United States Patent
Sasaki et al.

(10) Patent No.: US 7,321,412 B2
(45) Date of Patent: Jan. 22, 2008

(54) LIQUID CRYSTAL DISPLAY APPARATUS HAVING ALIGNMENT CONTROL FOR BRIGHTNESS AND RESPONSE

(75) Inventors: Takahiro Sasaki, Kawasaki (JP); Arihiro Takeda, Kawasaki (JP); Hideo Chida, Kawasaki (JP); Yoshio Koike, Kawasaki (JP); Kunihiro Tashiro, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/390,727

(22) Filed: Mar. 28, 2006

(65) Prior Publication Data

US 2006/0176430 A1   Aug. 10, 2006

Related U.S. Application Data

(63) Continuation of application No. 09/398,126, filed on Sep. 16, 1999.

(30) Foreign Application Priority Data

Sep. 18, 1998 (JP) .................... 10-264849
Aug. 13, 1999 (JP) .................... 11-229249

(51) Int. Cl.
  *G02F 1/1337* (2006.01)
(52) U.S. Cl. ..................... 349/129; 349/130
(58) Field of Classification Search ............... 349/141, 349/129, 130
  See application file for complete search history.

(56) References Cited

U.S. PATENT DOCUMENTS

| 4,878,742 | A | * | 11/1989 | Ohkubo et al. ............. 349/201 |
| 5,309,264 | A | | 5/1994 | Lien et al. |
| 5,434,690 | A | | 7/1995 | Hisatake et al. |
| 5,646,705 | A | | 7/1997 | Higuchi et al. |
| 5,872,611 | A | | 2/1999 | Hirata et al. |
| 5,905,556 | A | * | 5/1999 | Suzuki et al. ............. 349/141 |
| 6,008,874 | A | | 12/1999 | Kouno et al. |
| 6,067,141 | A | | 5/2000 | Yamada et al. |

(Continued)

FOREIGN PATENT DOCUMENTS

EP   0 854 377   7/1998

(Continued)

OTHER PUBLICATIONS

Takeda, et al.; A Super-High-Image-Quality Multi-Domain Vertical Alignment LCD by New Rubbing-Less Technology: *1998 SID International Symposium Digest of Technical Papers*; May 17-22, 1998; vol. 29, pp. 1077-1080.

(Continued)

*Primary Examiner*—James A. Dudek
(74) *Attorney, Agent, or Firm*—Greer, Burns & Crain, Ltd

(57) ABSTRACT

A liquid crystal display apparatus including a pair of substrates having electrodes and vertical alignment layers. A liquid crystal having a negative anisotropy of dielectric is inserted between the substrates. Each substrate has linearly arranged alignment control structures for controlling the alignment of the liquid crystal. The alignment control structures are formed in the form of projections or slits. Each alignment control structure is formed of a plurality of constituent units. In addition, means for forming a boundary of alignment of liquid crystal (singular point in director field) to control the liquid crystal located on the alignment control structures.

12 Claims, 103 Drawing Sheets

U.S. PATENT DOCUMENTS

| | | | |
|---|---|---|---|
| 6,100,953 | A | 8/2000 | Kim et al. |
| 6,181,402 | B1 | 1/2001 | Shim et al. |
| 6,188,457 | B1 | 2/2001 | Liu |
| 6,229,589 | B1 | 5/2001 | Koma |
| 6,256,080 | B1 | 7/2001 | Colgan et al. |
| 6,288,762 | B1 | 9/2001 | Sasaki et al. |
| 6,313,899 | B1 | 11/2001 | Wu et al. |
| 6,462,798 | B1 | 10/2002 | Kim et al. |
| 6,469,764 | B1 | 10/2002 | Kim et al. |
| 6,509,944 | B2 | 1/2003 | Koma et al. |
| 6,512,565 | B1 | 1/2003 | Lee et al. |
| 6,512,568 | B2 | 1/2003 | Song et al. |
| 6,567,144 | B1 | 5/2003 | Kim et al. |
| 6,661,488 | B1 | 12/2003 | Takeda et al. |
| 6,704,083 | B1 | 3/2004 | Kim et al. |
| 6,710,837 | B1 | 3/2004 | Song et al. |
| 6,724,452 | B1 | 4/2004 | Takeda et al. |
| 6,750,935 | B2 | 6/2004 | Seo et al. |
| 6,778,244 | B2 | 8/2004 | Song et al. |
| 6,791,647 | B1 | 9/2004 | Kim et al. |
| 6,809,787 | B1 | 10/2004 | Seo et al. |
| 6,825,906 | B2 | 11/2004 | Kim et al. |
| 6,862,063 | B2 | 3/2005 | Shim et al. |
| 6,876,419 | B2 | 4/2005 | Kim et al. |
| 6,937,311 | B2 | 8/2005 | Song et al. |
| 6,954,248 | B2 * | 10/2005 | Song et al. ............ 349/142 |
| 7,167,224 | B1 | 1/2007 | Takeda et al. |
| 7,224,421 | B1 | 5/2007 | Takeda et al. |
| 7,227,606 | B2 | 6/2007 | Takeda et al. |
| 2001/0009449 | A1 | 7/2001 | Kuo et al. |
| 2001/0010572 | A1 | 8/2001 | Koma et al. |
| 2001/0048494 | A1 | 12/2001 | Koma |
| 2002/0015125 | A1 | 2/2002 | Kim et al. |
| 2002/0118329 | A1 | 8/2002 | Koma |
| 2002/0145693 | A1 | 10/2002 | Kim et al. |
| 2003/0053019 | A1 | 3/2003 | Song et al. |
| 2003/0086043 | A1 | 5/2003 | Seo et al. |
| 2003/0202144 | A1 | 10/2003 | Kim et al. |
| 2004/0080697 | A1 | 4/2004 | Song et al. |
| 2004/0119924 | A1 | 6/2004 | Takeda et al. |
| 2004/0246422 | A1 | 12/2004 | Seo et al. |
| 2005/0105030 | A1 | 5/2005 | Kim et al. |
| 2005/0140887 | A1 | 6/2005 | Song et al. |
| 2007/0064187 | A1 | 3/2007 | Takeda et al. |

FOREIGN PATENT DOCUMENTS

| | | |
|---|---|---|
| EP | 0884 626 | 12/1998 |
| EP | 884626 | 12/1998 |
| JP | 06-043461 | 2/1994 |
| JP | 06-258649 | 9/1994 |
| JP | 07-043719 | 2/1995 |
| JP | 7199193 | 8/1995 |
| JP | 07-311383 | 11/1995 |
| JP | 08-101396 | 4/1996 |
| JP | 08-101399 | 4/1996 |
| JP | 08-146468 | 6/1996 |
| JP | 11-109358 | 4/1999 |
| JP | 11-149079 | 6/1999 |
| JP | 2000-147234 | 5/2000 |

OTHER PUBLICATIONS

Konovalov et al., "Multi-Domain Vertically Aligned Mode," 1998 SID International Symposium Digest of Technical Papers, Anaheim, CA, May 1998, vol. 29, pp. 1-4.

Anonymous, "Liquid Crystal Display," Research Disclosure, Mason Publications, Hampshire, GB, May 1998.

Lien et al., "Ridge and Fringe-Field Multi-Domain Homeotropic LCD," 1998 SID International Symposium Digest of Technical Papers, Anaheim, Ca, May 1998, vol. 29, 1123-1126.

Ong, H.L., "Multi-Domain Homeotropic LCDs with Symmetrical Angular Optical Performances," SID International Symposium Digest of Papers, Boston, May 1992, pp. 405-408.

* cited by examiner

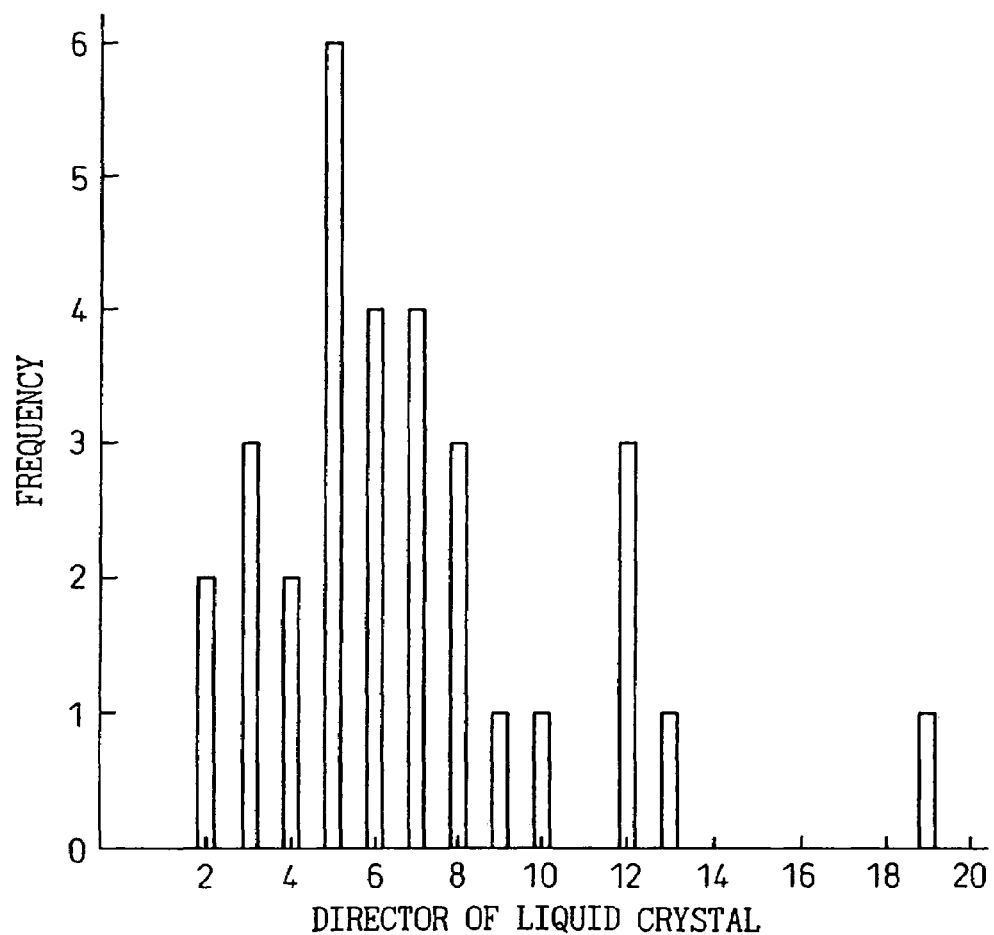

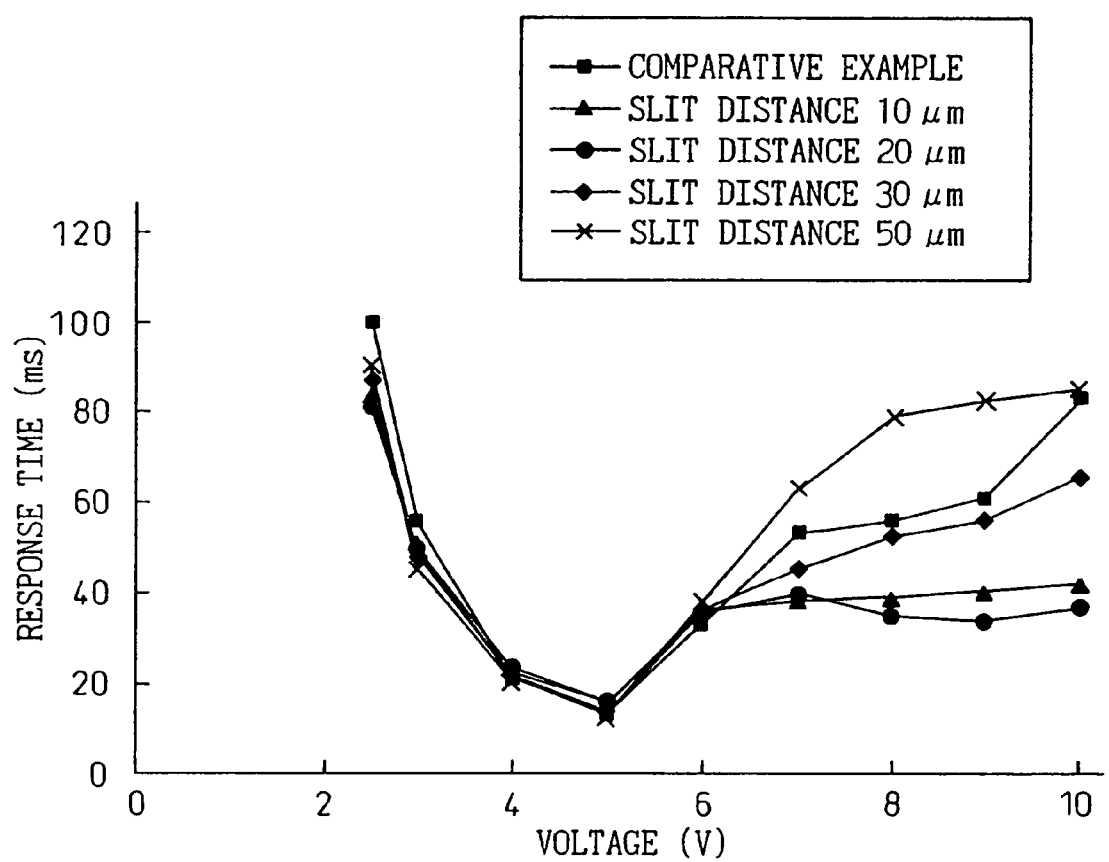

LIQUID CRYSTAL DISPLAY APPARATUS HAVING ALIGNMENT CONTROL FOR BRIGHTNESS AND RESPONSE

This is a continuation of application Ser. No. 09/398,126 filed Sep. 16, 1999.

BACKGROUND OF THE INVENTION

1. Field of the Invention

The present invention relates to a liquid crystal display apparatus such as a TV set or a display. In particular, the present invention relates to a liquid crystal display apparatus including a vertically aligned liquid crystal.

2. Description of the Related Art

A liquid crystal display apparatus includes a liquid crystal inserted between a pair of substrates. The pair of substrates include electrodes and alignment layers, respectively. The TN liquid crystal display apparatus that finds wide applications includes horizontal alignment layers and a crystal having a positive anisotropy of its dielectric constant. when no voltage is applied, the liquid crystal is aligned substantially parallel to the horizontal alignment layers. When a voltage is applied thereto, on the other hand, the liquid crystal becomes substantially perpendicular to the horizontal alignment layers.

The TN liquid crystal display apparatus has the advantage that it can be made thin but has the disadvantage that the visual field angle is small. A method of improving this disadvantage and assuring a wide visual field angle is alignment division. In alignment division, each pixel is divided into two regions, so that the liquid crystal rises toward one side in one region and rises toward the opposite side in the other region. In this way, a wider visual field angle is assured by averaging the behavior of the liquid crystal in one pixel.

To control alignment of the liquid crystal, the alignment layers are normally rubbed. For alignment division, one region of the pixel is rubbed in a first direction using a mask, and the other region of the one pixel is rubbed in a second direction opposite to the first direction using a complementary mask. As an alternative, the whole alignment layer is rubbed in the first direction, and the one region or the other region of one pixel is selectively irradiated with ultraviolet rays using a mask thereby to create a pretilt difference between the one region and the other region.

In a liquid crystal display apparatus using horizontal alignment layers, it is necessary to carry out cleaning to clean the substrates formed having the alignment layers after rubbing. As a result, the fabrication of the liquid crystal panel is comparatively troublesome and the substrates may be polluted during the rubbing.

In a liquid crystal display apparatus using vertical alignment layers, on the other hand, the liquid crystal is aligned substantially perpendicular to the vertical alignment layers when no voltage is applied thereto and the liquid crystal is substantially parallel to the vertical alignment layers when a voltage is applied thereto. Also with a liquid crystal apparatus using the vertical alignment layers, the alignment layers are normally rubbed for controlling the alignment of the liquid crystal.

Japanese Unexamined Patent Application No. 10-185836 filed by the assignee of this application proposes a liquid crystal display apparatus capable of controlling alignment of the liquid crystal, without rubbing. This liquid crystal display apparatus is an aligned crystal display apparatus of a vertical alignment type, includes a liquid crystal having vertical alignment layers and a negative anisotropy of dielectric constant, and has alignment control structures (linearly arranged structures having projections or slits) on each of the pair of substrates for controlling the alignment of the liquid crystal.

This liquid crystal display apparatus of a vertical alignment type has the advantages that no rubbing is required and that the alignment division can be attained by the arrangement of the linearly arranged structures. With this liquid crystal display apparatus of a vertical alignment type, therefore, it is possible to secure a wide visual field angle and a high contrast. Elimination of the requirement of rubbing allows the cleaning after rubbing to be eliminated. Thus, the fabrication of a liquid crystal display apparatus is facilitated, and without any pollution on the substrates, which otherwise might occur at the time of rubbing, the reliability of the liquid crystal display apparatus is improved.

In the liquid crystal display apparatus of a vertical alignment type having alignment control structures (projections or a slits) on substrates for controlling alignment of the liquid crystal, it has been found that there are regions where the alignment of liquid crystal molecules is unstable, and there are problems regarding brightness and response speed, which must be improved.

SUMMARY OF THE INVENTION

The object of the present invention is to provide a liquid crystal display apparatus of a vertical alignment type which has improved brightness and response.

A liquid crystal display apparatus according to the present invention comprises a pair of substrates having electrodes and vertical alignment layers, a liquid crystal having a negative anisotropy of its dielectric constant inserted between the pair of substrates, and alignment control structures arranged in each of the pair of substrates for controlling the orientation of the liquid crystal. Each alignment control structure comprises a plurality of constituent units.

With this configuration, each alignment control structure comprises a plurality of constituent units, so the movement of different alignment regions is smaller at the time of voltage application and the movement is rapidly ended. As a result, it is possible to provide a liquid crystal display apparatus having a high brightness and a high response speed.

According to another aspect of the invention, there is provided a liquid crystal display apparatus comprising a pair of substrates having electrodes and vertical alignment layers, a liquid crystal having a negative anisotropy of its dielectric constant inserted between the pair of substrates, and alignment control structures arranged in each of the pair of substrates for controlling alignment of the liquid crystal. The alignment control structures of at least one of the substrates has means for forming a boundary of alignment of a first type in which the liquid crystal molecules around a point are directed to said point and means for forming boundary of orientation of a second type in which a part of the liquid crystal molecules around a point are directed to said point and the other liquid crystal molecules around said point are directed away from said point.

According to still another aspect of the invention, there is provided a liquid crystal display apparatus comprising a pair of substrates having electrodes and vertical alignment layers, a liquid crystal having a negative anisotropy of its dielectric constant inserted between the pair of substrates, and alignment control structures arranged in each of the pair of substrates for controlling alignment of the liquid crystal.

The alignment control structures of one substrate are shifted from the alignment control structures of the other substrate, as viewed in the direction normal to the one substrate, and each of one substrate and the other substrate includes means for forming a boundary of alignment of liquid crystal molecules at fixed positions with respect to the alignment control structures of the opposed substrate, at the time of voltage application thereto.

According to a further aspect of the invention, there is provided a liquid crystal display apparatus comprising a pair of substrates having electrodes and vertical alignment layers, a liquid crystal having a negative anisotropy of its dielectric constant inserted between the pair of substrates, and alignment control structures arranged in each of the pair of substrates for controlling alignment of the liquid crystal. Each alignment control structure comprises a plurality of constituent units, and the constituent units of the alignment control structures of one substrate and the constituent units of the alignment control structures of the other substrate are arranged alternately on one line, as viewed in the direction normal to one substrate.

According to a still further aspect of the invention, there is provided a liquid crystal display apparatus comprising a pair of substrates having electrodes and vertical alignment layers, a liquid crystal having a negative anisotropy of its dielectric constant inserted between the pair of substrates, and alignment control structures arranged in each of the pair of substrates for controlling alignment of the liquid crystal. Each alignment control structure has a bent portion, and an additional alignment control structure is formed on the obtuse angle side of the bent portion of the alignment control structure of the substrate having the alignment control structures.

According to a yet further aspect of the invention, there is provided a liquid crystal display apparatus comprising a pair of substrates having electrodes and vertical alignment layers, a liquid crystal having a negative anisotropy of its dielectric constant inserted between the pair of substrates, and alignment control structures arranged in each of the pair of substrates for controlling alignment of the liquid crystal. The alignment control structure has a bent portion and an additional alignment control structure is arranged on the acute angle side of the bent portion of the alignment control structure of the substrate opposed to the substrate having the alignment control structures.

According to a still further aspect of the invention, there is provided a liquid crystal display apparatus comprising a pair of substrates having electrodes and vertical alignment layers, a liquid crystal having a negative anisotropy of its dielectric constant inserted between the pair of substrates, linearly arranged structures arranged in each of the pair of substrates for controlling alignment of the liquid crystal, and polarizers arranged respectively on the outside of the pair of substrates. One polarizer has an absorption axis displaced by a predetermined angle from an orientation rotated 45 degrees with respect to an orientation where the linearly arranged structures extend.

With this configuration, brightness of the liquid crystal display apparatus can be improved. Preferably, assuming that the crossing angle between the orientation of the absorption axis of the one polarizer and the linearly arranged structures is a, the crossing angle a is adapted to satisfy the relationship, $25°<a<43°$ or $47°<a<65°$.

According to a further aspect of the invention, there is provided a liquid crystal display apparatus comprising a pair of substrates having electrodes and vertical alignment layers, a liquid crystal having a negative anisotropy of its dielectric constant inserted between the pair of substrates, and alignment control structures arranged in each of the pair of substrates for controlling alignment of the liquid crystal. At least one substrate has TFTs connected to electrodes, shielding areas are arranged to cover the TFTs and the areas in the neighborhood thereof, and the shielding areas are overlapped partially with a part of the alignment control structures so that the area of the alignment control structures arranged in non-shielding areas is reduced.

With this configuration, brightness of the liquid crystal display apparatus can be improved. Preferably, in the case where the alignment control structures of the substrate having the TFTs are slits, the alignment control structures of the other substrate are overlapped with the shielding areas covering the TFTs.

According to yet another aspect of the invention, there is provided a liquid crystal display apparatus comprising a pair of substrates having electrodes and vertical alignment layers, a liquid crystal having a negative anisotropy of its dielectric constant inserted between the pair of substrates, and a linearly arranged structures arranged in each of the pair of substrates for controlling alignment of the liquid crystal. There are further provided first means arranged in the linearly arranged structures of one substrate for forming a boundary of alignment of the liquid crystal, and second means arranged on the other substrate at the same position as that of the first means in the direction in which the linearly arranged structures extend.

With this configuration, the orientation of the liquid crystal can be further assured for forming a boundary of alignment of the liquid crystal.

According to a yet further aspect of the invention, there is provided a liquid crystal display apparatus comprising a pair of substrates having electrodes and vertical alignment layers, a liquid crystal having a negative anisotropy of its dielectric constant inserted between the pair of substrates, and linearly arranged structures arranged in each of the pair of substrates for controlling alignment of the liquid crystal. The linearly arranged structures of the one substrate are formed in such a manner that at least the liquid crystal molecules located at a first position are aligned in the first direction parallel to the linearly arranged structures upon application of a voltage thereto, the linearly arranged structures of the other substrate are formed in such a manner that at least the liquid crystal molecules located at the second position on the linearly arranged structures are aligned in the second direction opposite to the first direction in parallel to the linearly arranged structures upon application of a voltage thereto, and the first position and the second position are located on a line perpendicular to the linearly arranged structures.

With this configuration, the trace appearing in the display when the liquid crystal display apparatus is affected by an external pressure can be eliminated. Preferably, the linearly arranged structures of the one substrate and the linearly arranged structures of the other substrate both include means for forming a boundary of alignment of a first type with the liquid crystal molecules around a point directed to said point. As an alternative, the linearly arranged structures of the one substrate and the linearly arranged structures of the other substrate may both include means for forming a boundary of alignment of a second type with the liquid crystal molecules around a point partially directed to said point and the other liquid crystal molecules are directed away from the same point.

According to still another aspect of the invention, there is provided a liquid crystal display apparatus comprising a pair of substrates having electrodes and vertical alignment layers, a liquid crystal having a negative anisotropy of its dielectric constant inserted between the pair of substrates, alignment control structures arranged in each of the pair of substrates for controlling alignment of the liquid crystal, and an auxiliary wall structure on at least one of the substrates between the alignment control structures of the substrate pair, as viewed in the direction normal to the substrate pair.

With this configuration, the response to the voltage application can be improved. Preferably, the auxiliary wall structure is long in the direction perpendicular to the alignment control structures and is arranged at a predetermined pitch along the alignment control structures.

According to a yet further aspect of the invention, there is provided a liquid crystal display apparatus comprising a pair of substrates having electrodes and vertical alignment layers, a liquid crystal having a negative anisotropy of its dielectric constant inserted between the pair of substrates, alignment control structures arranged in each of the pair of substrates for controlling alignment of the liquid crystal, and liquid crystal inclined orientation control means arranged between the alignment control structures of the substrate pair ill which a parameter changes in one direction from one of the alignment control structures.

With this configuration, response to the voltage application can be improved.

BRIEF DESCRIPTION OF THE DRAWINGS

The present invention will become more apparent from the following description of the preferred embodiments, with reference to the accompanying drawings, in which:

FIG. 77 is a view showing the relationship between the angle of the director of the liquid crystal and frequency thereof for minor areas in the liquid crystal display apparatus having the alignment control structures for controlling the alignment of the liquid crystal;

FIGS. 116A to 116G are views showing a method of fabricating a substrate having the alignment control structures and auxiliary wall structures;

FIGS. 117A to 117E are views showing another example of the method of fabricating a substrate having the alignment control structures and auxiliary wall structures;

FIG. 118 is a view showing a response when the distance between the auxiliary structures (slits) is changed while fixing the width of the auxiliary wall structures (slits) in the liquid crystal display apparatus of FIG. 111;

FIG. 119 is a view showing a response when the width of the auxiliary structures (slits) is changed while fixing the distance between the auxiliary wall structures (slits) in the liquid crystal display apparatus of FIG. 111;

FIG. 120 is a view showing a response when the distance between the auxiliary structures (slits) is changed while fixing the size of the auxiliary wall structures (slits) in the liquid crystal display apparatus of FIG. 112;

FIG. 121 is a view showing a response with the size of the auxiliary structures (projections) is changed while fixing the distance between the auxiliary wall structures (projections) in the liquid crystal display apparatus of FIG. 112;

FIG. 122 is a view showing the alignment control structures of the liquid crystal display apparatus according to the eleventh embodiment of the present invention;

FIG. 123 is a view showing a modification of the liquid crystal display apparatus of FIG. 122;

FIGS. 124A to 124E are views showing a method of fabricating the liquid crystal display apparatus of FIG. 122;

FIGS. 125A to 125E are views showing a method of fabricating the liquid crystal display apparatus of FIG. 123;

FIG. 126 is a view showing a modification of the liquid crystal display apparatus of FIG. 122;

FIG. 127 is a view showing a modification of the liquid crystal display apparatus of FIG. 122;

Figure 43:
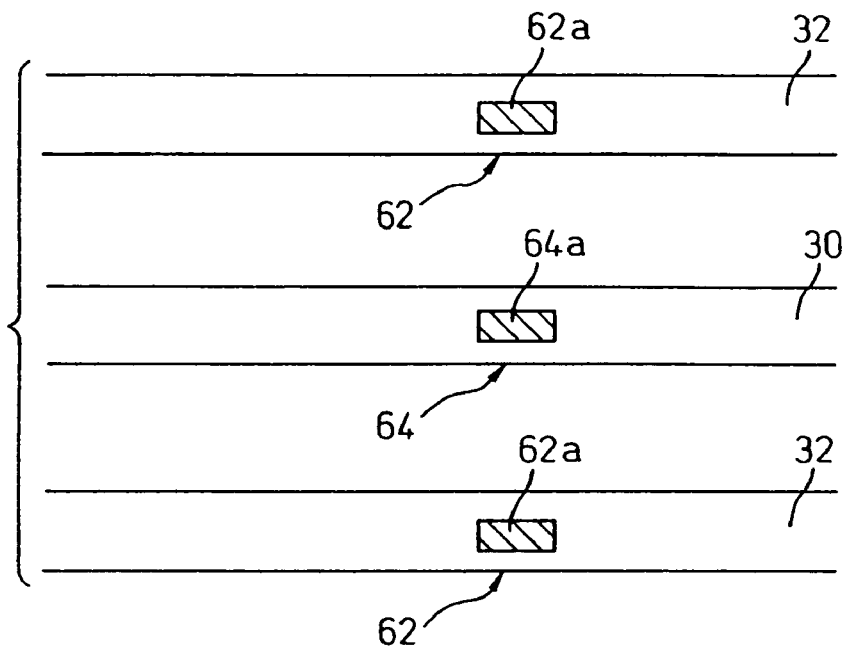
FIG. 43 is a plan view showing the alignment control structures according to the third embodiment of the present invention.
Figure 122:
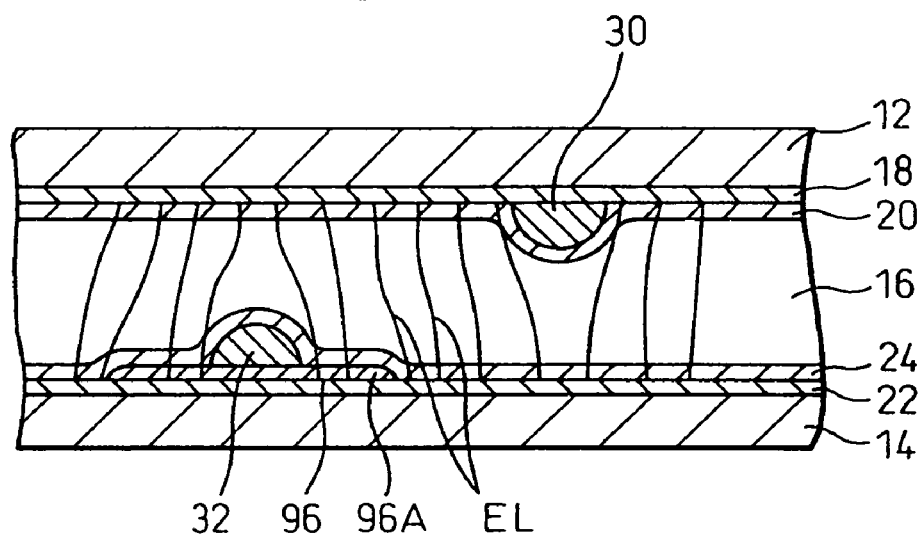
Figure 128:
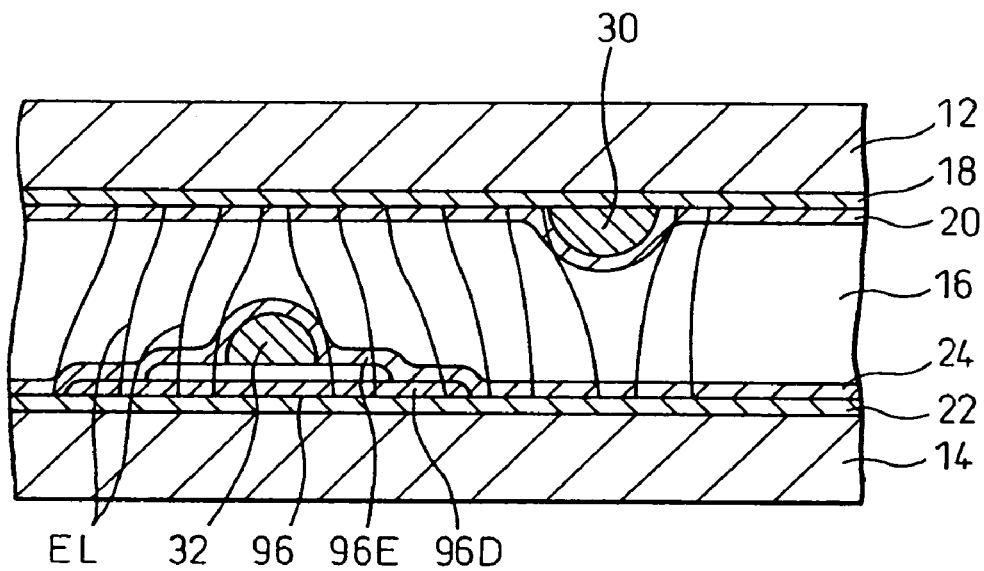
Figure 129:
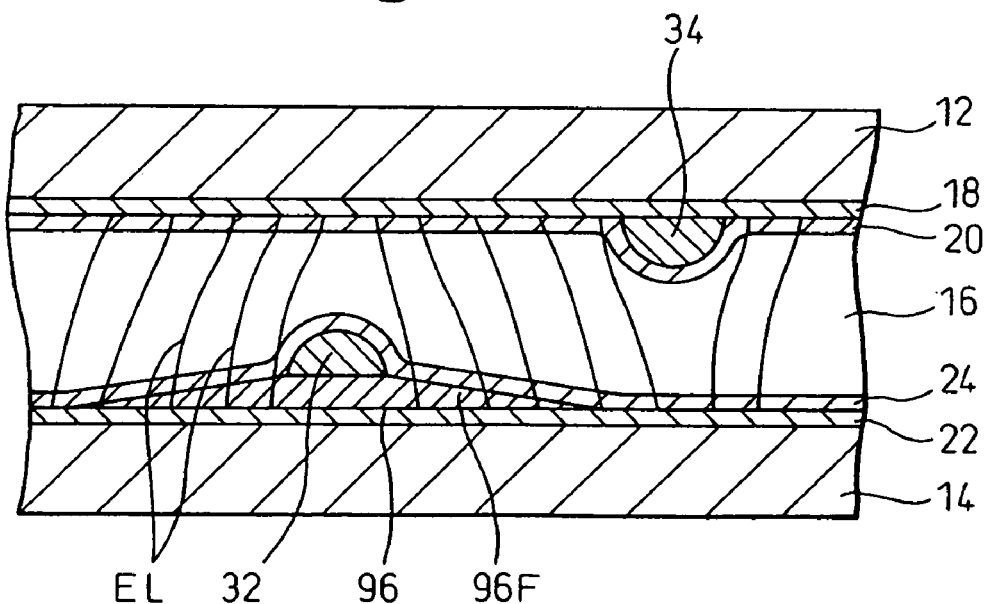
Figure 130:
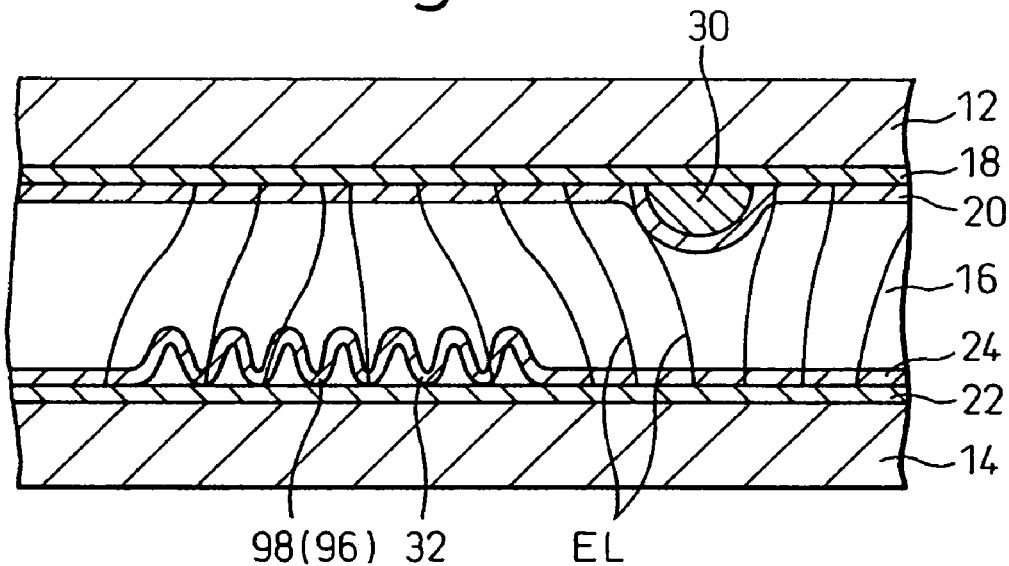
Figure 131:
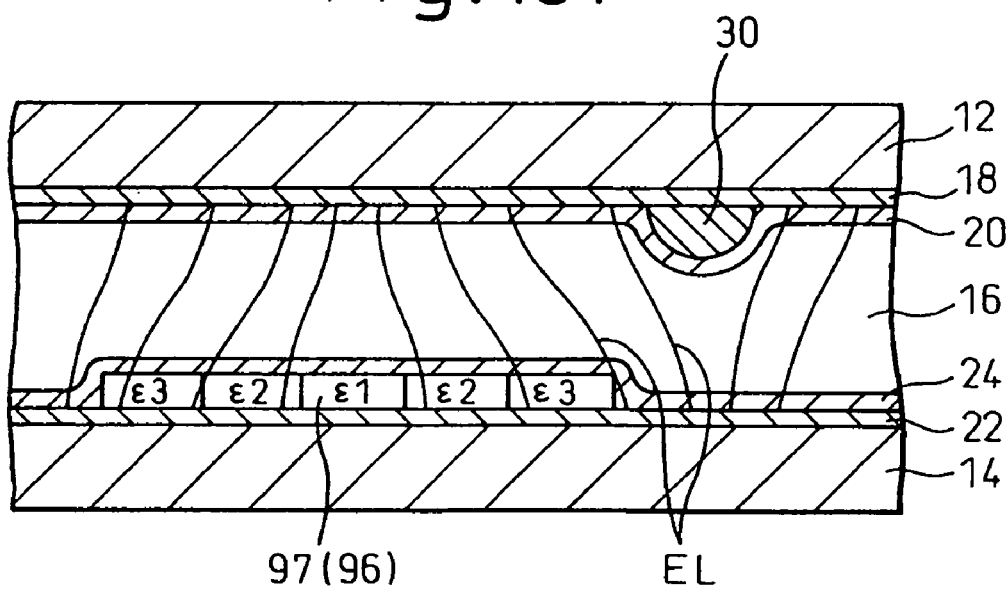
Figure 132:
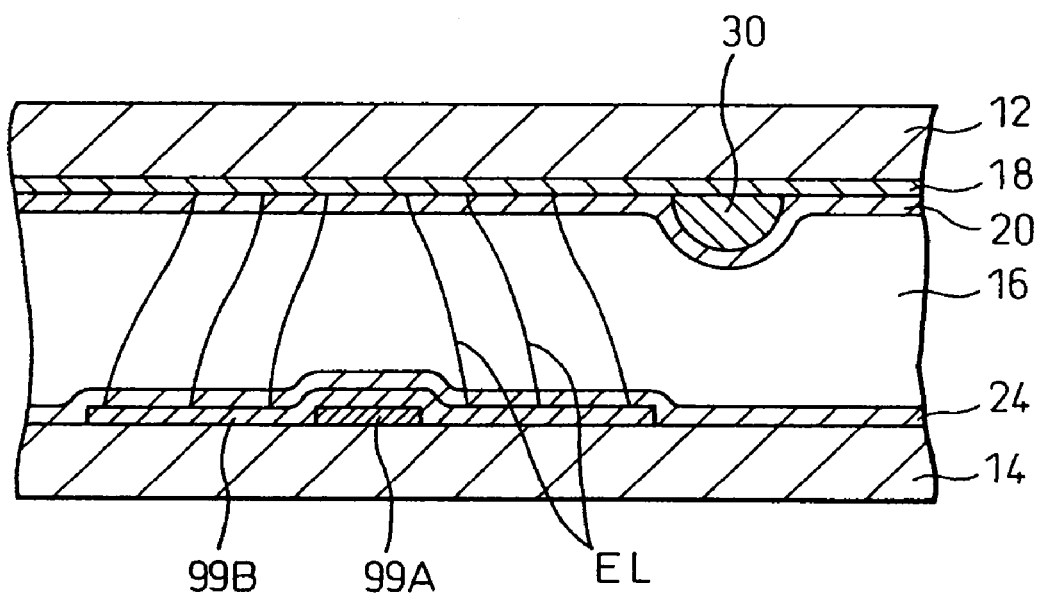
Figure 133A:
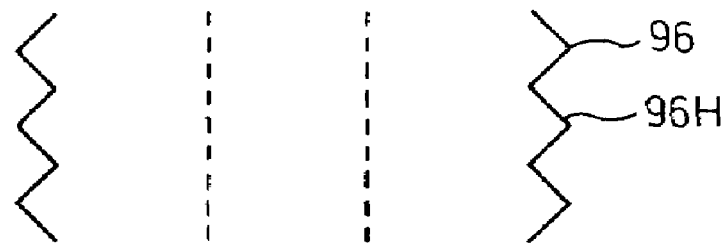
Figure 133B:
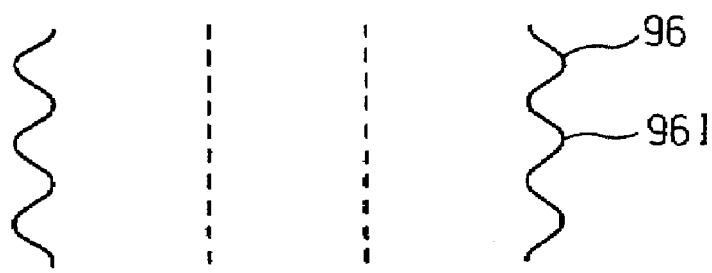
Figure 133C:
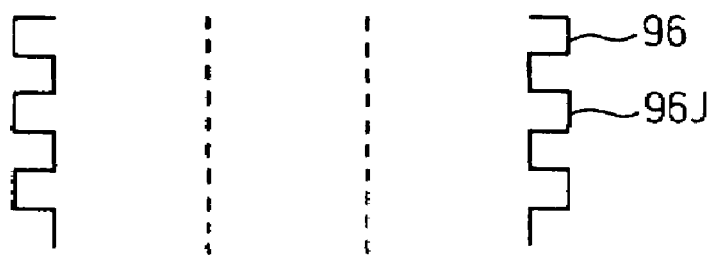
Figure 134A:
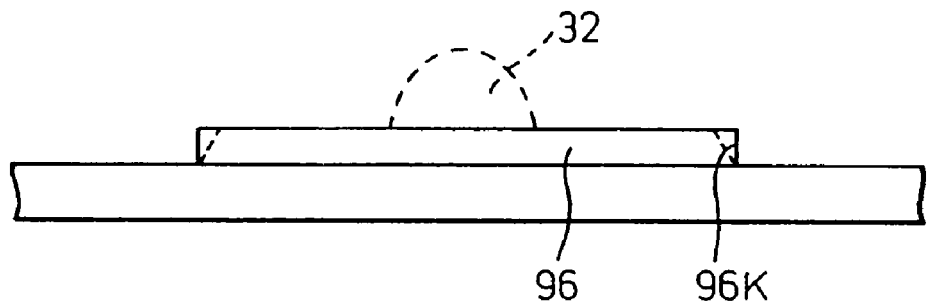
Figure 134B:
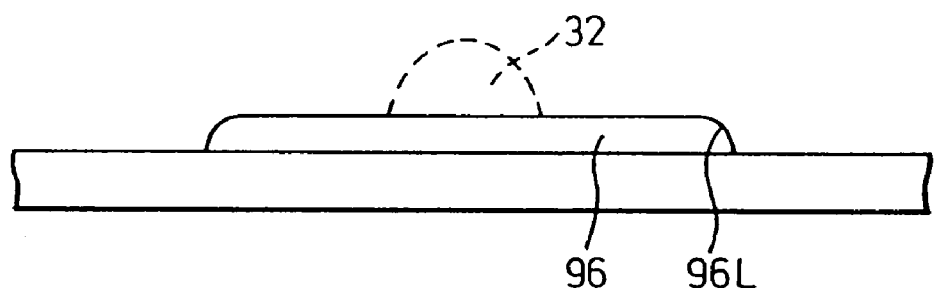
Figure 134C:
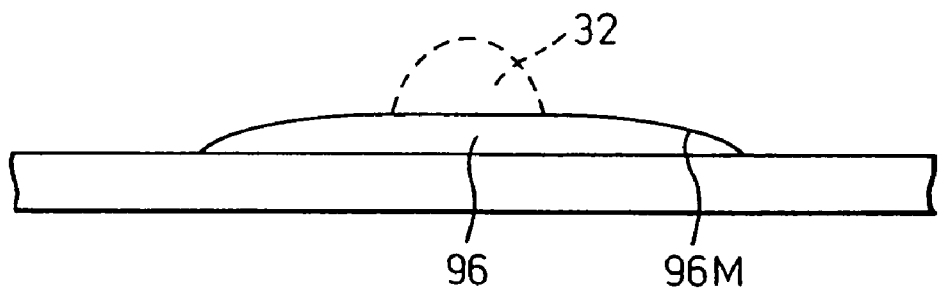
Figure 135A:
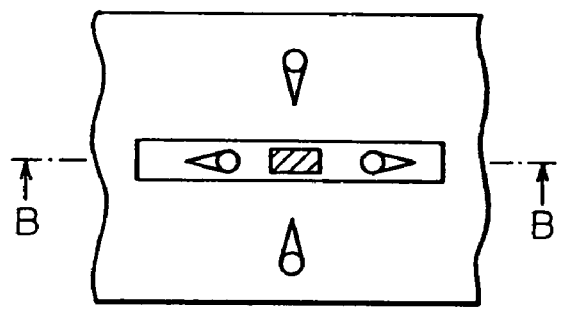
Figure 135B:
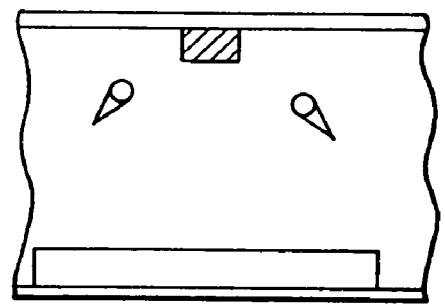
Figure 136A:
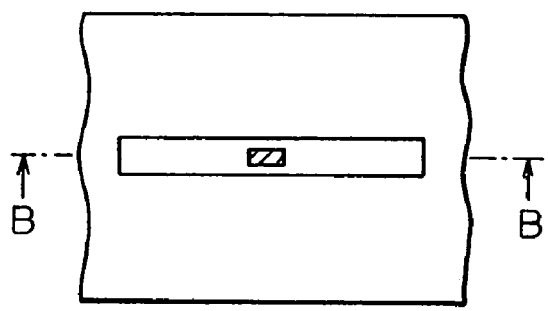
Figure 136B:
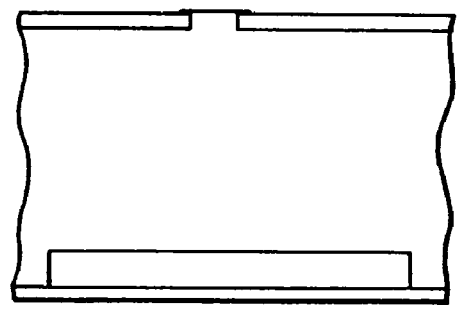
Figure 137A:
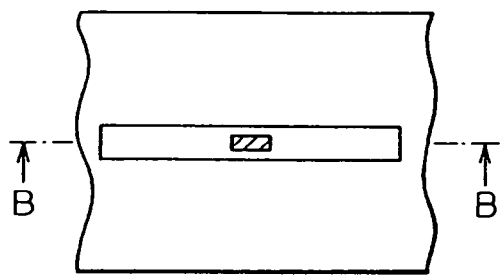
Figure 137B:
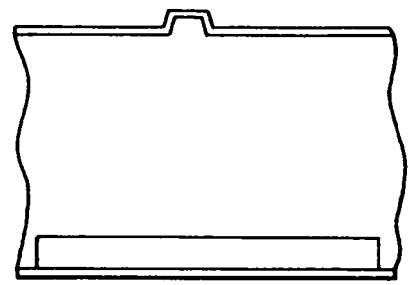
Figure 138A:
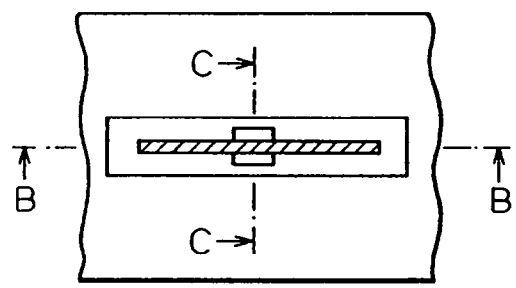
Figure 138B:
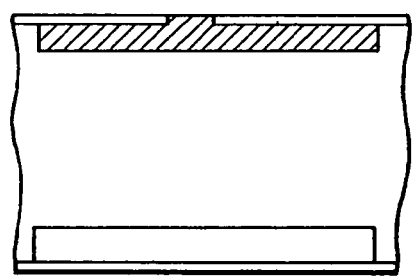
Figure 138C:
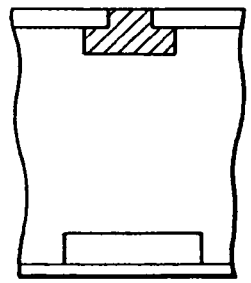
Figure 138D:
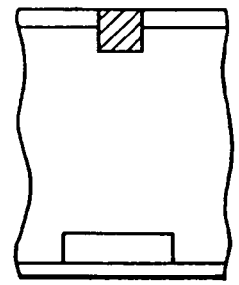
Figure 138E:
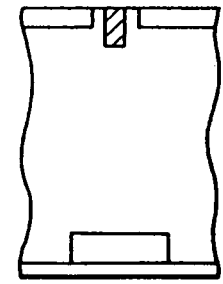
Figure 139A:
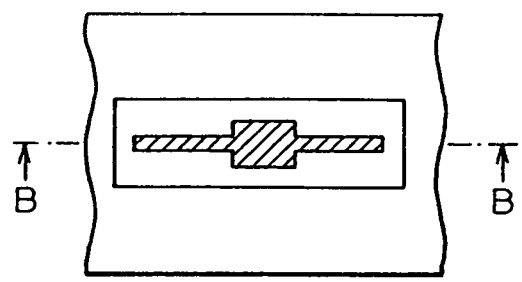
Figure 139B:
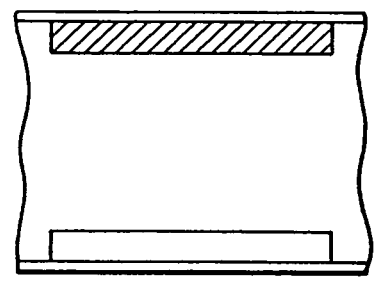
Figure 140A:
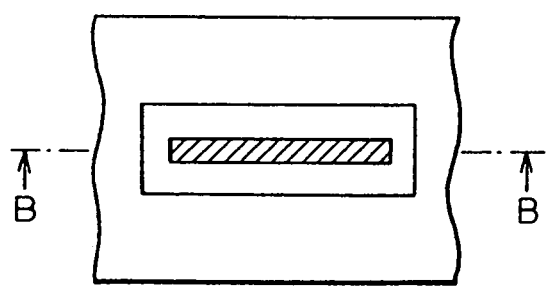
Figure 140B:
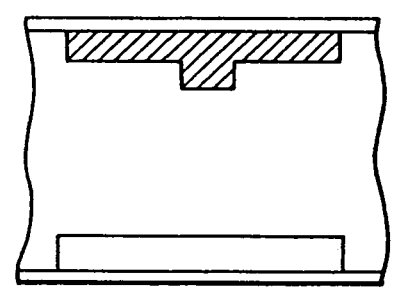
Figure 141A:
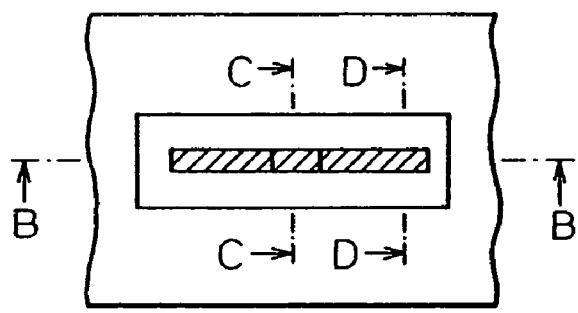
Figure 141B:
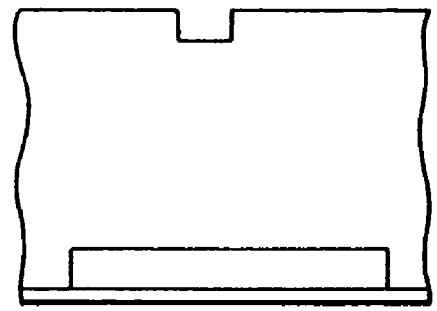
Figure 141C:
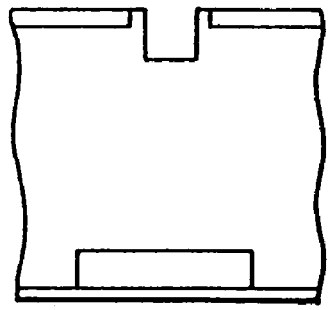
Figure 141D:
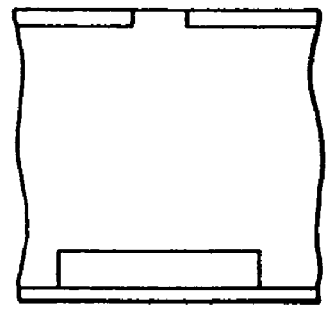
Figure 142A:
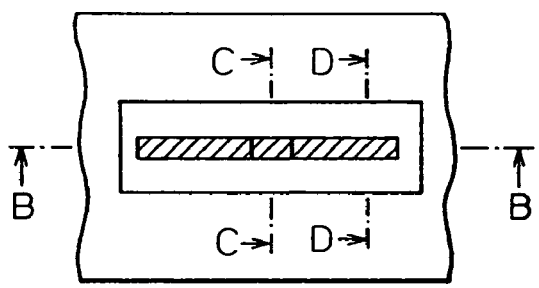
Figure 142B:
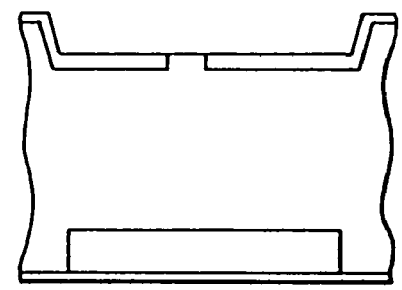
Figure 142C:
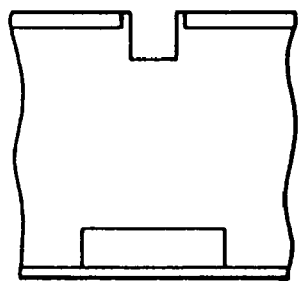
Figure 142D:
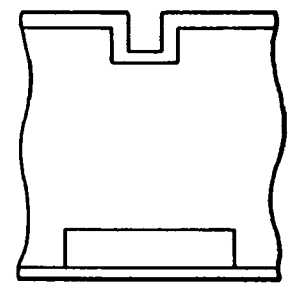
Figure 143A:
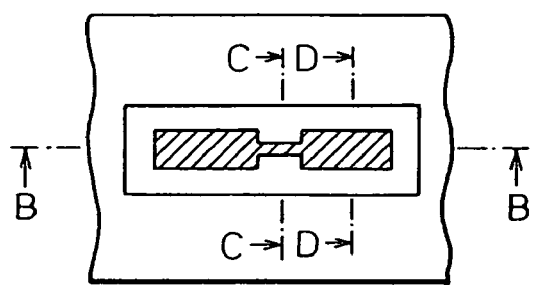
Figure 143B:
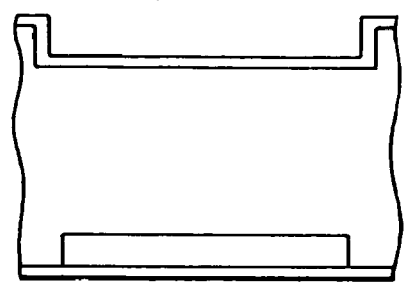
Figure 143C:
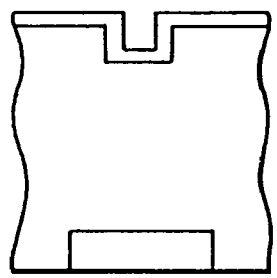
Figure 143D:
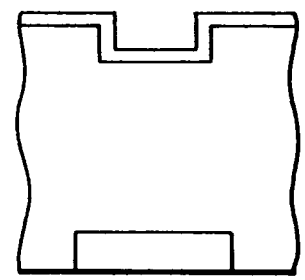
Figure 144A:
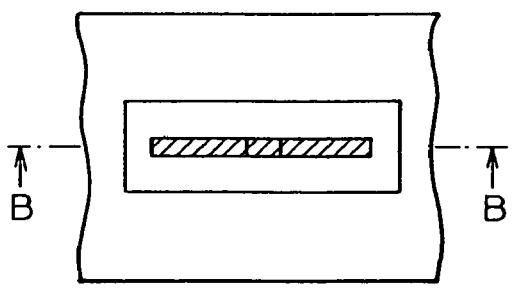
Figure 144B:
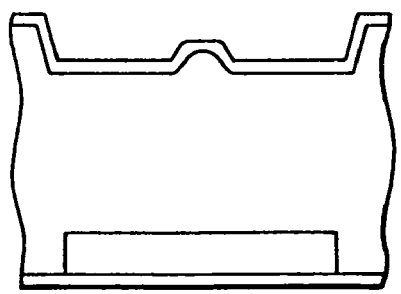
Figure 145A:
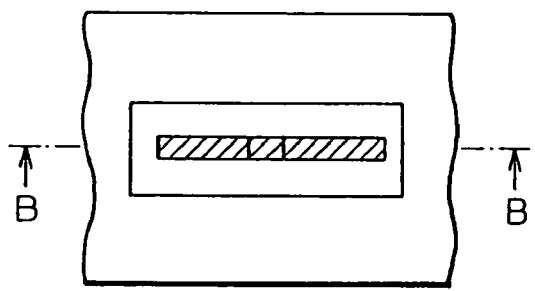
Figure 145B:
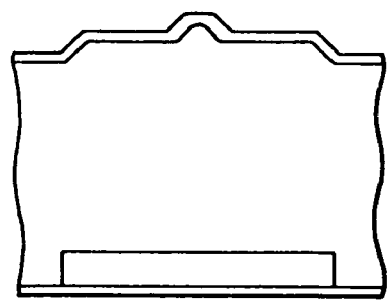
Figure 146A:
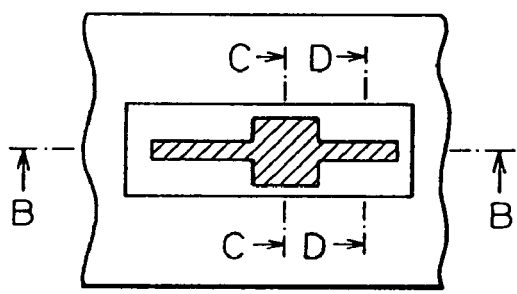
Figure 146B:
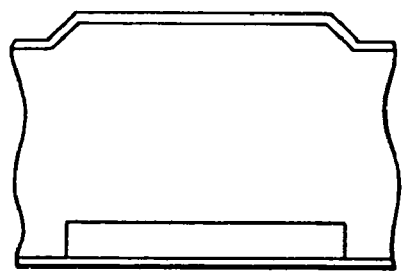
Figure 146C:
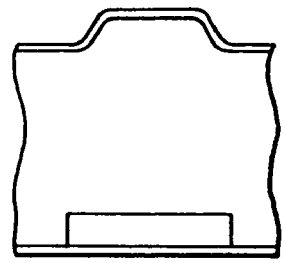
Figure 146D:
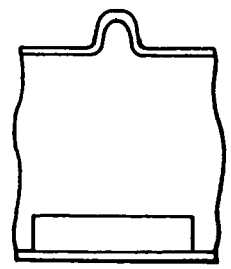
Figure 147A:
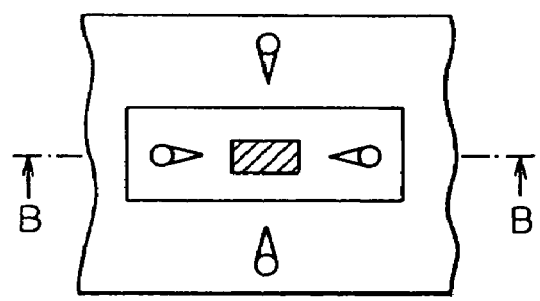
Figure 147B:
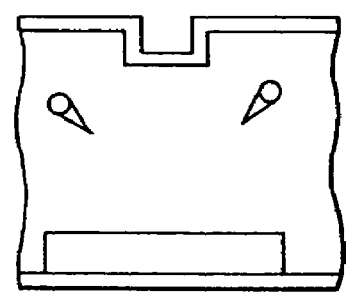
Figure 148A:
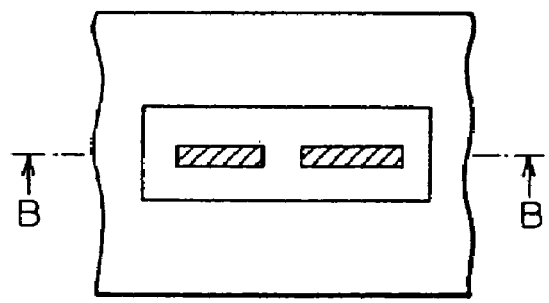
Figure 148B:
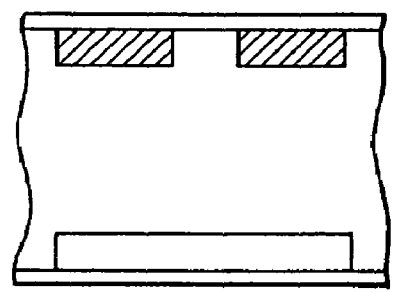
Figure 149A:
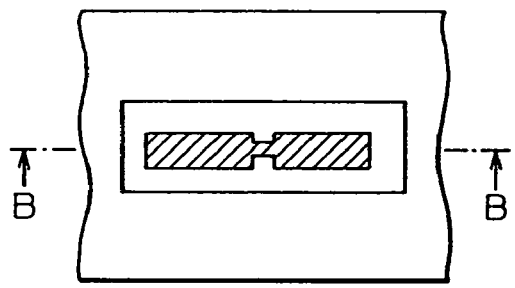
Figure 149B:
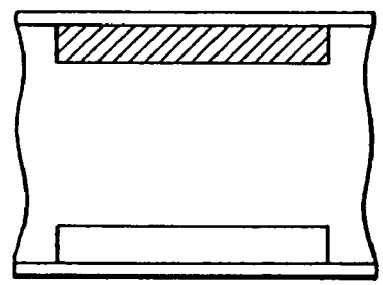
Figure 150A:
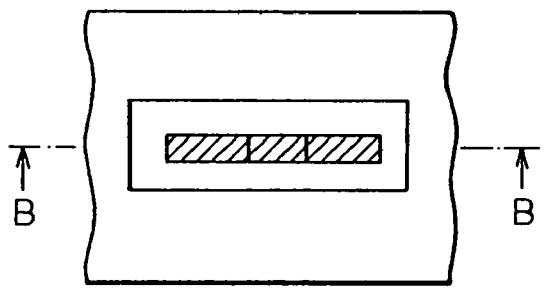
Figure 150B:
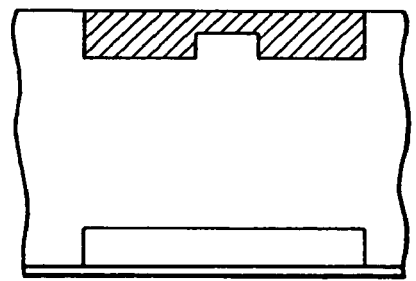
Figure 151A:
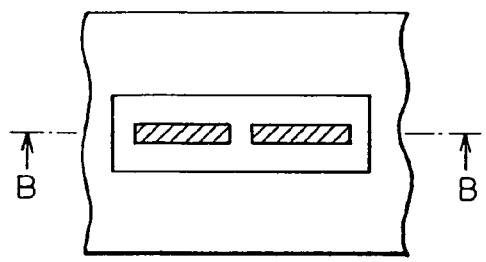
Figure 151B:
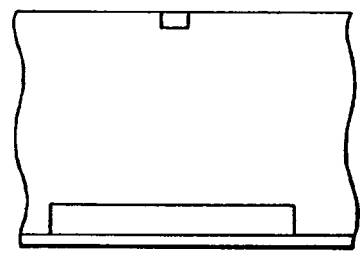
Figure 152A:
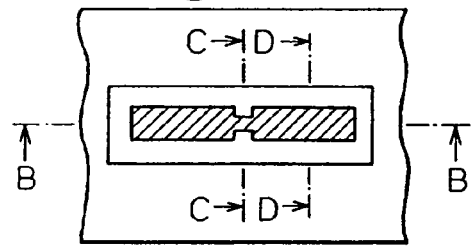
Figure 152B:
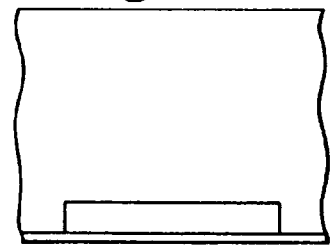
Figure 152C:
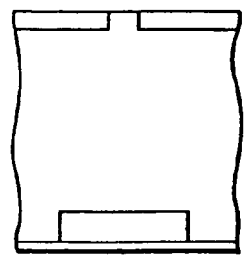
Figure 152D:
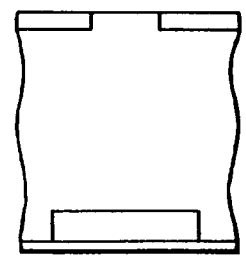
Figure 153A:
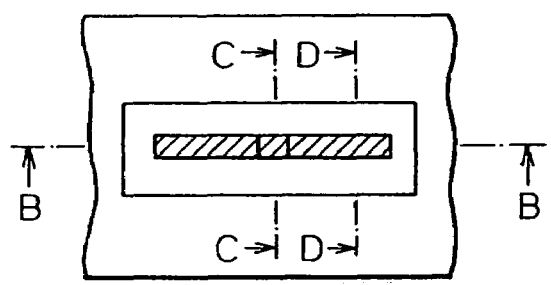
Figure 153B:
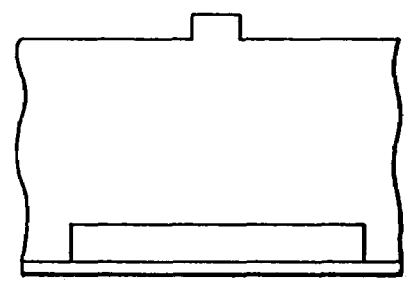
Figure 153C:
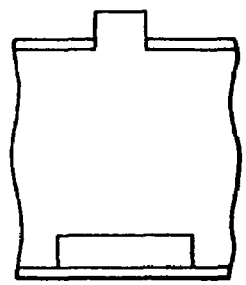
Figure 153D:
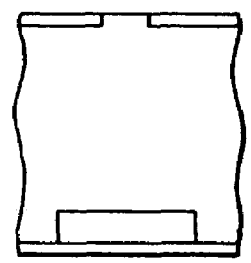
Figure 154A:
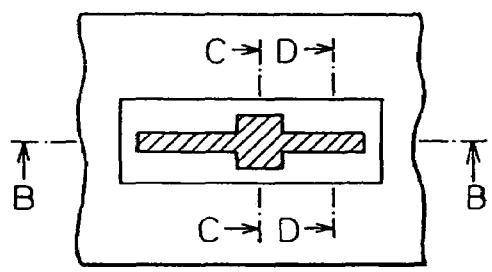
Figure 154B:
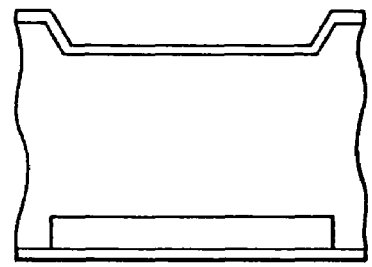
Figure 154C:
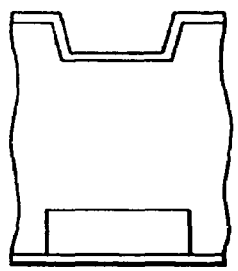
Figure 154D:
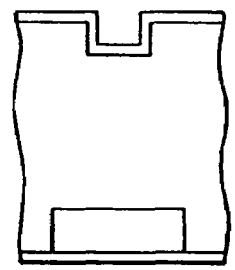
Figure 155A:
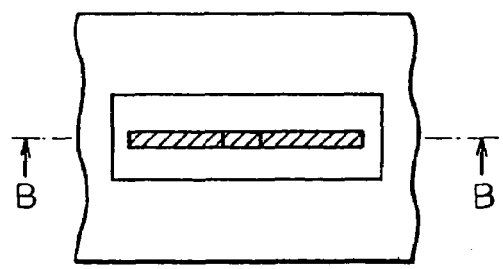
Figure 155B:
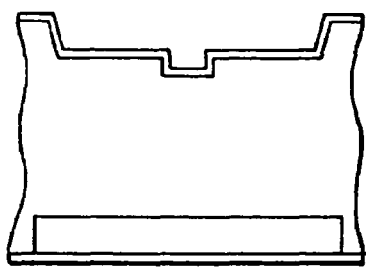
Figure 156A:
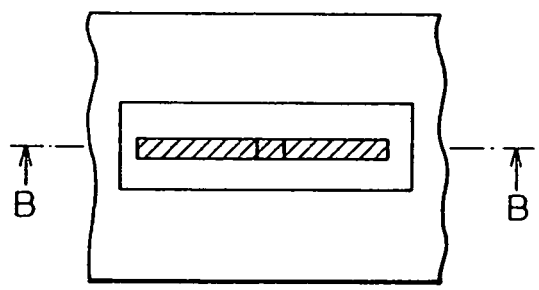
Figure 156B:
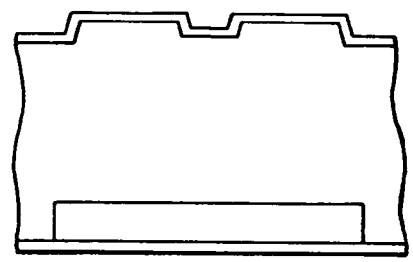
Figure 157A:
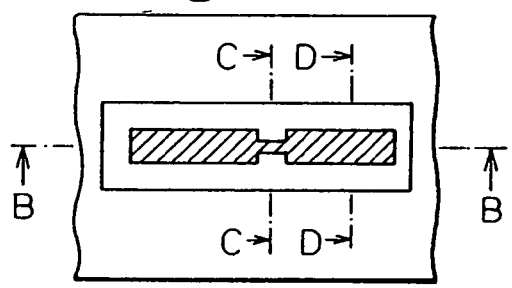
Figure 157B:
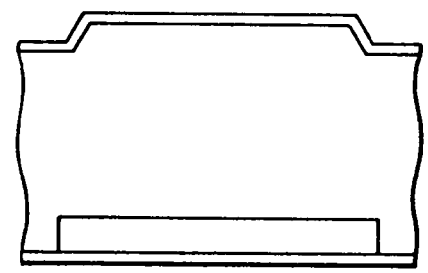
Figure 157C:
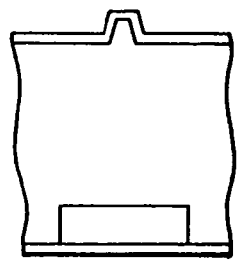
Figure 157D:
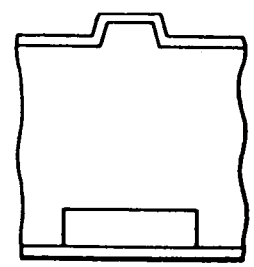

FIG. 128 is a view showing a modification of the liquid crystal display apparatus of FIG. 122;

FIG. 129 is a view showing a modification of the liquid crystal display apparatus of FIG. 122;

FIG. 130 is a view showing a modification of the liquid crystal display apparatus of FIG. 122;

FIG. 131 is a view showing a modification of the liquid crystal display apparatus of FIG. 122;

FIG. 132 is a view showing a modification of the liquid crystal display apparatus of FIG. 122;

FIGS. 133A to 133C are views showing modifications of the liquid crystal display apparatus of FIG. 122;

FIGS. 134A to 134C are views showing modifications of the liquid crystal display apparatus of FIG. 122;

FIGS. 135A and 135B are views showing a modification of the alignment control structures of FIG. 43;

FIGS. 136A and 136B are views showing a modification of the alignment control structures of FIG. 43;

FIGS. 137A and 137B are views showing a modification of the alignment control structures of FIG. 43;

FIGS. 138A to 138E are views showing a modification of the alignment control structures of FIG. 43;

FIGS. 139A and 139B are views showing a modification of the alignment control structures of FIG. 43;

FIGS. 140A and 140B are views showing a modification of the alignment control structures of FIG. 43;

FIGS. 141A to 141D are views showing a modification of the alignment control structures of FIG. 43;

FIGS. 142A to 142D are views showing a modification of the alignment control structures of FIG. 43;

FIGS. 143A to 143D are views showing a modification of the alignment control structures of FIG. 43;

FIGS. 144A and 144B are views showing a modification of the alignment control structures of FIG. 43;

FIGS. 145A and 145B are views showing a modification of the alignment control structures of FIG. 43;

FIGS. 146A to 146D are views showing a modification of the alignment control structures of FIG. 43;

FIGS. 147A and 147B are views showing a modification of the alignment control structures of FIG. 43;

FIGS. 148A and 148B are views showing a modification of the alignment control structures of FIG. 43;

FIGS. 149A and 149B are views showing a modification of the alignment control structures of FIG. 43;

FIGS. 150A and 150B are views showing a modification of the alignment control structures of FIG. 43;

FIGS. 151A and 151B are views showing a modification of the alignment control structures of FIG. 43;

FIGS. 152A to 152D are views showing a modification of the alignment control structures of FIG. 43;

FIGS. 153A to 153D are views showing a modification of the alignment control structures of FIG. 43;

FIGS. 154A to 154D are views showing a modification of the alignment control structures of FIG. 43;

FIGS. 155A and 155B are views showing a modification of the alignment control structures of FIG. 43;

FIGS. 156A and 156B are views showing a modification of the alignment control structures of FIG. 43; and FIGS. 157A to 157D are views showing a modification of the alignment control structures of FIG. 43.

DESCRIPTION OF THE PREFERRED EMBODIMENTS

Figure 1:
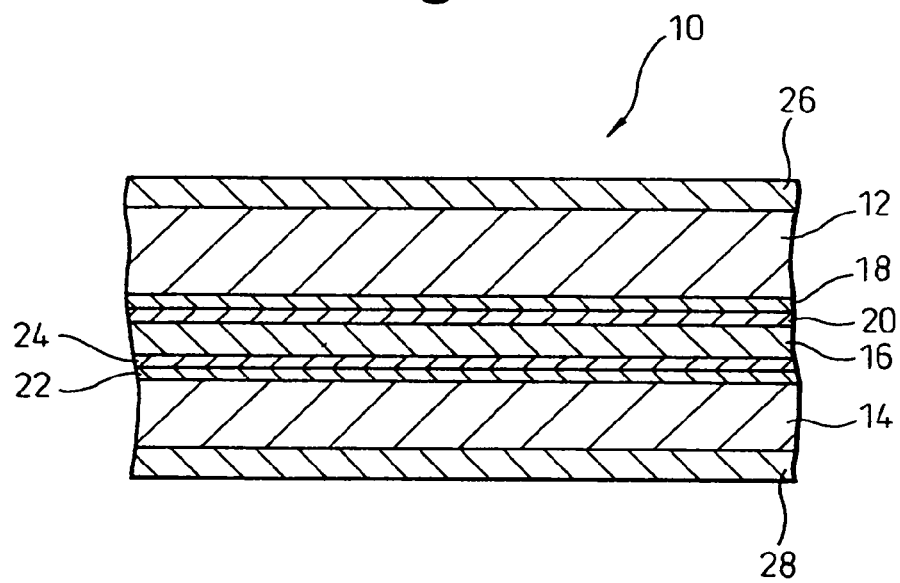
FIG. 1 is a schematic cross-sectional view showing a liquid crystal display apparatus.

The invention will now be explained with reference to the preferred embodiments. FIG. 1 is a schematic cross-sectional view showing a liquid crystal display apparatus according to the present invention. In FIG. 1, the liquid crystal display apparatus 10 includes a pair of transparent glass substrates 12 and 14, and a liquid crystal 16 having a negative anisotropy of its dielectric constant inserted between the glass substrates 12 and 14. The first glass substrate 12 has an electrode 18 and a vertical alignment layer 20, and the second glass substrate 14 has an electrode 22 and a vertical alignment layer 24. Further, a polarizer 26 is arranged on the outside of the first glass substrate 2, and a polarizer 28 is arranged on the outside of the second glass substrate 14. To simplify the explanation, the first glass substrate 12 will be called the upper substrate, and the second glass substrate 14 will be called the lower substrate.

In the case where the upper substrate 12 is configured as a color filter substrate, the upper substrate 12 further includes a color filter and a black mask. In this case, the electrode 18 is a common electrode. In the case where the lower substrate is configured as a TFT substrate, on the other hand, this lower substrate 12 includes an active matrix drive circuit together with the TFTs. In this case, the electrode 22 comprises a pixel electrodes.

Figure 2:
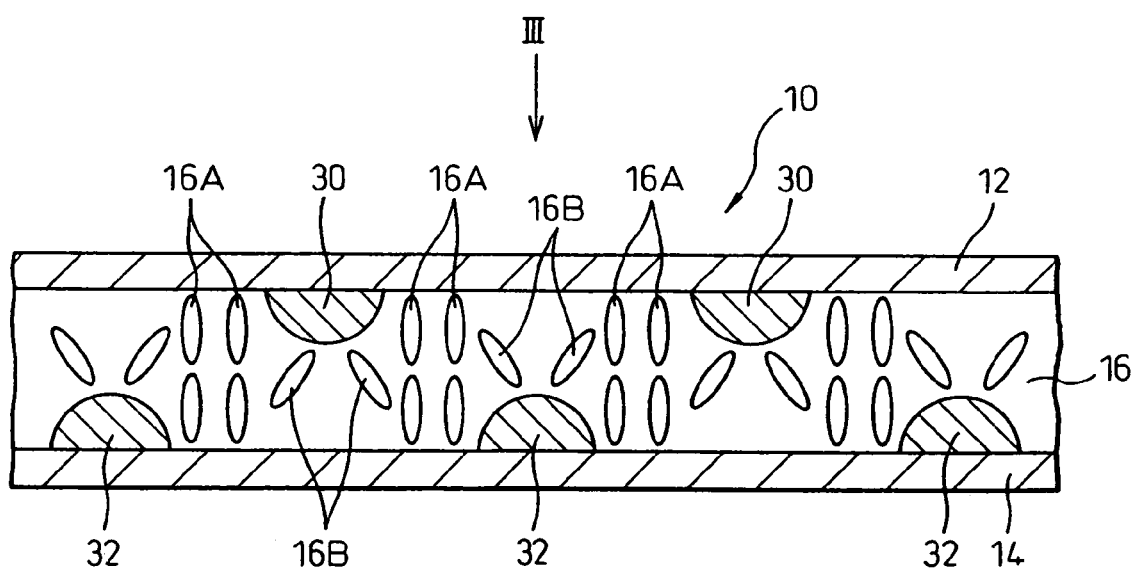
FIG. 2 is a schematic cross-sectional view showing a vertical alignment type liquid crystal display apparatus having alignment control structures for controlling alignment of the liquid crystal.

FIG. 2 is a schematic cross-sectional view showing the liquid crystal display apparatus of a vertical orientation type having alignment control structures for controlling alignment of the liquid crystal. For simplicity, the electrodes 18 and 22 and the alignment layers 20 and 24 of FIG. 1 are not shown in FIG. 2. In FIG. 2, the upper substrate 12 has projections 30 protruded toward the lower substrate 14 as alignment control structures. In a similar fashion, the lower substrate 14 has projections 32 protruded toward the upper substrate 12 as alignment control structures. The projections 30 and 32 extend linearly in the direction perpendicular to the page of FIG. 2.

Figure 3:
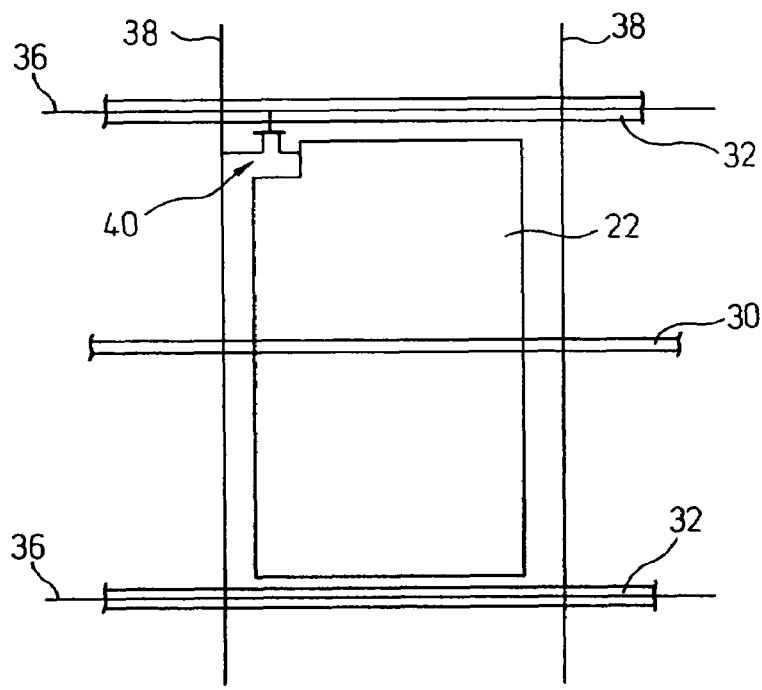
FIG. 3 is a plan view showing one pixel and the alignment control structures.

FIG. 3 is a plan view of the projections 30 and 32 shown from the direction of arrow III of FIG. 2. FIG. 3 further shows the portion of one pixel of the active matrix drive circuit. The active matrix drive circuit includes gate bus lines 36, drain bus lines 38, TFTs 40 and pixel electrodes 22. The projection 30 of the upper substrate 12 passes through the center of the pixel electrode 22, and the projections 32 of the lower substrate 12 pass through the gate bus lines 36. In this way, the projections 30 and 32 extend, in the top plan view, in parallel to each other and are arranged alternately. The example of FIG. 3, however, is a very simple one, to which the arrangement of the projections 30 and 32 is not limited.

As shown in FIG. 2, in the case where the liquid crystal 16 having a negative anisotropy of dielectric constant is arranged between the vertical alignment layers 20 and 24, the liquid crystal molecules 16A are aligned in the direction perpendicular to the vertical alignment layers 20 and 24 when no voltage is applied thereto. In the neighborhood of the projections 30 and 32, the liquid crystal molecules 16B are aligned in the direction perpendicular to the projections 30 and 32.

The projections 30 and 32 include slopes, and therefore the liquid crystal molecules 16B aligned in the direction perpendicular to the projections 30 and 32 are aligned at an angle to the vertical alignment layers 20 and 24.

Upon application of the voltage to the liquid crystal 16, the liquid crystal 16 having a negative anisotropy of its dielectric constant is aligned perpendicular to the electric field, and therefore the liquid crystal molecules lie substantially parallel to the substrate surfaces (vertical alignment layers 20 and 24). Normally, if the vertical alignment layers 20 and 24 are not rubbed, the direction in which the liquid crystal molecules lie is not decided, so the behavior of the liquid crystal is unstable. If the projections 30 and 32 extending in parallel to each other are provided as in this invention, however, the liquid crystal molecules 16B in the neighborhood of these projections 30 and 32 are aligned at an angle to the vertical alignment layers 20 and 24 as if pretilted, and therefore the direction in which the liquid crystal molecules 16B lie is determined by the time of voltage application thereto.

Taking as an example the liquid crystal molecules between the projection 30 on the left side on the upper substrate 14 and the projection 32 on the lower left side below the projection 30 in FIG. 2, the liquid crystal molecules 16B between these projections 30 and 32 are aligned from the upper right toward the lower left, and therefore, at the time of voltage application thereto, the liquid crystal molecules 16B fall in the direction parallel to the vertical alignment layers 20, 24 while rotating in the clockwise direction. As a result, the liquid crystal molecules 16A between these projections 30 and 32 fall in the direction parallel to the vertical alignment layers 20, 24 while rotating in the clockwise direction according to the behavior of the liquid crystal molecules 16B. In a similar fashion, among the liquid crystal molecules between the projection 30 on the left side of the upper substrate 14 and the projection 32 on the lower right below the projection 30 in FIG. 2, the liquid crystal molecules 16B between the projections 30 and 32 are aligned from the upper left side down rightward, and therefore fall in the direction parallel to the vertical alignment layers 20 and 24 while rotating in the counterclockwise direction at the time of voltage application thereto. As a result, the liquid crystal molecules 16A between these projections 30 and 32 fall parallel to the vertical alignment layers 20 and 24 while rotating in the counterclockwise direction according to the behavior of the liquid crystal molecules 16B.

Figure 4A:
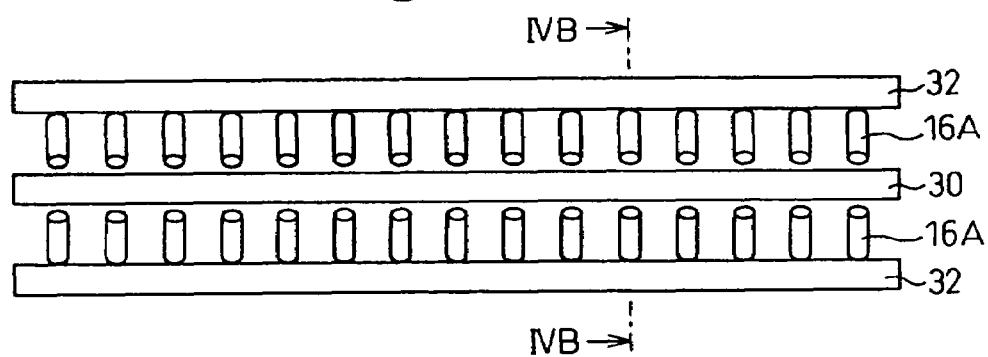
FIG. 4A is a plan view of the linearly arranged structures of FIGS. 2 and 3 with liquid crystal molecules falling based on the linearly arranged structures at the time of voltage application.
Figure 4B:
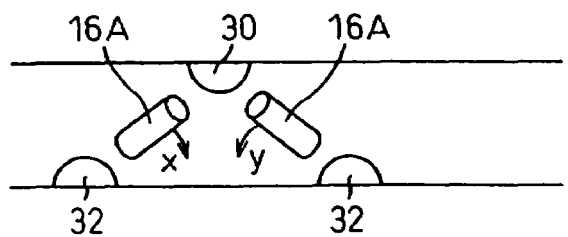
FIG. 4B is a cross-sectional view taken along the line IVB-IVB in FIG. 4A.

FIGS. 4A and 4B are views showing the liquid crystal molecules 16A falling at the time of voltage application thereto in accordance with the arrangement of the projections 30 and 32 of FIGS. 2 and 3. FIG. 4A is a plan view and FIG. 4B a cross-sectional view taken in line IVB-IVB. The liquid crystal molecules 16A on one side of the projection 30 of the upper substrate 12 fall toward the projection 30 while rotating in the clockwise direction (the direction along arrow X), while the liquid crystal molecules 16A on the other side of the projection 30 of the upper substrate 12 fall toward the projection 30 while rotating in the counterclockwise direction (the direction along arrow Y). By the way, in FIG. 4A, the liquid crystal molecules 16A are aligned perpendicular to the page of FIG. 4A in the absence of a voltage applied thereto. In this way, the liquid crystal alignment can be controlled without rubbing, and a plurality of areas having different directions of alignment of liquid crystal molecules are created in one pixel. Therefore, the alignment division is attained, thereby realizing a liquid crystal display apparatus having a wide angular range with a superior visual field.

Figure 5:
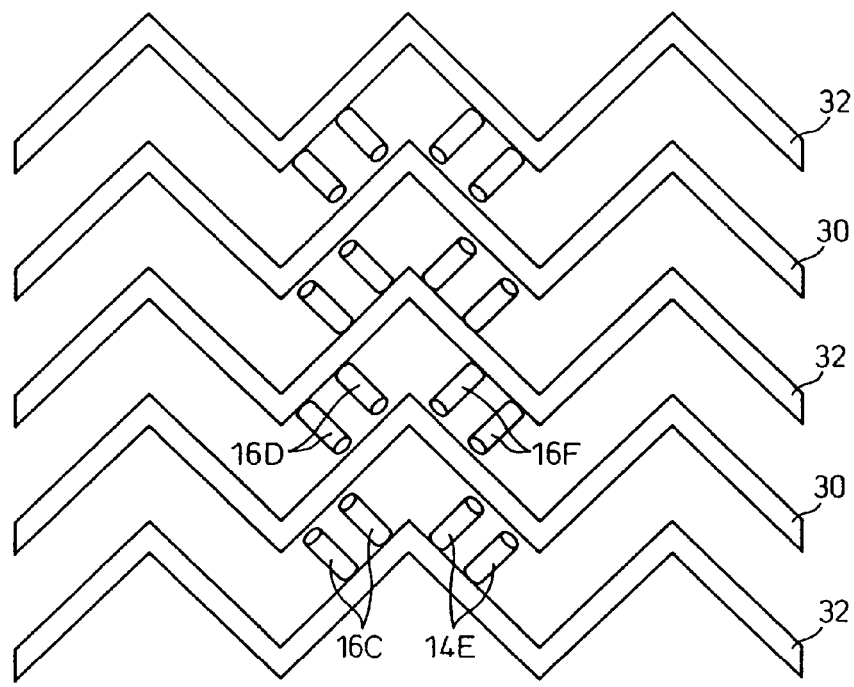
FIG. 5 is a plan view showing another example of the alignment control structures.

FIG. 5 is a plan view showing another example of the projections (alignment control structures) 30 and 32.

The projections 30 and 32 extend in parallel to each other while being bent at the same time. In other words, the projections 30 and 32 are bent in zigzag fashion in parallel to each other. In this example, the liquid crystal molecules 16C and 16D on either side of the small, straight portion of the projections 30 and 32 are aligned in opposite directions, and the liquid crystal molecules 16E and 16F on the either side of the next small, straight portion of the bend of the projections 30 and 32 are aligned in opposite directions. The liquid crystal molecules 16C and 16D are rotated by 90 degrees with respect to the liquid crystal molecules 16E, 16F.

As a result, the alignment division with four regions of different liquid crystal alignments in one pixel can be attained for a further improved visual field angle characteristic.

Figure 6:
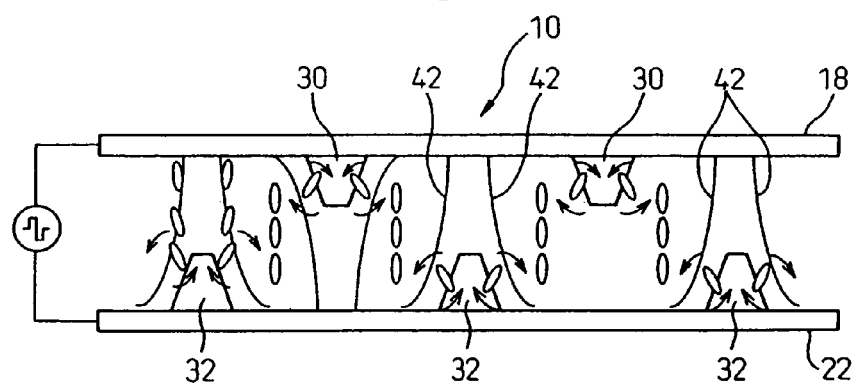
FIG. 6 is a schematic cross-sectional view showing a liquid crystal display apparatus in which the alignment control structures of a pair of the substrates are both projections.

FIG. 6 is a view illustrating a liquid crystal display apparatus in which the alignment control structures are formed by the projections 30 and 32. In FIG. 6, the electrode 18 arranged on the upper substrate 12 and the electrode 22 arranged on the lower substrate 14 are shown. The projections 30 and 32 are formed as dielectric members on the electrodes 18 and 22, respectively. Numeral 42 designates an electric field in the neighborhood of the projections 30 and 32. The projections 30 and 32 are made of dielectric material, and therefore, the electric field 42 in the neighborhood of the projections 30 and 32 is an oblique one. Thus, at the time of voltage application thereto, the liquid crystal molecules fall perpendicular to the electric field 42 as indicated by arrows. The direction in which the liquid crystal molecules lie by the oblique electric field is the same as the direction in which the liquid crystal molecules lie by the slopes of the projections 30 and 32.

Figure 7:
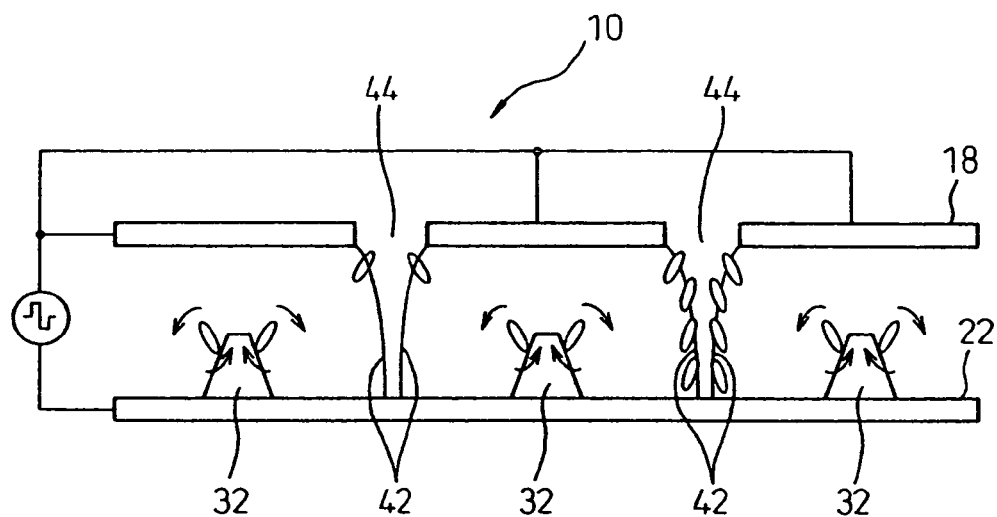
FIG. 7 is a schematic cross-sectional view showing a liquid crystal apparatus in which the alignment control structures of one substrate are projections and the alignment control structures of the other substrate are slit structures.

FIG. 7 is a schematic cross-sectional view showing a liquid crystal display apparatus in which the alignment control structures of the lower substrate 14 are the projections 32 and the alignment control structures of the upper substrate 12 are slit structures 44. The slit structures 44 includes the slits of the electrode 18 of the upper substrate 12. Actually, the vertical alignment layer 20 (not shown in FIG. 7) covers the electrode 18 having the slits. Therefore, the vertical alignment layer 20 is recessed at the positions thereof corresponding to the slits of the electrode 18. The slit structures 44 each include the slit in the electrode 18 and the recessed portion of the vertical alignment layer 20. These slit structures 44 extend linearly in a similar fashion to the projections 30 of FIG. 6.

In the neighborhood of each slit structure 44, an oblique electric field 42 is formed between the electrode 18 of the upper substrate 12 and the electrode 22 of the lower substrate 14. This oblique electric field 42 is similar to the oblique electric field 42 formed in the neighborhood of the projections 30 in FIG. 6, and the liquid crystal molecules fall in accordance with the oblique electric field 42 at the time of voltage application thereto. In this case, the manner in which the liquid crystal molecules fall is the same as the manner in which the liquid crystal molecules fall in the presence of the projections 30. Thus, in the same manner that alignment of the liquid crystal is controlled by the combination of the projections 30 and 32 as shown in FIG. 6, alignment of the liquid crystal can be also controlled by the combination of the slit structures 44 and the projections 32.

Figure 8:
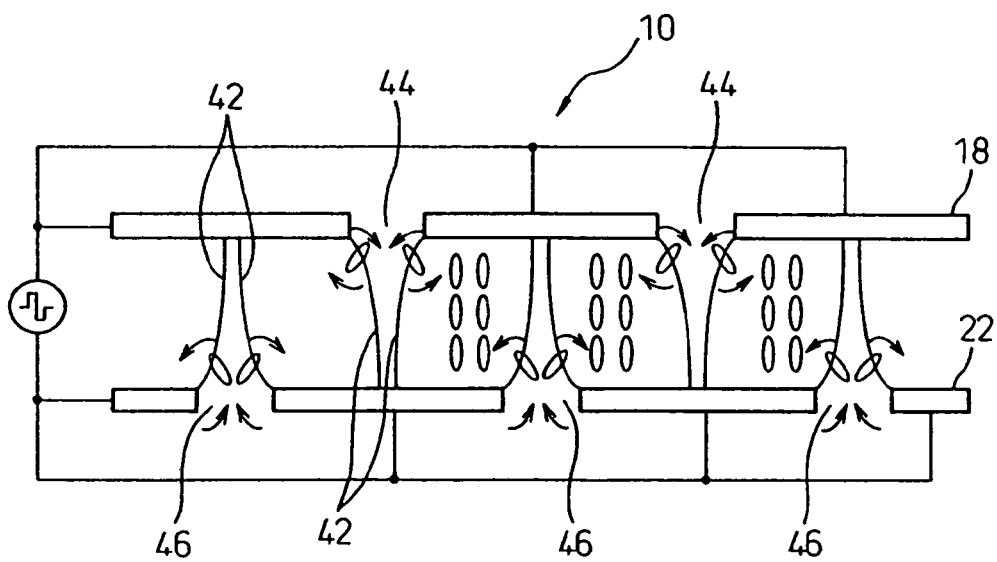
FIG. 8 is a schematic cross-sectional view showing a liquid crystal display apparatus in which the alignment control structures of a pair of substrates are both slit structures.

FIG. 8 is a schematic cross-sectional view showing a liquid crystal display apparatus in which the alignment control structures of the upper substrate 12 and the lower substrate 14 are both slit structures 44 and 46, respectively. Each slit structure 44 extends linearly in similar fashion to the projections 30 of FIG. 6, and the slit structures 46 extend linearly in a similar manner to the projections 32 of FIG. 6. In the neighborhood of the slit structures 44 and 46, an oblique electric field 42 is formed between the electrode 18 of the upper substrate 12 and the electrode 22 of the lower substrate 14. This oblique electric field 42 is similar to the oblique electric field 42 formed in the neighborhood of the projections 30 and 32 in FIG. 6, so that the liquid crystal molecules fall in accordance with the oblique electric field 42 at the time of voltage application thereto. In this case, the manner in which the liquid crystal molecules fall is the same as the manner in which the liquid crystal molecules fall in the presence of the projections 30 and 32. Thus, in the same manner that alignment of the liquid crystal is controlled by the combination of the projections 30 and 32 as shown in FIG. 6, alignment of the liquid crystal can be controlled by the combination of the slit structures 44 and 46.

As a result, alignment of the liquid crystal can be controlled in the same way by the projections 30 and 32 as by the slit structures 44 and 46. Therefore, the projections 30 and 32 and the slit structures 44 and 46 can be understood in common terms of alignment control structures (or linearly arranged structures).

Figure 9:
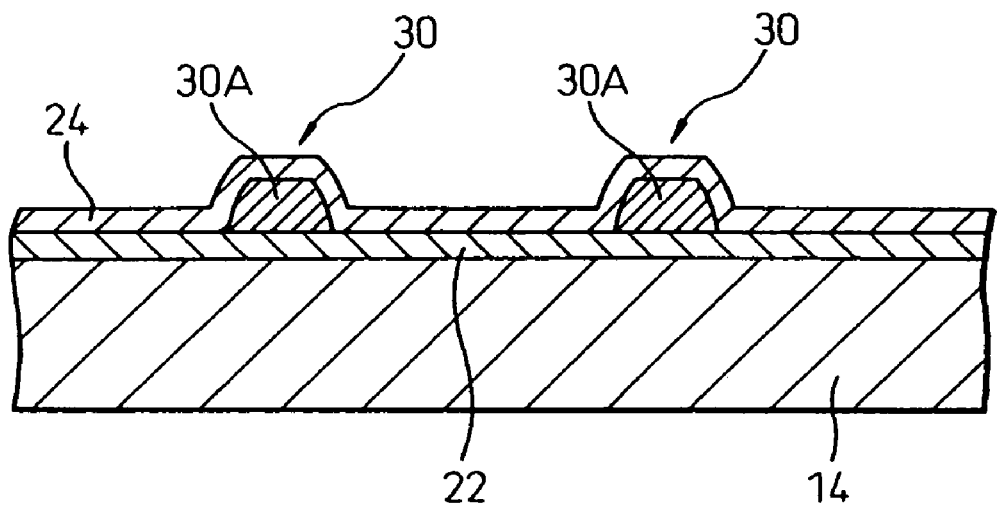
FIG. 9 is a cross-sectional view showing an example of the alignment control structures in the form of projections.

FIG. 9 is a cross-sectional view showing an example of the alignment control structures (linearly arranged structures) constituting the projections 30 (32). The projections 30 are formed in the following manner, for example. The lower substrate 14 is formed with the electrodes 22 together with the active matrix. Dielectric members 30A to constitute projections are formed on the electrodes 22. The dielectric members 30A are formed by coating a resist and patterning it. The vertical alignment layer 24 is formed on the dielectric member 30A and the electrode 22. In this way, the projections 30 are formed.

Figure 10:
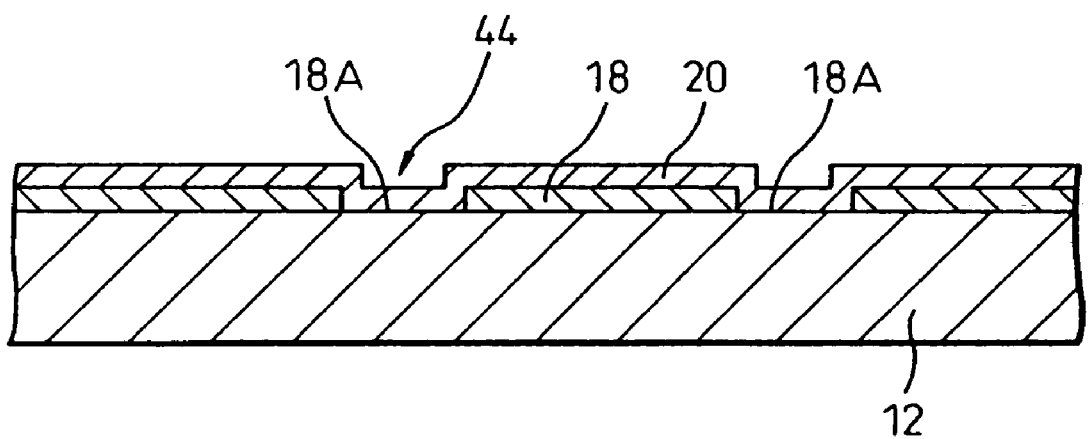
FIG. 10 is a cross-sectional view showing an example of the alignment control structure in the form of slit structures.

FIG. 10 is a cross-sectional view showing an example of the alignment control structures (linearly arranged structures) in the form of the slit structures 44 (46). The slit structures 44 are formed in the following manner, for example. After forming a color filter and a black matrix, etc., the electrode 18 is formed on the upper substrate 14. The electrode 18 is patterned thereby to form the slits 18A. A vertical alignment layer 20 is formed on the electrode 18 having the slits 18A. In this way, the slit structures 44 are formed.

Figure 11:
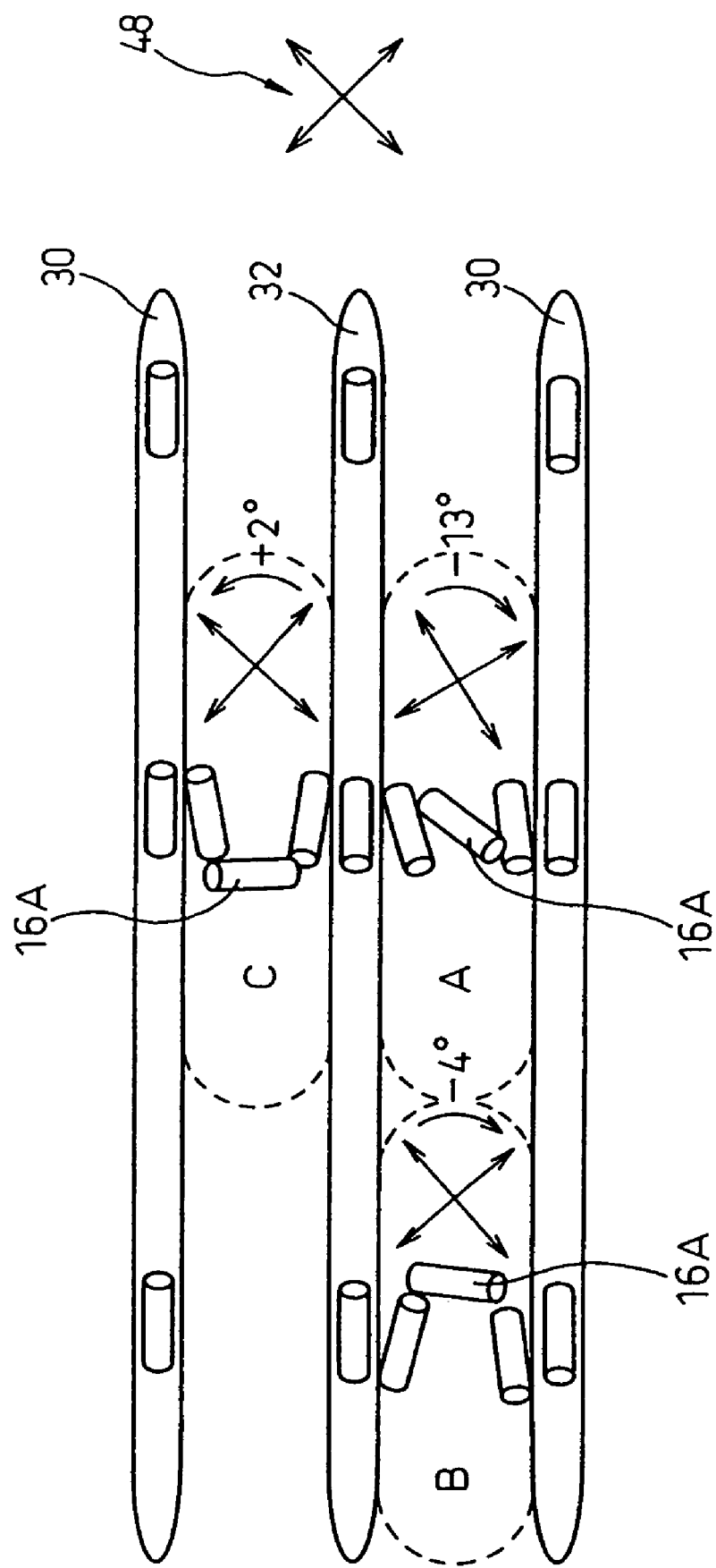
FIG. 11 is a view explaining a problem of the alignment of the liquid crystal display apparatus having alignment control structures.

FIG. 11 is a view explaining the problem of alignment of the liquid crystal display apparatus having the linearly arranged structures. Although the linearly arranged structures are described hereinafter primarily as the projections 30 and 32, the slit structures (sometimes simply called the slits) 44 and 46 may be used in place of the projections 30 and 32 with equal effect.

FIG. 11 shows the state similar to that of FIG. 4. (FIG. 4, however, shows only the liquid crystal molecules 16A in the gap between the projections 30 and 32, while FIG. 11 shows the liquid crystal molecules existing in the gap between the projections 30 and 32 and the liquid crystal molecules existing on and in the neighborhood of the projections 30 and 32. Also, in FIG. 11, the projection 32 of the lower substrate 14 is located at the center.) Numeral 48 designates the arrangement of the polarizers 26 and 28. The polarizers 26 and 28 are arranged at an angle of 45 degrees to the projections 30 and 32.

As described above, at the time of voltage application thereto, the liquid crystal molecules 16A existing in the gap between the projections 30 and 32 come to lie perpendicular to the projections 32 on either side of the projection 32 of the lower substrate (or the projection 30 of the upper substrate 12) in opposite directions. The liquid crystal molecules on and in the neighborhood of the projections 30 and 32, which are located between the liquid crystal molecules 16A lying in opposite directions, lie continuously with these liquid crystal molecules 16A. The liquid crystal molecules all come to be aligned in a plane parallel to the page of FIG. 11. In this case, the liquid crystal molecules just above the projection 32 may fall rightward or fall leftward. It is uncertain whether the liquid crystal molecules located just above the projections 32 fall rightward or leftward. For this reason, an alignment condition in which the liquid crystal molecules have fallen rightward and another alignment condition in which the liquid crystal molecules have fallen leftward coexist on the same projection 32. At a place where these two alignment conditions are in contact with each other, a boundary of alignment of the liquid crystal (singular point in director field) is formed. A plurality of boundaries exist on the single projection 32.

Also, in the case where the liquid crystal on the projection 30 of the upper substrate 12 is aligned in the same manner as those on the projection 32 of the lower substrate 14 (in the area C, for example), the alignment between the projections 30 and 32 assumes a bent form.

In the case where the liquid crystal is differently oriented on the projection 30 of the upper substrate 12 from those on the projection 32 of the lower substrate 32 (in the area A, for example), on the other hand, the alignment between the projections 30 and 32 assumes a spray form. Specifically, two types of alignment conditions coexist between the projections 30 and 32, and a boundary is formed between these areas of different alignment.

In more detail, even an alignment in the spray form, for example, is slightly different when the upper and lower substrates 12 and 14 are misaligned. The result is different angles of the polarizers 26 and 28 at which the transmittance is maximum in the respective areas. This condition was actually measured by rotating the polarizers 26 and 28 in several areas. In FIG. 11, area A shows that the polarizers 26 and 28 have been rotated by about −13 degrees with respect to a normal arrangement 48. The area B shows that the polarizers 26 and 28 have been rotated by −4 degrees with respect to the normal arrangement 48. The area C, on the other hand, shows that the polarizers 26 and 28 have been rotated by +2 degrees with respect to the normal arrangement 48.

Figure 12:
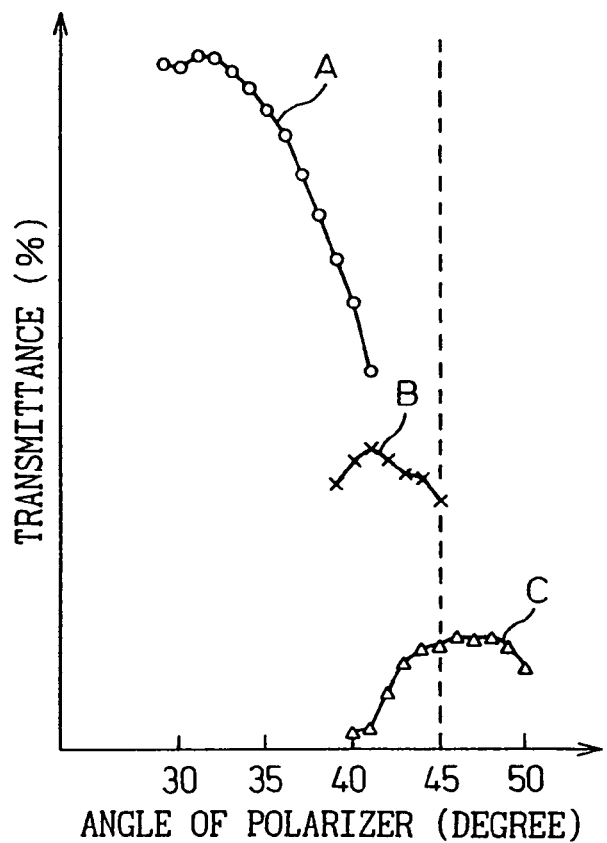
FIG. 12 is a view showing the transmittance in several areas of FIG. 11.

FIG. 12 is a view showing transmittance measured in the areas A, B and C of FIG. 11. The curve A represents the measurement in the area A of FIG. 11, the curve B the measurement in the area B of FIG. 11, and the curve C the measurement in the area C of FIG. 11. The curve A indicates that a considerably high transmittance is obtained at an angle of the polarizers 26 and 28 considerably displaced from the normal arrangement (45 degrees with respect to the projections 30 and 32), while in the case where the polarizers 26 and 28 are in the normal arrangement 48 (45 degrees with respect to the projections 30 and 32), light cannot be substantially transmitted. The curve B indicates that a comparatively high transmittance is obtained in the case where the polarizers 26 and 28 are located at an angle somewhat displaced from the normal arrangement 48 (45 degrees with respect to the projections 30, 32). The curve C shows that some degree of transmittance can be secured in the case where the polarizers 26 and 28 are in the normal arrangement 48 (45 degrees with respect to the projections 30, 32). In this way, the use of the projections 30 and 32 produces a plurality of areas of different transmittance characteristics.

Figure 13:
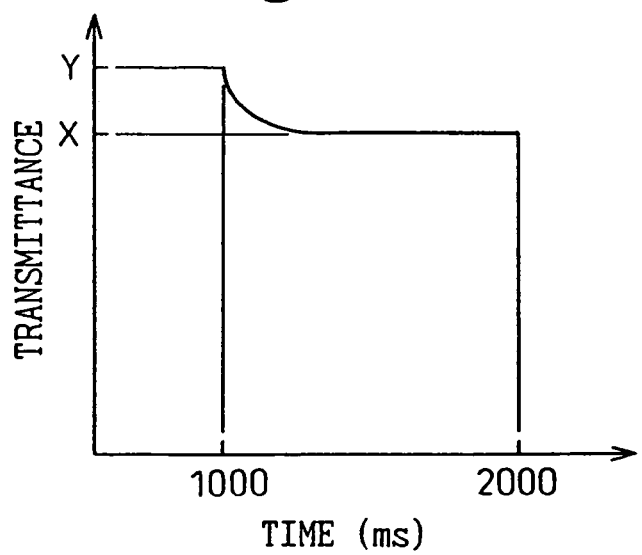
FIG. 13 is a view showing an overshoot of brightness.

FIG. 13 is a view showing the change in transmittance after voltage application. In FIG. 13, voltage is applied at 1000 ms, and voltage is removed at 2000 ms. In the case where areas of different alignments exist as described with reference to FIGS. 11 and 12, a phenomenon called overshoot occurs immediately after voltage application. Specifically, the transmittance increases greatly, for example, right after voltage application, and then, gradually decreases to a predetermined value where it comes into equilibrium. The overshoot is expressed by the degree the white brightness has increased from the transmittance in equilibrium. The overshoot (%) is defined as $(Y-X)/X \times 100$, where the initial brightness is X and the brightness in equilibrium is Y.

As shown in FIG. 11, if the areas A, B and C having different transmittances exist, the liquid crystal in the areas A, B and C continues to move in the respective areas after voltage application, and the liquid crystal in adjacent areas affects each other, so that the areas A, B and C themselves continue to move (i.e. the boundaries between areas A, B and C continue to move).

As a result, the transmittance increases and so does the overshoot. The overshoot is a cause of the afterimage, often leading to the deterioration of the display quality. Also, in the presence of areas A, B and C having different features, the display performance may develop a difference, thereby making it impossible to obtain a predetermined quality.

For this reason, it is desired to control alignment of the liquid crystal on the projections 30 and 32 to prevent the liquid crystal in areas having different transmittances from continuing to move persistently and thereby to improve brightness and response.

Figure 14:
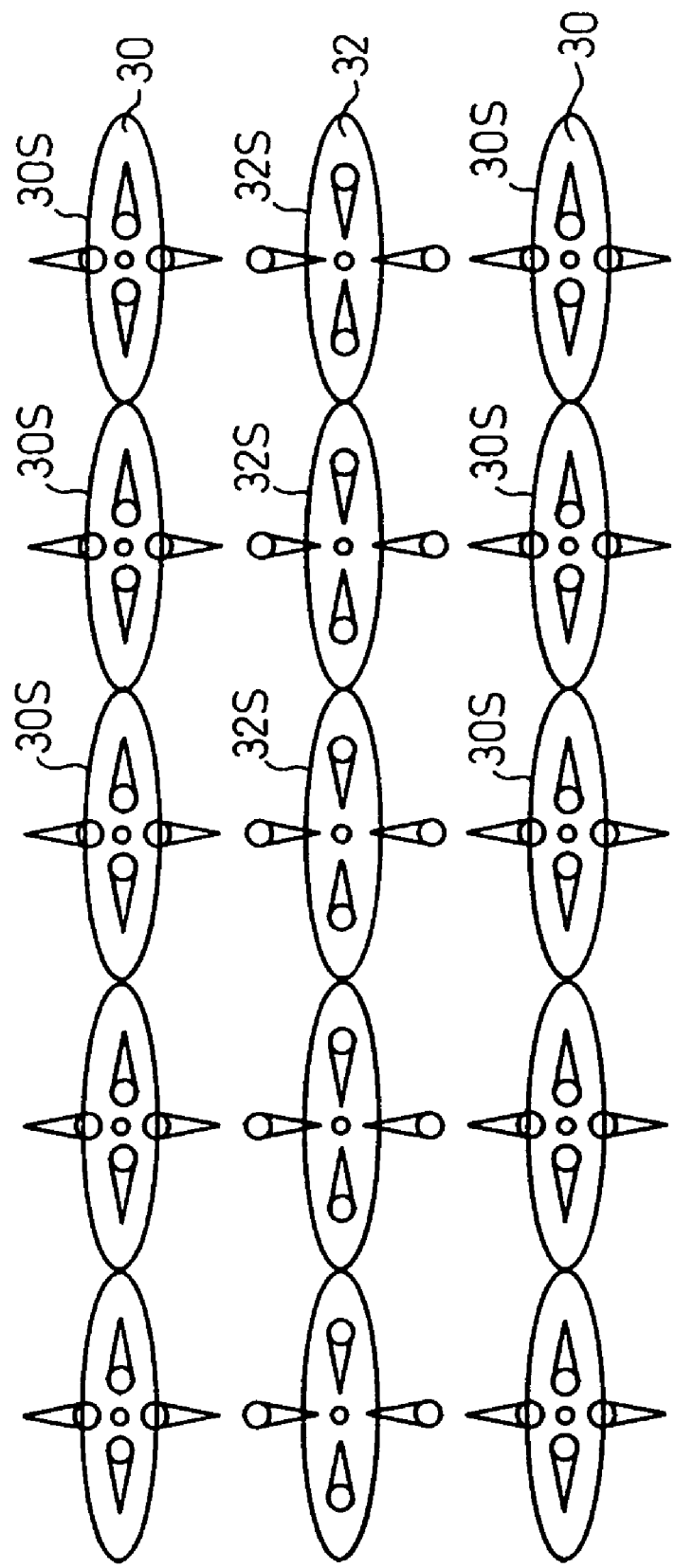
FIG. 14 is a view showing alignment control structures according to the first embodiment of the present invention.

FIG. 14 is a view showing an example of the projections (linearly arranged structures) 30 and 32 according to the first embodiment of the present invention. Slit structures 44 and 46 can of course be used in place of the projections 30 and 32 as the linearly arranged structures.

The liquid crystal display apparatus has the projections 30 of the upper substrate 12 and the projections 32 of the lower substrate 14, as described above. Each projection 30 or 32 is formed of a plurality of constituent units 30S or 32S. The constituent units 30S or 32S have a substantially uniform shape, and are distinguished from each other by a change in the shape or cutting. In the example of FIG. 14, two adjacent constituent units 30S or 32S are connected by a narrow portion. Also, the constituent units 30S of the projections 30 of the upper substrate 12 and the constituent units 32S of the projection 32 of the lower substrate 14 extend in parallel to each other, and the constituent units of the projections 30 of the upper substrate 12 and the corresponding constituent units of the projections 32S of the lower substrate 14 are arranged at such positions as to be overlapped with each other.

As described above, each projection 30 or 32 is formed of a plurality of the constituent units 30S or 32S, respectively and, therefore, there is less likelihood of forming a plurality of areas A, B and C having different transmittances as shown in FIG. 11 within each constituent unit 30S or 32S. Also, the areas A, B and C are prevented from continuously moving (the boundaries between the areas A, B and C are prevented from continuing to move), so that the liquid crystal comes to be stably aligned in the horizontal state within a shorter time. As a result, overshoot is reduced, thereby improving both the brightness and the response speed. Even if there are areas with a large transmittance loss, the effect thereof can be offset by the presence of a multiplicity of small areas with a small transmittance loss. For this purpose, each projection 30 or 32 desirably includes as many constituent units 30S or 32S as possible, respectively. Preferably, the length of the constituent units 30S or 32S is not less than the length of the gap between the projections 30 and 32 of the pair of substrates 12 and 14, and not more than 200 μm.

Figure 15:
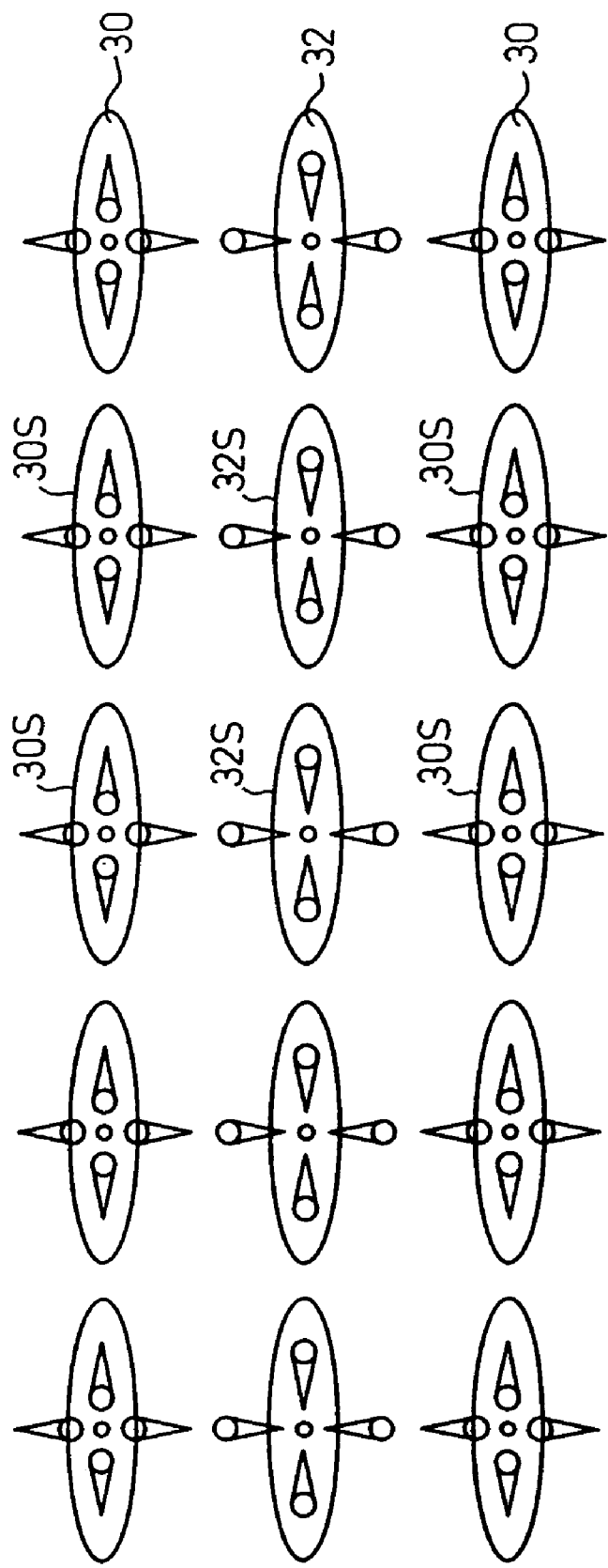
FIG. 15 is a view showing a modification of the alignment control structures.

FIG. 15 is a view showing a modification of the projections 30 and 32. The projections 30 and 32 are each configured of a plurality of constituent units 30S and 32S. In this example, the projections 30 and 32 are cut off, i.e. the constituent units 30S and 32S are separated from each other. The other features are similar to those of the example of FIG. 14.

Figure 16:
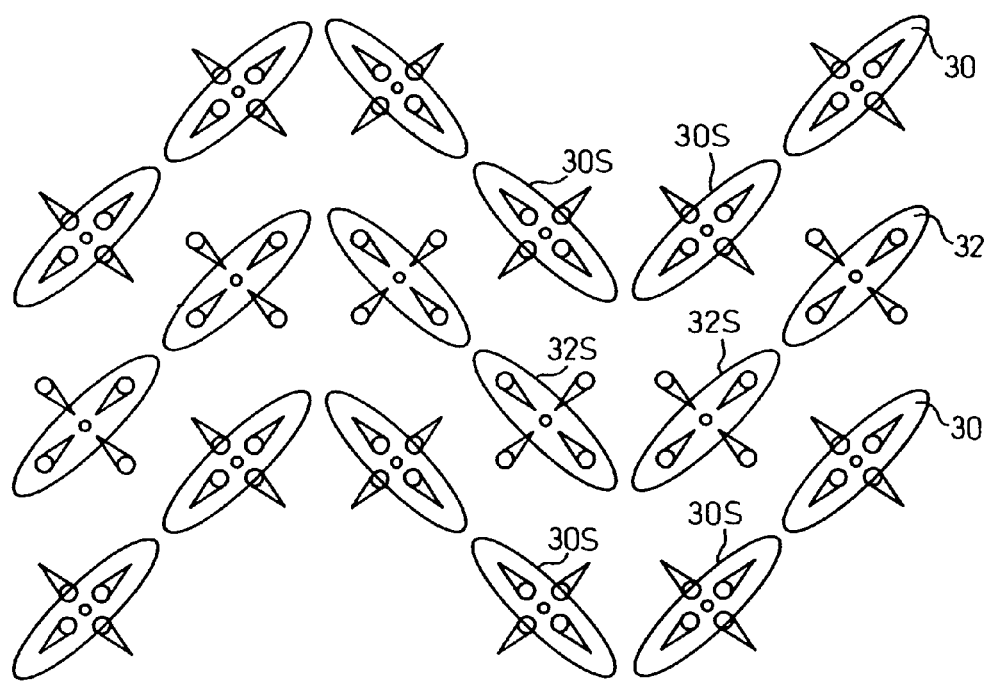
FIG. 16 is a view showing a modification of the alignment control structures.

FIG. 16 is a view showing a modification of the projections 30 and 32. The projections 30 and 32 are each formed of a plurality of constituent units 30S and 32S. In this example, the projections 30 and 32 are bent. The other features are similar to that of FIG. 15.

Figure 17:
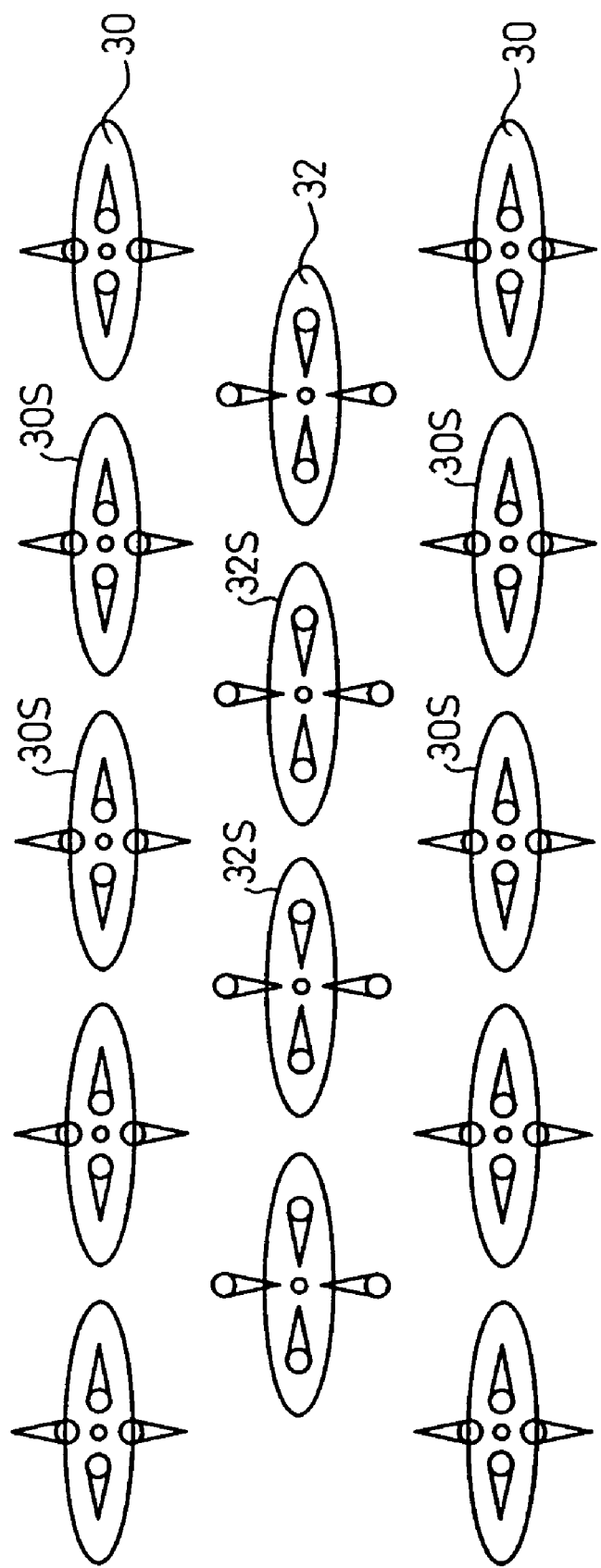
FIG. 17 is a view showing a modification of the alignment control structures.

FIG. 17 is a view showing a modification of the projections 30 and 32. The projections 30 and 32 are each configured of a plurality of constituent units 30S and 32S. In this case, the projections 30 and 32 are cut off, i.e. the constituent units 30S and 32S are separated from each other. Further, the constituent units 30S of the projections 30 of the upper substrate 12 and the constituent units 32S of the projections 32 of the lower substrate 14 extend in parallel to each other and are shifted from each other. The constituent units 30S and 32S making up the projections 30 and 32 of the upper and lower substrates, respectively, which are in contact with each other as shown in FIG. 14, may of course be shifted as shown in FIG. 17.

Figure 18:
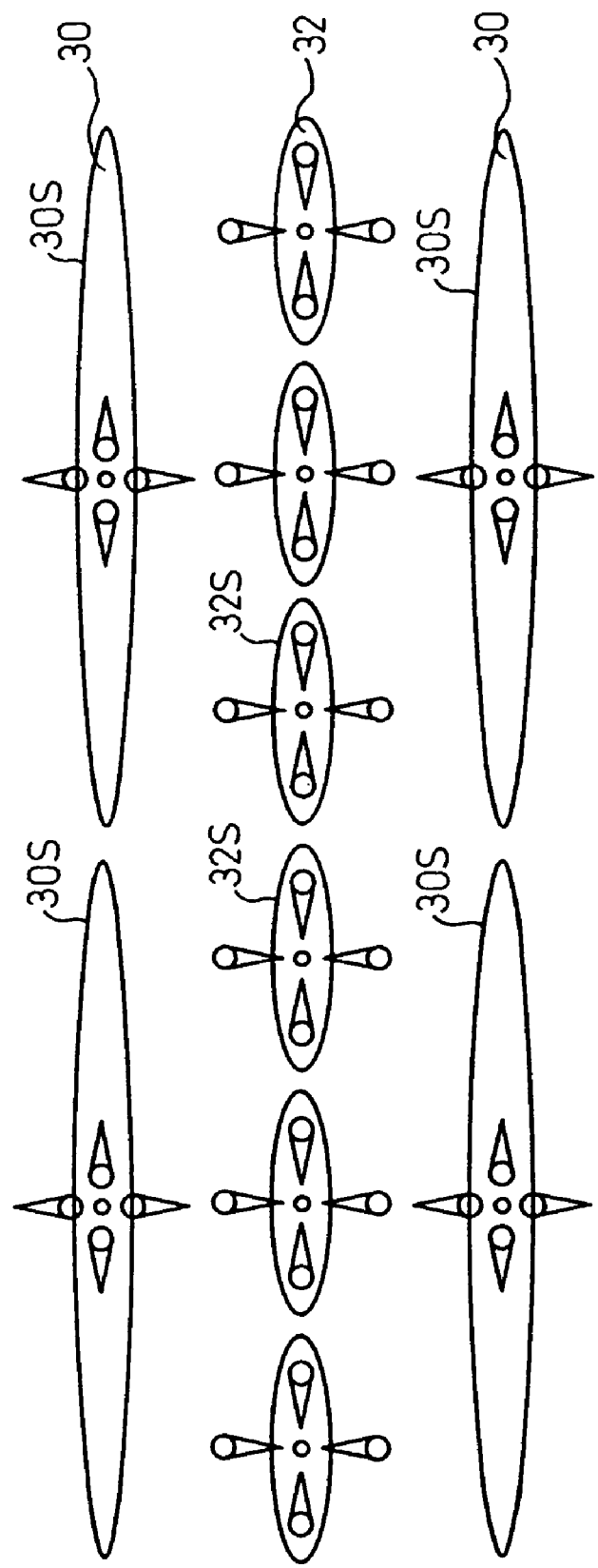
FIG. 18 is a view showing a modification of the alignment control structures.

FIG. 18 is a view showing a modification of the projections 30 and 32. The projections 30 and 32 are each configured of a plurality of constituent units 30S and 32S. In this case, the projections 30 and 32 are cut off, i.e. the constituent units 30S and 32S are separated from each other. Further, the constituent units 30S of the projections 30 of the upper substrate 12 and the constituent units 32S of the projections 32 of the lower substrate 14 have different lengths. The constituent unit 30S of the projections 30 of the upper substrate 12 is about three times as long as the constituent unit 32S of the projections 32 of the lower substrate 14. The center of the constituent unit 30S of the projections 30 of the upper substrate 12 coincides with the center of the three constituent units 32S of the projections 32S of the lower substrate 14.

Figure 19:
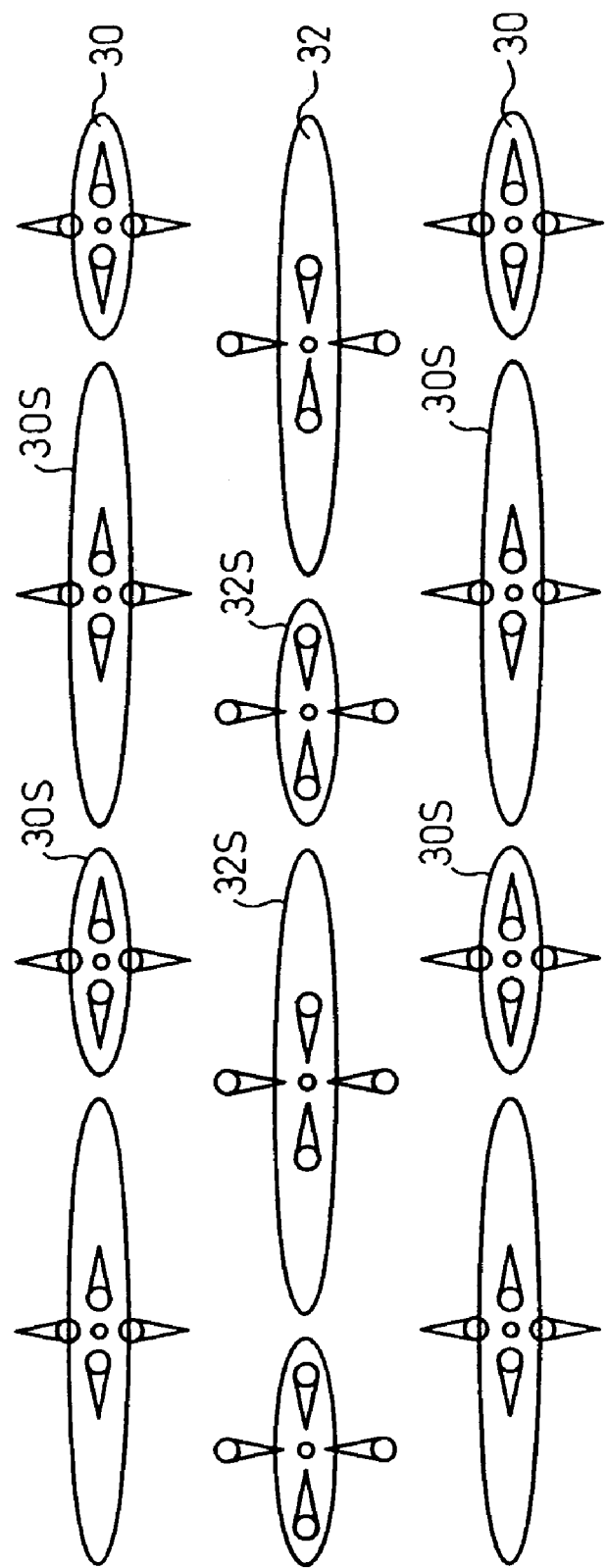
FIG. 19 is a view showing a modification of the alignment control structures.

FIG. 19 is a view showing a modification of the projections 30 and 32. The projections 30 and 32 are each formed of a plurality constituent units 30S and 32S. In this example, the projections 30 and 32 are cut off, i.e. the constituent units 30S and 32S are separated from each other. Further, the constituent units 30S of the projections 30 of the upper substrate 12 have different lengths, and so are the constituent units 32S of the projections 32 of the lower substrate 14. In this example, the constituent units 30S and 32S each have two types of length, and those constituent units having different lengths are formed into a set, so that sets of different lengths are arranged alternately. The set of the constituent units 30S of the projections 30 of the upper substrate 12 and the set of the constituent units 32S of the projections 32 of the lower substrate 14 are arranged in a staggered fashion. The constituent units 30S, 32S of FIGS. 18 and 19 can be arranged at a coincident position or connected as in the preceding embodiments.

Figure 20:
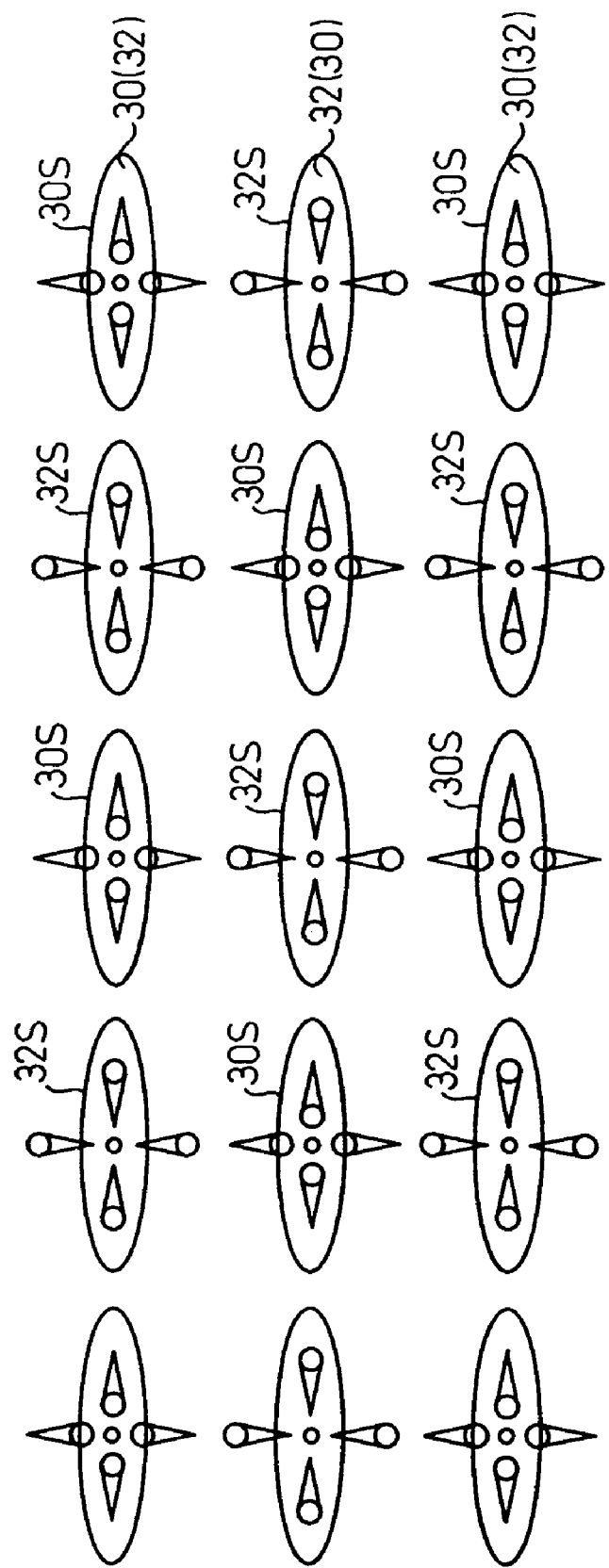
FIG. 20 is a view showing a modification of the alignment control structures.

FIG. 20 is a view showing a modification of the projections 30 and 32. Each of the projections 30 and 32 is formed of a plurality of constituent units 30S, 32S, respectively. In this example, the constituent units 30S of the projection 30 are arranged alternately with the constituent units 32S of the projection 32, and the constituent units 32S of the projection 32 are arranged alternately with the constituent units 30S. For example, the constituent units 30S of the projection 30 of the upper substrate are arranged at every other position of the projection 30 of FIG. 2, and the constituent units 32S of the projection 32 of the lower substrate are arranged at every other position free of the constituent units 30S of the projection 30 of the upper substrate just under the projection 30 of FIG. 2. Apparently, the projections 30 and 32 of the upper and lower substrates appear to form each train of a mixture of constituent units 30S, 32S of the projections 30 and 32 of the upper and lower substrates, respectively.

In the examples described above, the constituent units 30S and 32S are shown in elliptical form. The present invention, however, is not limited to the elliptical shape but may be rectangular, rhombic or otherwise polygonal. Also, for the purpose of averaging the length of the constituent units 30S and 32S of the projections 30 and 32, the length is preferably equal to that of the combination of the pixels of R, G and B, i.e. not more than 200 μm. Also, since the projection gap with the pair of the substrates overlapped with each other constitutes the minimum distance for controlling the alignment of the liquid crystal, the length of the constituent units 30S and 32S of the projections 30 and 32 is also preferably not less than the projection gap.

Although the case involving the projections 30 and 32 is described above, this is also the case with the slit structures 44 and 46 including the slits in the electrode. In other words, the slit is formed of a plurality of constituent units. In this case too, the arrangements described above can be used as they are. This also applies to the limitation of the length of the constituent units.

Figure 21:
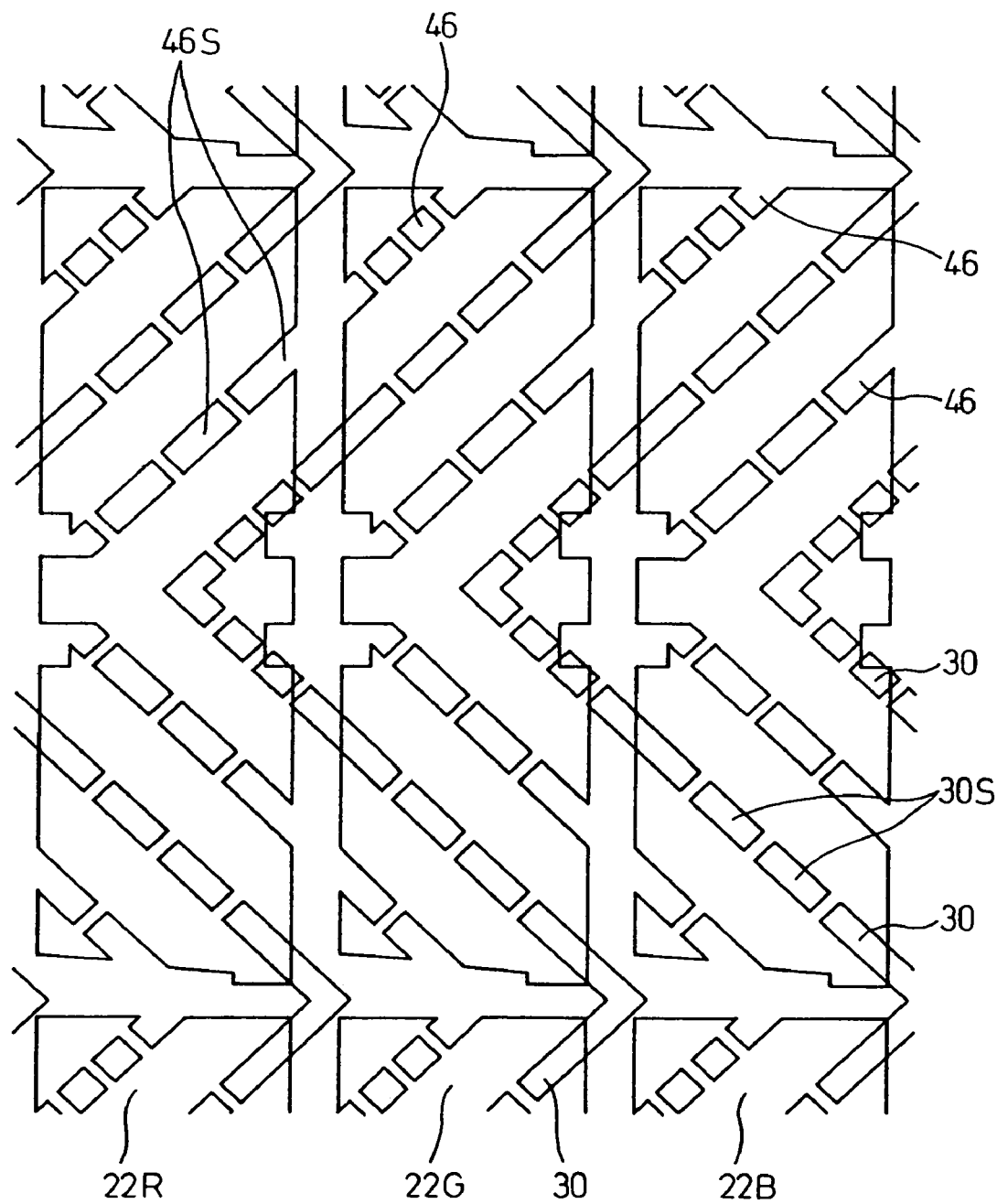
FIG. 21 is a view showing a modification of the alignment control structures.

FIG. 21 is a view showing a modification of the linearly arranged structures. FIG. 21 shows portions of the three pixel electrodes 22R, 22G and 22B, and the linearly arranged structures are in the zig-zag bent form, as shown in FIG. 5. The linearly arranged structures of the upper substrate 12 includes projections 30, and the linearly arranged structures of the lower substrate 14 includes slit structures 46. In other words, the combination of the linearly arranged structures of FIG. 21 is equivalent to the combination of the projections and the slit structures of FIG. 7, arranged upside down.

Figure 22:
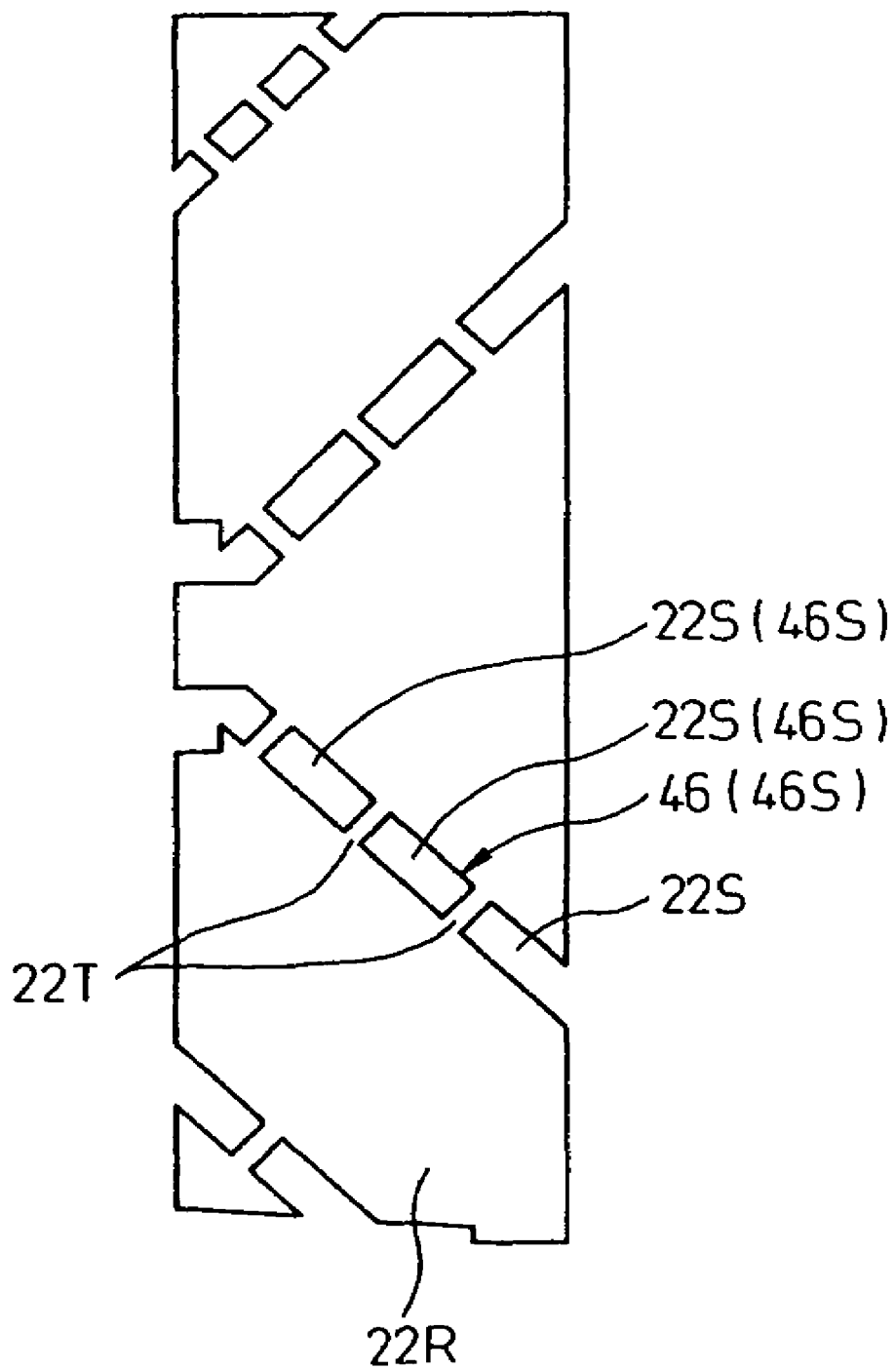
FIG. 22 is a view showing the pixel electrode and the slit structure of FIG. 21.

FIG. 22 is a view showing the pixel electrode 22R and the slit structures 46 of FIG. 21. The pixel electrode 22R has a plurality of slits 22S and a plurality of inter-slit portions 22T of the same material (ITO) as the pixel electrode 22R. The slits 22S can be formed at the time of patterning the pixel electrode 22R. The vertical alignment layer 24 is coated on the pixel electrode 22R, so that the series of slits 22S of the pixel electrode 22R constitutes the slit structure 46, and the slits 22S make up the constituent units 46S of the slit structure 46. The material portions 22T are portions where adjacent constituent units 46S are separated.

In this embodiment, the width of the slits 22S (the constituent unit 46S of the slit structure 46) is 5 μm, and the length thereof is 12 µm, 26 µm or 33 µm. The length of the slit 22S (the constituent unit 46S of the slit structure 46) is preferably not less than 10 µm. The length of the material portion 22T is 4 µm. The length of the material portion 22T is preferably not more than the width of the projection 30. In a similar fashion, the width of the constituent unit 30S of the projection 30 is 5 µm, and the length thereof is 12 µm, 26 µm or 33 µm. The length of the gap between the constituent units 30S of the projection 30 is 4 µm.

Figure 23A:
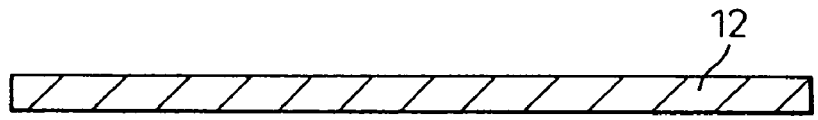
FIGS. 23A to 23E are views explaining the formation of the alignment control structure in the form of projections.
Figure 23B:
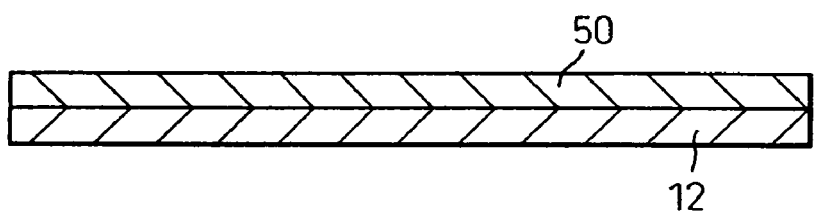
Figure 23C:
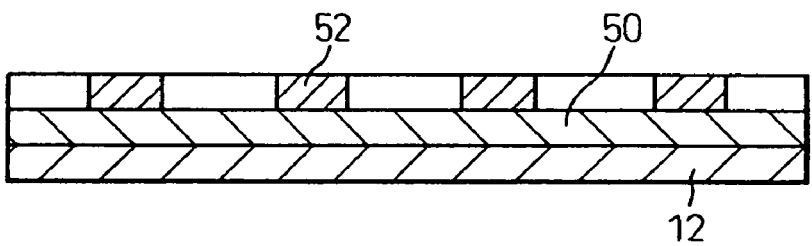
Figure 23D:
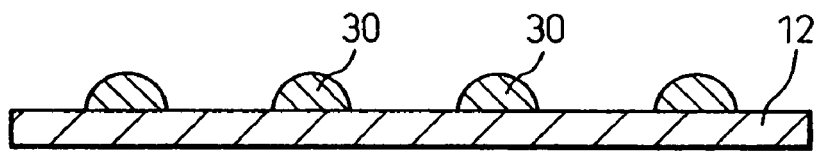
Figure 23E:
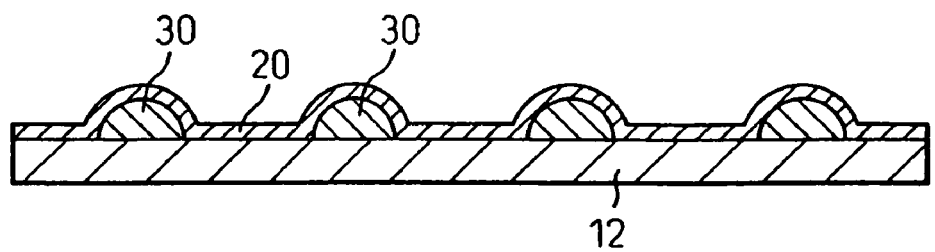

FIGS. 23A to 23E are views explaining the formation of the linearly arranged structures configured of the projections 30. As shown in FIG. 23A, a substrate 12 is prepared and a color filter, a black matrix and an electrode 18 are applied onto it. As shown in FIG. 23B, LC 200 (made by Shipley) constituting a positive resist 50 is spin coated on the substrate 12 having the electrode 18 (not shown) for 30 seconds at 1500 rpm. The positive resist is used here but it is not necessarily used. A negative resist or a photosensitive resin other than the resist is a possible alternative. As shown in FIG. 23C, the spin-coated resist 50 is prebaked at 90° C. for 20 minutes, and then subjected to contact exposure through a photo mask 52 (exposure time 5 seconds). As shown in FIG. 23D, after development with the developer (by Shipley) for one minute, the resist is post-baked at 120° C. for 60 minutes followed by another post baking at 200° C. for 40 minutes thereby to form a projection 30. The width of this projection 30 is 5 µm, the height thereof is 1.5 µm, and the length of the constituent units 30S of the projections 30 is described above. As shown in FIG. 23E, a vertical alignment layer JALS684 (made by JSR) is spin coated at 2000 rpm for 30 seconds, followed by baking at 180° C. for 60 minutes thereby to form the vertical alignment layer 20.

A seal (XN-21F, made by Mitsui Toatsu Chemical) is applied to this substrate 12 or the TFT substrate 14, and the remaining substrate is sprayed with spacers (SP-20045, made by Sekisui Fine Chemical) of 4.5 µm. The two substrates are laid one on the other. In the last step, an empty panel is produced by baking at 135° C. for 60 minutes. Rubbing and cleaning was not conducted. In vacuum environment, the empty panel is filled with the liquid crystal MJ961213 (made by Merck) having a negative anisotropy of its dielectric constant by vacuum-filling method. The insertion port is finally sealed with a sealing material (30Y-228, made by Three Bond) thereby to produce a liquid crystal panel.

The transmittance of the liquid crystal panel produced in this way was measured with the voltage of 5 V applied thereto. The measurement was 25.7%. Also, the measurement of the response speed upon application of voltages of 0 V to 5 V shows an overshoot of 1.6%.

In the case of the liquid crystal display apparatus having the linearly arranged structures of FIG. 15, the measurement of the transmittance upon application of 5 V thereto is 26.3%. The response speed as measured upon application of voltages of 0 V to 5 V indicates the overshoot of 1.1%. The width of the projections is 10 µm, the height thereof is 1.5 µm, the length of the constituent unit of the projections is 30 µm, the distance between the projection constituent units is 10 µm, and the gap between the projections with the upper and lower substrates laid one on the other is 20 µm.

In the case of the liquid crystal display apparatus having the linearly arranged structures shown in FIG. 17, on the other hand, the measurement of the transmittance upon application of 5 V thereto is 26.6%. The response speed as measured upon application of voltages of 0 V to 5 V indicates the overshoot of 0.9%. In the case of the liquid crystal display apparatus having the linearly arranged structures of FIG. 18, the measurement of the transmittance upon application of 5 V is 26.1%. Also, as a measurement of the response speed taken by applying voltages of 0 V to 5 V, the overshoot is 1.6%. In this case, the width of the projection is 10 µm, the height thereof is 1.5 µm, the length of the projection constituent unit is 30 µm, the length of the other projection constituent unit is 70 µm, the gap between the projection constituent units is 10 µm and the projection gap with the upper and lower substrates laid one on the other is 20 µm. Also, a panel is produced by attaching a pair of the upper and lower substrates to each other in such a manner that each long projection constituent unit is located at the same position as two short projection constituent units.

In the case of the liquid crystal display apparatus having the linearly arranged structures shown in FIG. 20, on the other hand, the measurement of the transmittance upon application of 5 V is 26.0%. Also, the response speed as measured upon application of 0 V to 5 V is 1.6% in terms of the overshoot. In this case, the projection has a width of 10 µm and a height of 1.5 µm, the length of the projection constituent unit is 30 µm, a gap between the projection constituent units is 50 µm, another gap between the projection constituent units is 10 µm, and the projection gap with the upper and lower substrates laid one on the other is 20 µm. Also, the projections are formed in such a manner that the projection constituent units of one substrate are located at positions corresponding to the gaps between the projection constituent units of the other substrate.

The following measurement is conducted as a comparative example 1. Projections having no constituent units are formed to produce a liquid crystal panel. The width of the projections is 10 µm, the height thereof is 1.5 µm, and the projection gap with the upper and lower substrates laid one on the other is 20 µm. The measurement of the transmittance upon application of 5 V is 22.8%. Also, the measurement of the response speed upon application of voltages of 0 V to 5 V indicates an overshoot of 7.5%.

The following measurement is taken as a comparative example 2. A liquid crystal panel having projections similar to those of FIG. 15 with longer projection constituent units is prepared. The width of the projections is 10 µm, the height thereof is 1.5 µm, the length of the projection constituent units is 300 µm, the gap between the projection constituent units is 10 µm, and the projection gap with the upper and lower substrates laid one on the other is 20 µm. The measurement of the transmittance taken upon application of 5 V is 23.5%. Also, the measurement of the response speed upon application of 0 V to 5 V indicates the overshoot of 6.3%.

The following measurement is taken as a comparative example 3. A liquid crystal panel having projections similar to FIG. 15 with shorter constituent units is prepared. The width of the projections is 10 µm, the height thereof is 1.5 µm, the length of the projection constituent units is 10 µm, the gap between the projection constituent units is 10 µm, and the projection gap with the upper and lower substrates overlaid one on the other is 20 µm. The measurement taken of the transmittance upon application of 5 V is 24.1%. Also, the response speed as measured upon application of 0 V to 5 V indicates the overshoot of 5.9%.

Figure 24:
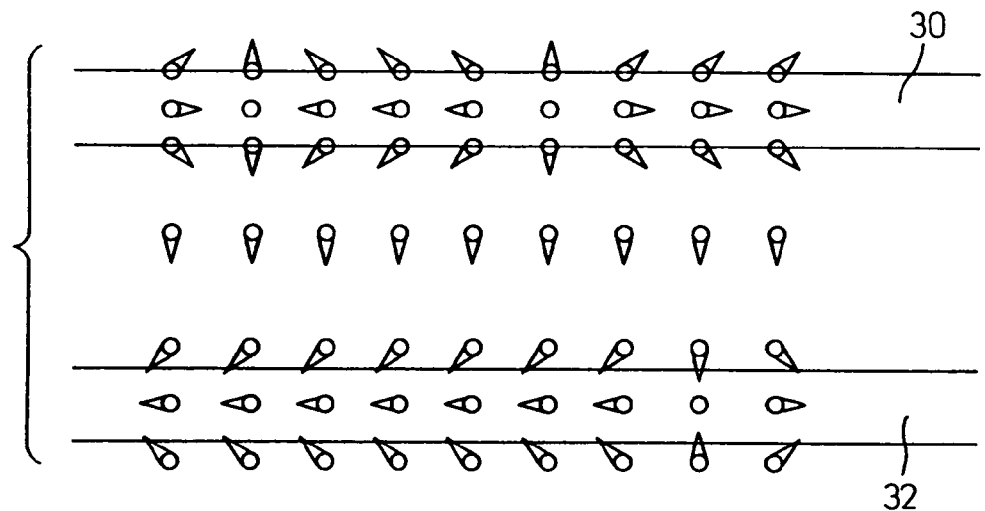
FIG. 24 is a view showing the alignment of the liquid crystal of the liquid crystal display apparatus having the alignment control structures.
Figure 25:
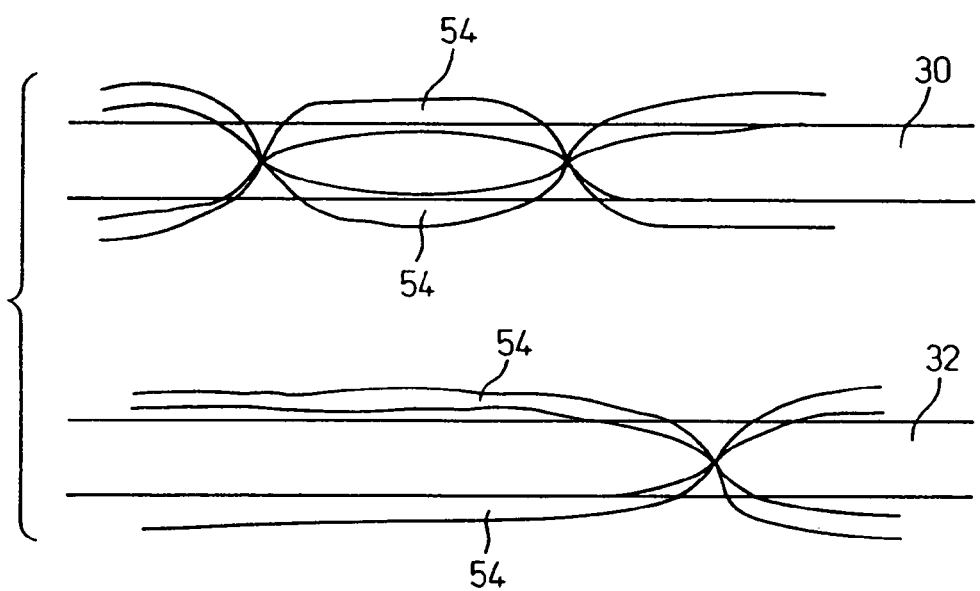
FIG. 25 is a view showing a display characteristic in the configuration of FIG. 24.

FIG. 24 is a view showing the alignment of the liquid crystal of a liquid crystal display apparatus having linearly arranged structures similar to those of FIG. 11. FIG. 25 is a view showing the display characteristic of the configuration shown in FIG. 24. In FIG. 25, numeral 54 designates an area which appears dark.

In FIG. 24, the liquid crystal molecules located between the projection 30 of the upper substrate 12 and the projection 32 of the lower substrate 14 are aligned substantially perpendicular to the projections 30 and 32. Also, the liquid crystal molecules located on the projections 30 and 32 are aligned substantially parallel to the projections 30 and 32.

It has been found that the boundaries (singular points in director field) and the number of divisions of the areas having different alignment conditions on the projections 30 and 32 continue to change for several seconds or several tens of seconds in some cases after voltage application. It has also been found that the recognition of this phenomenon as a change in transmittance of the liquid crystal panel is a principal cause of overshoot.

This phenomenon is considered to be caused by the following fact. The liquid crystal molecules on the projections 30 and 32 are considered to be aligned either rightward or leftward in the case where the projections 30 and 32 extend horizontally, as shown in FIG. 24, for example. In the absence of means for controlling the direction, however, the liquid crystal molecules fall randomly in one of two directions immediately after voltage application. After that, the areas of different alignment conditions on the projections 30 and 32 affect each other. Due to the absence of regulation of the directions of the alignment in these areas, however, the liquid crystal molecules easily change the status thereof under the effect from the surrounding. In this way, the liquid crystal in the areas of different orientations on the projections 30 and 32 is considered to continue to change for a long time.

As described above, the projections or slit structures configured of a plurality of constituent units has made it possible to regulated the directions of alignments by division points of constituent units.

Figure 26:
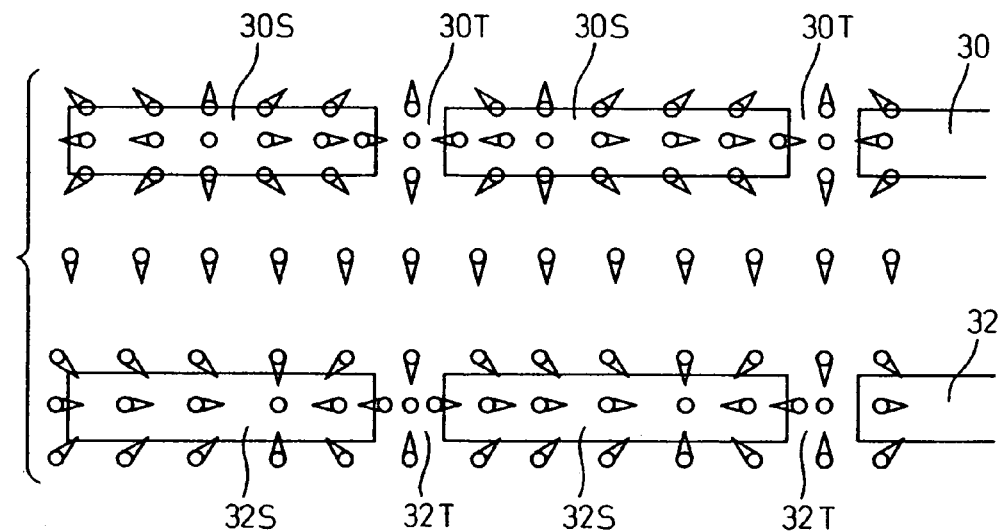
FIG. 26 is a view showing the alignment of the liquid crystal of the liquid crystal display apparatus having the alignment control structures including a plurality of constituent units.
Figure 27:
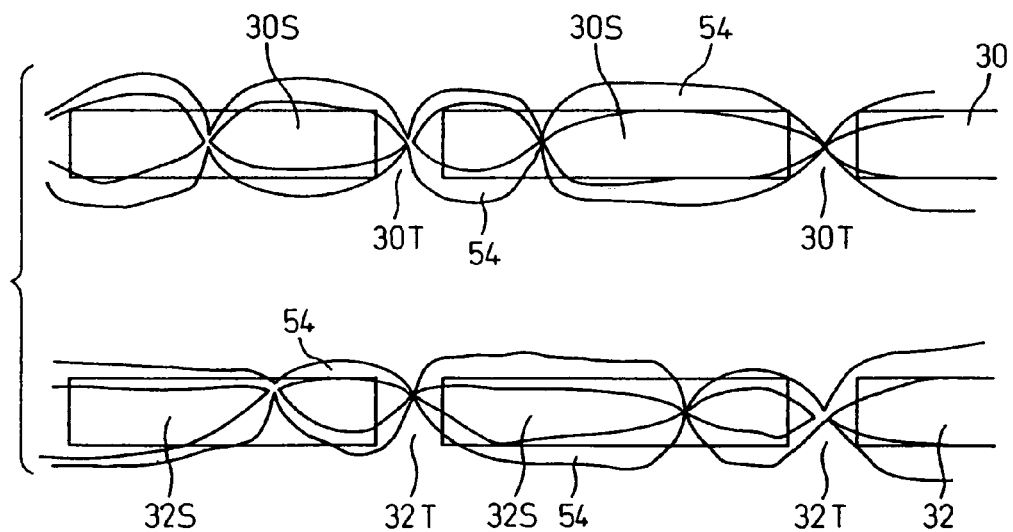
FIG. 27 is a view showing a display characteristic in the configuration of FIG. 26.

FIG. 26 is a view showing an alignment of the liquid crystal of the liquid crystal display apparatus having linearly arranged structures including a plurality of constituent units. FIG. 27 is a view showing the display characteristic of the configuration of FIG. 26. In FIG. 27, numeral 54 designates an area which appears dark. FIGS. 26 and 27 indicate the features of the liquid crystal molecules of the liquid crystal display apparatus of FIG. 15, for example.

The projections 30 and 32 are divided into areas having different alignments on the projections 30 and 32 at the cut portions 30T and 32T. The observation shows that the liquid crystal undergoes no secular variation at the cut portions 30T and 32T. It has been newly found, however, that a plurality of areas having different orientations of the liquid crystal exist also between the cut portions 30T and 32T and adjacent cut portions (in the constituent units 30S and 32S of the projections). The boundaries (singular points) between these areas have been found to undergo an age-based variation which, though minor, indicates room of further improvement of the overshoot.

Figure 28:
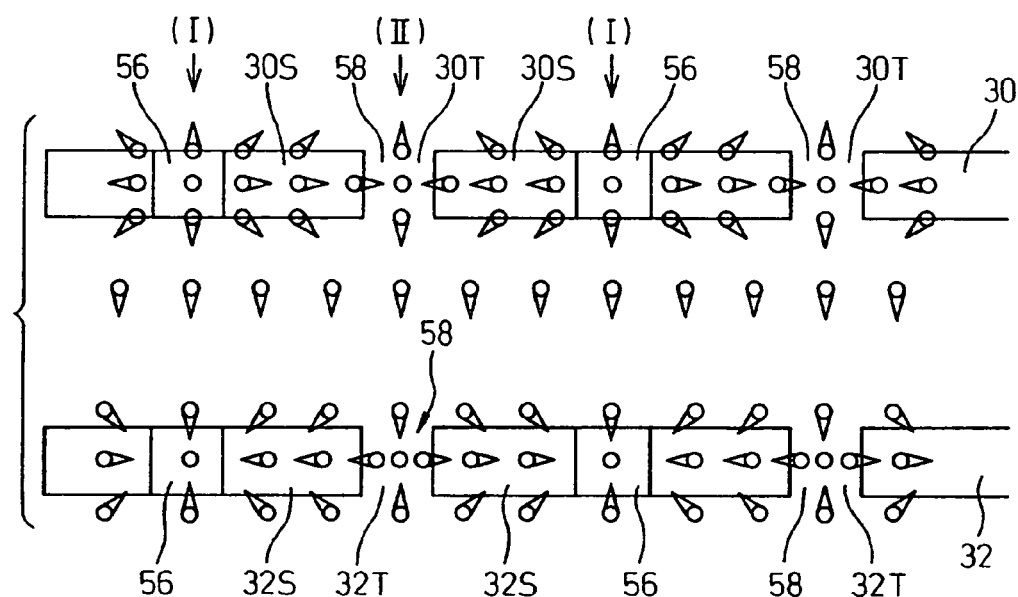
FIG. 28 is a view showing the alignment of the liquid crystal in the liquid crystal display apparatus having alignment control structures according to the second embodiment of the present invention.
Figure 29:
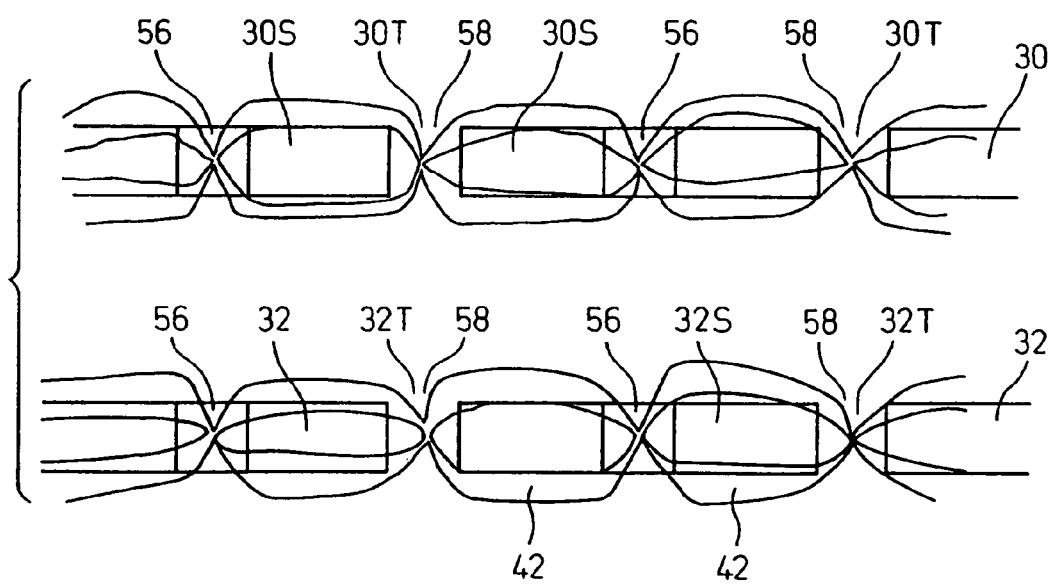
FIG. 29 is a view showing a display characteristic in the configuration of FIG. 28.
Figure 30:
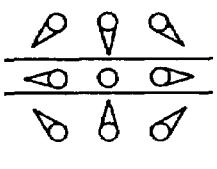
FIG. 30 is a view showing the feature of a boundary of alignment of a first type and the feature of a boundary of alignment of a second type.

FIG. 28 is a view showing the alignment of the liquid crystal of the liquid crystal display apparatus having the linearly arranged structures according to the second embodiment of the present invention. FIG. 29 is a view showing the display characteristic of the configuration shown in FIG. 28. FIG. 30 is a view showing, in enlarged form, the features of the boundaries (singular points) of alignment of first type and the features of the boundaries (singular points) of alignment of second type indicated in FIG. 28.

In FIGS. 28 and 30, a study of the means capable of controlling the alignment of the liquid crystal on the projections 30 and 32 shows that there are two types of boundaries (singular points in director field), regarding boundaries of a plurality of areas having different liquid crystal alignment conditions. In the first type (I), the liquid crystal molecules around a point are directed toward said point. In the second type (II), some of the liquid crystal molecules around a point are directed to said point while the remaining ones are directed opposite to the same one point. In FIG. 28, the liquid crystal molecules are each shown to have a head and a leg. In the first type (I), all the heads or all the legs of all the liquid crystal molecules are directed to the center. In the second type (II), on the other hand, some liquid crystal molecules have the heads thereof directed to the center while the remaining liquid crystal molecules have the legs thereof directed to the center.

In FIG. 28, the projections 30 and 32 constituting the linearly arranged structures of each substrate include means 56 for forming boundaries of alignment of first type (I) in which the liquid crystal molecules surrounding a point are directed toward said point, and means 58 for forming the boundaries of alignment of second type (II) in which a part of the liquid crystal molecules surrounding a point are directed toward said point and the remaining liquid crystal molecules are directed away from the same one point. The means 56 for forming the boundaries of alignment of first type (I) are arranged in the constituent units 30S and 32S of the projections 30 and 32, while the means 58 for forming the boundaries of alignment of second type are arranged in the boundaries between the constituent units 30S and 32S of the projections 30 and 32 (i.e. in the separation sections 30T and 32T for separating the constituent units 30S and 32S).

As seen from the foregoing description and FIG. 2, the projections 30 and 32 can control the alignment of the liquid crystal molecules by means of the main slopes thereof. In a similar fashion, the separation sections 30T and 32T defining the boundaries (singular points in director field) between the constituent units 30S and 32S of the projections 30 and 32 also have slopes with which the alignment of the liquid crystal molecules can be controlled. The slopes of the separation sections 30T and 32T generally extend transversely to the length of projections 30 and 32. The main slopes of the projections 30 and 32 have the function to align the liquid crystal molecules perpendicular to the length of the projections 30 and 32. The slopes of the separation sections 30T and 32T, in contrast, are adapted to align the liquid crystal molecules substantially parallel to the length of the projections 30 and 32. On the other hand, the liquid crystal molecules are generally aligned perpendicular to the length of the projections 30 and 32, and the function is similar for the separation sections 30T and 32T. Thus, the separation sections 30T and 32T constitute means 58 for forming the boundary of second type (II).

Figure 31:
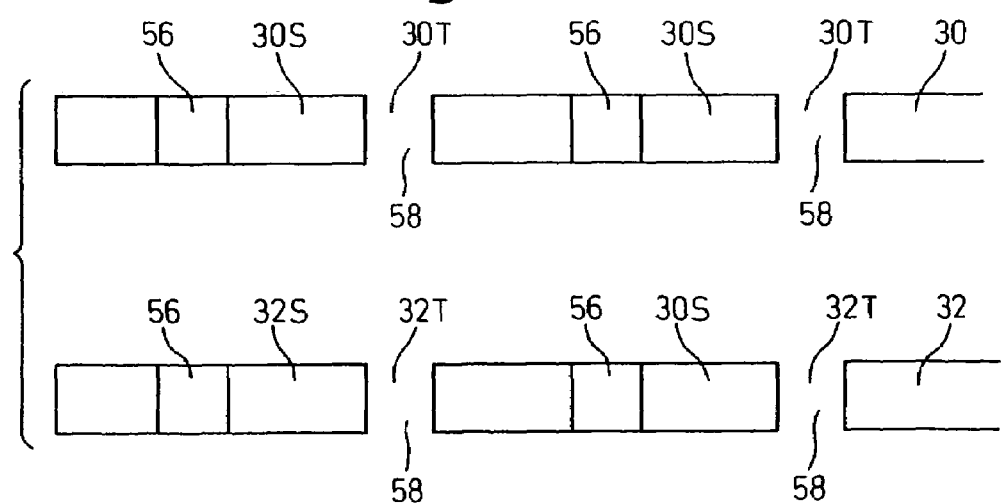
FIG. 31 is a plan view showing a specific example of the alignment control structures of FIG. 28.
Figure 32:
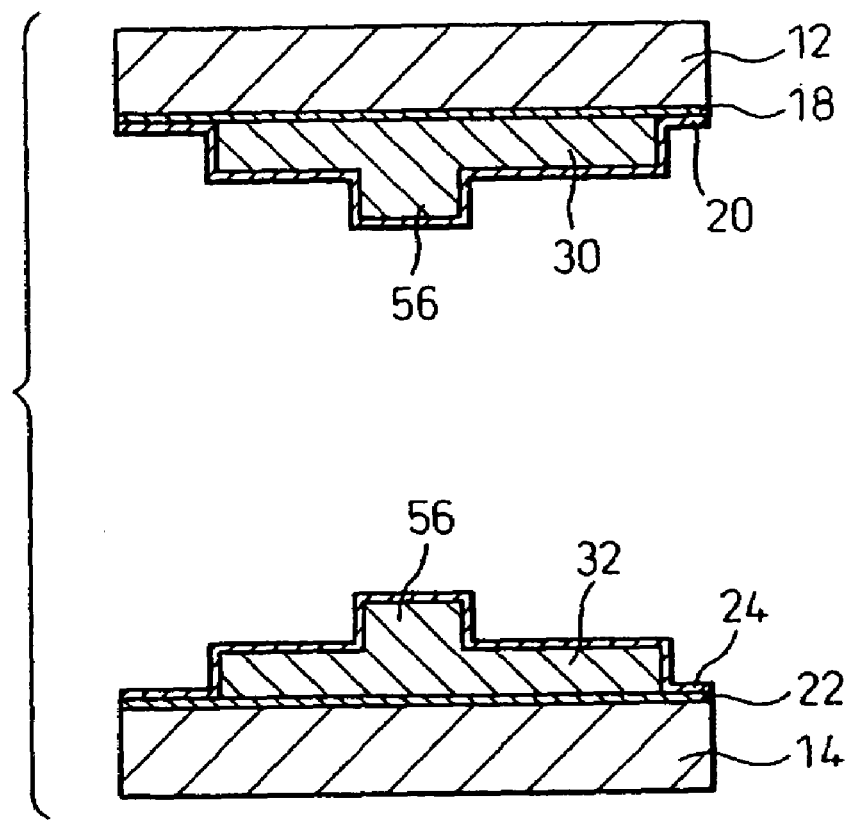
FIG. 32 is a cross-sectional view through the alignment control structures of FIG. 31.

FIGS. 31 and 32 show specific examples of the means 56 for forming the boundaries of alignment of first type (I). FIG. 32 is a cross-sectional view of both the cross-section passing through the projection 30 of the upper substrate 12 and of the cross-section passing through the projection 32 of the lower substrate 14. The means 56 includes dot-like projections formed on the projections 30 and 32, respectively. The means 56 aids the alignment of the liquid crystal in terms of shape or electric field and thus can align the liquid crystal molecules in the manner described above. With this portion as a nucleus, the alignment areas of the liquid crystal on the projections 30 and 32 can be divided. The liquid crystal is differently aligned in the boundary of first type (I) and the boundary of second type (II), and therefore the projections have naturally different effects on them.

The means 56 for forming the boundaries of alignment of a first type (I) can cause the liquid crystal molecules to lie toward the higher position on the projections on the upper substrate 12. Only after the cut portions and the heights of the projection are arranged alternately in this way, can the directions of alignments of all the domains on the projection be determined. Thus, the age-based variation of the domains of the liquid crystal after voltage application can be suppressed, and the overshoot can be eliminated substantially in its entirety.

In order to form the means 56 projecting on the projections 30 and 32, small structures are formed before forming the projections 30 and 32. The small structures may alternatively be formed after forming the projections 30 and 32. The small structure has a size of 10 μm square and a height of 1 μm. The small structures are made of the same material as the projections in the case under consideration. For forming the small structures on the TFT substrate, a method is available in which a wiring metal layer or an dielectric layer is deposited at the particular portion. For the CF substrate, on the other hand, the desired structure can be obtained without increasing the number of processes by depositing a color layer or a BM at the particular portion.

A photosensitive acrylic material PC-335 (made by JSR) is used for the projections. The projections have the width of 10 μm, the projection gap (the distance from the projection end of one substrate to the projection end of the other substrate after the substrates are attached to each other) is 30 μm, and the projection height is 1.5 μm (the height of the projection which is originally 1 μm higher is 2.5 μm tall). The separated sections 30S and 32S of the projections 30 and 32 have the size of 10 μm square, and the distance from the center of the separated sections 30S and 32S to the center of the height 56 of the projections 30 and 32 is 60 μm (the projection 1.5 μm tall exists continuously for the length of 50 μm).

The vertical alignment layer is made of JALS-204 (made by JSR). Microbar (made by Sekisui Fine Chemical) 3.5 μm in diameter is used as a spacer mixed with the liquid crystal, and MJ95785 (made by Merk) as a liquid crystal material.

Figure 33:
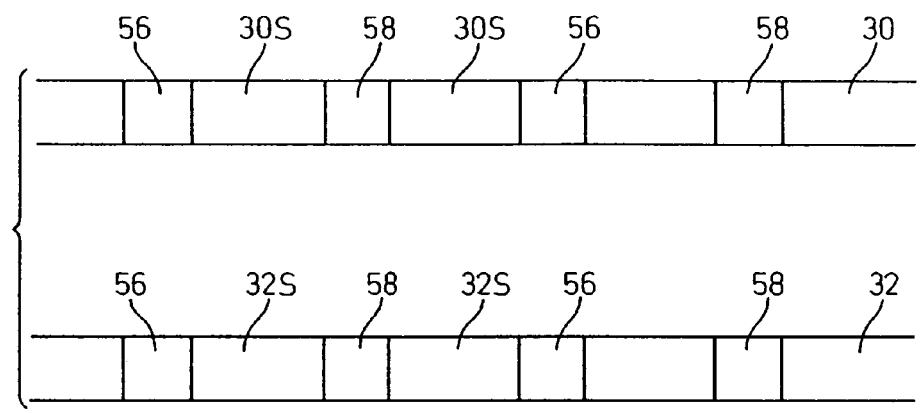
FIG. 33 is a plan view showing a modification of the alignment control structures.
Figure 34:
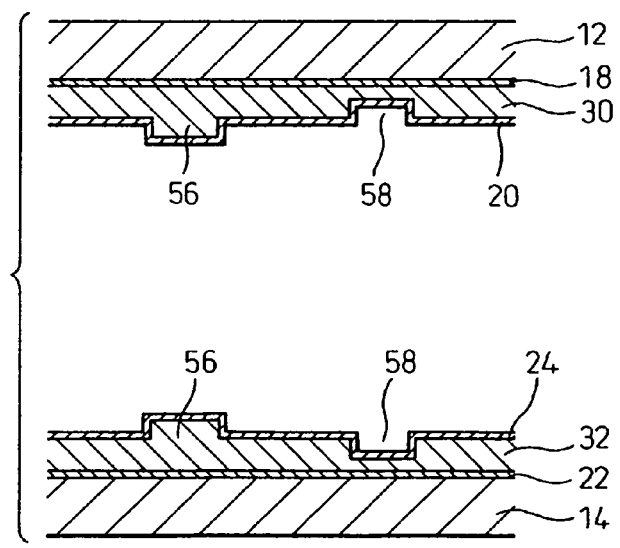
FIG. 34 is a cross-sectional view through the structures of FIG. 33.

FIGS. 33 and 34 are a plan view and a cross-sectional view, respectively, showing a modification of the linearly arranged structures. This example is similar to the preceding one except for the following points. Specifically, the upper and lower substrates 12 and 14 have projections 30 and 32, respectively, and the tall portions and the low portions are alternately formed in the projections 30 and 32 as the means 56 for forming the boundaries of alignment of first type (I) and the means 58 for forming the boundaries of alignment of second type (II). The low portions 58 of the projections 30 and 32 are the separation sections 30T and 32T for separating the constituent units 30S and 32S. The low portions have the projection height of 1 μm. As a method of reducing the height of the projection, according to this embodiment, the projections 30 and 32 formed in this embodiment are selectively ashed by radiation from an oxygen plasma. Also, in the case where the projections are formed on the TFT substrate, the desired structure can be obtained by a method for opening contact holes in the particular portion. For a CF substrate, on the other hand, a method for removing the color layer and the overcoat layer of the particular portion can be used without increasing the processes.

Figure 35A:
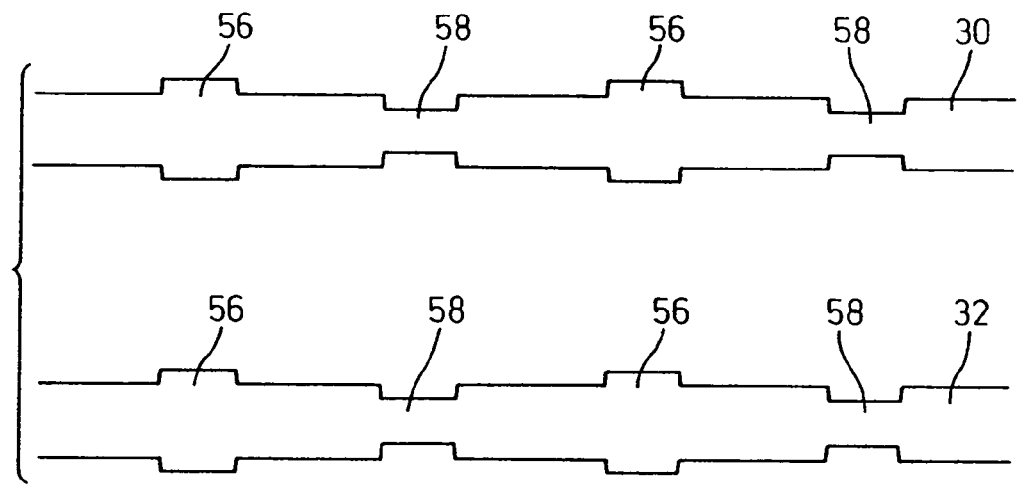
FIGS. 35A and 35B are plan views showing modifications of the alignment control structures.

FIG. 35A is a plan view showing a modification of the linearly arranged structures. The upper and lower substrates 12 and 14 have projections 30 and 32. The projections 30 and 32 have alternately wide portions and narrow portions as the means 56 for forming the boundaries of alignment of first type (I) and the means 58 for forming the boundaries of alignment of second type (II). The width of the wide portion 56 is 15 μm, and the width of the narrow portion 58 is 5 μm (normally, the width is 10 μm).

Figure 35B:
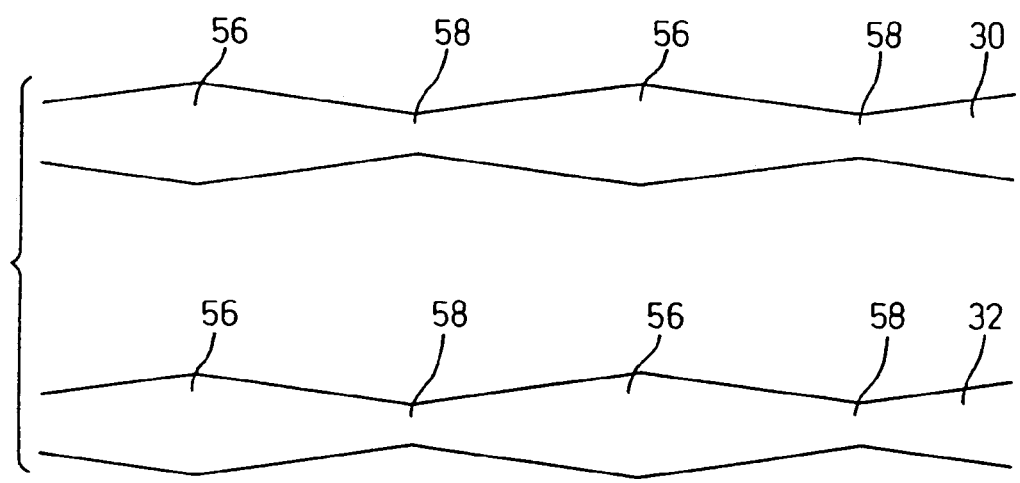

FIG. 35B is a plan view showing a modification of the linearly arranged structures. The upper and lower substrates 12 and 14 have projections 30 and 32. A wide portion and a narrow portion of the projections 30 and 32 are alternately arranged as the means 56 for forming the boundaries of alignment of first type (I), and the means 58 for forming the boundaries of alignment of second type (II).

Figure 36:
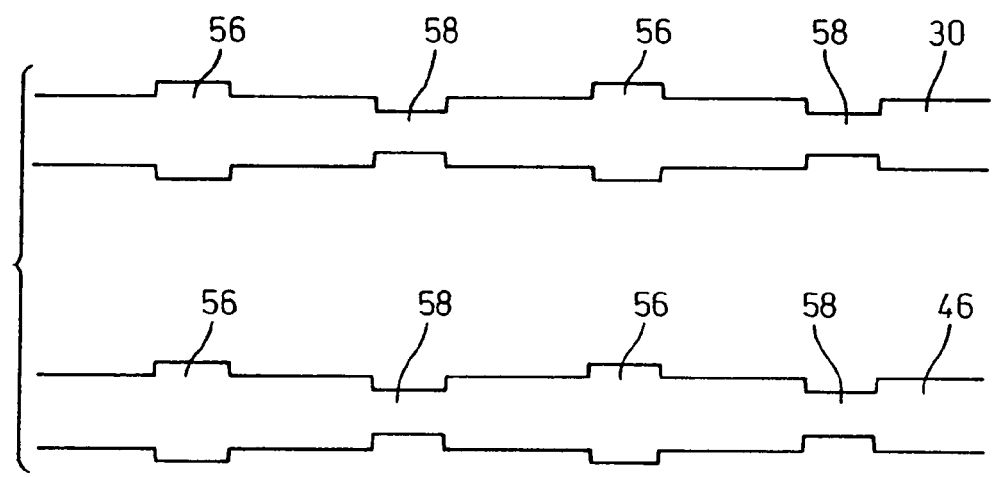
FIG. 36 is a plan view showing a modification of the alignment control structures.

FIG. 36 is a plan view showing a modification of the linearly arranged structures. The lower substrate 14 has slits 46 as the linearly arranged structures. The width of the slit 46s is continuously changed and wide portions are alternated with narrow portions, as the means 56 for forming the boundaries of alignment of first type (I) and the means 58 for forming the boundaries of alignment of second type (II).

Figure 37:
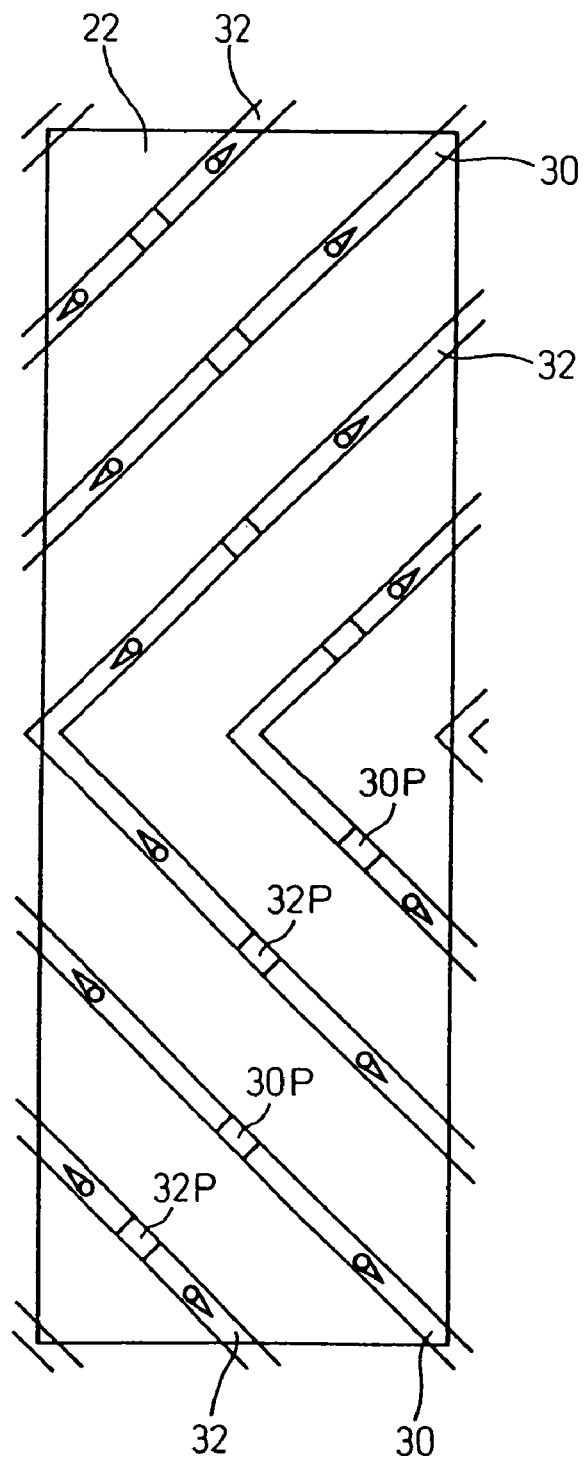
FIG. 37 is a plan view showing a modification of the alignment control structures.

FIG. 37 is a plan view showing a modification of the linearly arranged structures. The upper substrate 12 is a CF substrate, and the lower substrate 14 is a TFT substrate. The panel size is 15 inch type, and the number of pixels is 1024×768 (XGA). FIG. 37 shows one pixel unit of the panel. The height of the central portions 32P of the projections 32 of the TFT substrate 14 is reduced, and the height of the central portions 30P of the projections 30 of the CF substrate 12 is increased. Taking the effect of the edge of the pixel electrodes 22 into account, the desired alignment could be realized.

In an application of the present invention to a liquid crystal panel using a TFT substrate, it is necessary to take into full consideration the effect of the edge of the pixel electrodes 22 of the TFT substrate on the direction of the electric field.

Figure 38A:
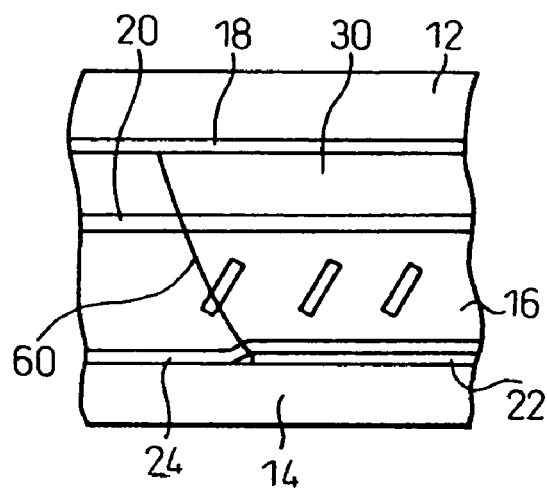
FIGS. 38A and 38B are cross-sectional views of a portion of a liquid crystal display apparatus near the edge of the pixel electrode.
Figure 38B:
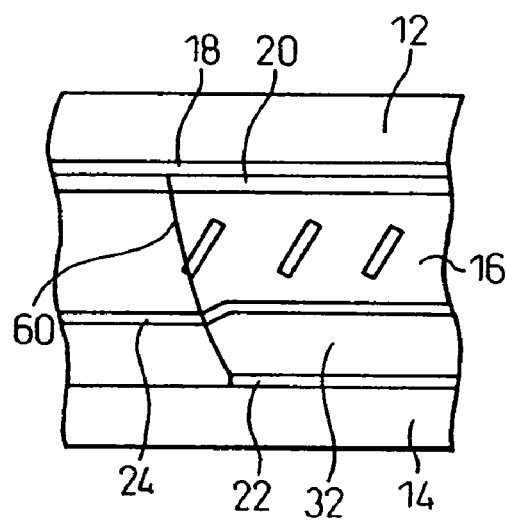
Figure 39A:
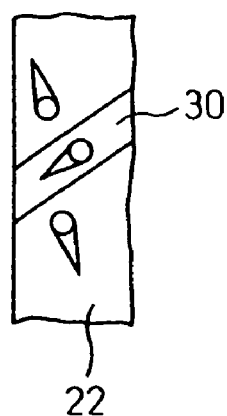
FIGS. 39A and 39B are views showing the alignment of the liquid crystal at the edge of the pixel electrode of FIGS. 8A and 38B.
Figure 39B:
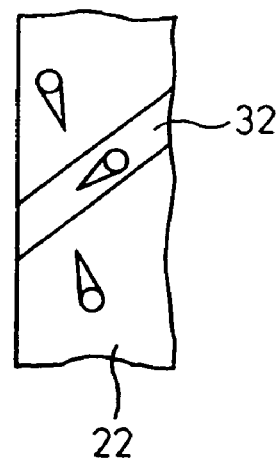

FIGS. 38A and 38B are partial cross-sectional views showing the neighborhood of the edge of the pixel electrode 22 of the liquid crystal display apparatus, and FIGS. 39A and 39B are views showing the alignment of the liquid crystal at the edge of the pixel electrode 22 of FIGS. 38A and 38B. FIGS. 38A and 39A show a portion of the projection 30 of the upper substrate 12, and FIGS. 38B and 39B a portion of the projection 32 of the lower substrate 14. As shown in FIGS. 38A to 39B, an oblique electric field 60 exists at the edge of the pixel electrode 22. This oblique electric field 60 plays the role of directing the liquid crystal molecules toward the center of the pixel, when viewed, so that the TFT substrate is arranged below the CF substrate. This indicates that the edge of the pixel electrode 22 has the same function as the means 56 for forming the boundary of orientation of first type (I) on the projection 32 of the TFT substrate, and has the same function as the means 58 for forming the boundaries of second type (II) against the projection 30 of the CF substrate.

In other words, the boundary nearest to the edge of the pixel electrode on the projection 32 of the TFT substrate always assumes the status of alignment of second type (II) and the boundary nearest to the edge of the pixel electrode always assumes the status of first type (I) on the projection 30 of the CF substrate. As a result, the configuration of FIG. 37 permits the alignment control of all the domains on the projection for the TFT liquid crystal panel by determining the direction of alignment on the projections 30 and 32 in accordance with the direction of regulation by the edge of the pixel electrode.

Figure 40:
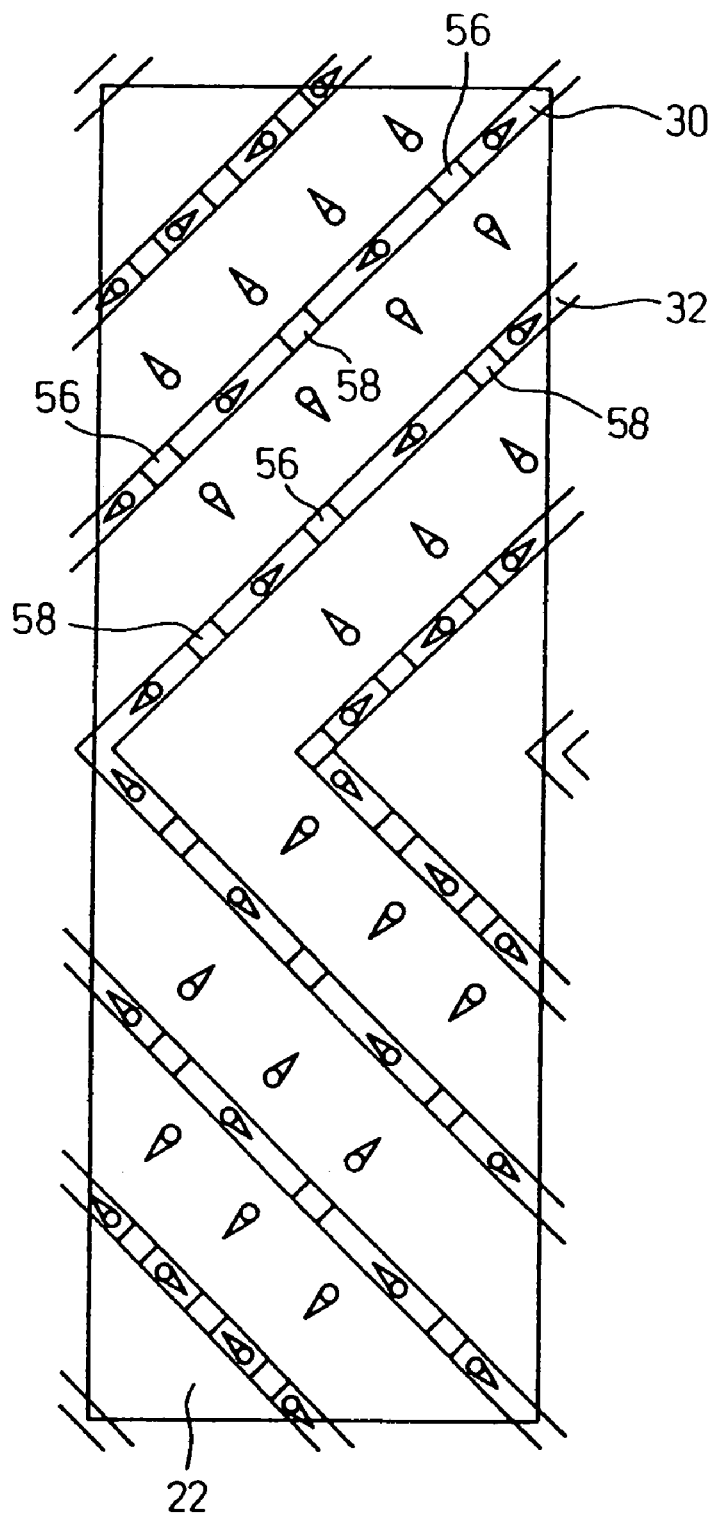
FIG. 40 is plan view showing a modification of the alignment control structures.

FIG. 40 is a plan view showing a modification of the linearly arranged structures. For the TFT substrate, the projection height is reduced as the alignment control means 58 on the projection 32 nearest to the edge of the pixel electrode, while the projection height is increased as the alignment forming means 56 inside. For the CF substrate, on the other hand, the projection height is increased as the alignment control means 56 on the portion of the projection 30 nearest to the pixel edge, while the projection height is reduced as the alignment forming means 58 inside.

In the embodiments described above, the dot-projections are formed in the same manner for the upper and lower substrates, but it is not necessary to do so. For example, the upper substrate may be formed with higher dot-projections and lower dot-projections, while the lower substrate may be formed with wider dot-projection and narrower dot-projections with equal effect. Also, only the two types of shapes need not be alternated on the same projections.

For example, the repetition of higher and lower dot-projections is not always necessary, but an alternative is to arrange a higher dot-projection, a lower dot-projection, a wider dot-projection, a narrower dot-projection, a higher dot-projection and a lower dot-projection in that order, for example. Anyway, the only requirement is to alternate the shape change satisfying the conditions for the boundaries of first and second types (I) and (II). This shape change for the projections and the slits is shown in Table 1.

TABLE 1

| Boundary forming means 56 of first type (I) |
| --- |
| Increase projection height |
| Increase projection width |
| Remove electrode under projection |
| Increase slit height (protrude) |
| Increase slit width |
| Boundary forming means 58 of second type (II) |
| Cut projection |
| Reduce projection height |
| Reduce projection width |
| Cut slit |
| Reduce slit height (form a hole) |
| Reduce slit width |

Figure 41:
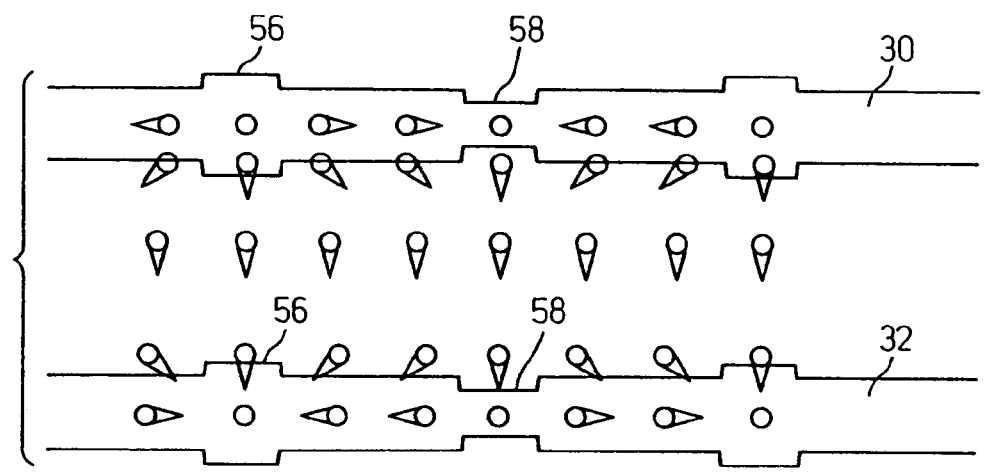
FIG. 41 is a plan view showing a modification of the alignment control structures.

FIG. 41 is a view showing the alignment of the liquid crystal on the linearly arranged structures of FIG. 35. In this case, the alignment in the display domain is the bend form.

Figure 42:
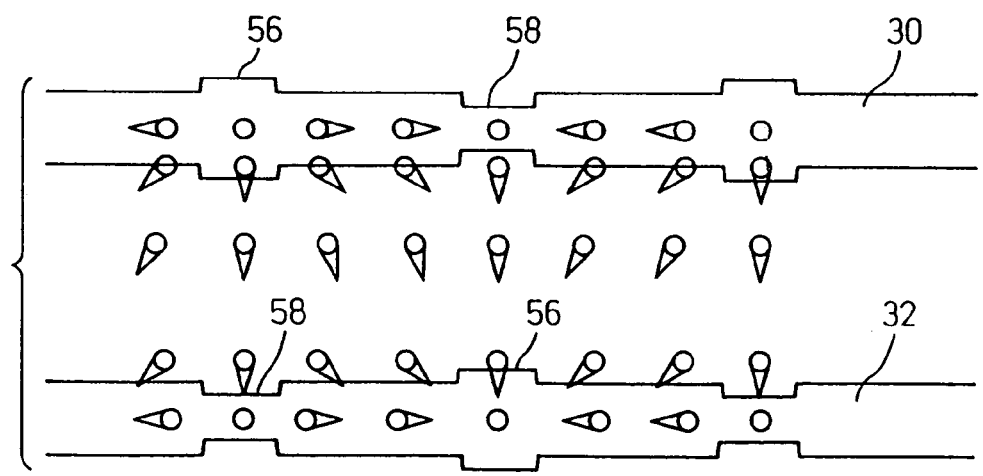
FIG. 42 is a plan view showing a modification of the alignment control structures.

FIG. 42 is a view showing a modification of the linearly arranged structure of FIG. 41. In this case, the alignment of the display domain is the spray form. By changing from the configuration of FIG. 41 to the configuration of FIG. 42, the bend alignment can be changed to the spray alignment.

Figure 44:
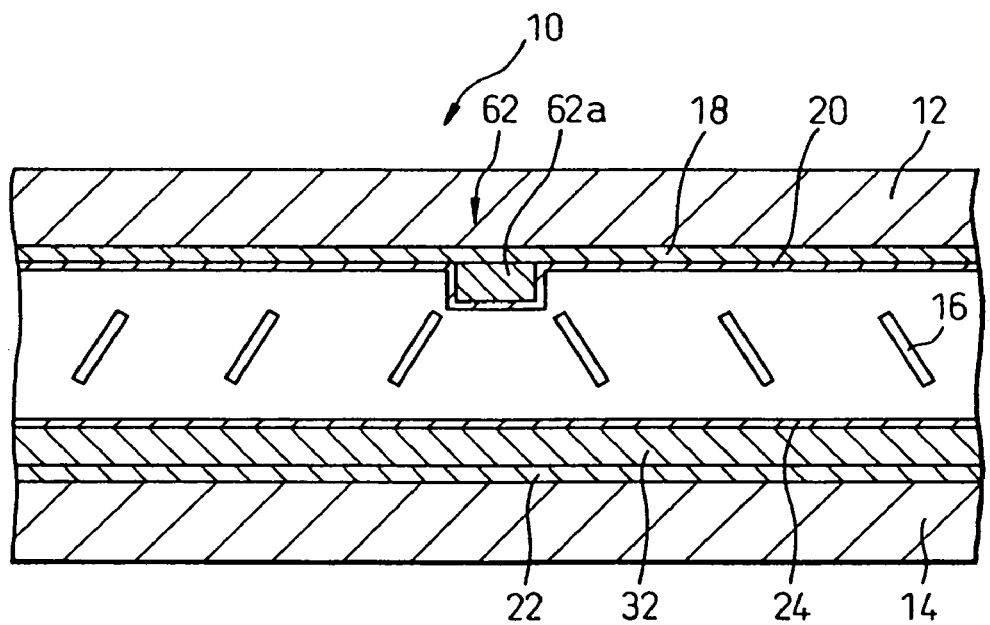
FIG. 44 is a cross-sectional view of the liquid crystal display apparatus passing through the alignment control structures of FIG. 43.

FIG. 43 is a plan view showing the alignment control structures according to the third embodiment of the present invention. FIG. 44 is a cross-sectional view passing through the alignment control structures of FIG. 43. The basic configuration of this liquid crystal display apparatus is similar to that of the liquid crystal display apparatus according to the embodiment shown in FIGS. 1 to 5. Specifically, the liquid crystal display apparatus 10 includes projections 30 and 32 as the alignment control structures (linearly arranged alignment control structures) for controlling the alignment of the liquid crystal between the projections 30 and 32 (display domain). The projections 30 and 32 are arranged in the direction parallel to each other and displaced from each other, as viewed normal to the substrate. FIG. 44 is a cross-sectional view passing through the projection 32 of the lower substrate 14 and the projection 30 of the upper substrate 12 is not shown in FIG. 44.

In this embodiment, the upper substrate 12 and the lower substrate 14 include means 62 and 64, respectively, for forming the boundary of alignment of the liquid crystal molecules (singular points in director field) at fixed positions on the opposed substrate upon application of a voltage thereto. In FIG. 44, the upper substrate 12 includes means 62 having a dot-projection 62a in the same cross-section as the projection 32 of the lower substrate 14. In a similar fashion, as shown in FIG. 43, the lower substrate 14 includes means 64 having a dot-projection 64a in the same cross-section as the projection 30 of the upper substrate 12.

Figure 45:
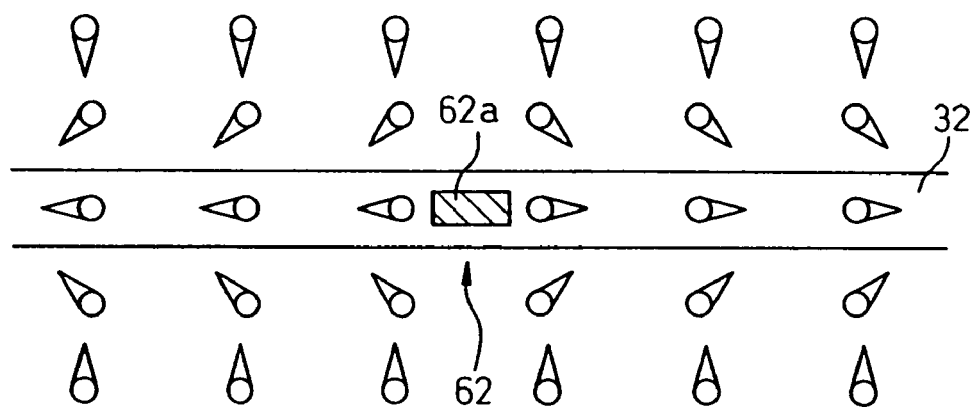
FIG. 45 is a view showing the alignment of the liquid crystal in the neighborhood of the alignment control structures of FIG. 44.
Figure 46:
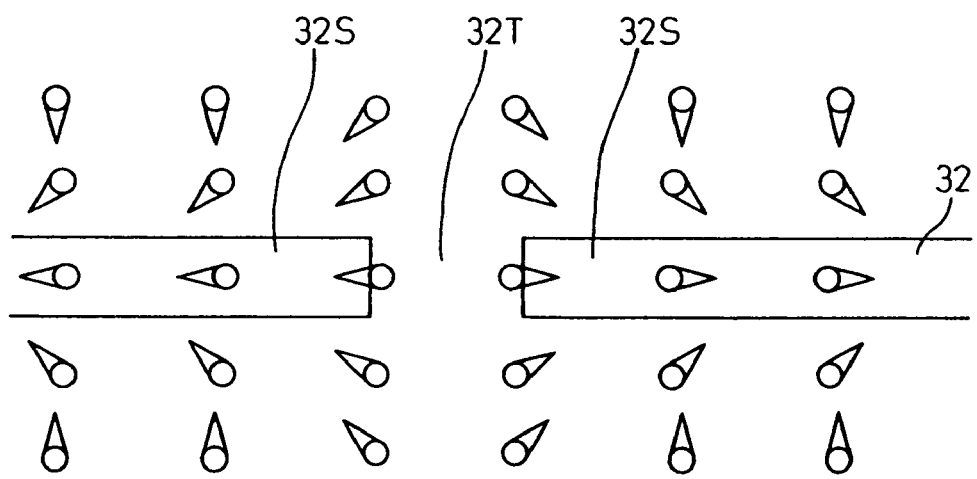
FIG. 46 is a view showing the alignment of the liquid crystal in the neighborhood of the alignment control structures according to the first embodiment.

FIG. 45 is a view showing the alignment of the liquid crystal in the neighborhood of the linearly arranged structure of FIG. 44. FIG. 46 is a view showing the alignment of the liquid crystal in the neighborhood of the linearly arranged structure according to the first embodiment.

In the first embodiment, the projections 30 and 32 are each formed of a plurality of constituent units 30S and 32S. The means 62 and 64 for forming the boundary of alignment of the liquid crystal molecules at a predetermined position according to this embodiment have the same function as the projections 30 and 32 formed of a plurality of constituent units 30S and 32S in the first embodiment. As seen from the comparison between FIGS. 45 and 46, the positions where the means 62 and 64 are formed along the projections 30 and 32 of the means 62 and 64 are the same as the cut portions or the boundaries of a plurality of constituent units 30S and 32S in the first embodiment.

As shown in FIGS. 44 and 45, the means 62 is intended to cause the liquid crystal molecules on the projection 32 to fall toward the dot-projection 62a of the means 62. In similar fashion, the means 64 is adapted to cause the liquid crystal molecules on the projection 30 to lie toward the projection 64a of the means 64. Thus it is seen that the means 62 and 64 have the same significance as the projections 30 and 32 formed of a plurality of constituent units 30S and 32S whereby the liquid crystal molecules tend to lie toward the cut portions or the boundaries 32T.

In the configuration of FIG. 46, the liquid crystal molecules located on the side of the projection 32 are desirably aligned perpendicular to the projection 32. The liquid crystal molecules on the side of the cut portions or the boundaries 32T where the projection 32 is discontinuous, however, are not necessarily turned perpendicular to the projection 32. In the configuration of FIGS. 44 and 45, the projection 32 is not discontinuous, and therefore the liquid crystal molecules located on the side of the projection 32 are all positioned perpendicular to the projection 32. Thus, the alignment of the liquid crystal in both the display area and the area on the projection can be controlled without reducing the brightness.

The dot-projections 62a and 64a are made of the photosensitive acrylic material PC-335 (made by JSR). The dot-projections 62a and 64a have the width of 5 µm and the height of 1.5 µm. The width of the linear projections 30 and 32 is 10 µm and the height thereof is 1.5 µm.

Figure 47A:
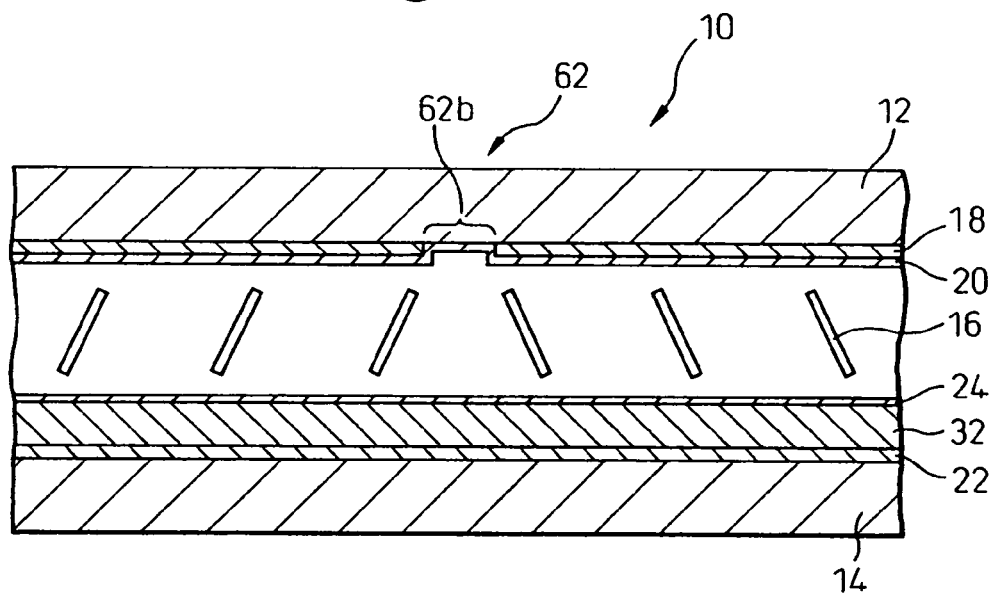
FIG. 47A is a cross-sectional view showing a modification of the means for controlling the boundary and the alignment control structures.
Figure 47B:
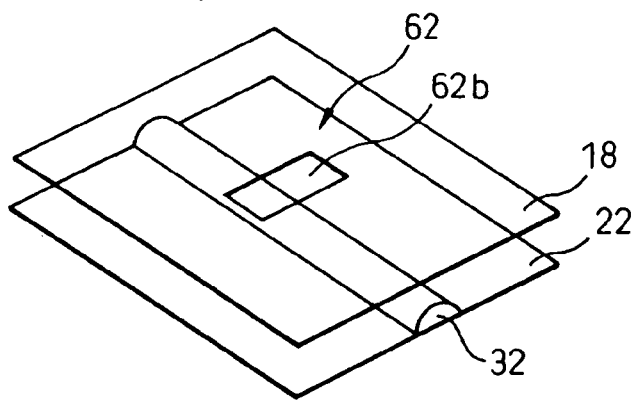
FIG. 47B is a schematic perspective view of FIG. 47A.
Figure 47C:
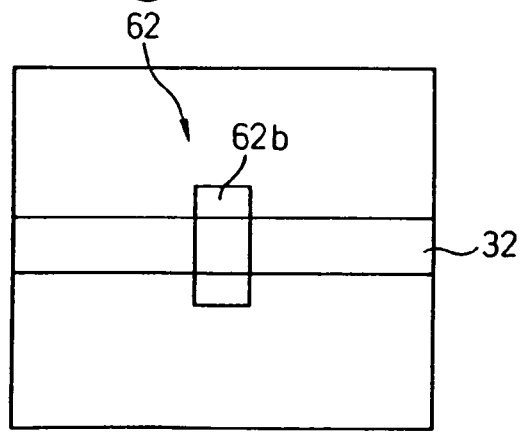
FIG. 47C is a schematic plan view of FIG. 47B.

FIGS. 47A to 47C are views showing a modification of the linearly arranged structure and the control means for the boundary alignment. FIG. 47A is a cross-sectional view, FIG. 47B an illustrative perspective view, and FIG. 47C is a plan view. In this embodiment, the means 62 for forming the boundary of alignment of the liquid crystal molecules at a predetermined position is a dot-slit structure 62b on the opposed substrate. The means 62 is arranged by forming a slit in the electrode 18 and forming the vertical alignment layer 20 on the electrode 18. The size of the slit is 14×4 µm or 10×4 µm at which the display brightness is improved. The slit width can be further reduced.

Figure 48:
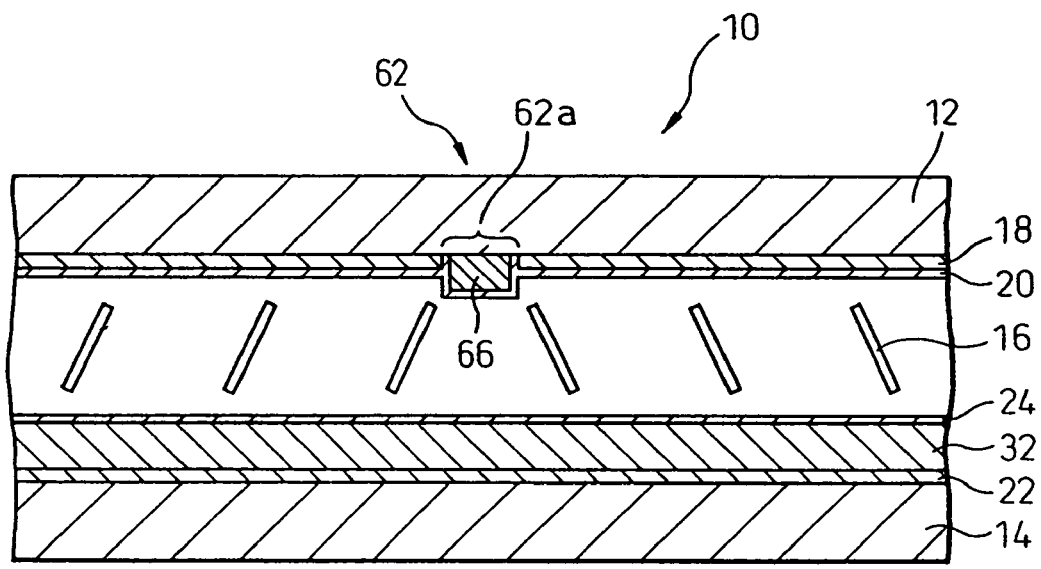
FIG. 48 is a cross-sectional view showing a modification of the means for controlling the alignment in the boundary and the alignment control structures.

FIG. 48 is a view showing a modification of the control means for alignment in the boundaries and the linearly arranged structures. In this embodiment, the means 62 for forming the boundary of alignment of the liquid crystal molecules at a predetermined position is the dot-projection 62a. The dot-projection 62a is produced in such a manner that a slit or a hole is formed in the electrode 18, a projection 66 is formed on the substrate in the slit or hole, and then the vertical alignment layer 20 is formed on the electrode 18. The width of the dot-projection 62a is 3 µm, the length 8 µm, and the height 1.5 µm. The projection 66 is formed of an acrylic resin. As projection forming means, the material of the bus line or the dielectric layer can be selectively used for the TFT substrate. For the CF substrate, on the other hand, the material of a color filter layer, a black mask layer or an overcoat layer can be selectively used.

Also, in place of providing the projection 66, a slit or a hole may be formed as a depression in the substrate, so that means 62 for forming the boundary of alignment of the liquid crystal molecules at a predetermined position can be a slit structure. For the TFT substrate, on the other hand, a contact hole can be selectively formed as a depression. In the case of the CF substrate, on the other hand, a depression can be formed selectively in the color filter layer, the black mask layer or the overcoat layer.

Figure 49:
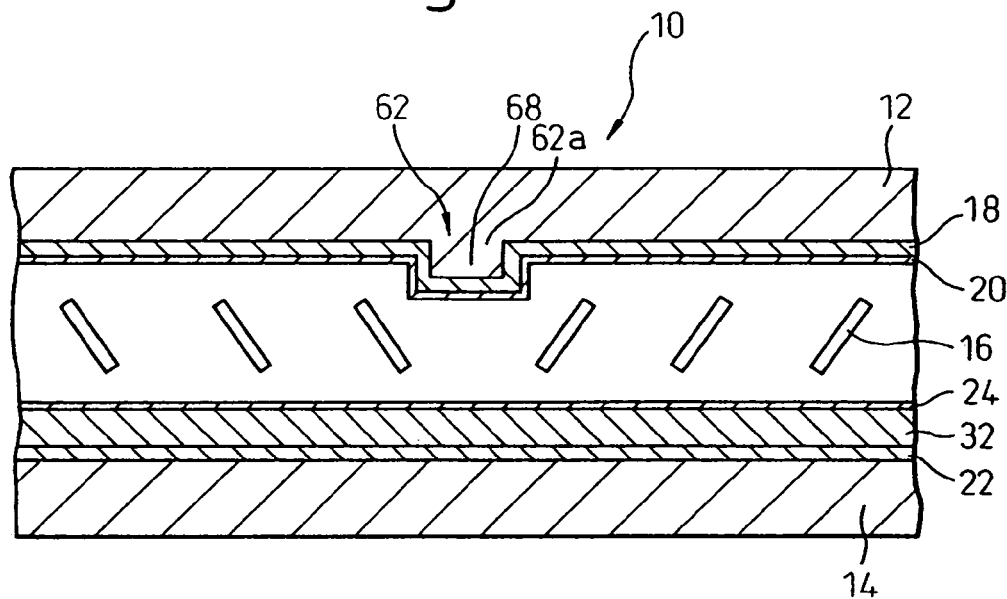
FIG. 49 is a cross-sectional view showing a modification of the means for controlling the alignment in the boundary and the alignment control structures.

FIG. 49 is a view showing a modification of the control means for the boundary of alignment and the linearly arranged structures. According to this embodiment, the means 62 for forming the boundary of alignment of the liquid crystal molecules at a predetermined position is a dot-projection 62a. The means 62 is such that a projection 68 is formed on the substrate 12, an electrode 18 is formed, and then a vertical alignment layer 20 is formed. The means 62 can also be formed of a slit structure by forming a depression in the substrate 12.

Figure 50:
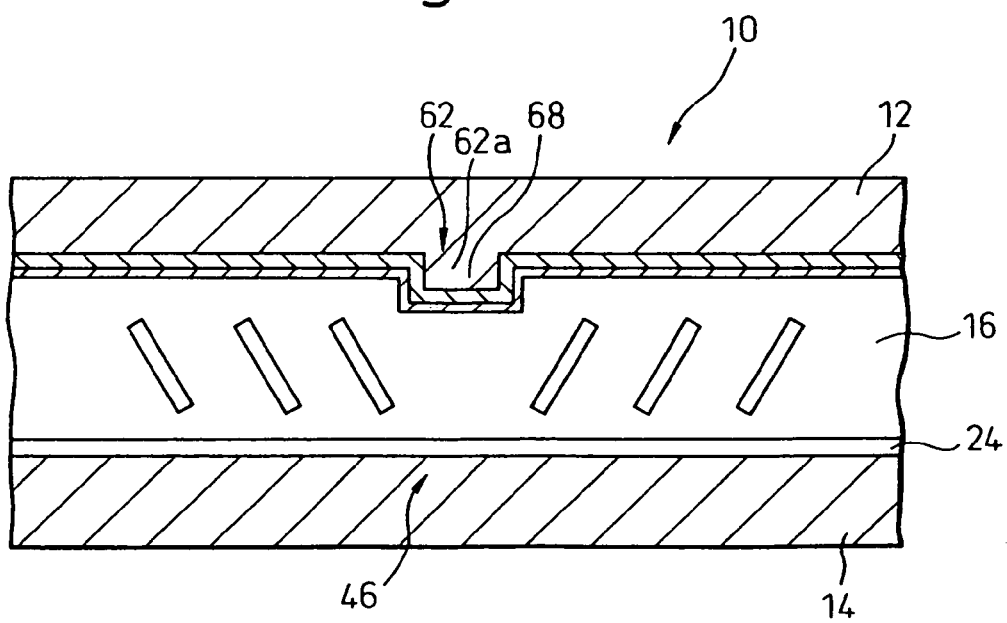
FIG. 50 is a cross-sectional view showing a modification of the means for controlling the alignment in the boundary and the alignment control structures.

FIG. 50 is a view showing a modification of the control means for the boundary of alignment and the linearly arranged structures. In FIGS. 43 to 49, the linearly arranged structures are configured of the projections 30 and 32. As an alternative, the linearly arranged structures can be formed of the slit structures 44 and 46 (FIGS. 7 and 8). In this embodiment, the linearly arranged structures are formed of the slit structures 46, and the means 62 for forming the boundary of alignment of the liquid crystal molecules at a predetermined position is configured of the dot-projection 62a. The means 62 is such that the projection 68 is formed on the substrate 12, the electrode 18 is formed and then the vertical alignment layer 20 is formed.

Figure 51:
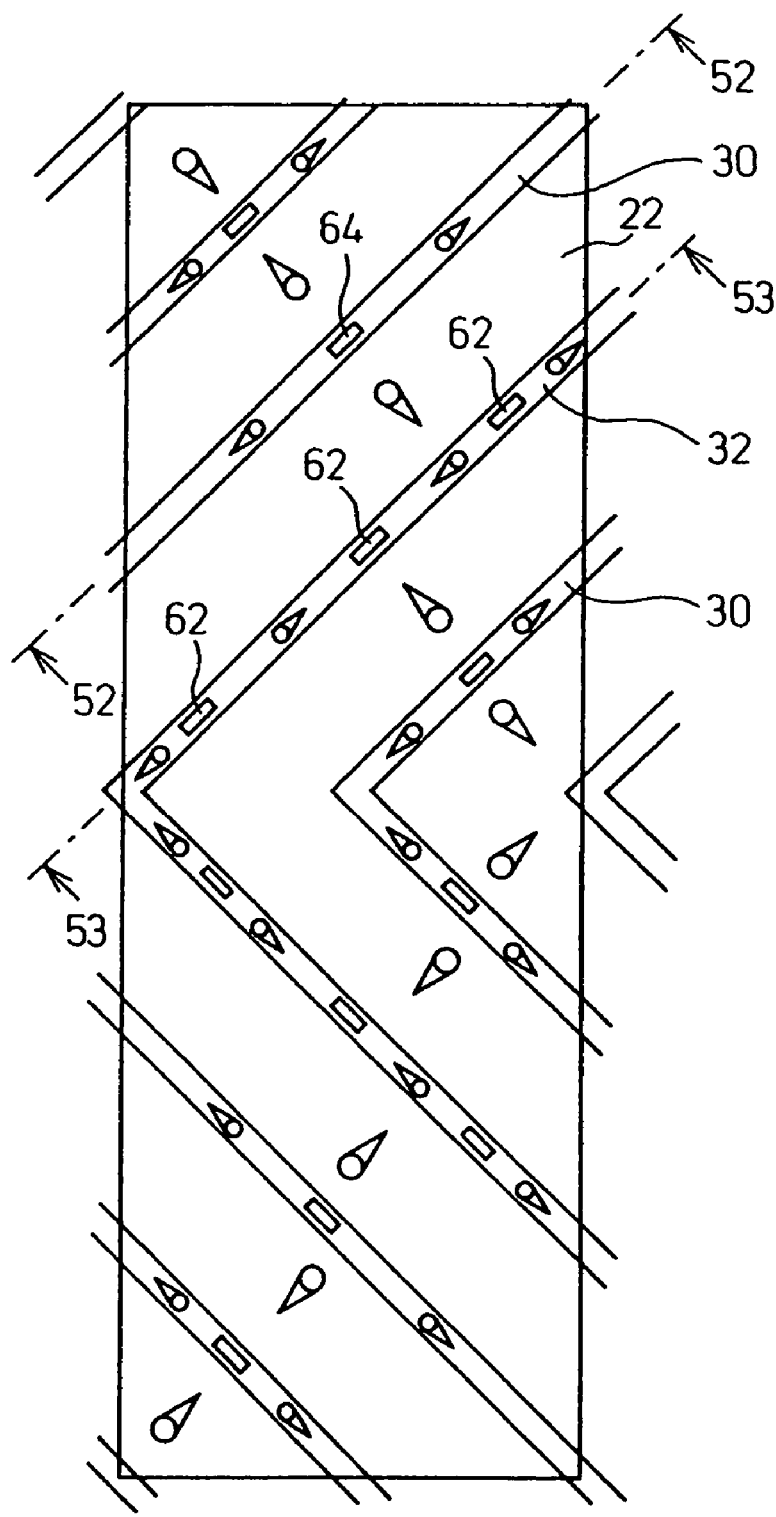
FIG. 51 is a plan view showing a modification of the means for controlling the alignment in the boundary and the alignment control structures.
Figure 52:
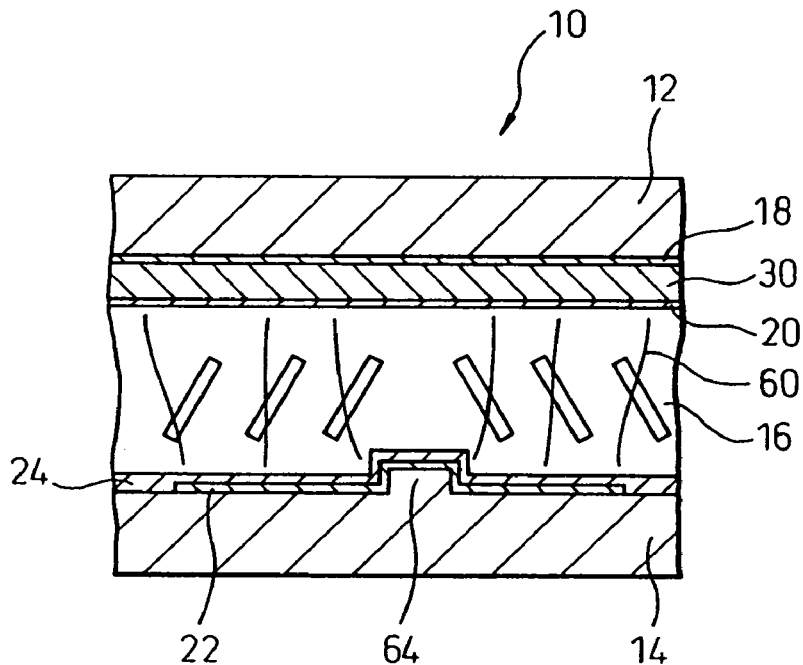
FIG. 52 is a cross-sectional view taken along line 52-52 in FIG. 51.
Figure 53:
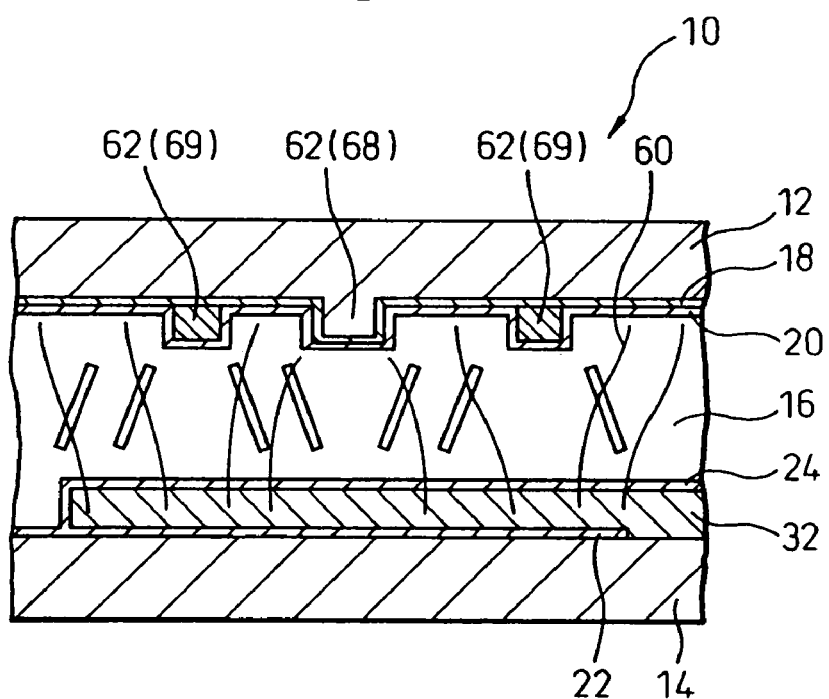
FIG. 53 is a cross-sectional view taken along the line 53-53 in FIG. 51.

FIG. 51 is a view showing a modification of the control means for boundary of alignment and the linearly arranged structures. In FIGS. 52 and 53 are cross-sectional views. In this case, the projections 30 and 32 are provides in a bent form, as the linearly arranged structures. As described above, it is necessary to take into account the effect of the oblique electric field from the edge of the pixel electrode 22 of the TFT substrate onto the opposed electrode 18. In this case, among the wedge-shaped declinations formed on the projection 32 of the TFT substrate, the disclination nearest to the edge of the pixel electrode has the intensity s=−1, which corresponds to the boundary of second type (II) in FIG. 28. Among the wedge-type declinations formed on the projection of the CF substrate, on the other hand, the declination nearest to the edge of the pixel electrode has the intensity s=+1, which corresponds to the boundary of first type (I) of FIG. 28. In an application to an actual liquid crystal panel, the direction of alignment on the projections 30 and 32 is determined in accordance with the formation of the disclination by the edge of the pixel electrode 22, thereby making it possible to control all the domains in the pixel in a stable fashion.

In this embodiment, the electrode located at the portion, in opposed relation to the projection 30 of the CF substrate, is selectively protruded to constitute the means 64 for forming the boundary of alignment of the liquid crystal molecules at a predetermined position. Also, the portion in opposed relation to the projection 32 of the TFT substrate is selectively formed with a projection, thereby constituting the means 62 for forming the boundary of alignment of the liquid crystal molecules at a predetermined position. Further, in the case where a plurality of wedge-shaped declinations are arranged on one projection in the pixel, the alignment control means is provided to arrange the disclinations of s=−1 and s=+1 alternately. According to this embodiment, as shown in FIG. 53, the means 62 with the electrode 22 protruded above the projection 68 and the means 62 with the projection 69 protruded above the electrode 22 are arranged alternately with each other.

Figure 54:
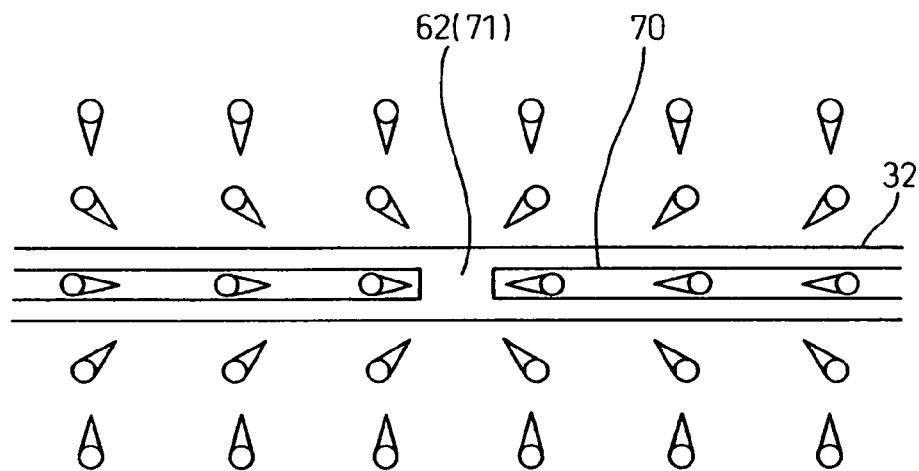
FIG. 54 is a plan view showing a modification of the means for controlling the alignment in the boundary and the alignment control structures.
Figure 55:
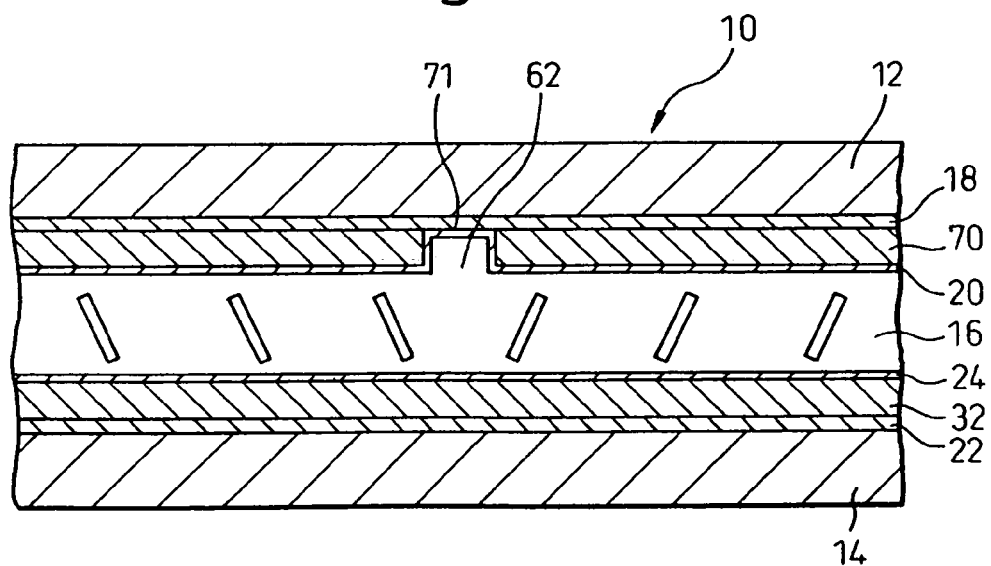
FIG. 55 is a cross-sectional view of the liquid crystal display apparatus through the alignment control structures of FIG. 54.

FIGS. 54 and 55 are views showing a modification of the control means for the boundary of alignment and the linearly arranged structures. In this embodiment, the means 62 for forming the boundary of alignment of the liquid crystal molecules at a predetermined position is formed as a slit 71 in the projection 70 extending long on the upper substrate 12 in opposed relation to the projection 32 of the lower substrate. The projection 70 is arranged on the electrode 18 and narrower than the projection 32.

Figure 56:
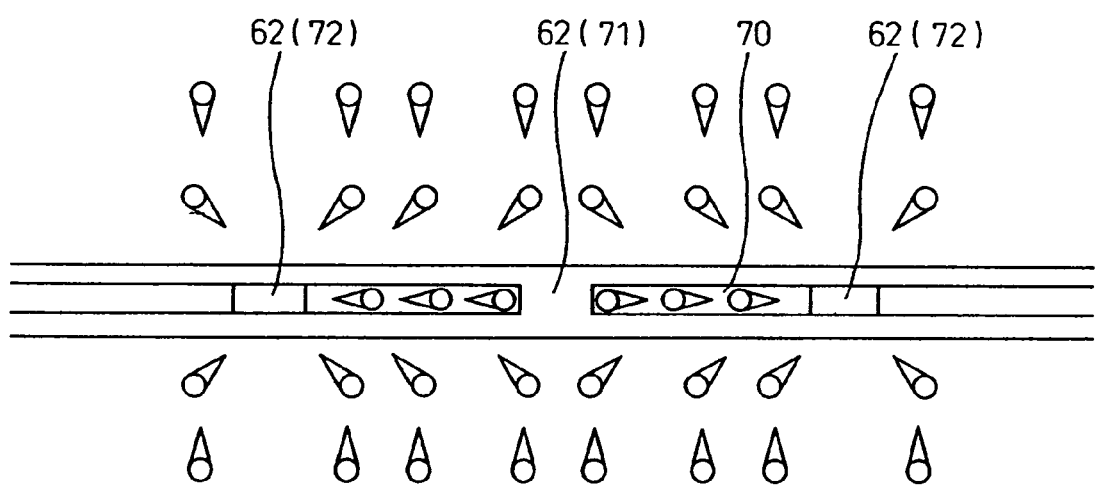
FIG. 56 is a plan view showing a modification of the means for controlling the alignment in the boundary and the alignment control structures.
Figure 57:
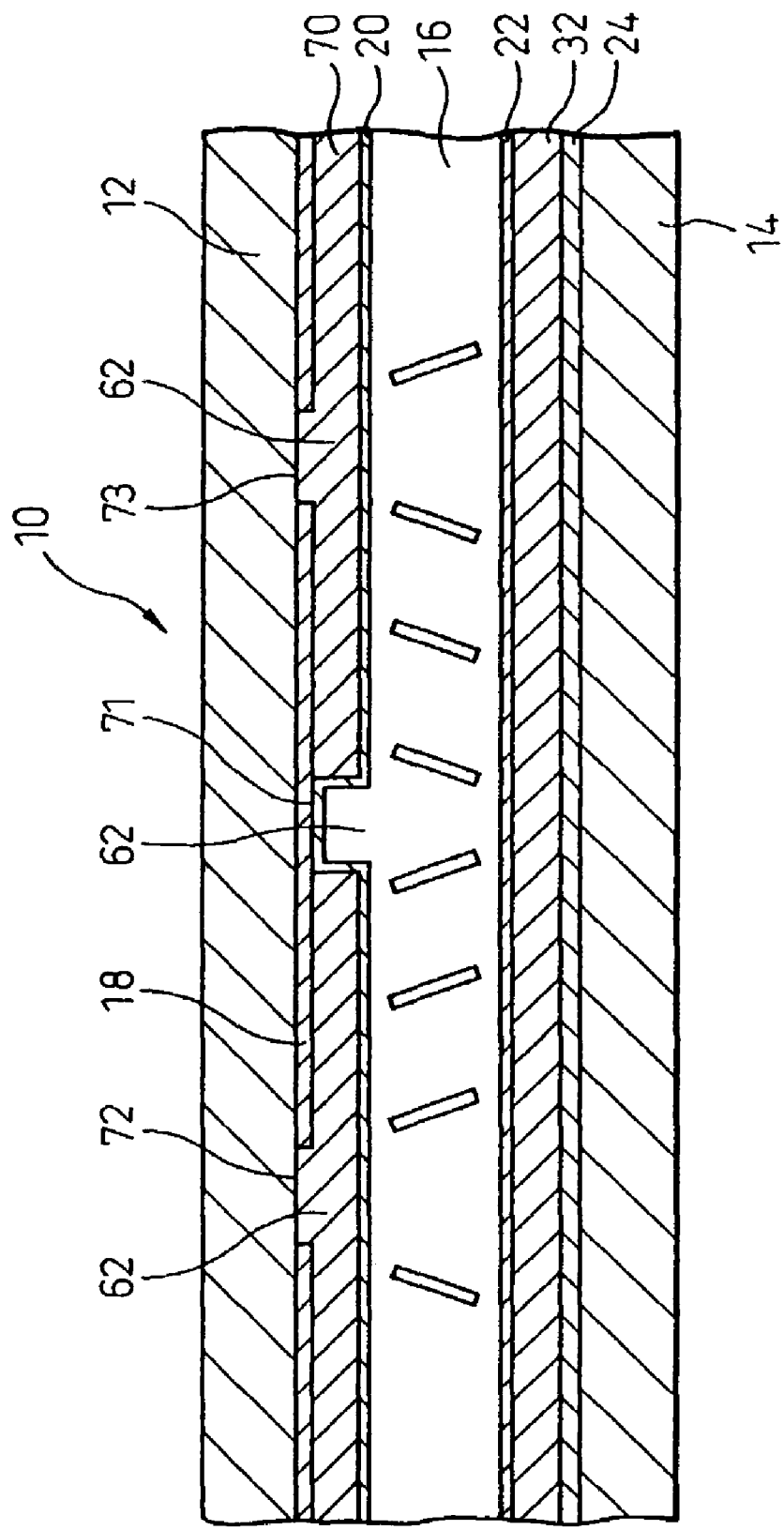
FIG. 57 is a cross-sectional view of the liquid crystal display apparatus through the alignment control structures of FIG. 56.

FIGS. 56 and 57 are views showing a modification of the control means for orientation the boundary of alignment. and the linearly arranged structures. In this embodiment, the means 62 for forming the boundary of alignment of the liquid crystal molecules at a predetermined position is formed as a slit 71 in the projection 70 extending long on the upper substrate 12 in opposed relation to the projection 32 of the lower substrate and a slit 72 of the electrode 18. The projection 70 is arranged on the electrode 18 and narrower than the projection 32.

FIGS. 135A to 157D are views showing examples of auxiliary structures for forming the disclinations of s=+1 and s=−1, where one of the substrate has the alignment control structures and the other substrate has the auxiliary structures at positions opposite to the alignment control structures. The alignment control structures of the substrate can be projections or slits.

Examples of means for realizing s=−1 are shown in FIGS. 135A to 147B, and summarized as follows: Dot-projection (FIGS. 135A and 135B); Dot-cut out in electrode (FIGS. 136A and 136B); Dot-recess in electrode (FIGS. 137A and 137B); Narrow linear projection and partial cut out in electrode under the narrow projection (FIGS. 138A to 138E); Narrow linear projection and partial enlarged portion on the narrow projection (FIGS. 139A and 139B); Narrow linear projection and partial higher portion on the narrow projection (FIGS. 140A and 140B); Narrow linear electrode projection and partial lower portion on the narrow electrode projection (FIGS. 141A to 141D); Narrow linear electrode projection and partial cut out in the electrode (FIGS. 142A to 142D); Narrow linear electrode projection and partial narrow portion (FIGS. 143A to 143D); Narrow linear electrode projection and partial lower portion (FIGS. 144A and 144B); Narrow linear electrode recess and partial lower portion (FIGS. 145A and 145B); and Narrow linear electrode recess and partial enlarged portion (FIGS. 146A to 146D).

Examples of means for realizing s=+1 are as follows, as shown in FIGS. 147A to 157D. Dot-projection of electrode (FIGS. 147A and 147B); Narrow linear projection and partial separation (FIGS. 148A and 148B); Narrow linear projection and partial narrow portion (FIGS. 149A and 149B); Narrow linear projection and partial lower portion (FIGS. 150A and 150B); Narrow linear slit and partial connection (FIGS. 151A and 151B); Narrow linear slit and partial narrow portion (FIGS. 152A to 152D); Narrow linear slit and partial lower portion (FIGS. 153A to 153D); Narrow linear electrode projection and partial enlarged portion (FIGS. 154A to 154D); Narrow linear electrode projection and partial higher portion (FIGS. 155A and 155B); Narrow linear electrode recess and partial higher portion (FIGS. 156A and 156B); and Narrow linear electrode recess and partial narrow portion (FIGS. 157A to 157D).

Figure 58:
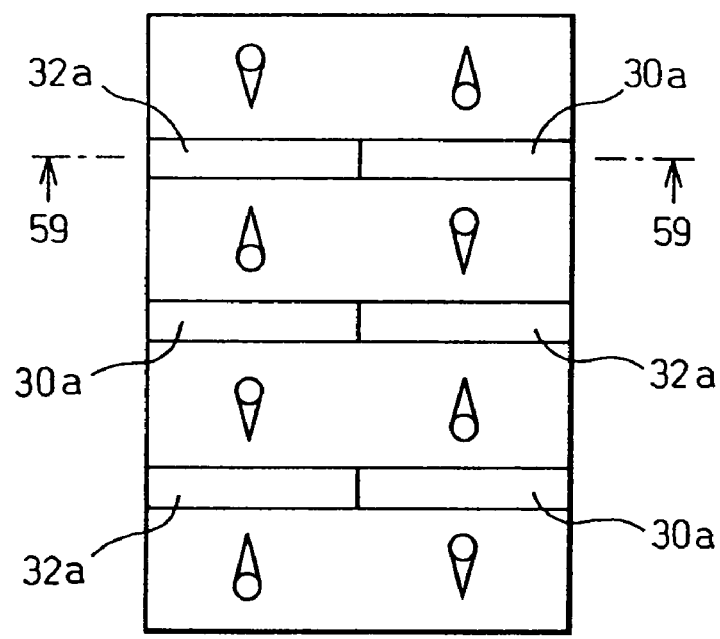
FIG. 58 is a plan view showing the alignment control structures according to the fourth embodiment.
Figure 59:
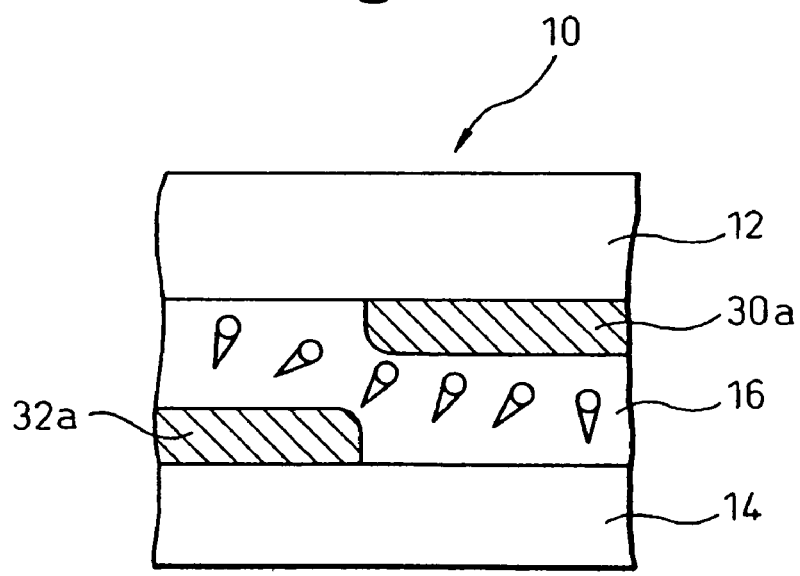
FIG. 59 is a schematic cross-sectional view of the liquid crystal display apparatus taken along the line 59-59 of FIG. 58.

FIG. 58 is a plan view showing the linearly arranged structures according to the fourth embodiment of the present invention. FIG. 59 is a cross-sectional view of the liquid crystal display apparatus taken along the line 59-59 in FIG. 58. The basic configuration of this liquid crystal display apparatus 10 is similar to the basic configuration of the liquid crystal display apparatus 10 according to the embodiments shown in FIG. 1 to 5. In this embodiment, the projections (alignment control structures) 30 and 32 are each formed of a plurality of constituent units 30a and 32a, respectively. As viewed from the direction normal to one substrate, the constituent units of the linearly arranged structure of the one substrate and the constituent units of the linearly arranged structure of the other substrate are arranged alternately on one line.

Taking the constituent units of the projection on the upper line (line 59-59) in FIG. 58, as examples, the constituent units 30a of the projection 30 on the upper substrate 12 and the constituent units 32a of the projection 32 of the lower substrate 14 are alternately arranged on the particular line. FIG. 59 shows the constituent units 30a and 32a. As shown in FIG. 59, the liquid crystal molecules located on this line fall continuously in the direction parallel to the line. As explained with reference to FIG. 11, therefore, the problem that the liquid crystal molecules on the projection fall in random directions can be solved.

Noting the left half portion in FIG. 58, the relative positions of the constituent units 32a of the projection 32 of the lower substrate 14 on the upper line, the constituent units 30a of the projection 30 of the upper substrate 12 on the intermediate line, and the constituent units 32a of the projection 32 of the lower substrate 14 on the lower line, are the same as the arrangement of FIGS. 3 and 4. The relative positions are the same as in the case where these projections are in opposed relationship in a plane at an angle to the substrate surface as shown in FIG. 2. This is also the case with FIG. 58. Thus, the operation of this liquid crystal display apparatus is basically the same as the operation of the first embodiment. Especially, with this configuration, the response speed for a half tone can be improved. By the way, the configuration of FIG. 58 is similar to that of FIG. 20.

Figure 60:
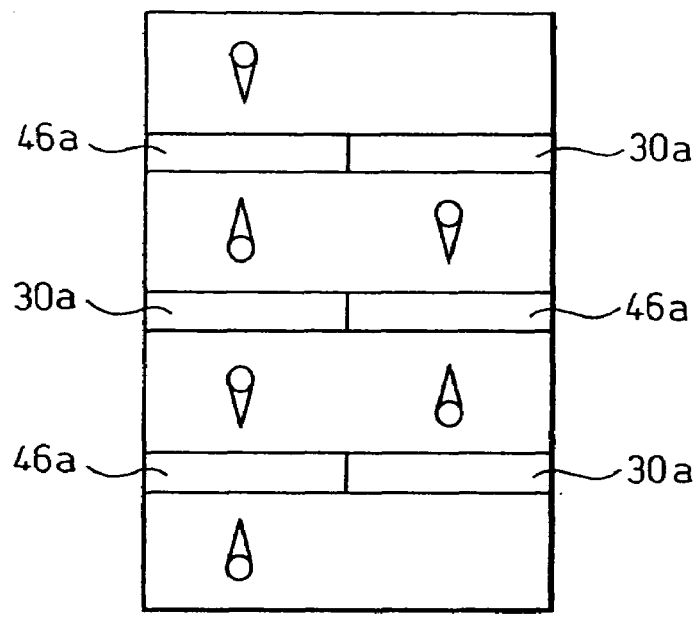
FIG. 60 is a plan view showing a modification of the alignment control structures.
Figure 61:
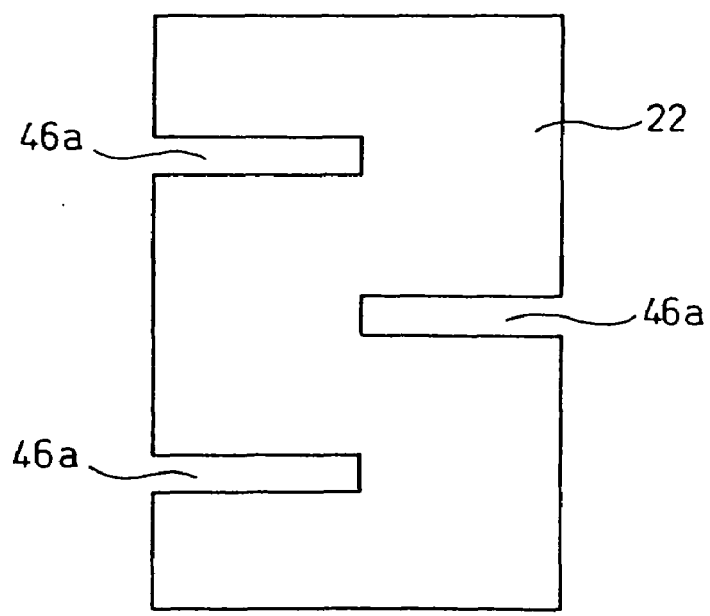
FIG. 61 is a plan view showing a pixel electrode having the slit structure of FIG. 60.

FIGS. 60 and 61 are diagrams views a modification of the linearly arranged structures. In this case, the projection 30 is used as a linearly arranged structure of the upper substrate 12, while the slit structure 46 is used as a linearly arranged structure of the lower substrate 14. The slit structure 46 can be divided into the constituent units 46a as shown in FIG. 61. In this case, the electrical connection of the individual pixel electrodes separated by the slits can be realized with a larger width thereby leading to the advantage of a wider design margin. Another advantage is that there is no likelihood of disconnection or resistance increase in the connector between the slits of the pixel electrode 22.

In this example, each linearly arranged structure has a plurality of constituent units in one pixel and a linear wall structure is arranged substantially symmetrically in one pixel. A similar feature is obtained also in the application to the bent linearly arranged structures shown in FIG. 21.

Figure 62:
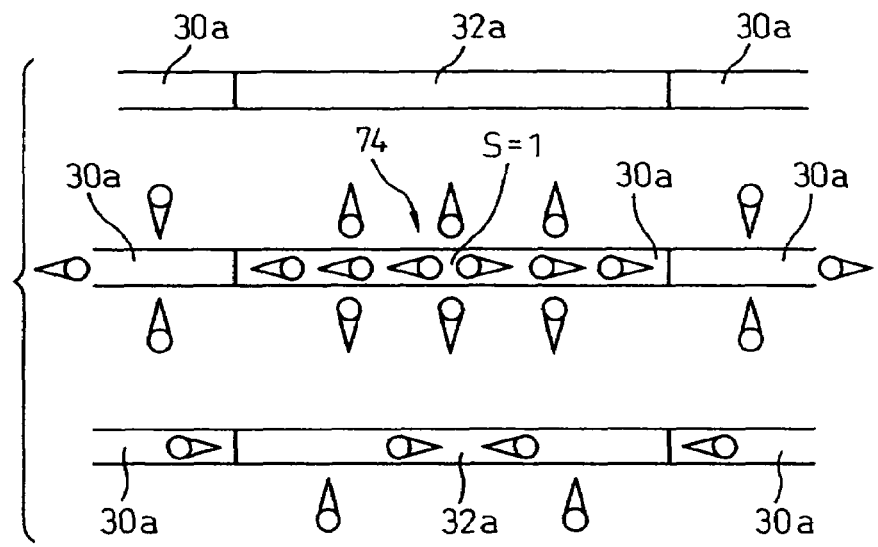
FIG. 62 is a plan view showing a modification of the alignment control structures.

FIG. 62 is a view showing a modification of the linearly arranged structure. In this case, the constituent units 30a and 32a of the projections 30, 32 are arranged alternately as in the case shown in FIG. 58, and at the same time, means 74 is provided for forming the boundary of alignment in such a manner that at least one of the constituent units 30a and 32a of the projections 30 and 32 has the liquid crystal molecules around a point directed toward said point. The means 74 for forming the boundary of alignment is analogous, for example, to the means 56 for forming the boundary of alignment of first type (I) shown in FIG. 28. The alignment of first type (I) forms a singularity point of the alignment vector corresponding to s=1. In this case, the alignment vector of the minor domains on the projection can be controlled, with the result that the stable control of the display domains is realized for an improved response speed for a half tone.

The means 74 can be similar to the corresponding one of the second embodiment described above.

Figure 63:
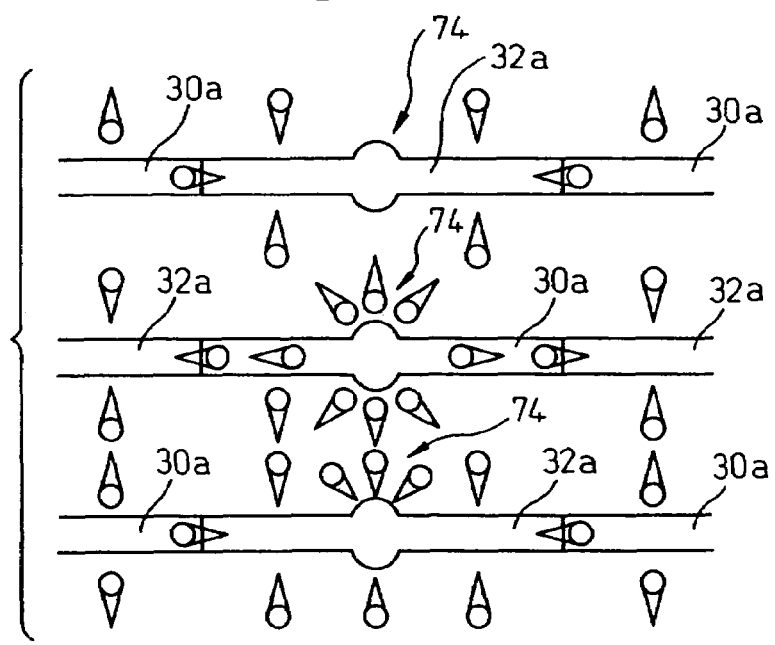
FIG. 63 is a plan view showing a modification of the alignment control structures.

FIG. 63 shows a specific example of the means 74 for forming the boundary of alignment. In FIG. 63, the means 74 is to enlarge the width of the constituent units 30a and 32a of the projections 30 and 32.

Figure 64:
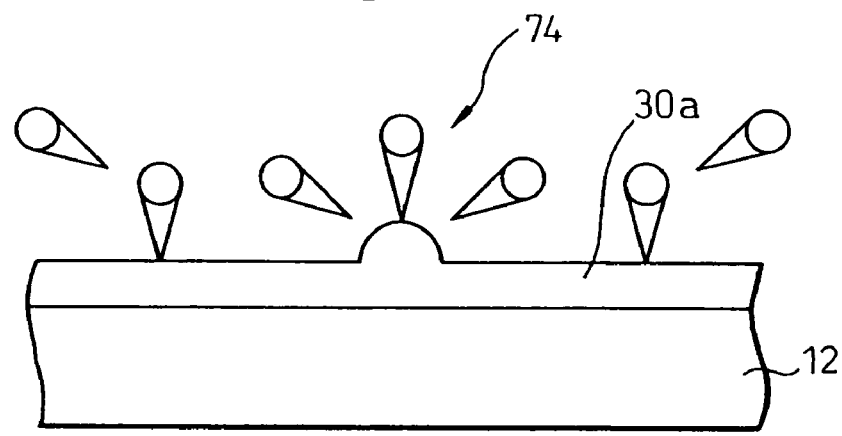
FIG. 64 is a plan view showing a modification of the alignment control structures.

Also, as shown in FIG. 64, the means 74 can also be achieved by increasing the height of the constituent units 30a and 32a of the projections 30 and 32.

At a point where the width of the constituent units 30a and 32a of the projection is partially increased or the height is increased, the liquid crystal director widens from the particular part as a center and therefore the particular point constitutes a singularity point of s=1. Also, in the case where the common substrate is arranged on this side, the liquid crystal director toward the center of the pixel from the edge of the pixel electrode rises toward the center on all the projections due to the oblique electric field of the pixel electrode. Thus, it is possible to form a minor domain which is continuously connected smoothly in the projection boundary.

Figure 65:
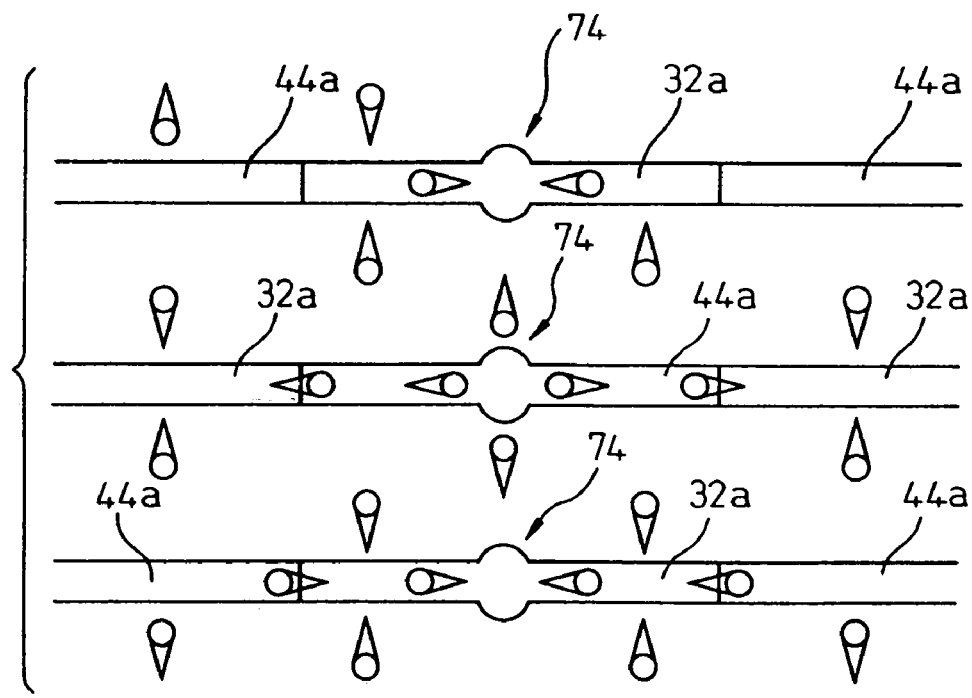
FIG. 65 is a plan view showing a modification of the alignment control structures.

FIG. 65 shows a specific example of the means 74 for forming the boundary of alignment. In FIG. 65, the linearly arranged structures are combination of the projections 32 and the slit structures 44. The means 74 can be achieved by increasing the width or height of the constituent units 32a of the projection 32 and by increasing the width or depth of the slit structure 44.

The response speed as compared with the corresponding speed in the structures of the first embodiment is shown in Table 2 (slit width 10 μm, projection width 10 μm and distance 20 μm between projections).

TABLE 2

|  | 1st embodiment | 4th embodiment | Drive condition |
| --- | --- | --- | --- |
| $T_{on} + T_{off}$ | 25 ms | −25 ms | 0 to 5 V |
| $T_{on} + T_{off}$ | 50 ms | −40 ms | 0 to 3 V |

In this way, the response speed can be improved by the smooth motion of the minor domains on the projections. Thus, the improvement of the response for a half tone with a stable orientation can be assured. Also, the width of the electrical connector of the slits can be increased, leading to the advantage that there is no fear of disconnection.

This embodiment was explained with reference to two divisions as an example. The same can be applied to the bent type linearly arranged structures. Also, several embodiments can be combined.

Figure 66:
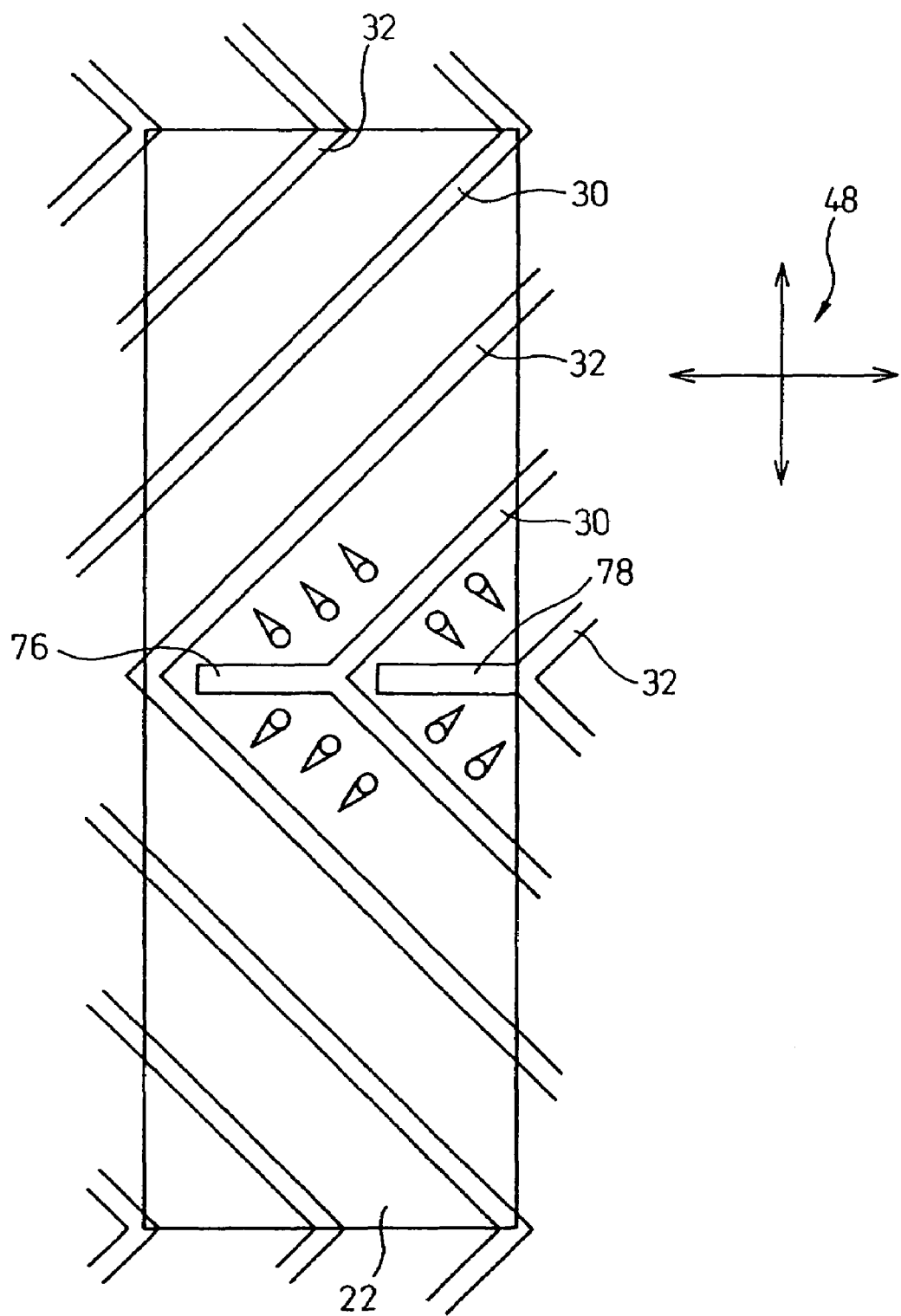
FIG. 66 is a plan view showing the alignment control structures according to the fifth embodiment of the present invention.

FIG. 66 is a plan view showing the linearly arranged structures according to the fifth embodiment of the present invention. The basic configuration of this liquid crystal display apparatus 10 is similar to that of the liquid crystal display apparatus 10 according to the embodiments of FIGS. 1, 2 and 5. In the embodiment of FIG. 5, the projections (linearly arranged structure) 30 and 32 extend parallel to each other and are bent. With this configuration, one pixel includes four areas of alignment of the liquid crystal molecules 16C, 16D, 16E and 16F, oriented in thereby making possible the alignment division with a superior visual angle characteristic.

The two line segments forming the bent portion of the projections 30 and 32 are at an angle of 90 degrees. The polarizers 26 and 28 are arranged in such a manner that the polarization axes form an angle of 45 degrees to the line segments of the bent portion of the projections 30 and 32, as designated by 48. Although only a part of the liquid crystal molecules is shown in FIG. 66, there are four areas of alignment of the liquid crystal molecules 16C, 16D, 16E and 16F (FIG. 5) in one pixel.

In this embodiment, additional projections 76 and 78 constituting additional linear wall structures are arranged on the obtuse angle side of the bent portions of the substrates having the projections 30 and 32. Specifically, the additional projection 76 is arranged continuously from the projection 30 on the obtuse angle side of the projection 30 of the upper substrate 12. The additional projection 76 extends along the bisector of the obtuse angle on the obtuse angle side of the projection 30 of the upper substrate 12. On the other hand, the additional projection 78 is arranged continuously from the projection 32 on the obtuse angle side of the projection 32 of the lower substrate 14. The additional projection 78 extends along the bisector of the obtuse angle on the particular obtuse angle side of the projection 32 of the lower substrate 14. As a result" the brightness is improved for a higher response.

Figure 67:
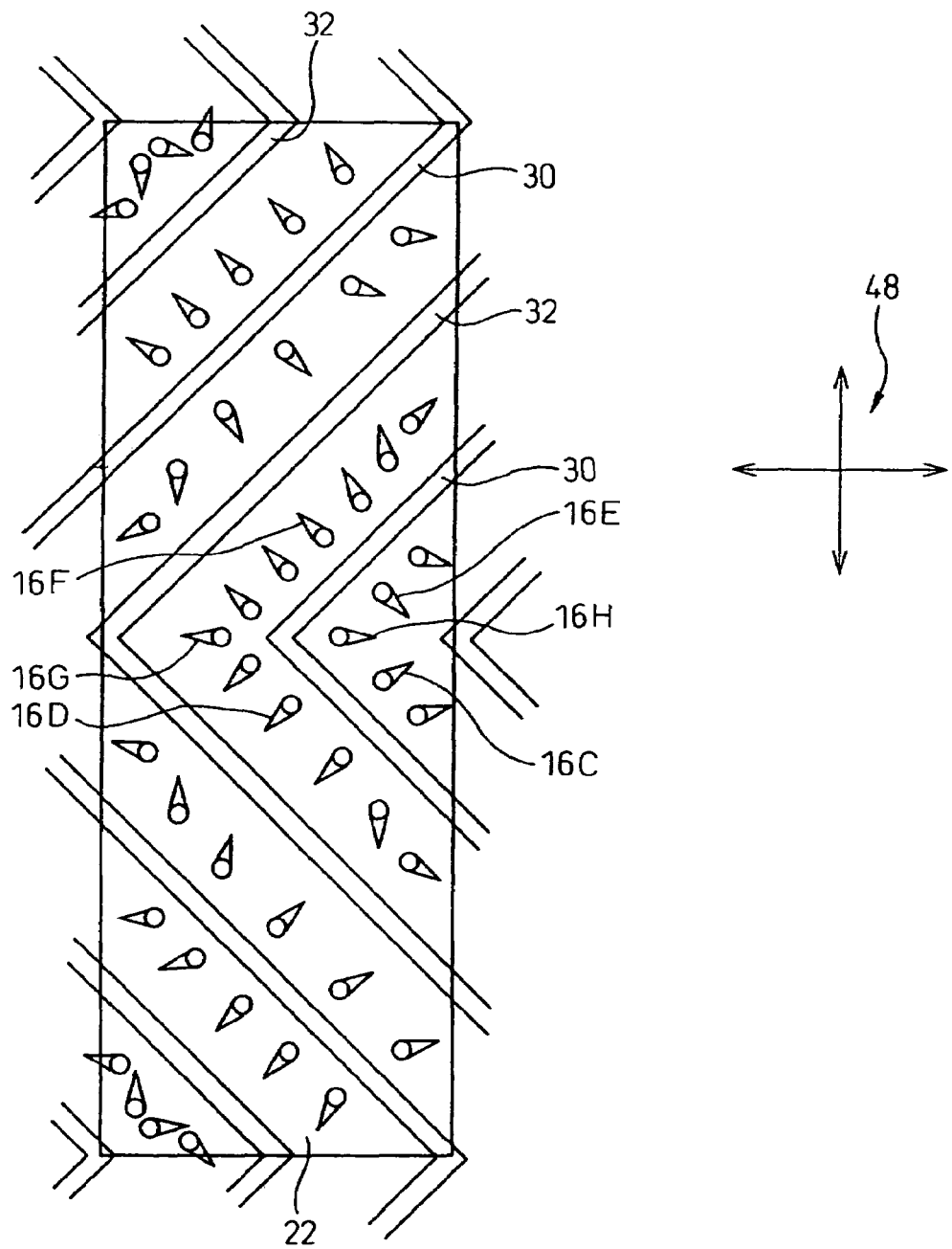
FIG. 67 is a plan view showing a typical example of the alignment control structures having bent portions.

FIG. 67 shows projections 30 and 32 similar to the corresponding ones in FIG. 5. FIG. 67 shows in more detail the alignment of the liquid crystal molecules with respect to the projections 30 and 32. One pixel contains four areas of alignment of the liquid crystal molecules 16C, 16D, 16E and 16F. Further, there is an area of liquid crystal molecules 16G on the obtuse angle side of the bent portion of the projection 30, and liquid crystal molecules 16H on the obtuse angle side of the bent portion of the projection 32. At the time of voltage application, the liquid crystal molecules should lie in the direction perpendicular to the projections 30 and 32, respectively. At the bent portions of the projections 30 and 32, however, the liquid crystal molecules are aligned in such a manner that the liquid crystal molecules 16G and 16H are aligned in parallel along the bisector of the obtuse angle of the bent portions of the projections 30 and 32 since the liquid crystal molecules 16D-16F and 16C-16E located on the two line segments forming the bent portions are aligned continuously. The direction of alignment of the liquid crystal molecules 16G and 16H is parallel or perpendicular to the polarization axes indicated by 48, and in the case where a white display is formed by applying a voltage, the areas of the liquid crystal molecules 16G and 16H become dark.

Figure 68:
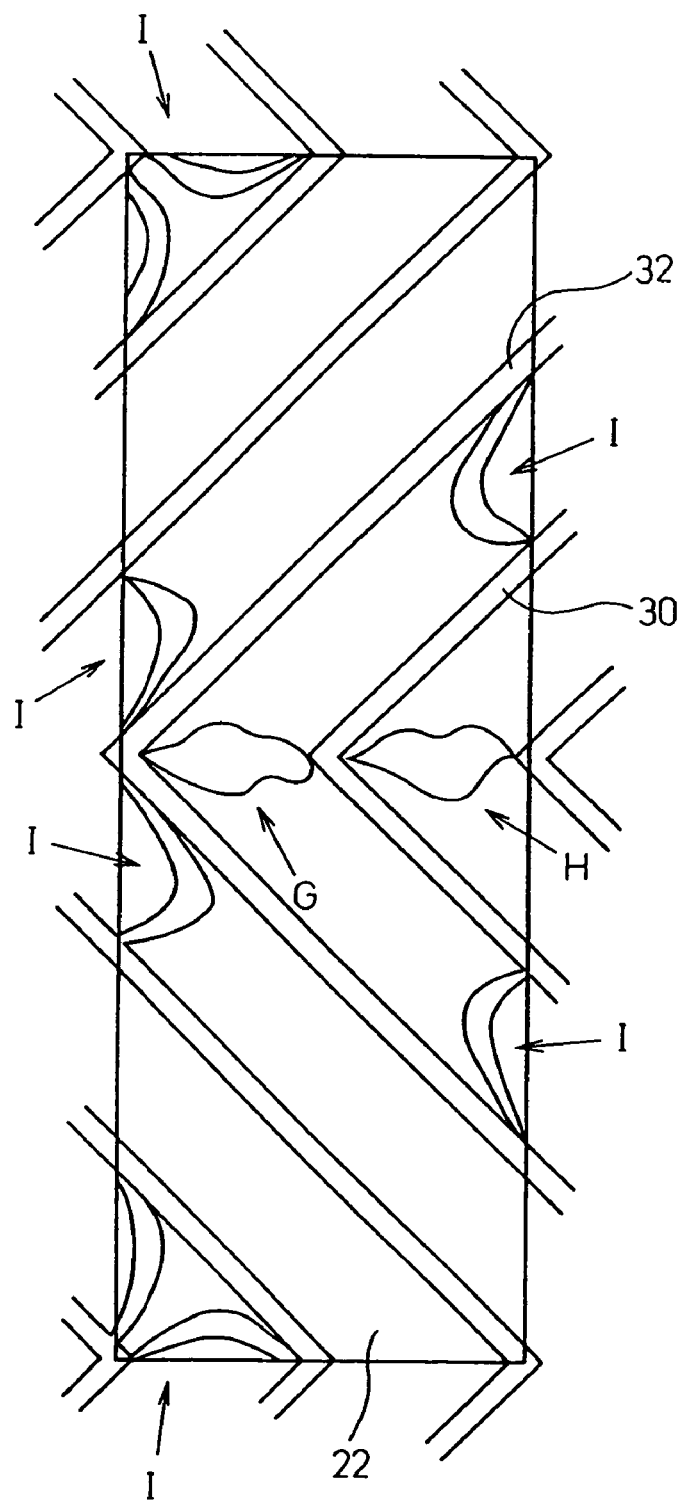
FIG. 68 is a view explaining the problem of the liquid crystal display apparatus having the alignment control structures of FIG. 67.

FIG. 68 shows a screen when a white display is viewed on the liquid crystal display apparatus having the linearly arranged structures of FIG. 67. The areas G and H of the liquid crystal molecules 16G and 16H actually darken. Also, the areas I at the edges of the pixel electrodes 22 darken. This will be explained later.

In FIG. 66, the additional projections 76 and 78 are formed on the obtuse angle side of the bent portions of the substrates having the projections 30 and 32, and therefore# the alignment of the liquid crystal molecules 16G and 16H in question is corrected to realize almost the same alignment as the liquid crystal molecules 16D-16F and 16C-16E located on both sides thereof. As a result, the areas G and H shown in FIG. 68 are not darkened and the brightness is improved.

The width of the additional projections 76 and 78 can be the same as the width of the original projections 30 and 32. Nevertheless, the width of the additional projections 76 and 78 is desirably smaller than the width of the original projections 30 and 32. This is by reason of the fact that, if the additional projections 76 and 78 have a strong power for controlling the alignment, the neighboring liquid crystal molecules come to be aligned perpendicular to the additional projections 76 and 78.

If the additional projections have only a small power for controlling the alignment, on the other hand, the neighboring liquid crystal molecules are not aligned perpendicular to the additional projections 76 and 78 but assume the almost the same alignment as the liquid crystal molecules 16D-16F and 16C-16E located on both sides thereof. In the case where the width of the original projections 30 and 32 is 10 μm, for example, the desirable width of the additional projections 76 and 78 may be about 5 μm.

By forming the additional projections 76 and 78 on the projections 30 and 32 as described above, the manner in which the liquid crystal molecules at the bent portion fall can be definitely determined, and therefore both the brightness and the response can be improved.

In this embodiment, the glass substrates 12 and 14 are made of NA-35 in the thickness of 0.7 mm. The pixel electrodes 22 and the common electrode 18 are made of ITO. TFTs for driving the liquid crystal and bus lines are arranged on the substrate having the pixel electrodes 22, while a color filter is arranged on the opposed substrate having the common electrode 18. The photosensitive acrylic material PC-335 (made by JSR) is used for the projections. For both the substrates, the projection width is 10 μm and the projection interval (the distance from the projection end of one substrate to the projection end of the other substrate after attaching the two substrates to each other) is 30 μm. The projection height is 1.5 μm. The vertical alignment layers 20, 24 are made of JALS-204 (made by JSR). The liquid crystal material of MJ95785 (made by Merc) is used. The spacer is Microbar having a diameter of 3.5 μm (made by Sekisui Fine Chemical).

Figure 69:
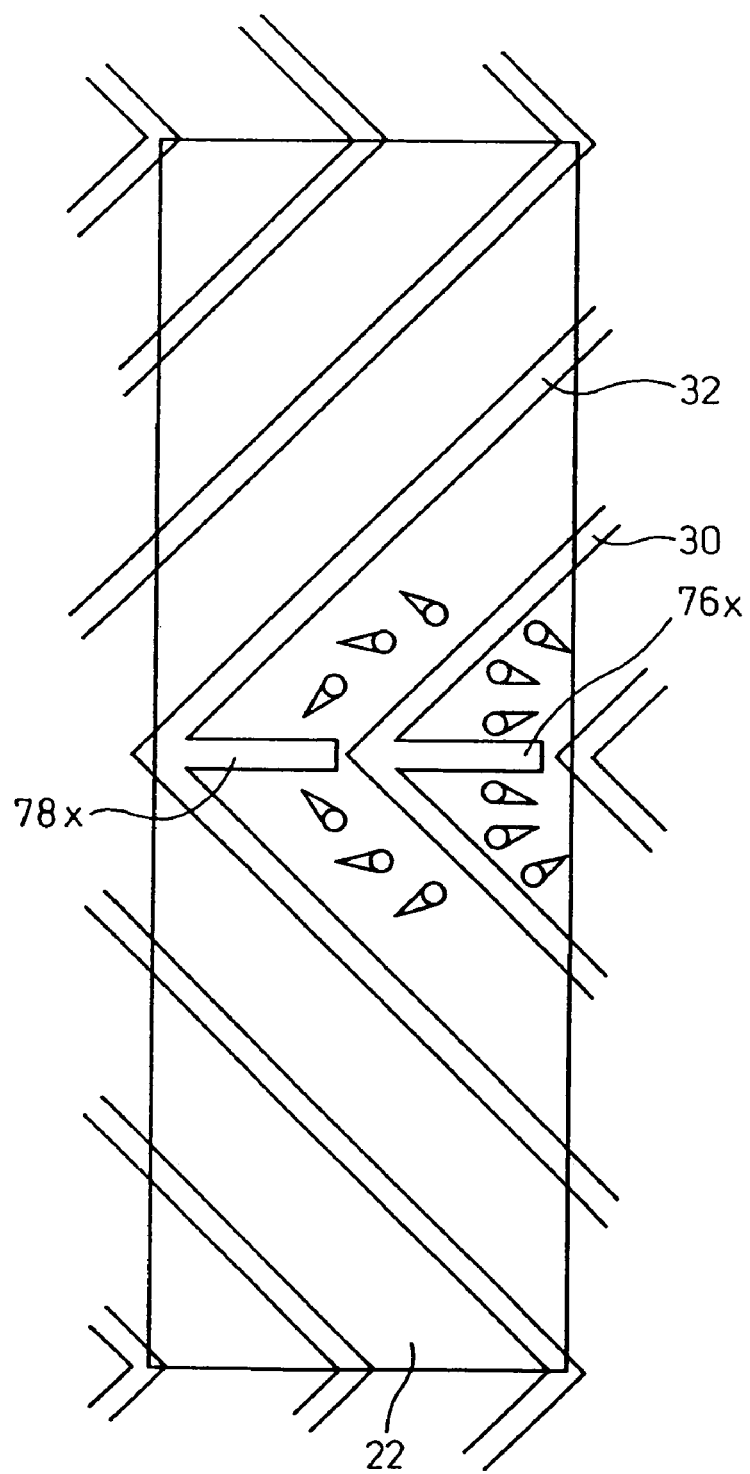
FIG. 69 is a plan view showing a modification of the alignment control structures.

FIG. 69 shows a modification of the linearly arranged structures. In this example, additional projections 76x and 78x are arranged on the acute angle side of the bent portions of the projections 30 and 32. In this case, alignment of the liquid crystal molecules controlled by the projections 30, 32 is not smoothly connected to alignment of the liquid crystal molecules controlled by the additional projections 76x and 78x. Thus, the liquid crystal molecules in the neighborhood of the bent portions of the projections 30 and 32 are aligned in the direction at right angles or perpendicular to the direction of the polarization axes, resulting in an insufficient improvement. It has been found, therefore, that the additional projections 76x and 78x are preferably arranged on the obtuse angle side of the bent portions of the projections 30 and 32, as shown in FIG. 66.

The additional projections 76 and 78 have thus far been explained as viewed from the same substrate as the one having the projections 30 and 32. When viewed from the substrate opposed to the one formed with the projections 30 and 32, the additional projections 76 and 78 assume the following form. In FIG. 66, for example, the additional projection 76 is formed on the acute angle side of the bent portion of the projection 32 of the substrate 14 in opposed relationship to the substrate 12 having the projections 30. In a similar fashion, the additional projection 78 is formed on the acute angle side of the bent portion of the projection 30 of the substrate 12 in opposed relationship to the substrate 14 having the projections 32.

Figure 70:
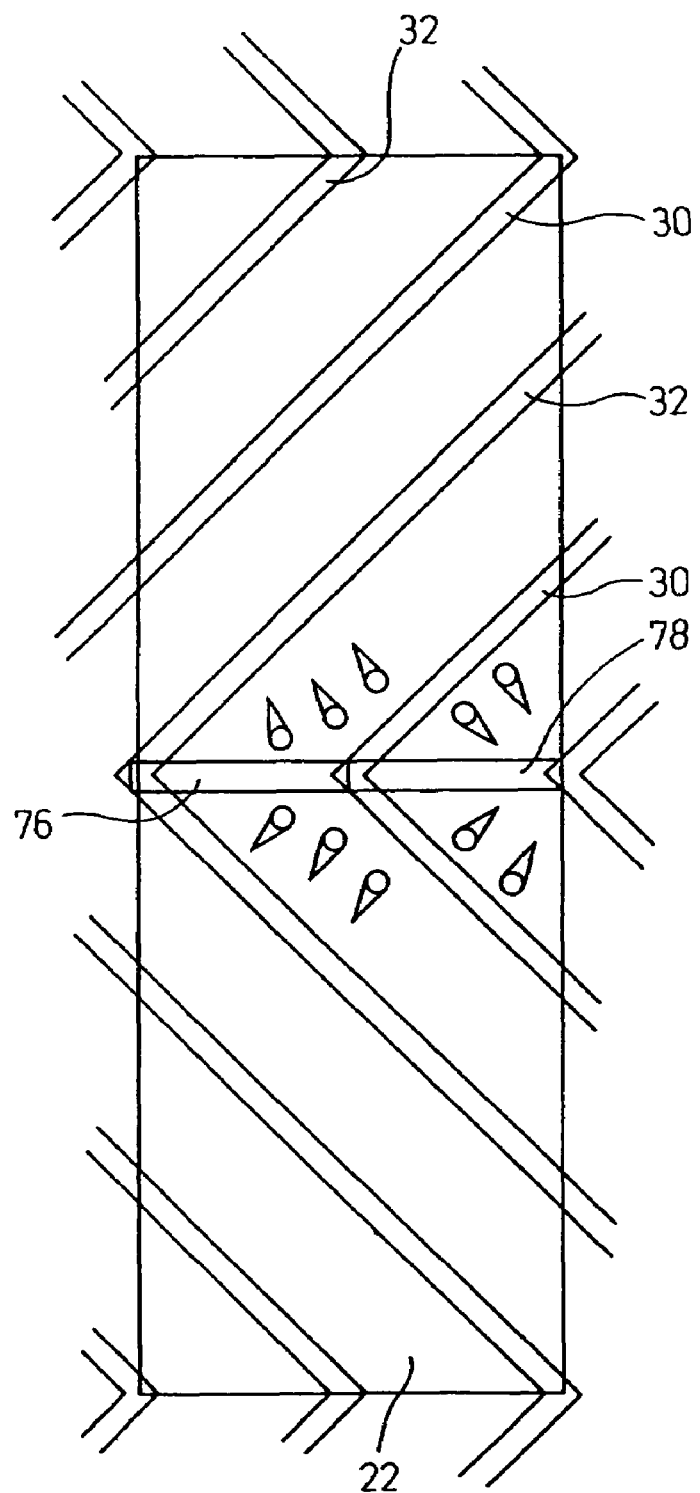
FIG. 70 is a plan view showing a modification of the alignment control structures.

FIG. 70 shows a modification of the linearly arranged structures. In this example, as in the example of FIG. 66, the additional projections 76 and 78 are formed on the obtuse angle side of the bent portions of the projections 30 and 32. The projections 76 and 78 in this example extend further than the projections 76 and 78 of FIG. 66. The forward end of each of the additional projections 76 and 78 extends to a point where it is overlapped with the bent portions of the projections 32 and 30 in opposed relationship thereto. The additional projections 76 and 78 may be extended in this way but are not desirably extended beyond the point where the forward end thereof is overlapped with the bent portions of the projections 32 and 30.

Further, in this example, the upper substrate 12 and the lower substrate formed with the projections 32 and 30 and the additional projections 76 and 78 are attached to each other with the peripheral portions thereof sealed. Thus, an empty panel is formed, into which the liquid crystal is injected subsequently. In this example, the height of the projections is 1.75 μm, and the projections of the substrates partially contact with each other, so that the cell thickness of 3.5 μm is secured. The cell thickness can be maintained by partial contact between the projections of the two substrates, without using spacers. If a spacer is inserted, the orientation of the liquid crystal molecules would be affected also on the surface of the spacer. In this arrangement, there is no spacer, and any abnormal alignment which otherwise might be caused by spacers is eliminated.

As described above, the linearly arranged structures for controlling the alignment is configured of the projections 30 and 32 or the slit structures 44 and 46. In the case where the slit structures 44 and 46 are employed as linearly arranged structures, additional slit structures similar to the slit structures 44 and 46 are provided in place of the additional projections 76 and 78. Also, the linearly arranged structures for controlling the alignment may be configured of projections on slits which are formed in the electrode.

Figure 71:
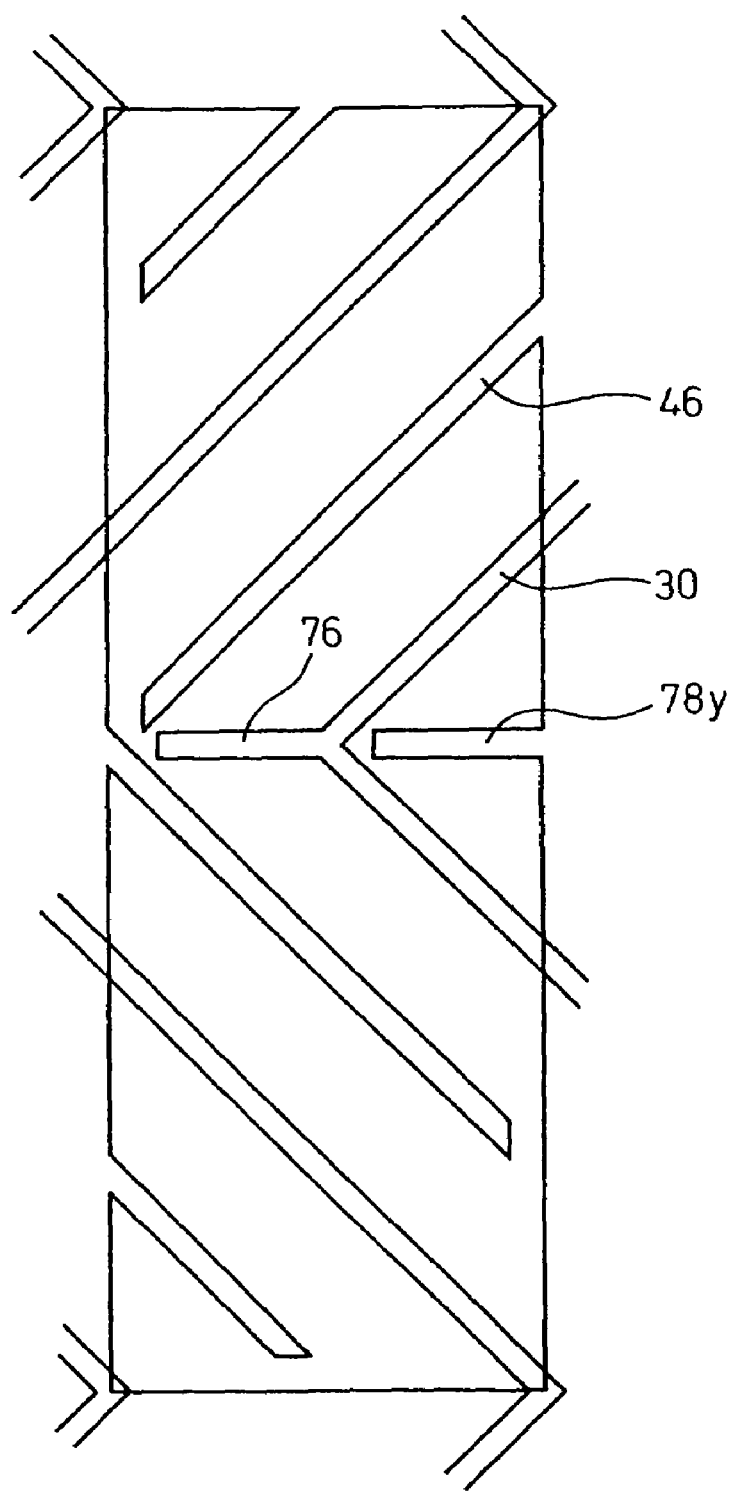
FIG. 71 is a plan view showing a modification of the alignment control structures.

FIG. 71 shows a modification of the linearly arranged structures. As the linearly arranged structures for controlling the alignment, the projections 30 of the upper substrate 12 and the slit structures 46 of the lower substrate 14 are provided. As described above, the slit structures 46 are configured by forming slits in the pixel electrodes 22 of the lower substrate 14. The additional projection 76 is provided in a similar manner to the additional projection 76 of FIG. 66, and the additional slit structure 78y is provided on the obtuse angle side of the bent portion of the slit structure 46 in place of the additional projection 78 of FIG. 66. The additional slit structure 78y is not connected to the bent portion of the slit structure 46 by reason of the fact that the slit has a discontinuous portion as the slit structure 46 is configured as a slit in the pixel electrode 22. By the way, the additional slit structure 78y can be said to be provided on the acute angle side of the projection 30 of the opposed substrate.

Figure 72:
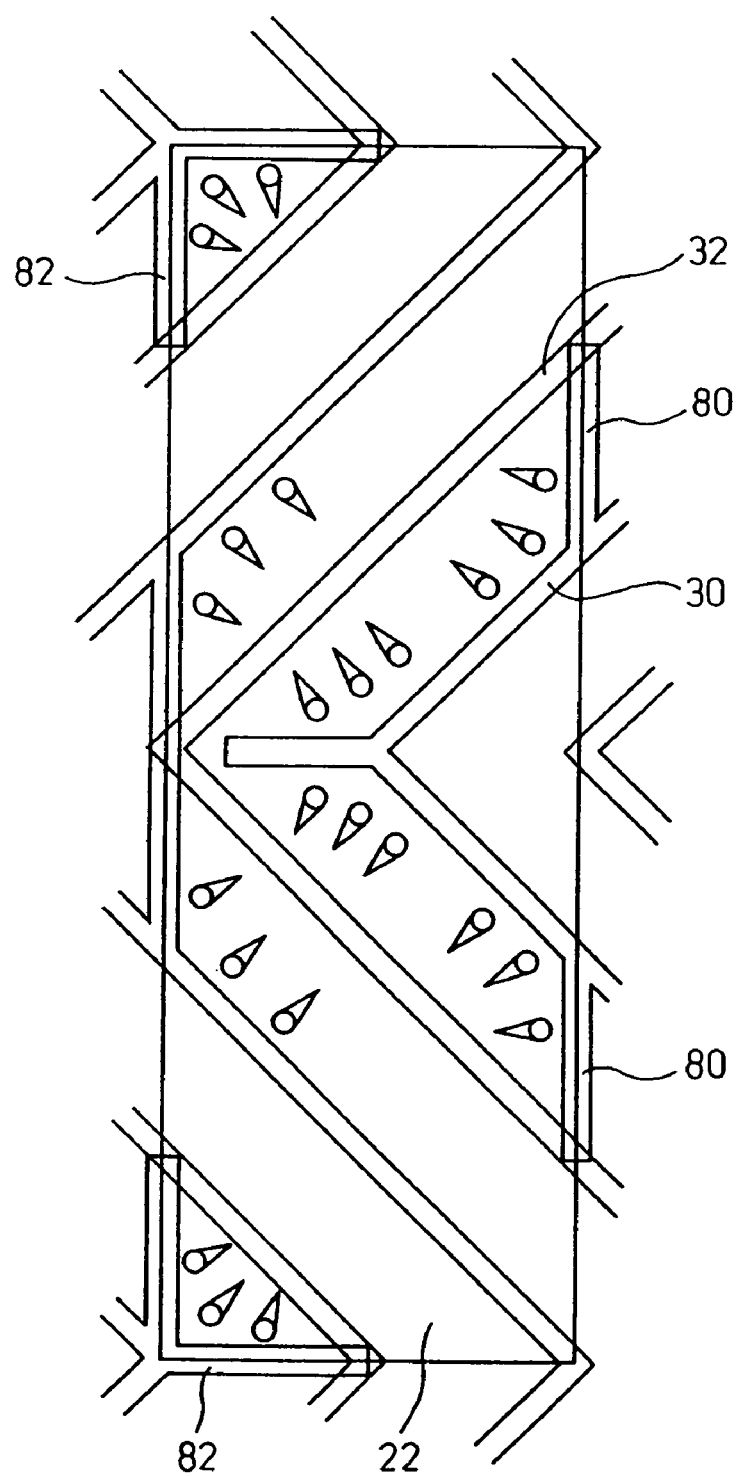
FIG. 72 is a plan view showing a modification of the alignment control structures.

FIG. 72 shows a modification of the linearly arranged structures. In this example, as in the case of FIG. 66, the additional projections 76 and 78 are provided. Further, the edge projections 80 are provided at points where they are overlapped with at least a part of the edge of the pixel electrode 22. In such a case, the projections 30 and 32 are arranged neither in parallel nor perpendicular to the edge of the pixel electrode 22. The edge projections 80 are arranged at positions corresponding to the areas I of FIG. 68. As shown in FIG. 67, the liquid crystal molecules are aligned in such a manner as to fall toward the center of the pixel under the effect of the oblique electric field at the edge of the pixel electrode 22. At the positions corresponding to the areas I of FIG. 68, the projection 30 on the upper substrate (opposed substrate) 12 and the edge of the pixel electrode 22 form an obtuse angle, or the projection 32 on the pixel electrode 22 and the edge of the pixel electrode 22 assumes an acute angle.

In these areas, the alignment of the liquid crystal molecules is considerably different from the alignment of the liquid crystal molecules located inward of the edge (FIG. 67), and therefore the display becomes dark as shown in FIG. 68. Provision of the edge projections 80 as shown in FIG. 72, however, causes the alignment of the liquid crystal molecules at the edge of the pixel electrode 22 to become similar to the alignment of the liquid crystal molecules located inward of the particular edge, thereby preventing the display from darkening. In FIG. 72, corner projections 82 are also provided.

Figure 73:
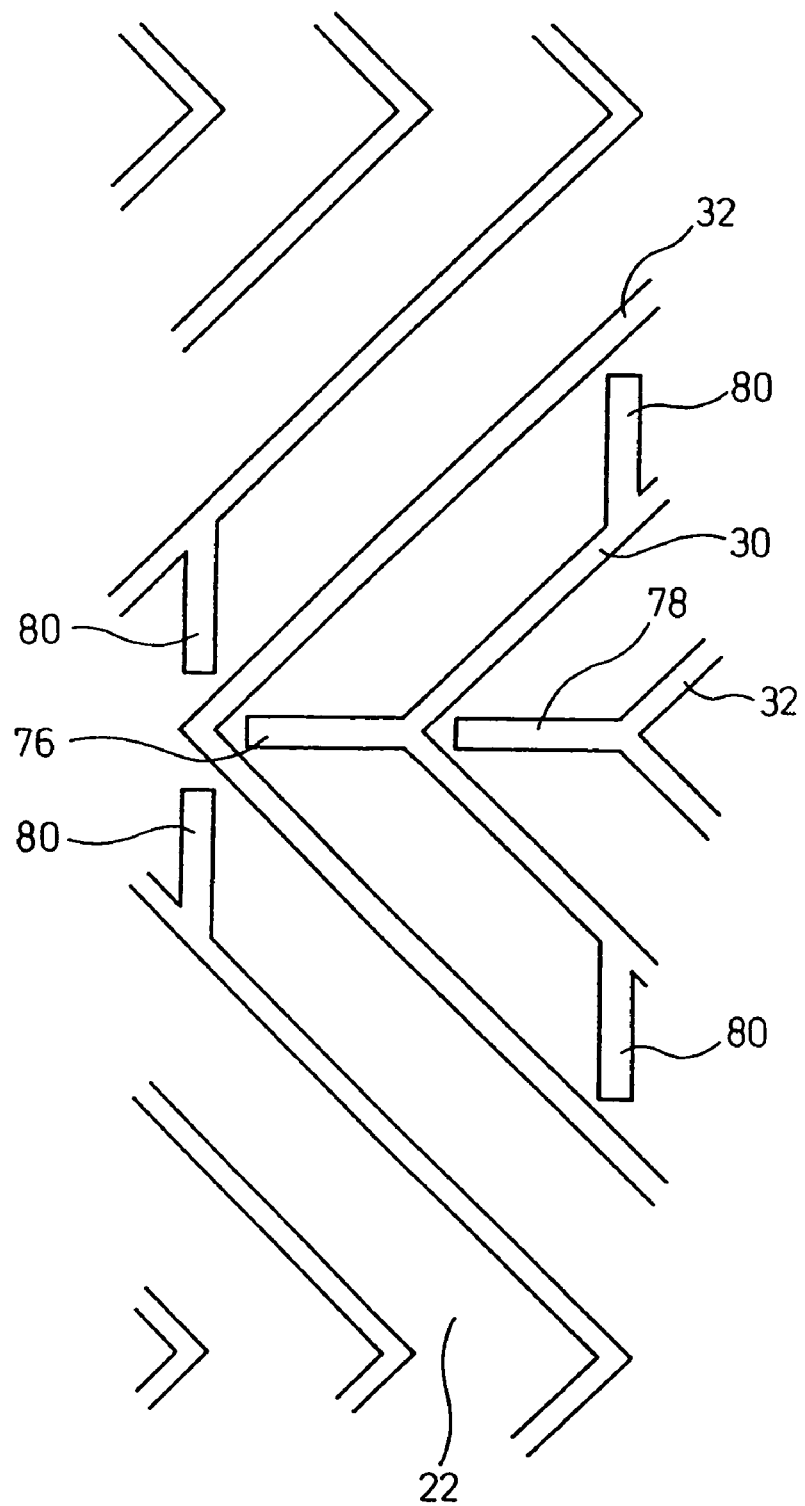
FIG. 73 is a plan view showing a modification of the alignment control structures.

FIG. 73 shows a modification of the linearly arranged structures. This modification is similar to the modification of FIG. 72 except that the corner projections 82 are not included in this modification. Also in the cases of FIGS. 72 and 73, a newly formed projection is extended to the projection on the pixel electrode. The height of the projection is 1.75 μm and no spacer is sprayed. The cell thickness of 3.5 μm is secured by partial contact between the projections of the two substrates.

Figure 74:
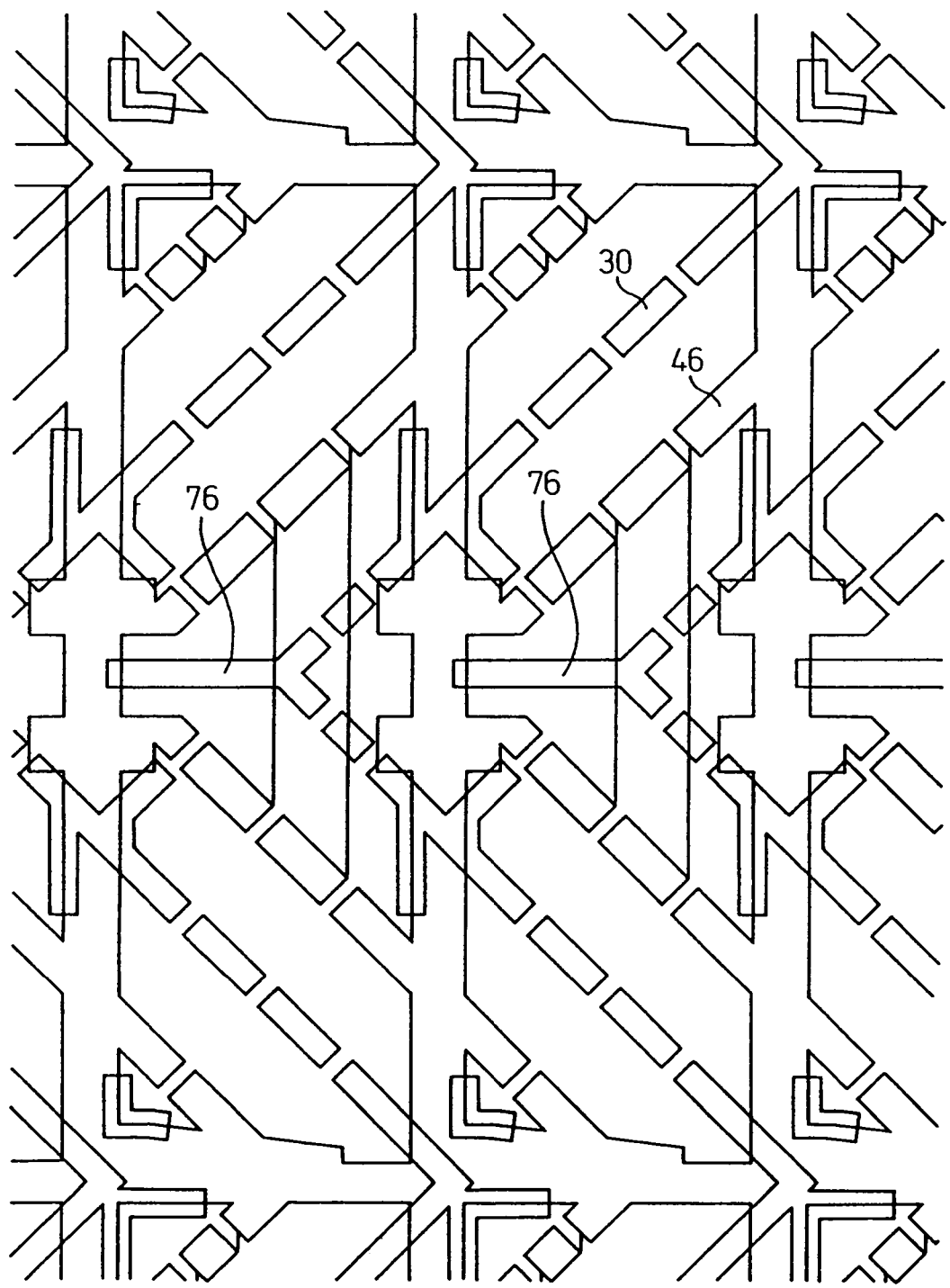
FIG. 74 is a plan view showing a modification of the alignment control structures.

FIG. 74 shows a modification of the linearly arranged structures. In this modification, the projection 30 has an additional projection 76. At the same time, the projection 30 and the slit structure 46 are configured of a plurality of constituent units (30S and 46S) as in the case of FIG. 21. In this case, therefore, the effect of configuring the linearly arranged structures of a plurality of constituent units and the effect of providing an additional linear wall structure are both obtained.

Figure 75:
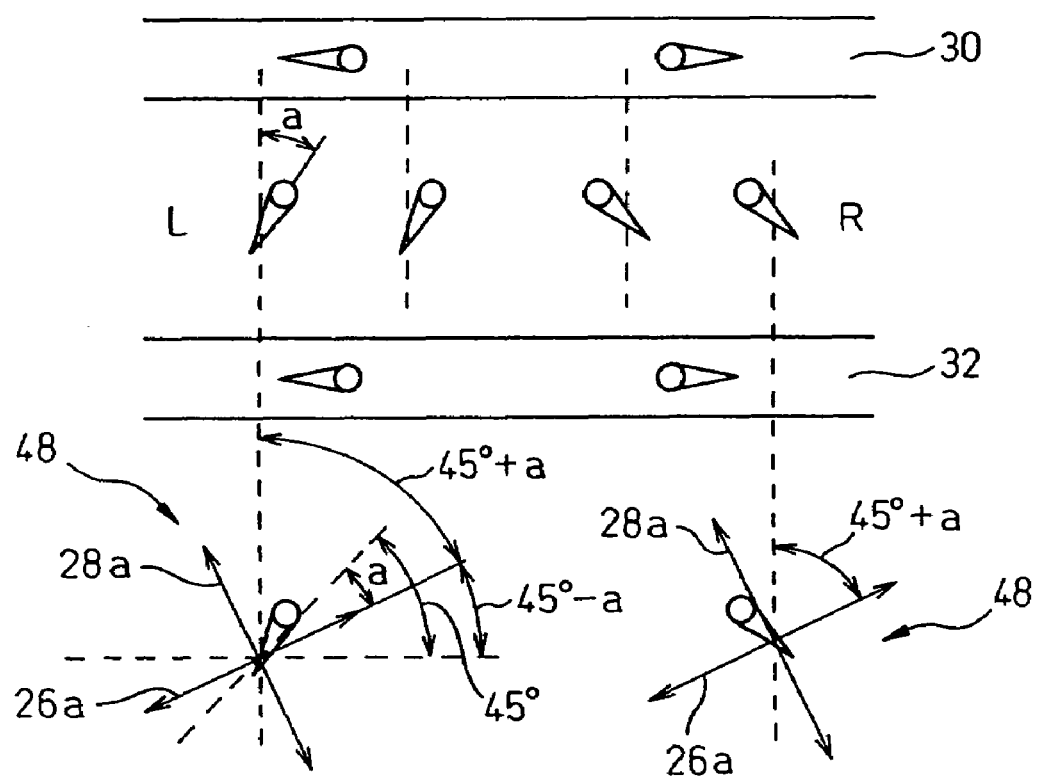
FIG. 75 is a view showing the relationship between the alignment control structures and the polarizers of the liquid crystal display apparatus according to the sixth embodiment of the present invention.

FIG. 75 is a view showing the relationship between the linearly arranged structures and polarizers of a liquid crystal display apparatus according to the sixth embodiment of the present invention. FIG. 76 is a view showing the display brightness in the configuration of FIG. 75.

The liquid crystal display apparatus shown in FIG. 75 includes a configuration basically similar to that of the liquid crystal display apparatuses shown in FIGS. 1 to 10. Specifically, the liquid crystal display apparatus comprises a pair of substrates 12 and 14, a liquid crystal 16 having a negative anisotropy of its dielectric constant and inserted between the pair of the substrates 12 and 14, linearly arranged structures (projections 30 and 32, slits 44 and 46, for example) provided on each of the pair of substrates 12 and 14 for controlling the alignment of the liquid crystal 16 and polarizers 26 and 28 arranged on the outside of the pair of substrates 12 and 14, respectively. The pair of substrates 12 and 14 include the electrodes 18 and 22 and the vertical alignment layers 20 and 24, respectively.

The linear wall structure for controlling the alignment of the liquid crystal in FIG. 75 is configured of projections similar to the projections 30 and 32 shown in FIG. 4. The arrangement of the polarizers 26 and 28 is shown by numeral 48. The polarizers 26 and 28 have absorption axes 26a and 28a, respectively. These absorption axes 26a and 28a cross at right angles to each other. The absorption axis 26a of one polarizer 26 (hence, also the absorption axis 28a of the other polarizer 28) is arranged at a predetermined angle (a) displaced from the orientation rotated by 45 degrees from the orientation in which the projections 30 and 32 extend. To express it in more easily understood terms, in FIG. 75, the absorption axis 26a of the polarizer 26 is arranged at an angle (45°±a) to the straight line (indicated by dashed line) crossing at right angles to the projections 30 and 32, and hence at an angle (45°±a) to the orientation in which the projections 30 and 32 extend.

FIG. 75 shows the behavior of the liquid crystal molecules on the linearly arranged structures (projections 30 and 32) for controlling the orientation of the liquid crystal. In a liquid crystal display apparatus having the linearly arranged structures (projections 30 and 32, slits 44 and 46) for controlling the alignment of the liquid crystal, as explained above with reference to FIGS. 11 and 13, an overshoot occurs immediately after voltage application. One of the causes of the overshoot is that in the case where the polarizers 26 and 28 are arranged at 45° to the linearly arranged structures, the liquid crystal molecules fail to be arranged in a position exactly perpendicular to the linearly arranged structures after voltage application and therefore the brightness of white display is reduced. This embodiment is intended to solve such a problem.

In FIG. 75, upon application of a voltage thereto, the liquid crystal molecules located between the projections 30 and 32 fall into a position perpendicular to the projections 30 and 32. The liquid crystal molecules on the projections 30 and 32 fall rightward or leftward in parallel to the projections 30 and 32. As a result, the liquid crystal molecules located between the projections 30 and 32 do not assume a position exactly perpendicular to the projections 30 and 32 but a position somewhat oblique to the projections 30 and 32. By way of explanation, the left area L and the right area R are shown distinctly in FIG. 75. The liquid crystal molecules located in the left area L are rotated clockwise at an angle g to the line perpendicular to the projections 30 and 32 (the director of the liquid crystal for the left area L is the angle g), while the liquid crystal molecules located in the right area R are rotated counterclockwise.

Figure 76A:
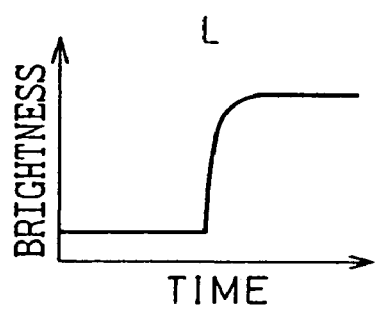
FIGS. 76A to 76C are views showing the display brightness in the configuration of FIG. 75.

In this embodiment, the polarizers 26 and 28 are arranged in accordance with the alignment of the liquid crystal molecules located in the left area L. The absorption axis 26a of the polarizer 26 is arranged at an angle of 45° to the director of the liquid crystal located in the left area L. Thus, as shown in FIG. 76A, the brightest display can be realized at the time of white display in the left area L.

Figure 76B:
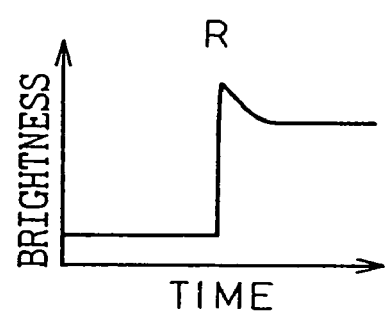
Figure 76C:
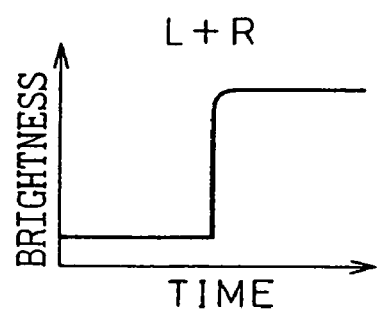

In the right area R, on the other hand, the same condition as realized in the left area L cannot be realized. Instead, as shown in FIG. 76B, the brightest display cannot be realized at the time of white display. As shown in FIG. 76C, however, as far as the entire display (L+R) combining the bright left area L and the right area R which darkens after being brightened once, a bright-display can be realized at the time of white display, thereby making it possible to improve the overshoot considerably.

FIG. 77 is a view showing the relationship between the director angle a of the liquid crystal and the frequency thereof for each minor area in a liquid crystal display apparatus having linearly arranged structures (projections 30 and 32, for example) for controlling the alignment of the liquid crystal. This indicates that the director of the liquid crystal becomes oblique generally in the range not more than 20°. Therefore, the predetermined angle a by which the absorption axis 26a of the polarizer 26 is displaced from the orientation rotated by 45 degrees from the orientation in which the projections 30 and 32 extend is not more than 20°.

In this case, the crossing angle b, which is assumed to be the angle at which the direction of the absorption axis 26a of the polarizer 26 crosses the linearly arranged structures (projections 30 and 32, for example), is in the range of 25°<b<45° or 45°<b<65°. Between the polarizers 26 and 28 and the substrates 12 and 14, however, there is an error of about 2° derived from the relative positions at the time of manufacture. Taking this into account, the crossing angle b should be in the range of 25°<b<43° or 47°<b<58°.

More specifically, in FIG. 77, the frequency of the director of the liquid crystal is high in the range of 2° to 13°. Therefore the predetermined angle a is desirably in the range between 2° and 13°. In this case, the crossing angle b should be in the range of 32°<b<43° or 47°<b<58°.

Figure 78:
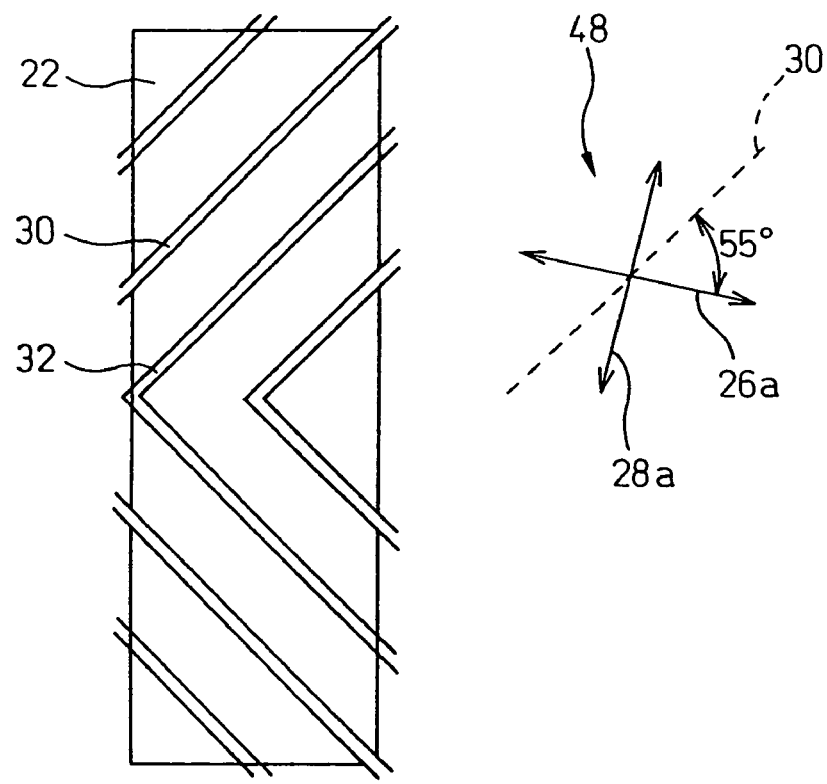
FIG. 78 is a view showing the relationship between the alignment control structures and the polarizers of the liquid crystal display apparatus according to a modification of the embodiment of FIG. 75.
Figure 79:
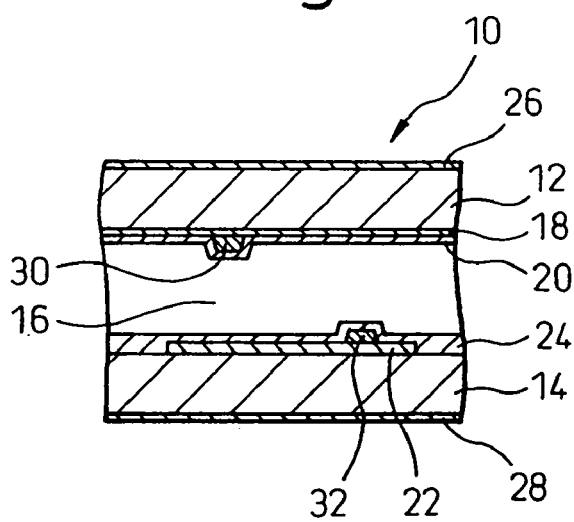
FIG. 79 is a cross-sectional view of the liquid crystal display apparatus of FIG. 78.

FIGS. 78 and 79 show a modification of the embodiment of FIG. 75. FIG. 78 is a view showing the relationship between the linearly arranged structures and the polarizers of a liquid crystal display apparatus, and FIG. 79 is a cross-sectional view of the liquid crystal display apparatus shown in FIG. 78. The upper substrate 12 has projections 30, and the lower substrate 14 has projections 32. The projections 30 and 32 have square bent portions. In this case, the absorption axis 26a of the polarizer 26 is arranged at an angle of 55° to the line sections of the projections 30. The absorption axes 26a and 28a of the two polarizers 26 and 28 cross at right angles to each other.

Figure 80:
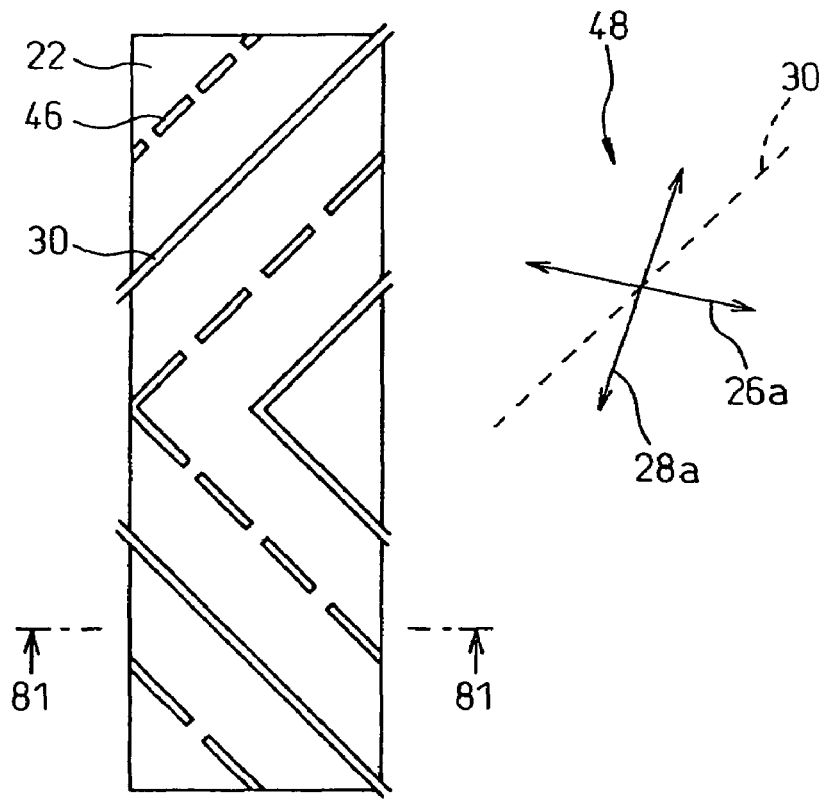
FIG. 80 is a view showing the relationship between the alignment control structures and the polarizers of the liquid crystal display apparatus according to a modification of the embodiment of FIG. 75.
Figure 81:
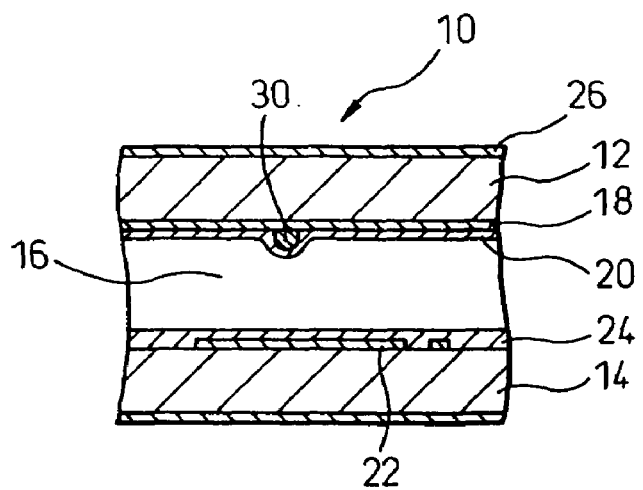
FIG. 81 is a cross-sectional view of the liquid crystal display apparatus of FIG. 80.

FIGS. 80 and 81 are views showing a modification of the embodiment of FIG. 75. FIG. 80 is a view showing the relationship between the linearly arranged structures and the polarizers of the liquid crystal display apparatus, and FIG. 81 is a cross-sectional view of the liquid crystal display apparatus of FIG. 80. The upper substrate 12 has projections 30, and the lower substrate 14 has slits 46. The projections 30 and the slits 46 have square bent portions. In this case, the absorption axis 26a of the polarizer 26 is arranged at an angle of 55° to the line sections of the projection 30 (or the slit 46). The absorption axes 26a and 28a of the two polarizers 26 and 28 cross at right angles to each other.

Figure 82:
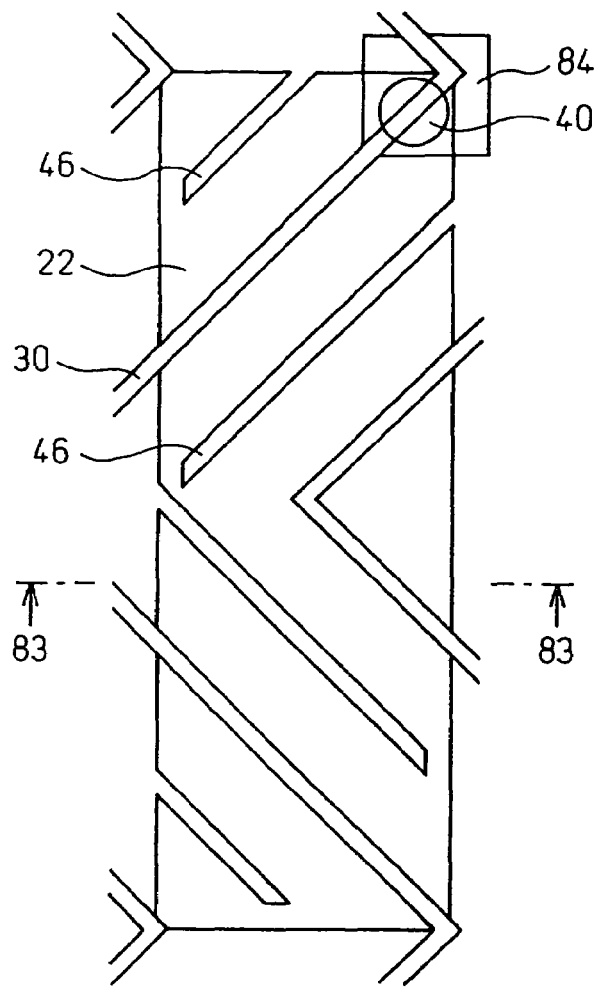
FIG. 82 is a view showing the alignment control structures of a liquid crystal display apparatus according to the seventh embodiment of the present invention.
Figure 83:
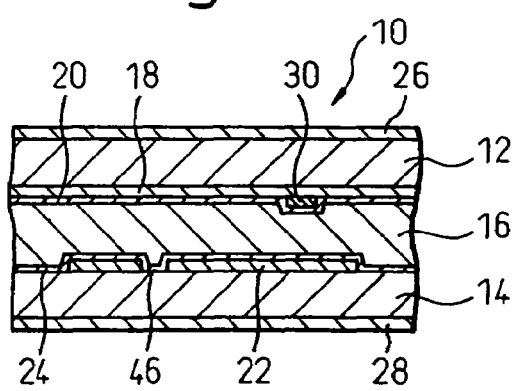
FIG. 83 is a cross-sectional view taken along the line 83-83 in the liquid crystal display apparatus of FIG. 82.

FIG. 82 is a view showing the linearly arranged structures of the liquid crystal display apparatus according to the seventh embodiment of the present invention. FIG. 83 is a cross-sectional view of the liquid crystal display apparatus of FIG. 82.

The liquid crystal display apparatus shown in FIGS. 82 and 83 comprises a pair of substrates 12 and 14, a liquid crystal having a negative anisotropy of its dielectric constant and inserted between the pair of the substrates 12 and 14, linearly arranged structures (projections 30 and 32 or slits 44 and 46, for example) arranged on each of the pair of the substrates 12 and 14 for controlling the alignment of the liquid crystal 16, and polarizers 26 and 28 arranged on the outside of the pair of the substrates 12 and 14, respectively.

The lower substrate 14 is a TFT substrate, and the electrode 22 is pixel electrodes. The lower substrate 14 has TFTs 40 connected to the pixel electrode 22. The TFT 40 is connected to a gate bus line and a drain bus line (FIG. 3). A shielding area 84 covers the TFT 40 and the neighborhood thereof. The shielding area 84 is provided for preventing the TFT 40 from being exposed to direct light. The TFT 40 is in contact with the pixel electrode 22 and therefore the shielding area 84 is partially overlapped with the pixel electrode 22.

The pixel electrode 22 defines a pixel aperture. However, the area occupied by the pixel electrode 22 but not overlapped with the shielding area 84 is not a pixel aperture. Thus, that portion of the area occupied by the pixel electrode 22 and not overlapped with the shielding area 84 constitutes a non-shielding area (pixel aperture).

In this example, the linearly arranged structures arranged on the upper substrate 12 are the projections 30, and the linearly arranged structures arranged on the lower substrate 14 are the slits 46 formed on the electrode 22. The projections 30 and the slits 46 are formed to have bent portions. Examples of combination of the projections 30 and the slits 46 are shown in FIGS. 71 and 74.

The shielding area 84 and the linearly arranged structures 30 and 46 are arranged in such a manner that the shielding area 84 and a part of the linearly arranged structure 30 are partially overlapped to reduce the area of the linearly arranged structure 30 and 46 arranged in the non-shielding area.

As described above, the projection 30 is formed of a transparent dielectric material, and the slit 46 is formed in a transparent pixel electrode 22. Therefore, the linearly arranged structure 30 and 47 can be regarded as transparent members. Nevertheless, in view of the fact that the liquid crystal molecules located on the linearly arranged structures 30 and 47 are aligned differently than the liquid crystal molecules located in the gap between the linearly arranged structure 30 and 47 upon application of a voltage thereto, the light transmission rate and the opening rate are reduced on the linearly arranged structure 30 and 47 in the pixel aperture at the time of white display upon application of a voltage thereto. Thus, the area of the linearly arranged structures 30 and 46 arranged in the non-shielding area (the pixel aperture) is desirably reduced. A predetermined area is required of the linearly arranged structures 30 and 46, however, for controlling the alignment of the liquid crystal. In view of this, assuming that the area of the linearly arranged structures 30 and 46 is constant, a part of the linearly arranged structures 30 and 46 is relocated to a position overlapped with the shielding area 84 to reduce the area of the linearly arranged structures 30 and 46 arranged in the non-shielding area. In this way, the actual aperture rate can be increased. For this reason, in FIG. 82, the shielding area 84 and the linearly arranged structures 30 and 46 are designed in such a manner that the projection 30 is partially overlapped with the shielding area 84.

Figure 84:
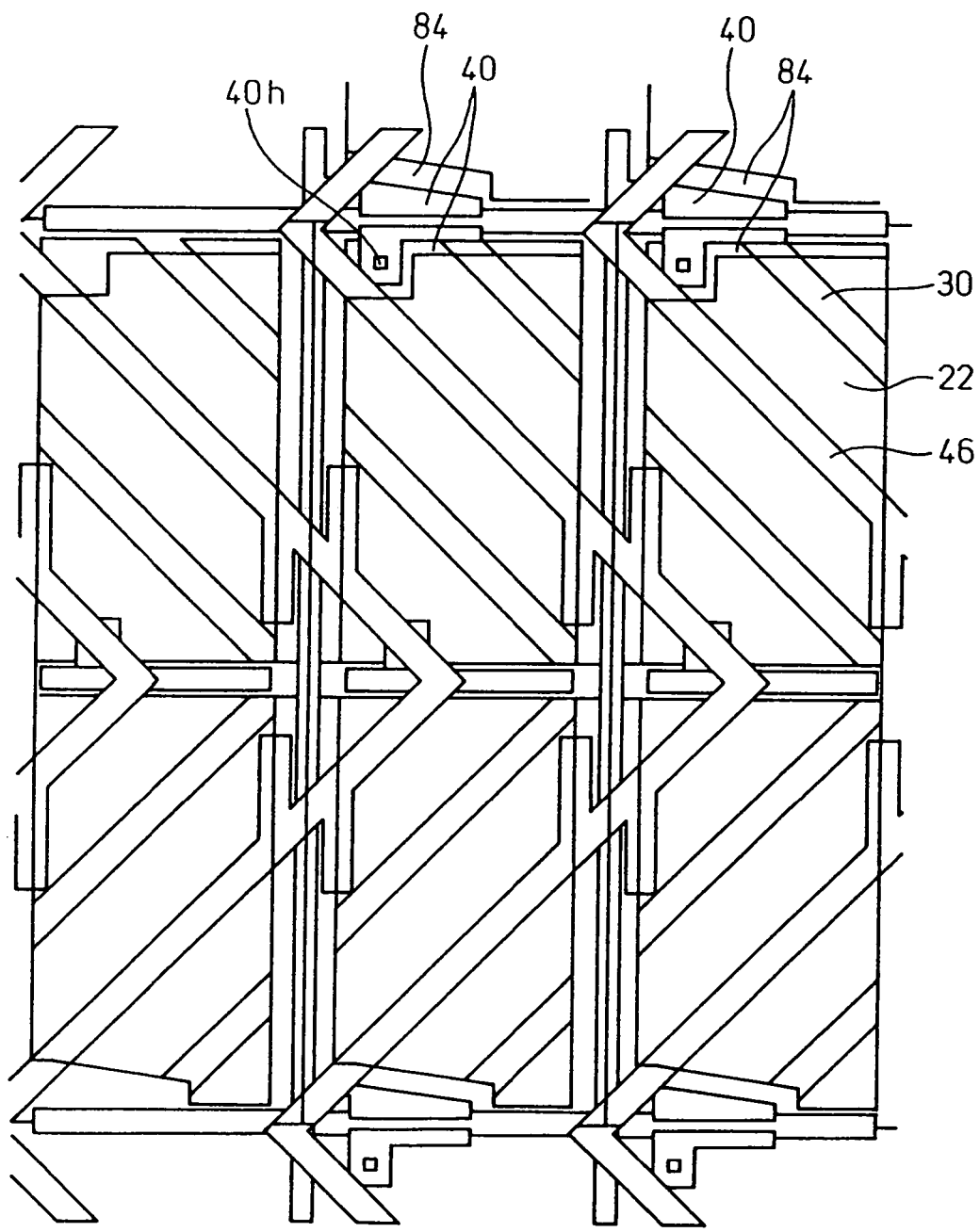
FIG. 84 is a view showing a more specific example of the alignment control structures of FIG. 82.

FIG. 84 is a view showing a specific example of the linearly arranged structures 30 and 46 of FIG. 82. The feature of the apparatus shown in FIG. 84 is similar to that of the apparatus explained with reference to FIG. 82. The source electrode of the TFT 40 is connected to the pixel electrode 22 by a contact hole 40*h*.

Further, as shown in FIGS. 82 to 84, in the case where the linearly arranged structures of the substrate 14 having the TFTs 40 are slits 46, the projections 30 (or the slits 44) of the opposed substrate 12 is desirably overlapped with the shielding area 84 covering the TFT 40. The slit 46 overlapped with the shielding area 84 may make it inconvenient to establish the contact between the TFT 40 and the pixel electrode 22.

Figure 85:
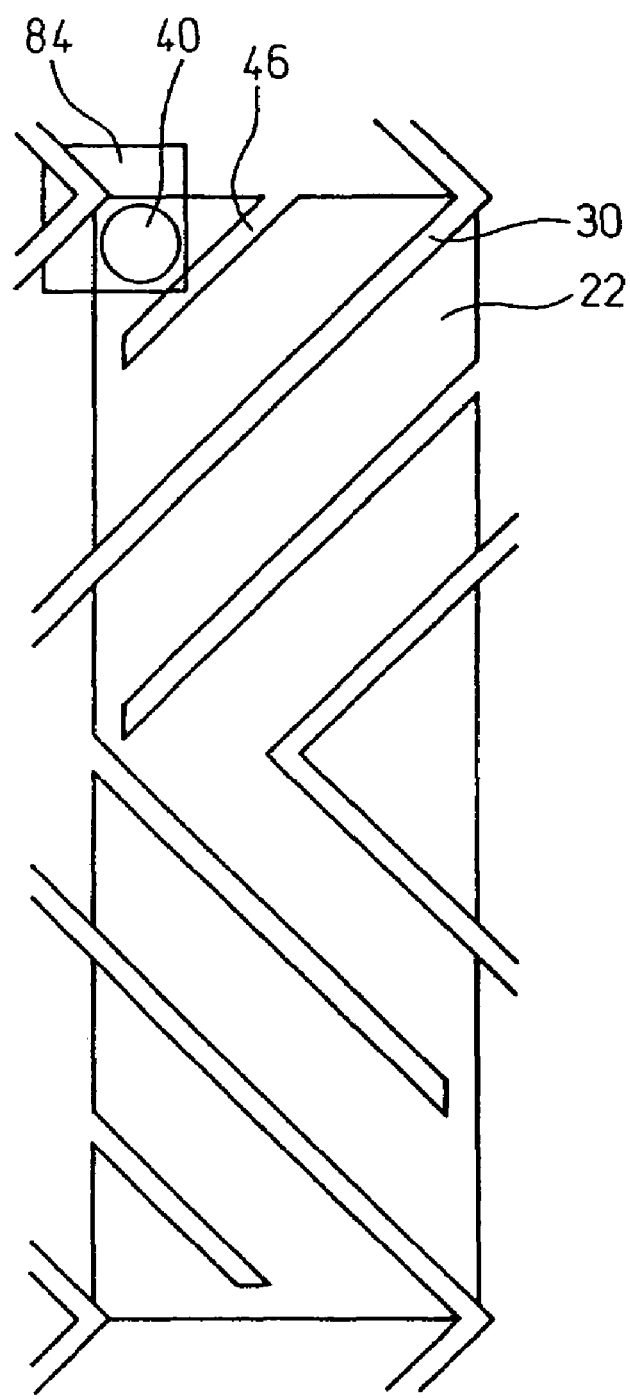
FIG. 85 is a plan view showing a comparative example of the alignment control structures of FIG. 82.

FIG. 85 is a view showing a comparative example of the linearly arranged structures of FIG. 82. In this example, in the case where the linearly arranged structures of the substrate 14 having the TFTs 40 are the slits 46, the TFT substrate 14 or the slit 46 is arranged to be overlapped with the shielding area 84 covering the TFT 40. Once the slit 46 is overlapped with the shielding area 84, however, it becomes difficult to connect the TFT 40 and the pixel electrode 22. In other words, the slit 46 comes to occupy the position where a contact hole (40*h* in FIG. 84) is not to be formed.

Figure 86:
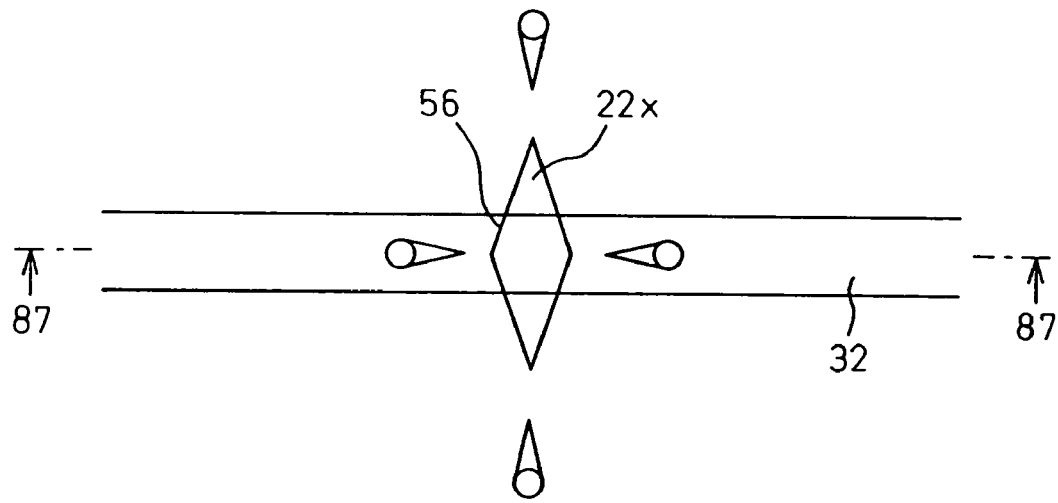
FIG. 86 is a view showing a modification of the alignment control structures of FIG. 28.
Figure 87:
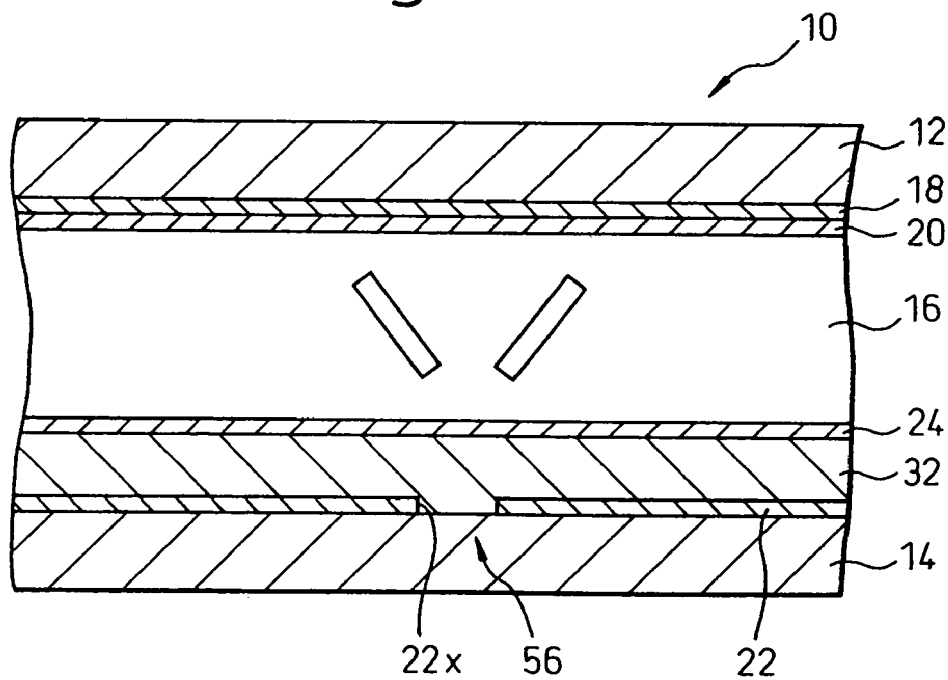
FIG. 87 is a cross-sectional view taken along the line 87-87 of the liquid crystal display apparatus having the alignment control structures of FIG. 86.

FIG. 86 is a view showing a modification of the linearly arranged structures of FIG. 28, and FIG. 87 is a cross-sectional view of the liquid crystal display apparatus having the linearly arranged structure of FIG. 86. FIGS. 86 and 87 are views for explaining an example in which the electrode is removed from under the third projection in the left column of Table 1 described above. The projection 32 is formed on the electrode 22 of the substrate 14, but the electrode 22 under the projection 32 is formed with a rhombic void 22*x*. The projection 32 can constitute the boundary forming means 56 of first type (I) due to the void 22*x* of the electrode 22. The void 22*x* is not necessarily rhombic but may take other shapes such as rectangle.

Figure 88:
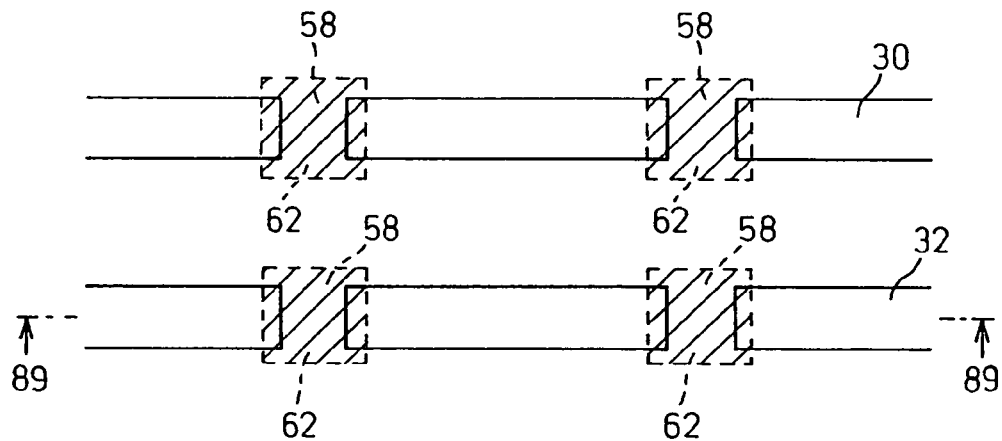
FIG. 88 is a view showing the alignment control structures of the liquid crystal display apparatus according to the eighth embodiment of the present invention.
Figure 89:
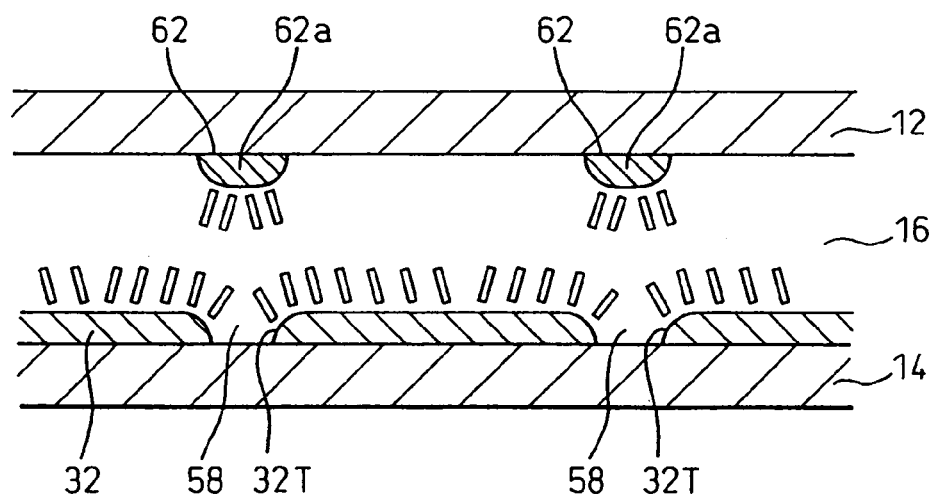
FIG. 89 is a cross-sectional view taken along the line 89-89 of a liquid crystal display apparatus having the linear wall structure of FIG. 88.

FIG. 88 is a view showing the linearly arranged structures of the liquid crystal display apparatus according to an eighth embodiment of the invention. FIG. 89 is a cross-sectional view of the liquid crystal display apparatus having the linearly arranged structures of FIG. 88. The embodiment of FIGS. 88 and 89 has a combined feature of the embodiment of FIG. 28 and the embodiment of FIG. 43. Specifically, this embodiment comprises first means for forming the boundary of alignment of the liquid crystal in the linearly arranged structures of one substrate, and second means for forming the boundary of alignment of the liquid crystal at the same position as the first means in the other substrate along the extension of the linearly arranged structures.

The upper substrate 12 has the linearly arranged structures 30 formed of projections, and the lower substrate 14 has the linearly arranged structures 32 formed of projections. FIG. 89 is a cross-sectional view taken along a line passing through the linearly arranged structures 32 formed of the projections of the lower substrate 14. The projection 32 has separation sections 32T, thereby forming the boundary forming means 58 of second type (II) on the projection 32. Further, the opposed substrate 12 is formed with dot-projections 62*a* at positions opposed to the separation sections 32T, respectively. As explained with reference to FIG. 43, the dot-projections 62*a* of the opposed substrate 12 are means 62 for forming the boundary of alignment of the liquid crystal molecules at a predetermined position and have the same function of controlling the liquid crystal alignment as the boundary forming means 58 of second type (II). In this case, therefore, the two boundary forming means 58 and 62 of second type (II) are arranged at the same position thereby to secure the formation of the boundary of second type (II) more positively. Thus, the alignment of the liquid crystal molecules is assured further.

Figure 90:
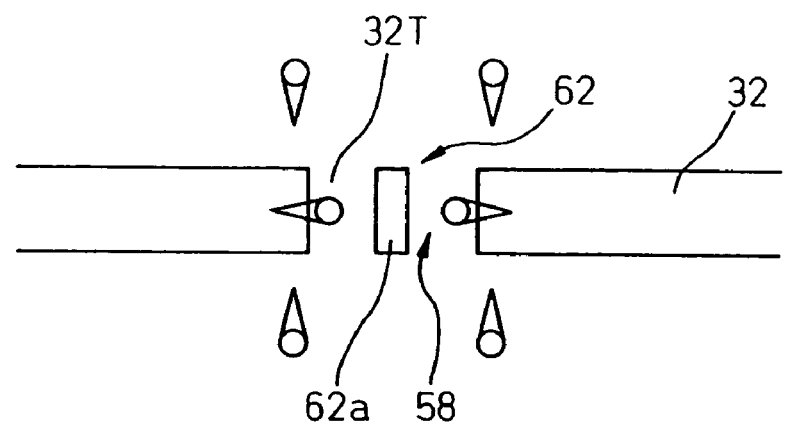
FIG. 90 is a view showing a modification of the alignment control structures of FIG. 88.
Figure 91:
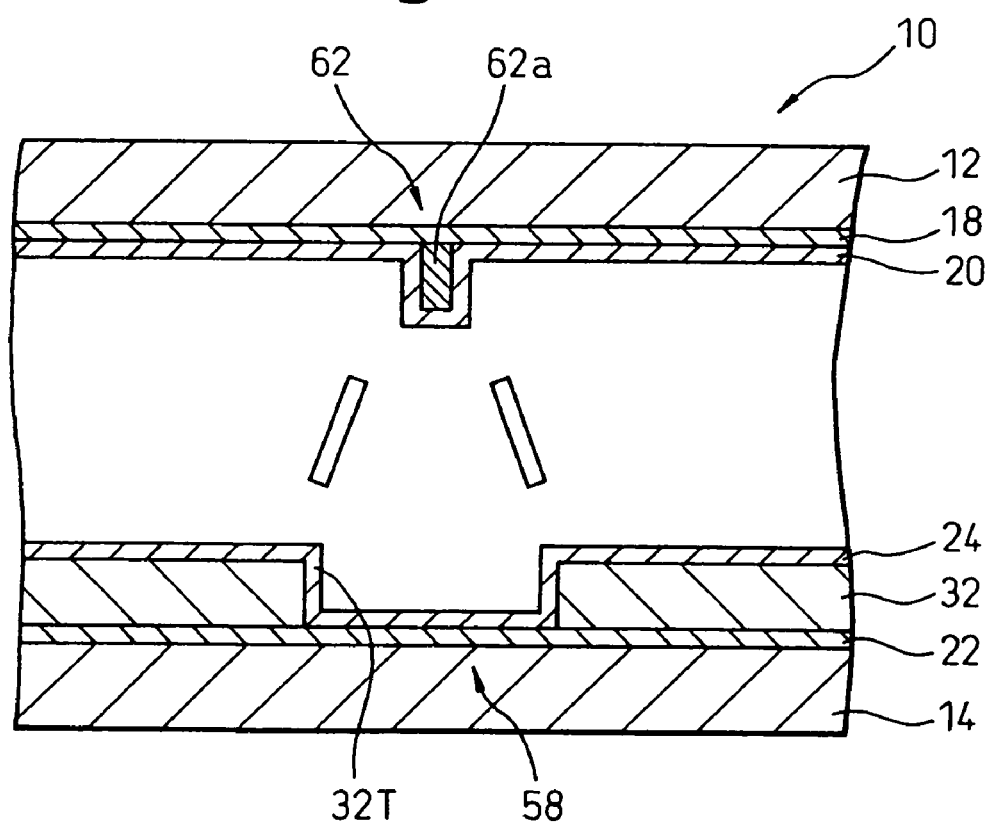
FIG. 91 is a cross-sectional view through the liquid crystal display apparatus having the alignment control structures of FIG. 89.

FIGS. 90 and 91 are views showing an example analogous to FIGS. 88 and 89. This modification also includes the boundary forming means 58 of second type (II), and the opposed substrate 12 includes the means 62 for forming the boundary of alignment of the liquid crystal molecules at a predetermined position. In the embodiment of FIGS. 90 and 91, the size relationship between the separation sections 32T of the projection 32 constituting the means 58 and the projections 62*a* constituting the means 62 is different from the corresponding relation in FIGS. 88 and 89.

Figure 92:
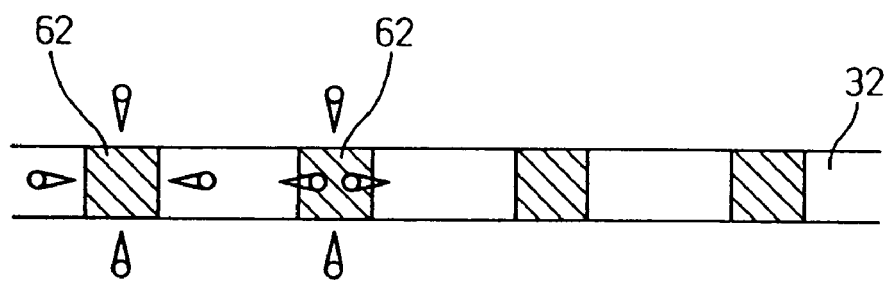
FIG. 92 is a view showing a modification of the alignment control structures of FIG. 88.
Figure 93:
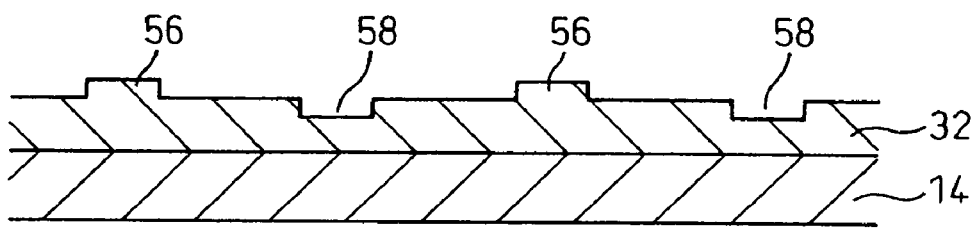
FIG. 93 is a cross-sectional view of the alignment control structures of FIG. 92.

FIG. 92 is a view showing a modification of the linearly arranged structures of FIG. 88. FIG. 93 is a cross-sectional view showing the linear wall structure (projection) 32 of FIG. 92. This linearly arranged structure (projections) 32 includes the boundary forming means 56 of first type (I) formed by increasing the height of the projection 32 and the boundary forming means 58 of second type (II) formed by reducing the height of the projection 32 as shown in FIG. 32. The opposed substrate 12 includes the boundary forming means 62 at the same position as the means 56, 58.

Figure 94:
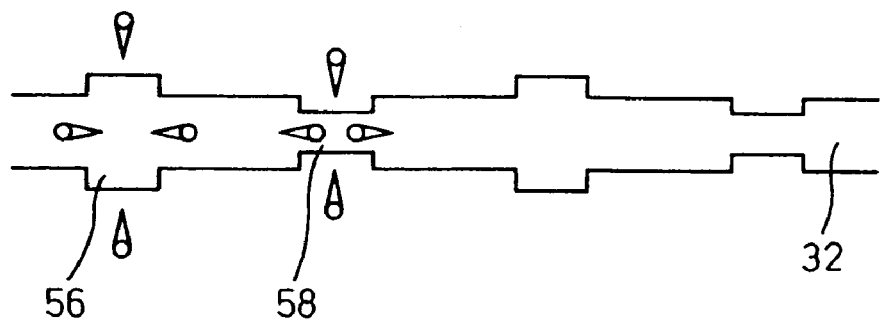
FIG. 94 is a view showing a modification of the alignment control structures of FIG. 93.

FIG. 94 is a view showing a modification of the linearly arranged structures of FIG. 93. This linearly arranged structures (projections) 32, as shown in FIG. 35, include the boundary forming means 56 of first type (I) formed by widening the projection 32 and the boundary forming means 58 of second type (II) formed by narrowing the width of the projection 32. The opposed substrate 12 can include the boundary forming means 62 at the same position as the means 56, 58.

Figure 95:
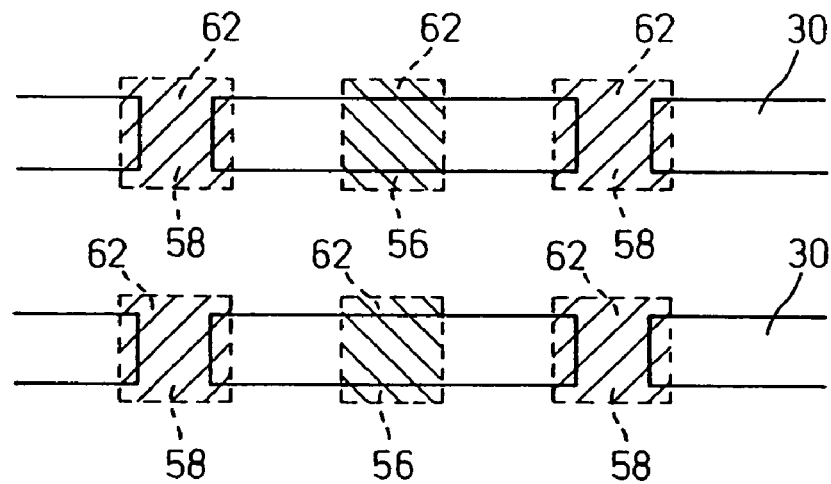
FIG. 95 is a view showing a modification of the alignment control structures of FIG. 88.
Figure 96:
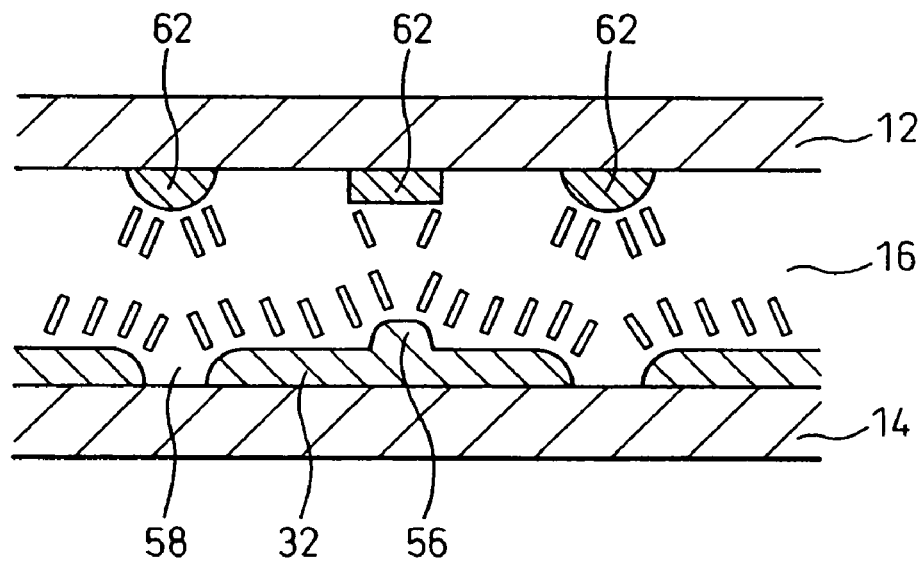
FIG. 96 is a cross-sectional view passing through the liquid crystal display apparatus having the alignment control structures of FIG. 95.

FIGS. 95 and 96 are views showing an example similar to FIGS. 88 and 89. In this example also, the projection 32 includes the boundary forming means 56 of a first type (I) and the boundary forming means 58 of a second type (II), and the opposed substrate 12 includes the means 62 for forming the boundary of alignment of the liquid crystal molecules at the same predetermined position as the means 56 and 58. The boundary forming means 56 of first type (I) constitutes a separation section of the projection 32 and the boundary forming means 58 of a second type (II) constitutes a portion increased in height on the projection 32.

Figure 97:
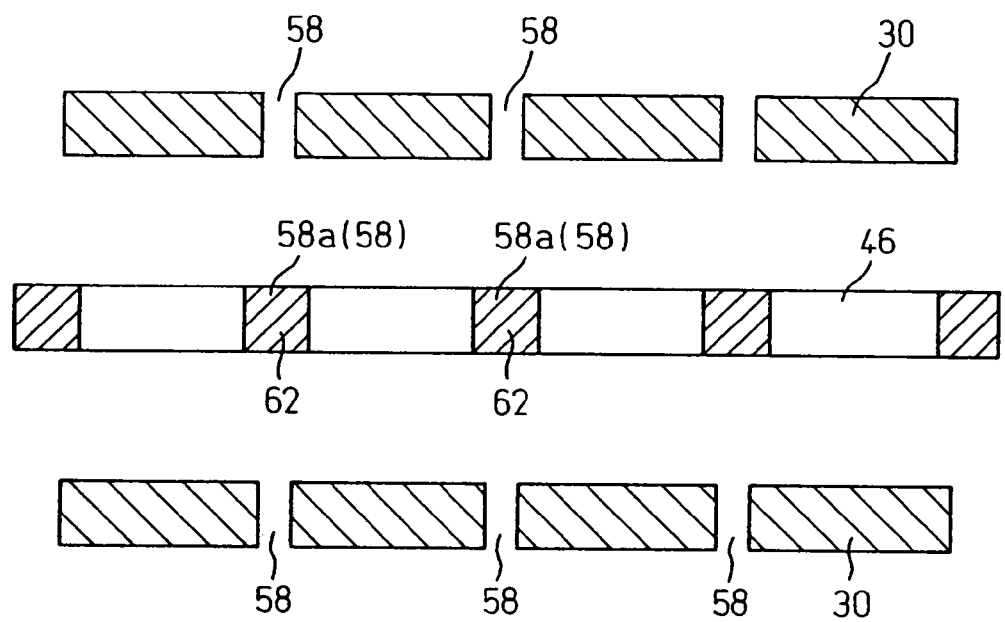
FIG. 97 is a view showing a modification of the alignment control structures of FIG. 88.

FIG. 97 is a view showing a modification of the linearly arranged structures of FIG. 88. In this example, the linearly arranged structures of the lower substrate 14 are formed as slits 46. The slits 46 are separated by the walls 58a, and constitute the boundary forming means 58 of second type (II). At the same time, each wall 58a, to cooperate as a protruded wall, constitutes the means 62 for forming the boundary of alignment of the liquid crystal molecules at a predetermined position on the linearly arranged structures (projections) 30.

Figure 98:
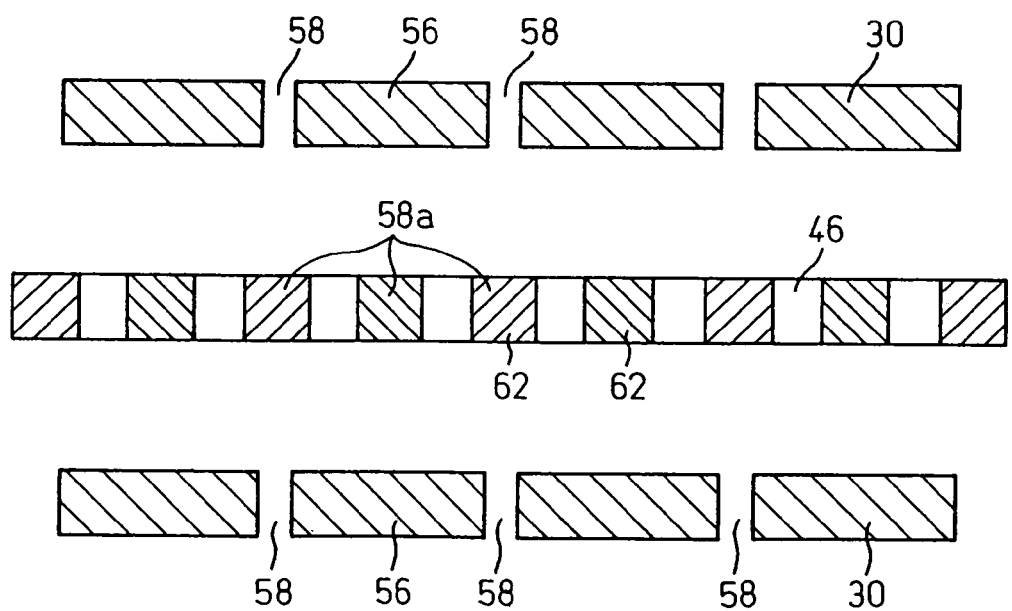
FIG. 98 is a view showing a modification of the alignment control structures of FIG. 88.

FIG. 98 is a view showing linearly arranged structures analogous to FIG. 97. In this example, the linearly arranged structures of the lower substrate 14 are formed as slits 46 separated by walls 58a. The walls 58a are located at the separation sections and the intermediate portions of the component parts of the separated linear wall structure (projections) with which the walls 58a are to cooperate, and constitute the boundary forming means 58 of first type (I) and the boundary forming means 58 of second type (II). At the same time, the wall 8a, to cooperate as a protruded wall, constitutes the means 62 for forming the boundary of alignment of the liquid crystal molecules at a predetermined position on the linearly arranged structures (projection) 30.

The embodiments described above with reference to FIGS. 88 to 98 can be summarized as follows. (a) As the boundary forming means 56 of first type (I), the projections 30 and 32 are thickened or increased in height and the slits 44 and 46 are thickened or increased in height, while as the boundary forming means 60 and 62 for the opposed substrate, a dot-projection, a partially cut projection, a partially thinned projection, a partially lowered projection, a partially connected projection, a partially thinned slit or a partially lowered slit are provided. (b) As the boundary forming means 58 of second type (II), the projections 30, 32 are cut (into a plurality of constituent units), thinned or reduced in height, and the slits 44, 46 are cut, thinned or reduced in height. As the boundary forming means 60, 62 for the opposed substrate, on the other hand, a dotted projection, a partially thickened projection, a projection partially increased in height, a partially protruded projection, a partially thickened projection or a dotted electrode recess is formed.

Figure 99:
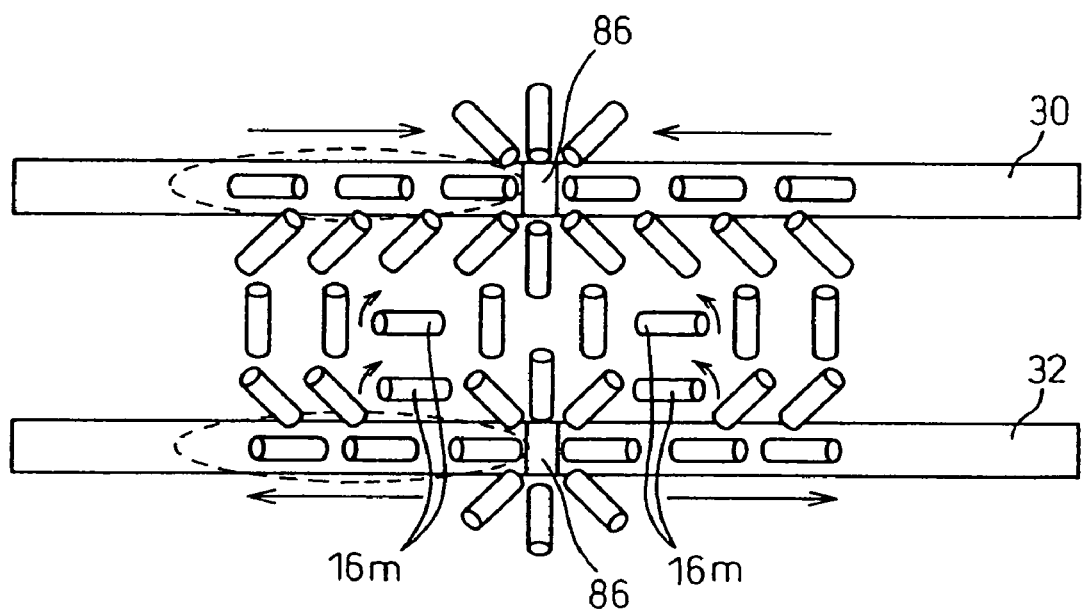
FIG. 99 is a view showing the alignment control structures of the liquid crystal display apparatus according to the ninth embodiment of the present invention.

FIG. 99 is a view showing the linearly arranged structures of the liquid crystal display apparatus according to the ninth embodiment of the present invention. In this case, as in the preceding embodiment, the liquid crystal display apparatus comprises a pair of substrates 12 and 14, a liquid crystal 16 having a negative anisotropy of its dielectric constant and inserted between the pair of the substrates 12 and 14, linearly arranged structures (such as projections 30 and 32 or slits 44 and 46) arranged in each of the pair of the substrates 12 and 14 for controlling the alignment of the liquid crystal 16, and polarizers 26 and 28 arranged on the outside of the pair of the substrates 12 and 14.

FIG. 99 shows one linearly arranged structure (projection) 30 of the upper substrate 12 and one linearly arranged structure (projection) 32 of the lower substrate 14. The linearly arranged structure 30 of the upper substrate includes the means 86 similar to the means 56 for forming the boundary of alignment of first type with the liquid crystal molecules around a point are directed to said point as described above with reference to FIG. 28, and the linearly arranged structure 32 of the lower substrate also includes the means 86 for forming the boundary of alignment of first type with the liquid crystal molecules around a point are directed to said point.

At the time of voltage application, as described previously, the liquid crystal molecules on the linearly arranged structures 30 of the upper substrate and the liquid crystal molecules on the linearly arranged structures 32 of the lower substrate are aligned in the direction parallel to the linearly arranged structure 30 and 32, respectively. On the other hand, the liquid crystal molecules located in the gap between the linearly arranged structures 30 of the upper substrate and the linearly arranged structures 32 of the lower substrate are aligned perpendicular to the linearly arranged structures 30 and 32.

Further, among the liquid crystal molecules on the linearly arranged structures 30 of the lower substrate, those liquid crystal molecules located in the area on the left side of the boundary forming means 86 are aligned rightward with the head thereof directed toward the boundary forming means 86 as indicated by arrow, while the liquid crystal molecules located in the area on the right side of the boundary forming means 86 are aligned leftward with the head thereof directed toward the boundary forming means 86 as indicated by arrow. In similar fashion, among the liquid crystal molecules on the linearly arranged structures 32 of the lower substrate, those liquid crystal molecules located in the area on the left side of the boundary forming means 86 are aligned leftward with the head thereof directed away from the boundary forming means 86 as indicated by arrow, while the liquid crystal molecules located in the area on the right side of the boundary forming means 86 are oriented with the head thereof directed rightward away from the boundary forming means 86 as indicated by arrow.

With regard to the liquid crystal molecules located on a line perpendicular to the linearly arranged structures 30 and 32 (those liquid crystal molecules located in the area on the left side of the boundary forming means 86 surrounded by a dotted circle, for example), the liquid crystal molecules on the linearly arranged structures 30 are aligned rightward (first direction), and the liquid crystal molecules located on the linearly arranged structures 32 are aligned leftward (in the second direction opposite to the first direction). In other words, among the liquid crystal molecules located in the area on the left side of the boundary forming means 86, those liquid crystal molecules located on the linearly arranged structures 30 are aligned in the direction opposite to the liquid crystal molecules located on the linearly arranged structures 32. Similarly, among the liquid crystal molecules located in the area on the right side of the boundary forming means 86, the liquid crystal molecules located on the linearly arranged structures 30 are aligned in the direction opposite to the liquid crystal molecules located on the linearly arranged structures 32.

Figure 100:
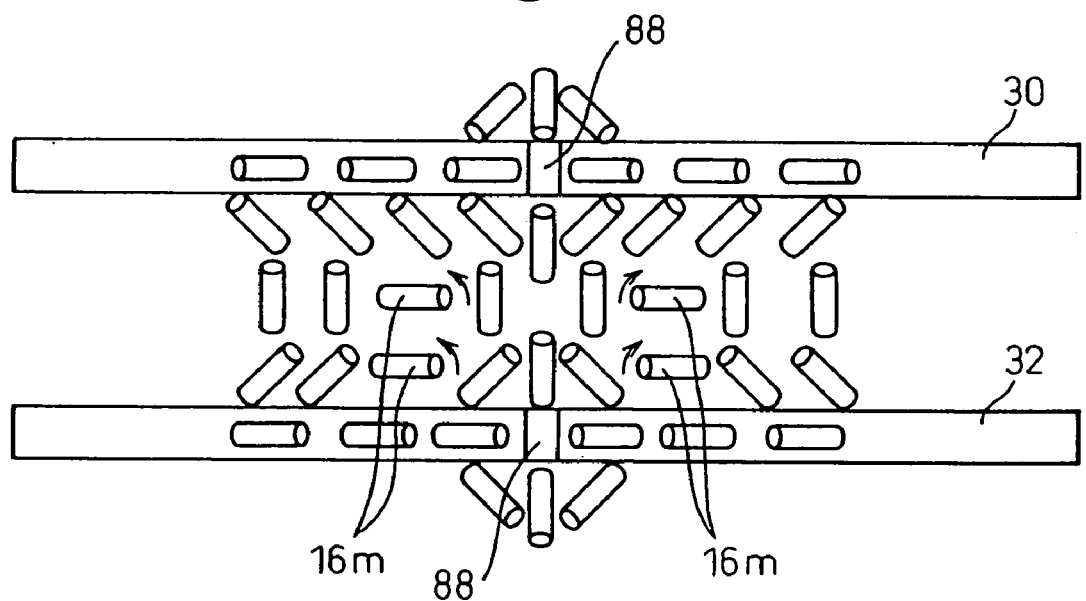
FIG. 100 is a view showing a modification of the alignment control structures of FIG. 99.

FIG. 100 is a view showing a modification of the linearly arranged structures of FIG. 99. In this case, the linearly arranged structures 30 and 32 both include means 88 similar to the means 58 for forming the boundary of alignment of second type in which part of the liquid crystal molecules around a point are directed toward said point and the other liquid crystal molecules are aligned in the opposite direction from the same point. with regard to the liquid crystal molecules on the linearly arranged structures 30 of the upper substrate, therefore, those liquid crystal molecules located in the area on the left side of the boundary forming means 88 are aligned leftward with the head thereof directed away from the boundary forming means 88, as indicated by arrow, while those liquid crystal molecules located in the area on the right side of the boundary forming means 88 are oriented, as indicated by arrow, rightward with the head thereof directed away from the boundary forming means 88. In similar fashion, among the liquid crystal molecules on the linearly arranged structures 32 of the lower substrate, those liquid crystal molecules located in the area on the left side of the boundary forming means 88 are aligned, as indicated by arrow, rightward with the head thereof directed toward the boundary forming means 88, while those liquid crystal molecules located in the area on the right side of the boundary forming means 88 are aligned, as indicated by arrow, leftward with the head thereof directed toward the boundary forming means 88.

Taking the liquid crystal molecules located on a line perpendicular to the linearly arranged structures 30 and 32, as an example, the liquid crystal molecules on the linearly arranged structures 30 are aligned in the first direction, while the liquid crystal molecules on the linearly arranged structures 32 are aligned in the second direction opposite to the first direction.

Figure 101:
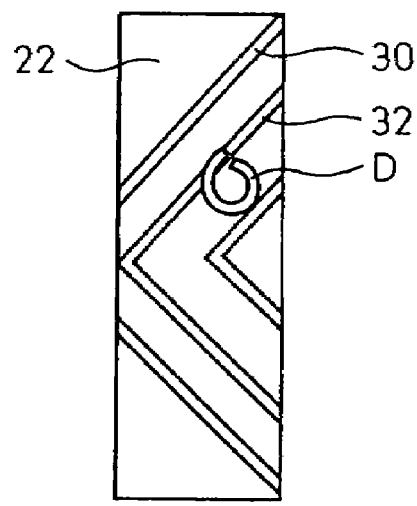
FIG. 101 is a view explaining the problem of pressing, by finger-pressure, the liquid crystal display apparatus having the alignment control structure.

FIG. 101 is a view for explaining the problem of operating by finger a liquid crystal display apparatus having the linearly arranged structures 30 and 32. FIG. 101 shows the state in which a point D on the image display screen is pressed by a finger. In the case where the point D on the image display screen is pressed by a finger, the trace of the finger may be left at the point D as a display defect. The finger trace disappears when the voltage application is stopped. Even when the voltage application is continued, the finger trace may disappear within a short voltage application time or may remain after a protracted voltage application. No problem is posed in the case where the liquid crystal display apparatus is used as an apparatus in which no external force is applied such as by finger. For a liquid crystal display apparatus such as a touch panel in which an external force is applied by finger or the like, on the other hand, the problem of finger trace being left on the display screen is posed.

Figure 102:
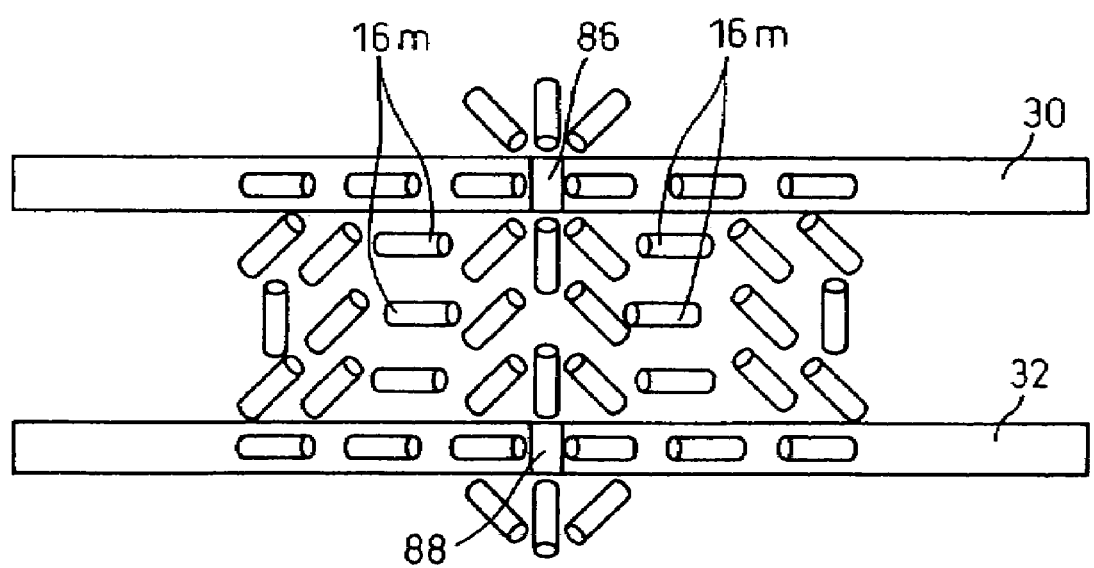
FIG. 102 is a view showing an example liable to pose a problem when pressed by a finger.

FIG. 102 is a view showing a typical example in which a finger trace is liable to occur. The linearly arranged structures 30 of the upper substrate includes means 86 for forming the boundary of alignment of first type, and the linearly arranged structures 32 of the lower substrate includes means 88 for forming the boundary of alignment of second type in which some liquid crystal molecules around a point are directed to said point while the other liquid crystal molecules are directed in the opposite direction from the same point. The liquid crystal molecules on the linearly arranged structures of the upper substrate 30 are thus aligned in the same direction as the liquid crystal molecules on the linearly arranged structures 32 of the lower substrate. Among the liquid crystal molecules on the linearly arranged structures 30 of the upper substrate, for example, the liquid crystal molecules located in the area on the left side of the boundary forming means 86 are aligned leftward, while among the liquid crystal molecules on the linearly arranged structures 32 of the lower substrate, the liquid crystal molecules located in the area on the left side of the boundary forming means 88 are aligned leftward.

In the case where the image display screen is pressed by finger, the liquid crystal molecules on the linearly arranged structures 30 and 32 move toward the gap between the linearly arranged structures 30 and 32, so that a part 16*m* of the liquid crystal molecules in the gap between the linearly arranged structures 30 and 32 are aligned in the direction parallel to the linearly arranged structures 30 and 32. The liquid crystal molecules in the gap between the linearly arranged structures 30 and 32 are originally required to be perpendicular to the linearly arranged structures 30 and 32. At the portion pressed by finger, however, the part 16*m* of the liquid crystal molecules in the gap between the linearly arranged structures 30 and 32 is aligned parallel to the linearly arranged structures 30 and 32. Thus, a declination occurs resulting in the finger trace being left.

As shown in FIG. 102, in the case where the liquid crystal molecules on the linearly arranged structures 30 and 32 of the two substrates are aligned in the same direction, the liquid crystal molecules that have moved toward the gap between the linearly arranged structures 30 and 32 from the linearly arranged structures 30 and 32 are aligned in the same direction as the liquid crystal molecules on the linearly arranged structures 30 and 32. These liquid crystal molecules are aligned continuously from the linearly arranged structure 30 through the gap between the linearly arranged structures 30 and 32 to the other linearly arranged structures 32, so. that the finger trace is left for a long time.

In the case where the image display screen is pressed by finger in FIGS. 99 and 100, on the other hand, as in the case of FIG. 102, a part 16*m* of the liquid crystal molecules on the linearly arranged structures 30 and 32 is pushed out toward the gap between the linearly arranged structures 30 and 32 into a position parallel to the linearly arranged structures 30 and 32. In this case, however, the liquid crystal molecules on the linearly arranged structures 30 and 32 of the two substrates are aligned in opposite directions.

Figure 103:
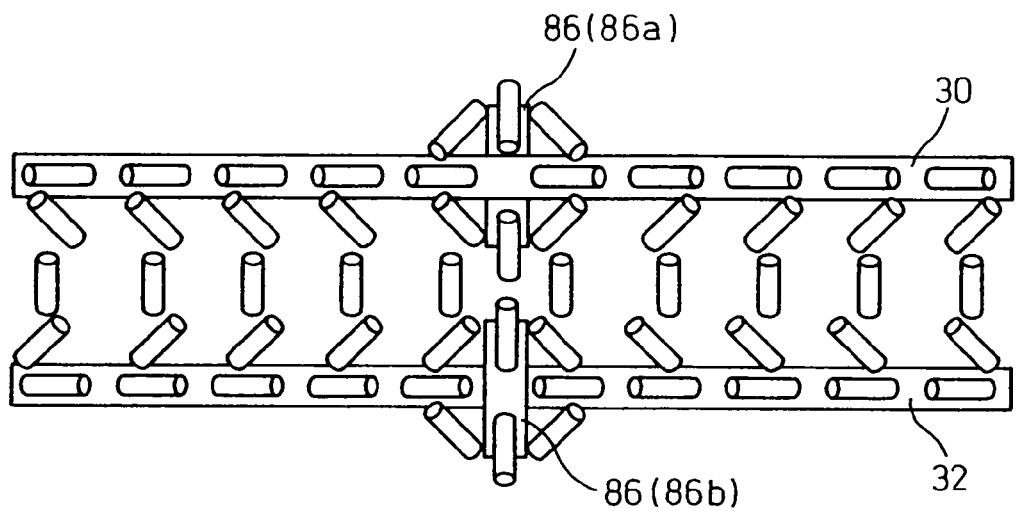
FIG. 103 is a view showing an example of means for forming boundary of first type of FIG. 99.
Figure 104:
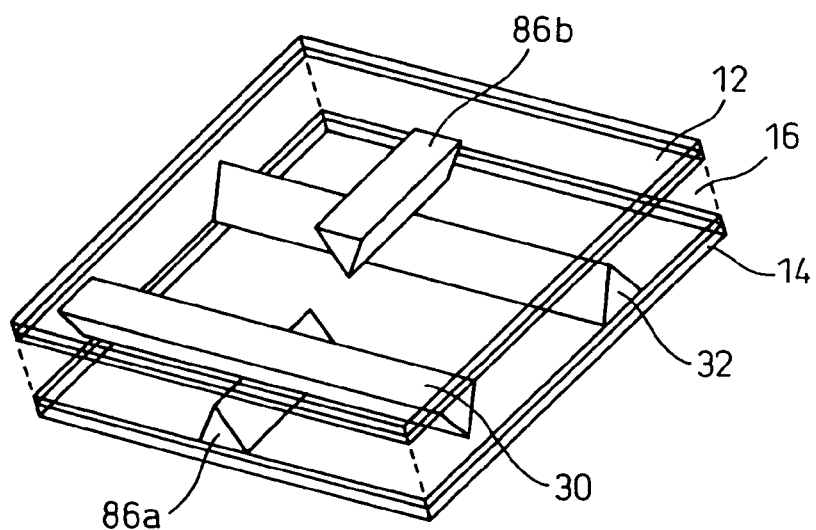
FIG. 104 is a perspective view illustrating the liquid crystal display apparatus having means for forming a boundary of first type of FIG. 103.

Therefore, the liquid crystal molecules 16*m* that have been pushed out are aligned in the same direction as the liquid crystal molecules on the linearly arranged structures of one substrate, but in the direction opposite to the liquid crystal molecules on the linearly arranged structures of the other substrate and fail to be continuously aligned with the liquid crystal molecules on the other linearly arranged structures. Adjacent liquid crystal molecules must be continuously aligned, and therefore the liquid crystal molecules 16*m* pushed out tend to rotate in the direction perpendicular to the linearly arranged structures 30 and 32 as indicated by an arrow. As a result, the finger trace disappears within a short time FIGS. 103 and 104 are view showing an example of the boundary forming means 86 of FIG. 99. The linearly arranged structures 30 of the upper substrate are projections. As to the linearly arranged structures 30 of the upper substrate 12, the means 86 for forming the boundary of alignment of second type (II) includes a small projection 86a arranged on the lower substrate 14. The linearly arranged structures 32 of the lower substrate 14 are projections. with regard to the linearly arranged structures 32 of the lower substrate 14, the means 86 for forming the boundary of alignment of second type (II) includes a small projection 86b arranged on the upper substrate 12. The small projection 86a and the small projection 86b are arranged on a line perpendicular to the linearly arranged structures 30 and 32.

Figure 105:
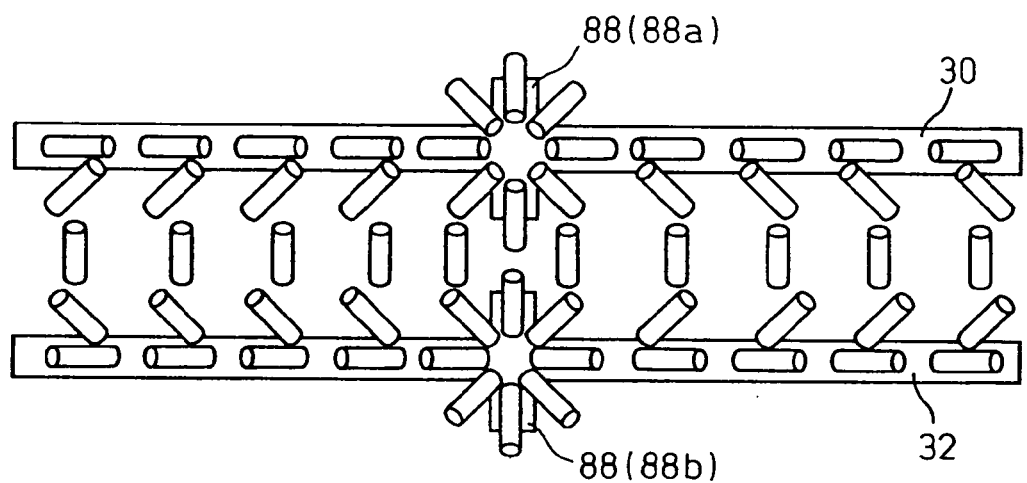
FIG. 105 is a view showing an example of means for forming a boundary of second type of FIG. 99.
Figure 106:
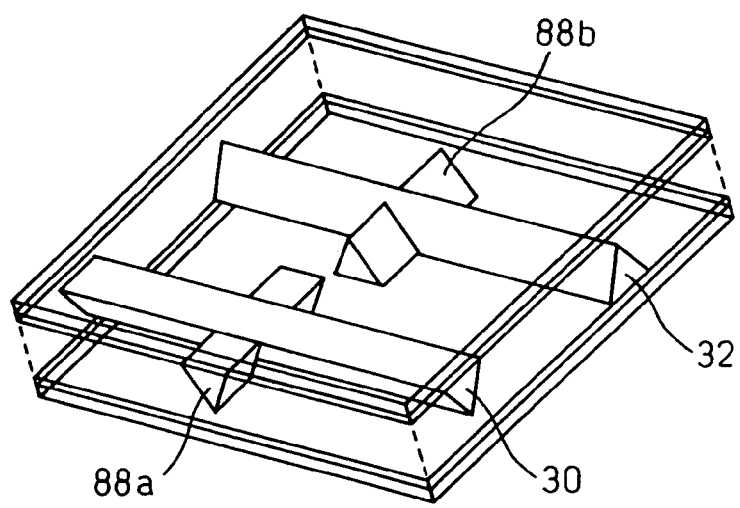
FIG. 106 is a perspective view illustrating the liquid crystal display apparatus having means for forming a boundary of second type of FIG. 105.

FIGS. 105 and 106 are views showing an example of the boundary forming means 88 of FIG. 100. The linearly arranged structures 30 of the upper substrate are projections. With regard to the linearly arranged structure 30 of the upper substrate 12, the means 88 for forming the boundary of alignment of first type (I) includes a small projection 88a arranged on the upper substrate 12. The linearly arranged structure 32 of the lower substrate 14 is a projection, and with regard to the linearly arranged structure 32 of the lower substrate 14, the means 88 for forming the boundary of alignment of first type (I) includes a small projection 88b arranged on the lower substrate 14. The small projection 88a and the small projection 88b are arranged on a line perpendicular to the linearly arranged structures 30 and 32. In FIGS. 103 to 106, the small projections 86a and 86b are longer than the width of the linearly arranged structures 30 and 32 and extend in the direction at right angles to the linearly arranged structures 30 and 32. The width of the linearly arranged structures 30 and 32, for example, is 10 µm and the height thereof is 1.5 µm. The width of the small projections 86a and 86b is 10 µm, the height thereof is 1.5 µm and the length thereof is 14 µm. The small projections 86a and 86b can be formed of a dielectric material.

Figure 107:
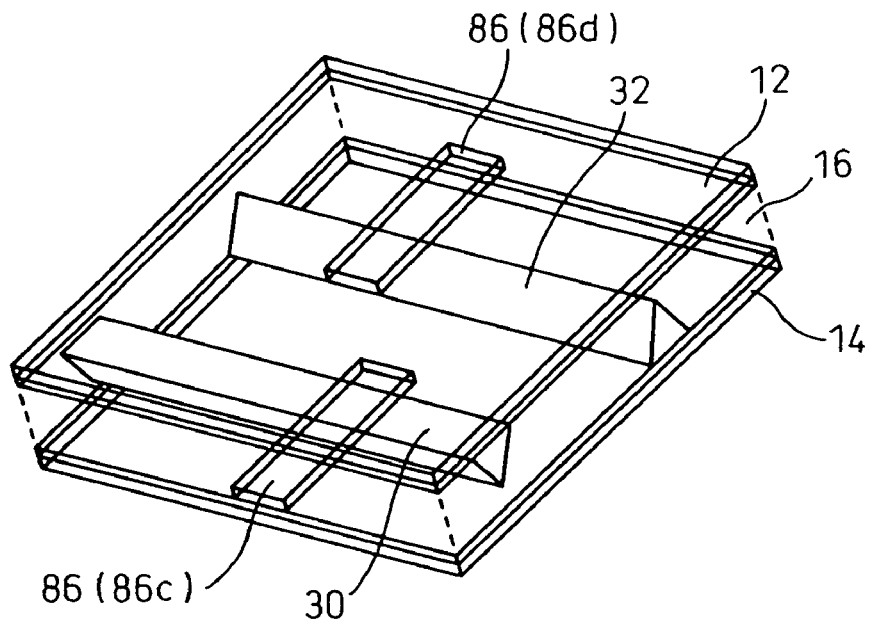
FIG. 107 is a view showing an example of means for forming a boundary of first type of FIG. 99.

FIG. 107 is a view showing an example of the boundary forming means 86 of FIG. 99. The linearly arranged structure 30 of the upper substrate is a projection, and with regard to the linearly arranged structure 30 of the upper substrate 12, the means 86 for forming the boundary of alignment of first type includes a small slit 86c formed in the electrode of the lower substrate 14. The linearly arranged structure 32 of the lower substrate 14 is a projection, and with regard to the linearly arranged structure 32 of the lower substrate, the means 86 for forming the boundary of alignment of second type includes a small slit 86d formed in the electrode of the upper substrate 12. The small slit 86c and the small slit 86d are arranged on a line perpendicular to the linearly arranged structures 30 and 32.

Figure 108:
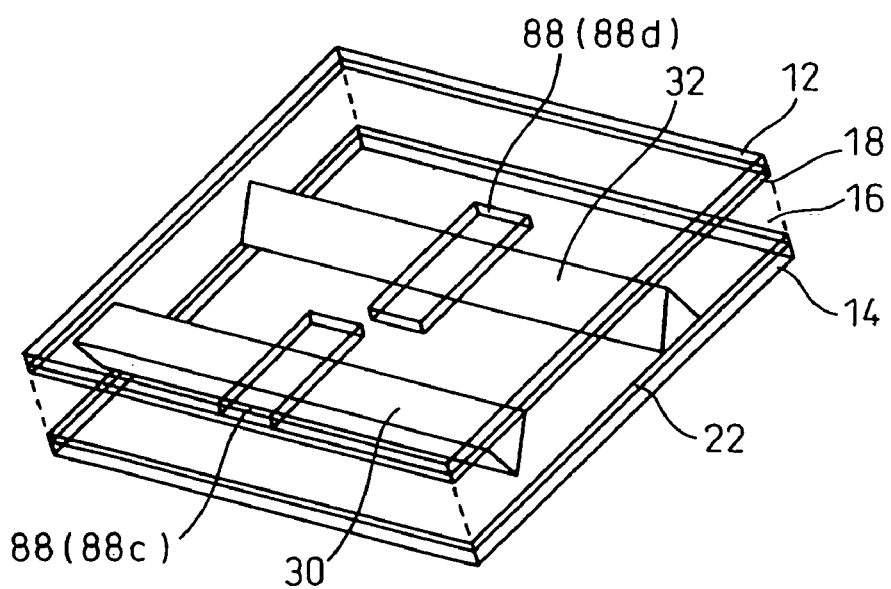
FIG. 108 is a view showing an example of means for forming a boundary of second type of FIG. 99.

FIG. 108 is a view showing an example of the means 88 of FIG. 100. The linearly arranged structure 30 of the upper substrate is a projection, and the means 88 for forming the boundary of alignment of second type on the linearly arranged structure of the upper substrate 12 includes a small slit 88c formed in the upper substrate 12. The linearly arranged structure 32 of the lower substrate 14 is a projection, and the means 88 for forming the boundary of alignment of second type on the linearly arranged structure 32 of the lower substrate 14 includes a small slit 88d formed in the lower substrate 14. The small slit 88c and the small slit 88d are arranged on a line perpendicular to the linearly arranged structures 30 and 32. In FIGS. 107 and 108, the small slits 88c, 88d are longer than the width of the linear wall structure 30, 32 and extend in the direction at right angles to the linearly arranged structures 30 and 32.

In FIGS. 99 to 108, projections are shown as the linearly arranged structures 30 and 32. As an alternative, slits may of course be used as the linearly arranged structures 30 and 32. In this case too, small projections or small slits can be used as the means 86 and 88. Also, the two means 86 including the upper substrate and the lower substrate may be a combination of a small projection and a small slit, and the two means 88 including the upper substrate and the lower substrate may be a combination of a small projection and a small slit. In this way, according to this embodiment, a liquid crystal display apparatus having a high shock resistance is obtained.

Figure 109:
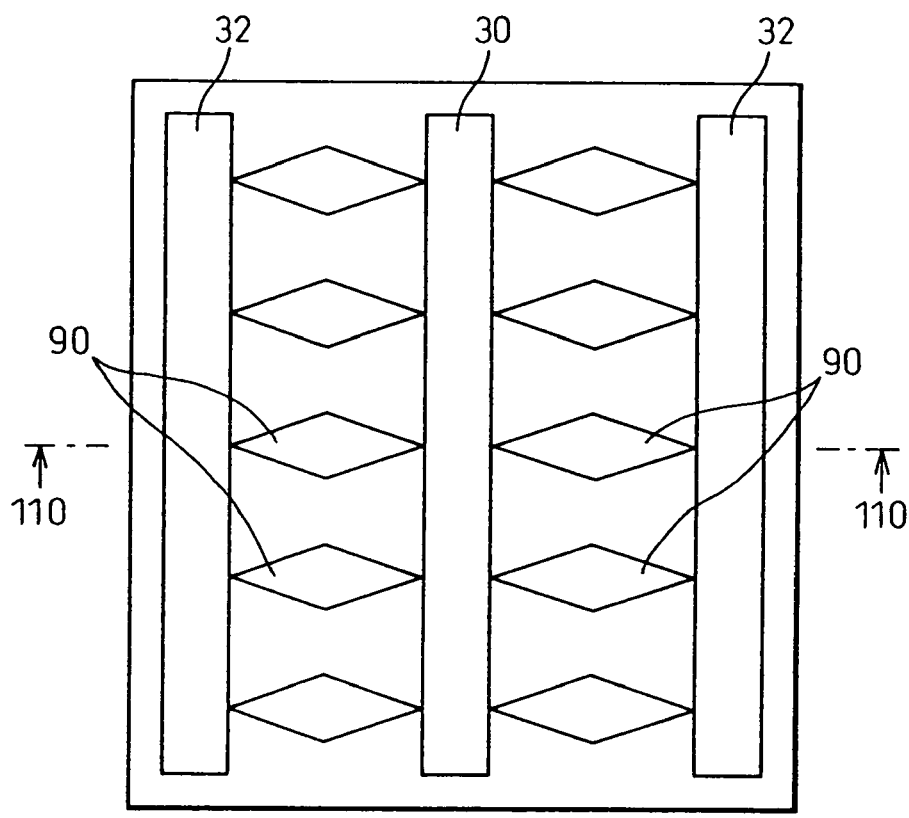
FIG. 109 is a view showing the alignment control structures of the liquid crystal display apparatus according to the tenth embodiment of the present invention.
Figure 110:
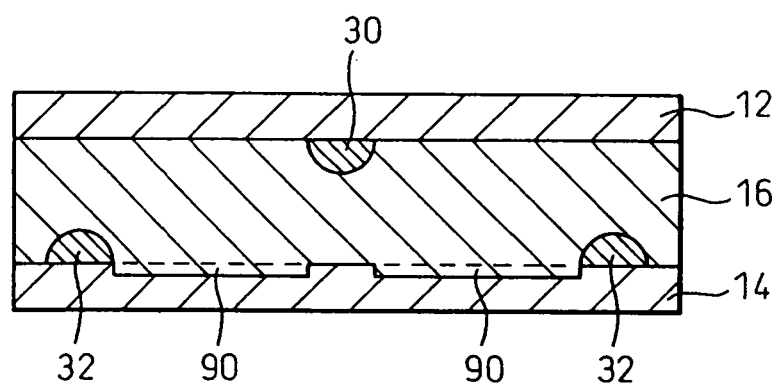
FIG. 110 is a cross-sectional view taken along the line 110-110 of the liquid crystal display apparatus of FIG. 109.

FIG. 109 is a view showing the linearly arranged structures of a liquid crystal display apparatus according to the tenth embodiment of the invention. FIG. 110 is a cross-sectional view of the liquid crystal display apparatus of FIG. 109. Also in this case, as in the preceding embodiment, the liquid crystal display apparatus comprises a pair of substrates 12 and 14, a liquid crystal having a negative anisotropy of its dielectric constant and inserted between the pair of the substrates 12 and 14, linearly arranged structures (such as projections 30 and 32 or slits 44 and 46) arranged on each of the pair of the substrates 12 and 14, respectively, for controlling the alignment of the liquid crystal 16, and polarizers (not shown) arranged on the outside of the pair of the substrates 12 and 14, respectively.

According to this embodiment, the linearly arranged structures 30 of the upper substrate 12 are a projections 30, and the linearly arranged structures 32 of the lower substrate 14 are projections 32. Auxiliary wall structures 90 are arranged on the lower substrate 14 between the linearly arranged structures 30 and 32 of the pair of the substrates 12 and 14, as viewed in the direction normal to the pair of the substrates 12 and 14. The auxiliary wall structures 90 are arranged as rhombic slits. The auxiliary wall structures 90 are long in the direction perpendicular to the linearly arranged structures 30 and 32, and arranged at predetermined pitches (5 to 50 µm) along the linearly arranged structures 30 and 32.

Figure 111:
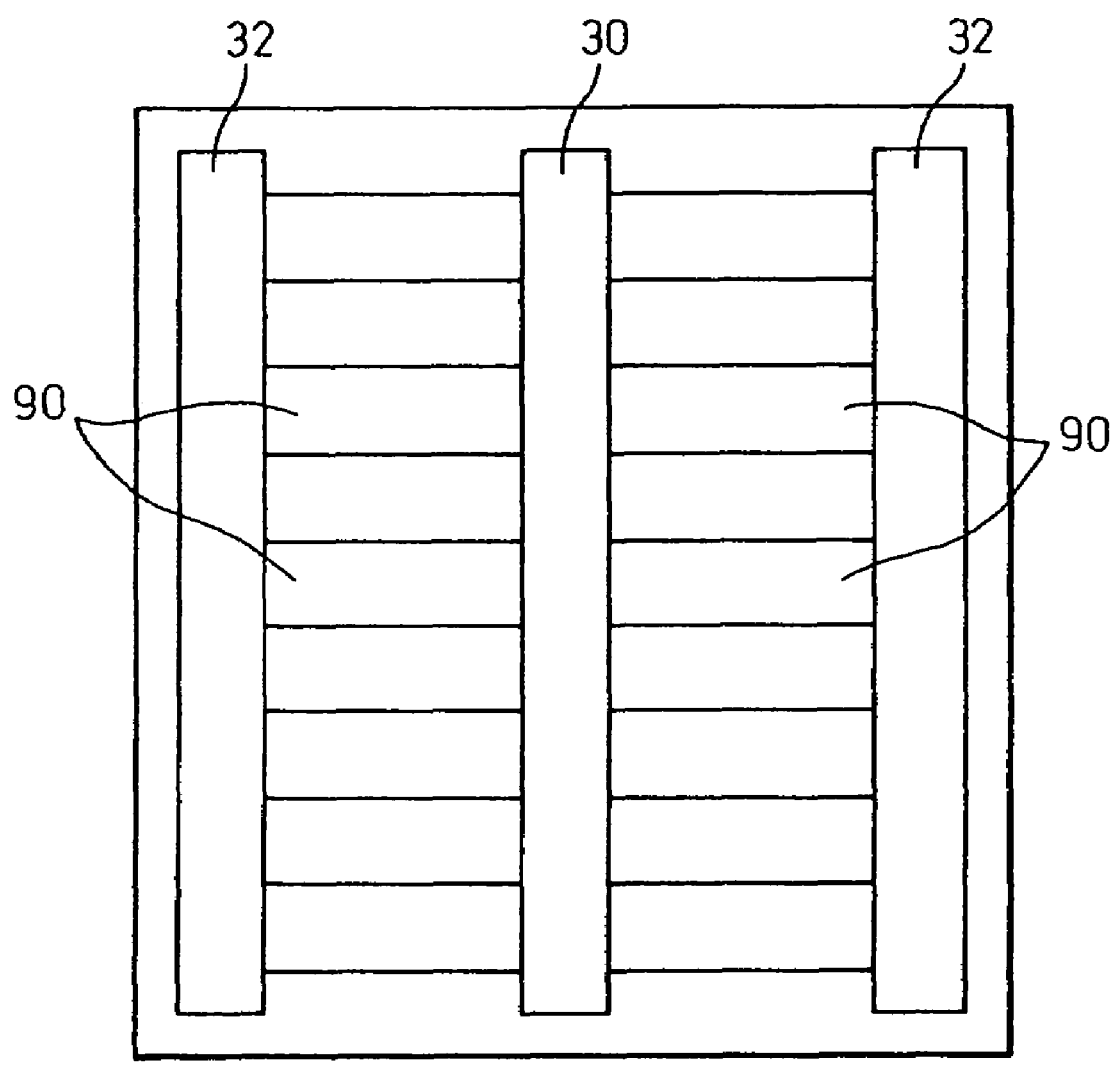
FIG. 111 is a view showing a modification of the liquid crystal display apparatus of FIG. 109.

FIG. 111 is a view showing a modification of the liquid crystal display apparatus of FIG. 109. In this example, the linearly arranged structures 30 of the upper substrate 12 are projections 30, and the linearly arranged structures 32 of the lower substrate 14 are projections 32. The auxiliary wall structures 90 interposed between the linearly arranged structures 30 and 32 of the pair of the substrates 12 and 14 are arranged as rectangular slits. The auxiliary wall structures 90 are long in the direction perpendicular to the linearly arranged structures 30 and 32, and are arranged at predetermined pitches along the linearly arranged structures 30 and 32.

Figure 112:
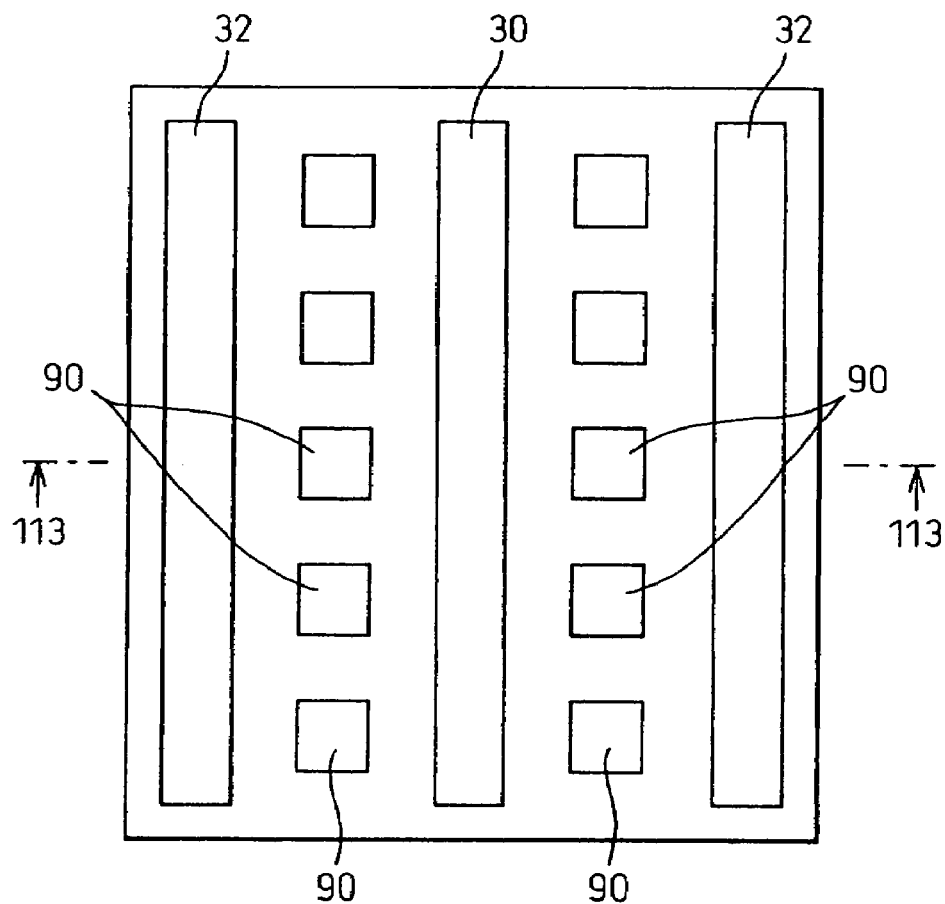
FIG. 112 is a view showing a modification of the liquid crystal display apparatus of FIG. 109.
Figure 113:
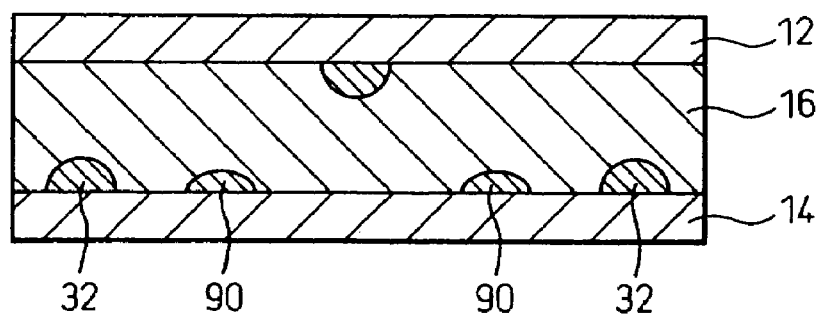
FIG. 113 is a cross-sectional view taken along the line 113-113 of the liquid crystal display apparatus of FIG. 112.

FIGS. 112 and 113 are views showing a modification of the liquid crystal display apparatus of FIG. 109. In this example, the linearly arranged structures 30 of the upper substrate 12 are projections 30, and the linearly arranged structures 32 of the lower substrate 14 are projections 32. The auxiliary wall structures 90 interposed between the linearly arranged structures 30 and 32 of a pair of the substrates 12 and 14 are provided as square projections. The auxiliary wall structures 90 are arranged at predetermined pitches along the linearly arranged structures 30 and 32.

Figure 114:
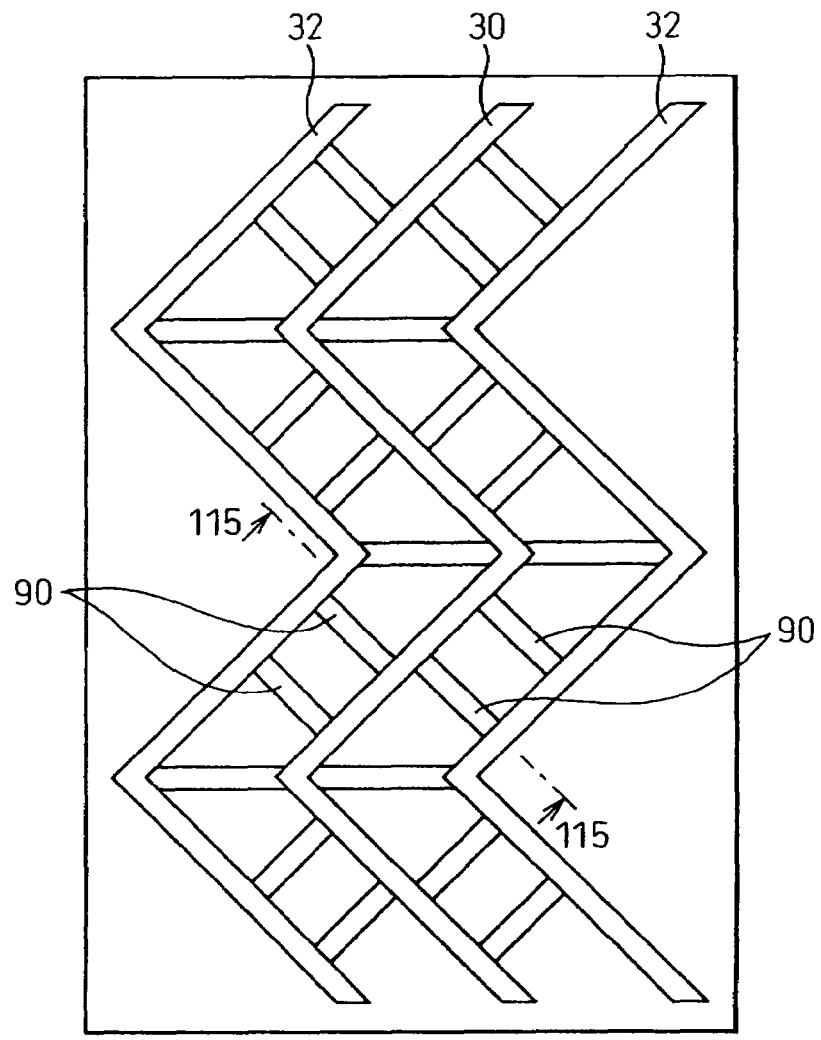
FIG. 114 is a view showing a modification of the liquid crystal display apparatus of FIG. 109.
Figure 115:
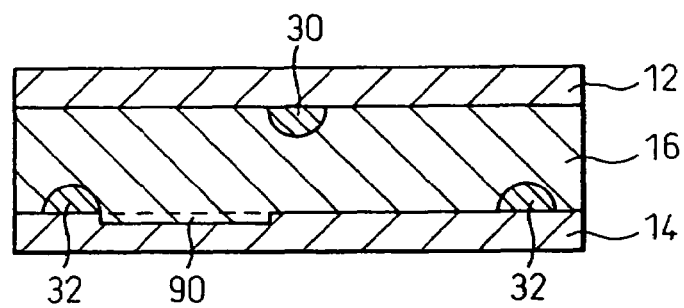
FIG. 115 is a cross-sectional view taken along the line 115-115 of the liquid crystal display apparatus of FIG. 114.

FIGS. 114 and 115 are views showing a modification of the liquid crystal display apparatus of FIG. 109. In this example, the linearly arranged structures 30 of the upper substrate 12 are projections 30, and the linearly arranged structures 32 of the lower substrate 14 are projections 32. Each auxiliary wall structure 90 interposed between the linearly arranged structures 30 and 32 of the pair of the substrates 12 and 14 is arranged as a rectangular slit. The auxiliary wall structure 90 is long in the direction perpendicular to the linearly arranged structures 30 and 32 and is arranged at predetermined pitches along the linearly arranged structures 30 and 32.

The operation of the liquid crystal display apparatus shown in FIGS. 109 to 115 will be explained. In a liquid crystal display apparatus comprising the linearly arranged structures 30 and 32 on the pair of the substrates 12 and 14 for controlling alignment of the liquid crystal, no rubbing is required and the visual angle characteristic is improved. In view of the fact that the distance is large between the linearly arranged structures 30 and 32 in cooperative relation, however, the response of the liquid crystal is low upon application of a voltage thereto. The provision of the auxiliary wall structures 90 between the linearly arranged structures 30 and 32 facilitates the alignment of the liquid crystal in the gap between the linearly arranged structures 30 and 32 and thus improves the response of the liquid crystal as compared when the auxiliary wall structures 90 are absent.

More specifically, in the liquid crystal display apparatus comprising the linearly arranged structures 30 and 32 on the pair of the substrates 12 and 14, the liquid crystal molecules are aligned in the direction perpendicular to the substrate surface and fall in a predetermined direction upon application of a voltage thereto. The liquid crystal molecules located at an intermediate position between the linearly arranged structure 30 and 32 in cooperative relation will not lie in a fixed direction but tend to lie in a random direction immediately after voltage application. with the lapse of a predetermined time, however, the molecules lie in a predetermined direction. The result is a lower response. In the presence of the auxiliary wall structure 90, the liquid crystal molecules located intermediate between the linearly arranged structures 30 and 32 in cooperative relation lie in a predetermined direction immediately after voltage application, thereby improving the responsiveness.

FIGS. 109 to 115 show examples in which both the linearly arranged structures 30 and 32 are formed as projections, for which the auxiliary wall structures 90 including projections or slits are provided. The linearly arranged structures 30 and 32 are both formed as slits. As an alternative, linearly arranged structures of one substrate are formed as projections, and the linearly arranged structures of the other substrate formed as slits. Also in this case, the auxiliary wall structures 90 can be configured of projections or slits. The projections and the slits have substantially the same function and substantially the same effect on the liquid crystal alignment. The auxiliary wall structures 90, therefore, may be either projections or slits. Although no geometric restriction exists, the rhombus produces a good result.

In the case where slits are formed as the auxiliary wall structures 90, the slit should be as long as possible and substantially as long as the gap between the linearly arranged structures 30 and 32 in the direction perpendicular to the linearly arranged structures 30 and 32 in order to heighten the effect of the slits. The slits, if lengthened in the direction parallel to the linearly arranged structures 30 and 32, reduce the area of the electrode portion (in the case where the slit is arranged on the electrode), while if too short, makes it difficult to form the slit itself. The desirable length, therefore, is about 5 to 10 µm. As to the distance between the slits, the effect of the slits is reduced if the distance are too long, while too short a distance disturbs the orientation of the liquid crystal under the mutual effect of the slits. The distance of 5 to 30 µm is recommended.

In the case where projections are formed as the auxiliary wall structures 90, the conditions to be met are somewhat different from those for the slits. First, the size of the projections should not be too large, otherwise the transmittance of the liquid crystal display apparatus is reduced. Too short a projection, on the other hand, makes it difficult to form the projection itself and reduces the effect at the same time. The length of about 5 µm is desirable in the directions both perpendicular and parallel to the linear wall structure 30, 32. As to the distance between the projections, about 5 to 30 µm is desirable for the same reason as in the case of the slit on the one hand and in order not to sacrifice the transmittance on the other.

The use of conductive projections as the auxiliary wall structures 90 is more desirable as it can widen the distance between the projections without sacrificing the transmittance. At the same time, the distance between the projections can be increased up to about 50 µm. For forming conductive projections, ITO is sputtered after forming the projection on the substrate lacking the ITO electrode.

In the case where slits or projections are formed as the auxiliary wall structures 90, the auxiliary wall structures 90 are not necessarily arranged on both the substrates 12 and 14 but only one of them.

Figure 116A:
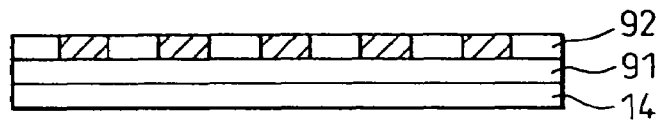

FIGS. 116A to 116G are views showing a method of fabricating the substrate 14 having the linearly arranged structures 32 and the auxiliary wall structures 90. As shown in FIG. 116A, the substrate 14 formed with an ITO film is prepared first. In the case where the substrate 14 is a TFT substrate, the TFT and an active matrix are formed on the substrate followed by forming an ITO film. A positive resist (LC200 made by Shipley Far East) 91 is spin coated on the substrate 14 at 1500 rpm for 30 seconds. The resist is not necessarily positive, but may be negative. Further, a photosensitive resin may be used instead of resist. The spin-coated resist 91 is prebaked at 90° C. for 20 minutes, after which the resist 91 is subjected to contact exposure through a photomask 92 for ITO patterning (exposure time 5 seconds).

Figure 116B:
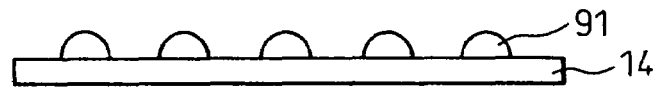
Figure 116C:
Figure 116D:
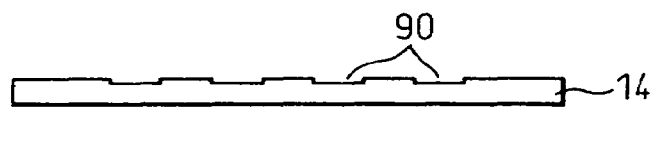

As shown in FIG. 116B, the resist 91 is developed (the development time 50 seconds) with the developer MF319 of Shipley Far East, followed by two post-baking sessions at 120° C. for one hour and at 200° C. for forty. minutes. As shown in FIG. 116C, the ITO of the substrate 14 is etched (etching time 3 minutes) using an ITO etchant (mixture solution of iron chloride, hydrochloric acid and pure water) heated to 45° C. As shown in FIG. 116D, the resist 91 is separated using acetone thereby to produce a substrate 14 with ITO electrode having auxiliary wall structures (slits) 90 patterned thereon.

The patterned ITO constitutes the pixel electrodes 22. It follows, therefore, that the auxiliary wall structures (slits) 90 are formed on the pixel electrodes 22. The auxiliary wall structures (slits) 90 thus produced are rectangular in shape having the longer side of 20 µm and the shorter side of 5 µm with the longer side crossing at right angles to the linear wall structure 32. Also, the distance between the auxiliary wall structures (slits) 90 are 10 µm in the direction perpendicular to the linearly arranged structures 32 and 20 µm in the direction parallel to the linear wall structure 32.

Figure 116E:
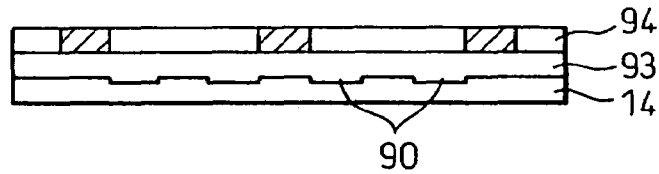
Figure 116F:

As shown in FIG. 116E, the resist (LC200) 93 is spin coated in similar fashion to the preceding case on the substrate 14 patterned with the ITO electrode thus prepared, and after exposure through a photomask 94 for projection, the linearly arranged structures (projections) 32 are formed. In the process, the auxiliary wall structures (slits) 90 of the ITO electrode are located between the linearly arranged structures 30 and 32. FIG. 116F shows the linearly arranged structures (projections) 30 and 32 thus formed. The linearly arranged structures (projections) 32 have the width of 10 μm and the height of 1.5 μm and, when the upper and lower substrates 12 and 14 are laid one on the other, the interval of the linearly arranged structures 30 and 32 is 20 μm. Instead of the auxiliary wall structures (slits) 90 as in the case under consideration, the linearly arranged structures (projections) 32 can be formed first.

Figure 116G:
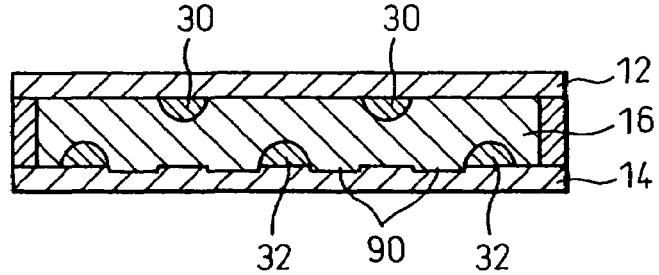

Then, the vertical alignment layers JALS684 (made by JSR) is spin coated at 200 rpm for 30 seconds, followed by baking at 180° C. for one hour. One substrate is formed with a seal (XN-21F, made by Mitsui Toatsu Chemical), and the other substrate is sprayed with a spacer (SP-20045, made by Sekisui Fine Chemical) of 4.5 μm. The resulting two substrates 12, 14 are laid one on the other (FIG. 116G). In the last step, an empty panel is produced by baking at 135° C. for 90 minutes. The liquid crystal MJ961213 (made by Merck) having a negative dielectric constant anisotropy is injected into the empty panel in a vacuum environment. Then, the injection port is sealed with a sealer (30Y-228, made by Three Bond) thereby to complete a liquid crystal panel (FIG. 116G).

In this case, the distance between the auxiliary wall structures (slits) 90 are 20 μm in the direction parallel to the linearly arranged structures 32. By a similar fabrication method, a liquid crystal display apparatus is prepared which has the auxiliary wall structures (slits) 90 with distance of 20 μm in the direction parallel to the linearly arranged structures 32.

Figure 117A:
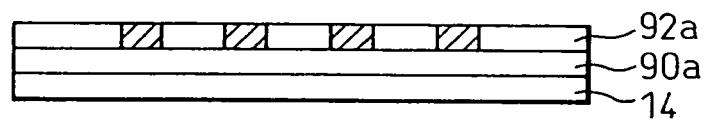
Figure 117B:
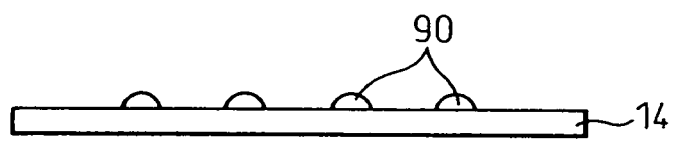
Figure 117C:
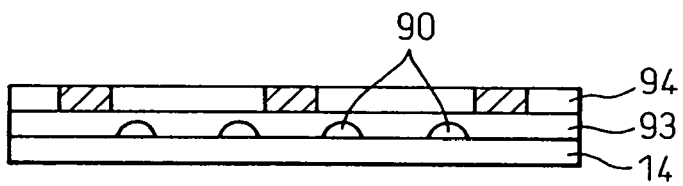

FIGS. 117A to 117E are views showing another example of the method for fabricating a substrate having linearly arranged structures and auxiliary wall structures. As shown in FIG. 117A, a positive resist (LC200, made by Shipley Far East) 90a is spin coated on the substrate 14 having the ITO electrode (not shown) at 2000 rpm for 30 seconds. The resist 90a thus spin-coated is prebaked at 90° C. for 20 minutes, followed by contact exposure through a photomask 92a (exposure time 5 seconds).

As shown in FIG. 1117B, the resist 90a is developed with the developer MF319 of Sciplay Far East (development time 50 seconds), followed by post-baking at 120° C. for one hour and again at 200° C. for 40 minutes to thereby form the auxiliary wall structures (projections) 90. These auxiliary wall structures have a size of 5 μm square, a height of 1 μm and a distance between projections of 25 μm (FIG. 1117C).

Figure 117D:
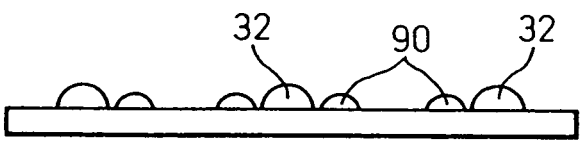
Figure 117E:
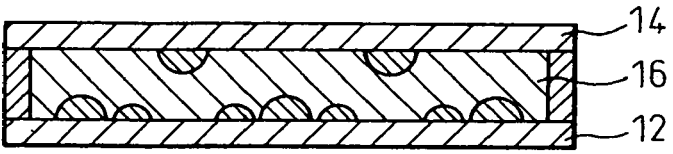

As shown in FIG. 117D, the resist (LC200) 93 is spin coated in similar fashion on the substrate 14 thus prepared and, by exposure through the photomask 94 for forming a projection, the auxiliary wall structures (projections) 90 are arranged between the linearly arranged structures 30 and 32. In a similar manner, the other substrate 12 is formed, and the upper and lower substrates are laid one on the other (FIG. 117E). The linearly arranged structures (projections) 32 have a width of 10 μm, a height of 1.5 μm, and the interval of 20 μm between the linear wall structure 30, 32 when the upper and lower substrates 12, 14 are laid one on the other.

According to yet another example, the auxiliary wall structures 90 are formed of conductive projections. A method of fabricating this will be explained. As in the preceding case, auxiliary wall structures (projections) 90 are formed by use of a positive resist (LC200, made by Sciplay Far East) on a pair of the substrates lacking the ITO electrode. These auxiliary wall structures (projections) 90 have a size of 5 μm square, a height of 1 μm, and the inter-projection distance of 25 μm in the direction perpendicular to the linearly arranged structures 32 and 50 μm in the direction parallel thereto. Then, the ITO is sputtered on the substrate 14 having the auxiliary wall structures (projections) 90, thus forming the pixel electrodes 22 by etching. The auxiliary wall structures (projections) 90 are covered by the ITO and formed as conductive projections. Then, the linearly arranged structures (projections) 32 are formed, and the two substrates 12 and 14 are laid one on the other. The linearly arranged structures (projections) 32 can of course be formed first.

FIG. 118 is a view showing the response of the liquid crystal display apparatus of FIG. 111, in which the distance between the auxiliary wall structures (slits) 90 are changed to 10, 20, 30, 50 μm while maintaining a constant width (5 μm) of the auxiliary wall structures (slits) 90. The measurement is taken at 25° C. The comparative example is the linearly arranged structures 30 and 32, and reference is made to a liquid crystal display apparatus having no auxiliary wall structures (slits) 90. The measurement shows that when the distance between the auxiliary wall structures (slits) 90 is 10, 20, 30 μm, the response speed is smaller than the response speed of the comparative example, while in the case where the distance between the auxiliary wall structures (slits) 90 are 50 μm, the response speed is larger than the speed of the comparative example. Thus, the distance between the auxiliary wall structures (slits) 90 are desirably not more than 50 μm or, more accurately, not more than 30 μm. Also, the transmittance is considerably reduced for the distance between the auxiliary structures (slits) 90 of 10 μm or less. Thus the lower limit of the distance between the auxiliary wall structures (slits) 90 is about 5 μm taking the resolution of the resist into account. By the way, the transmittance for respective distances between the auxiliary structures (slits) is as follows:

| Comparative example | 10 μm | 20 μm | 30 μm | 50 μm |
|---|---|---|---|---|
| 24.0% | 22.7% | 23.5% | 23.8% | 24.2% |

Figure 119:
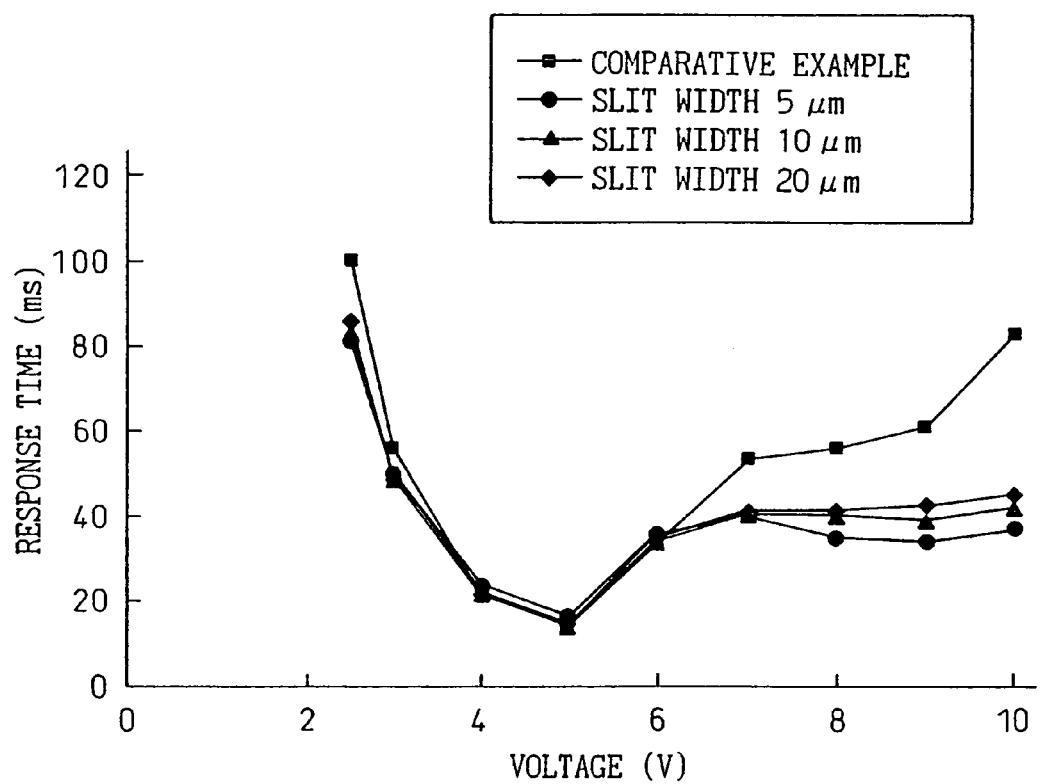

FIG. 119 is a view showing the response of the liquid crystal display apparatus of FIG. 111 in which the distance between the auxiliary wall structures (slits) 90 is kept constant (20 μm) while the width of the auxiliary wall structures (slits) 90 changed to 5, 10 and 20 μm. This measurement shows that in the case where the width of the auxiliary wall structures is 5, 10 and 20 μm, the response speed is smaller than the response speed of the comparative example. For a width of not less than 20 μm of the auxiliary wall structures (slits) 90, the transmittance is reduced. Thus, the width of the auxiliary wall structures (slits) 90 is desirably about 5 to 10 μm. By the way, the transmittance for each width of the auxiliary wall structures (slits) 90 is as follows:

| Comparative example | 5 μm | 10 μm | 20 μm |
|---|---|---|---|
| 24.0% | 23.5% | 22.7% | 20.8% |

Figure 120:
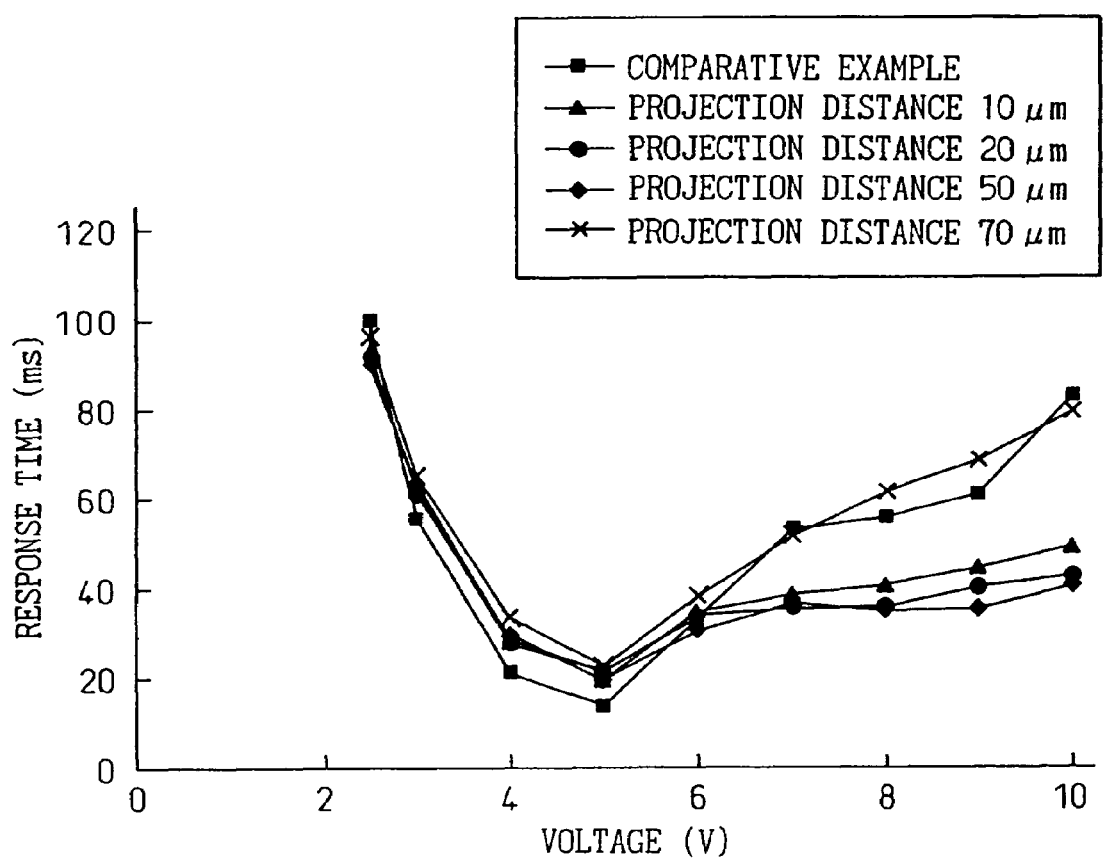

FIG. 120 is a view showing the response with the distance between the auxiliary wall structure (projections) 90 are changed to 10, 20, 50 and 70 μm with a fixed size (5 μm square) of the auxiliary wall structures (projections) 90 of the liquid crystal display apparatus of FIG. 112. This measurement shows that in the case where the distance between the auxiliary wall structures (projections) 90 are 70 μm, the response speed is larger than the response speed of the comparative example. Thus, the distance between the auxiliary wall structures (projections) 90 are desirably not more than 50 μm. When the distance between the auxiliary wall structures (projections) 90 are reduced below 10 μm, on the other hand, the transmittance is reduced. Therefore, the lower limit of the distance between the auxiliary structures (projections) 90 is about 5 μm considering the resolution of the resist. The transmittance for each interval of the auxiliary wall structures (projections) 90 is as follows:

| Comparative example | 10 μm | 20 μm | 50 μm | 70 μm |
|---|---|---|---|---|
| 24.0% | 22.3% | 23.1% | 23.8% | 24.2% |

Figure 121:
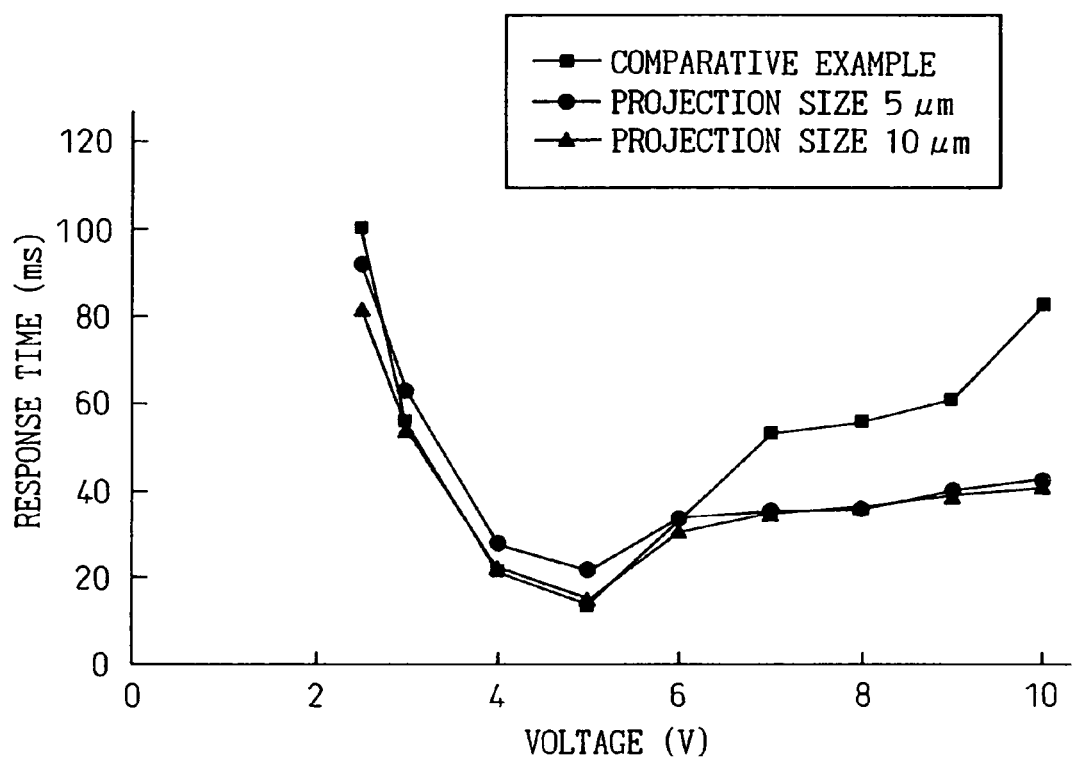

FIG. 121 is a view showing the response of the liquid crystal display apparatus of FIG. 112, in which the size of the auxiliary wall structures (projections) 90 is changed to 5 or 10 μm square with fixed distance between the auxiliary wall structures (projections) 90 at 20 μm. The measurement shows that the response speed for 5 μm in size of the auxiliary wall structures (projections) 90 is substantially the same as that for 10 μm in size of the auxiliary wall structures (projections) 90. When the size of the auxiliary wall structure (projections) 90 is 5 μm, however, the transmittance is reduced. Desirably, therefore, the size of the auxiliary wall structures (projections) 90 is about 5 μm. The transmittance for each size of the auxiliary wall structures (projections) 90 is as follows:

| Comparative example | 5 μm | 10 μm |
|---|---|---|
| 24.0% | 23.1% | 20.6% |

FIG. 122 is a view showing a liquid crystal display apparatus according to the eleventh embodiment of the present invention. In this case, as in the preceding embodiment, the liquid crystal display apparatus comprises a pair of substrates 12 and 14, a liquid crystal 16 having a negative anisotropy of dielectric constant and inserted between the pair of the substrates 12 and 14, linearly arranged structures (projections 30 and 32 or the slits 44 and 46, for example) provided on each of the pair of substrates 12 and 14 for controlling the alignment of the liquid crystal 16, and polarizers 26 and 28 arranged on the outside of the pair of the substrates 12 and 14, respectively.

FIG. 122 shows one linearly arranged structure (projection) 30 of the upper substrate 12, and one linearly arranged structure (projection) 32 of the lower substrate 14. Further, an auxiliary wall structure 96 is arranged between the linearly arranged structures 30 and 32 of the substrate pair at least as viewed along the normal to the substrate pair. According to this embodiment, the auxiliary wall structure 96 is formed on the lower substrate 14 as a substantially flat band-shaped projection 96A wider than the linearly arranged structure 32 in the direction parallel to the linearly arranged structure 32. The linearly arranged structure 32 is formed as a two-stage projection on the auxiliary wall structure 96. The parameter changing in one direction is the height of the band-shaped projection 96A.

With this configuration, the liquid crystal is aligned obliquely at the side edge of the auxiliary wall structure 96. Further, in the case where dielectric constant of the auxiliary wall structure 96 is smaller than the dielectric constant of the liquid crystal, the application of an electric field causes the electric field (electric lines of force EL) to be inclined thereby causing the liquid crystal to align obliquely due to the difference between the dielectric constant of the auxiliary wall structure 96 and the dielectric constant of the liquid crystal. The inclination of the liquid crystal is restricted by the auxiliary wall structure 96 as well as by the linearly arranged structures 32, so that the inclination of the liquid crystal immediately propagates through all the pixels immediately after voltage application, thereby shortening the response time.

Figure 123:
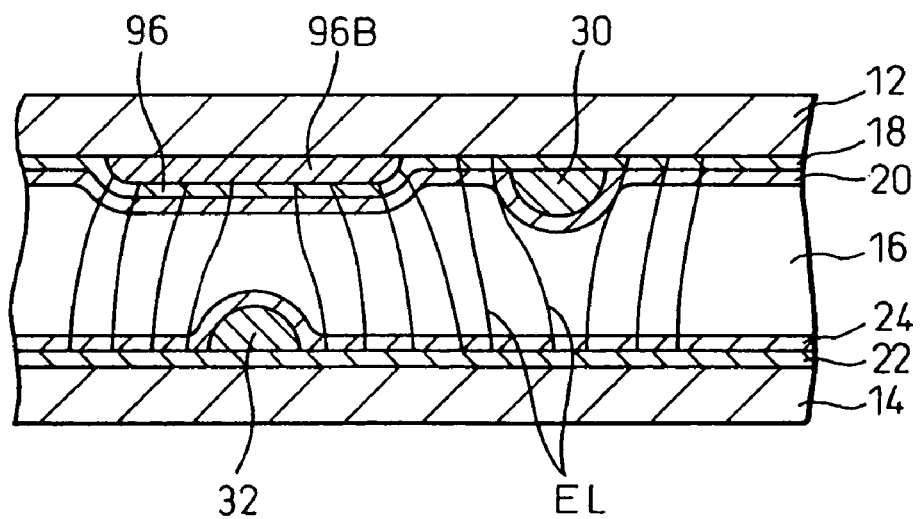

FIG. 123 is a view showing a modification of the liquid crystal display apparatus of FIG. 122. This modification includes conductive projections 96B arranged on the substrate 12 in an opposed relationship to the linearly arranged structures 32. The parameter changing in one direction is the height of the conductive projection 96B formed in the opposed substrate 12. The liquid crystal is aligned obliquely at the side edge of the conductive projections 96B. Further, in view of the shape of the conductive projections 96B, application of a voltage causes the electric field to be inclined and the liquid crystal to be aligned obliquely. The alignment is restricted by the auxiliary wall structures 96 as well as by the linearly arranged structures 32, and the liquid crystal inclination propagates to the whole pixels immediately after voltage application, thereby shortening the response time.

Figure 124A:
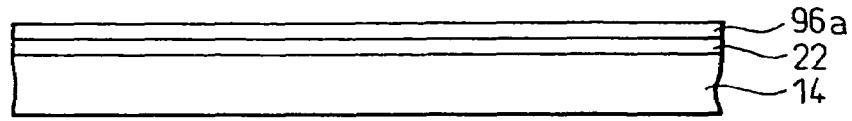
Figure 124B:
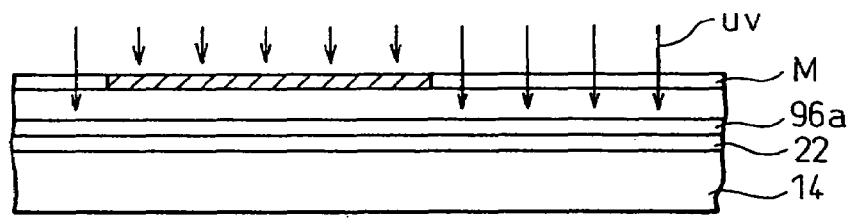
Figure 124C:
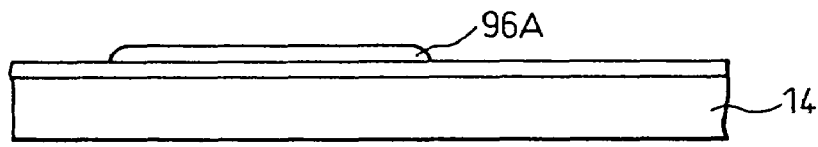
Figure 124D:
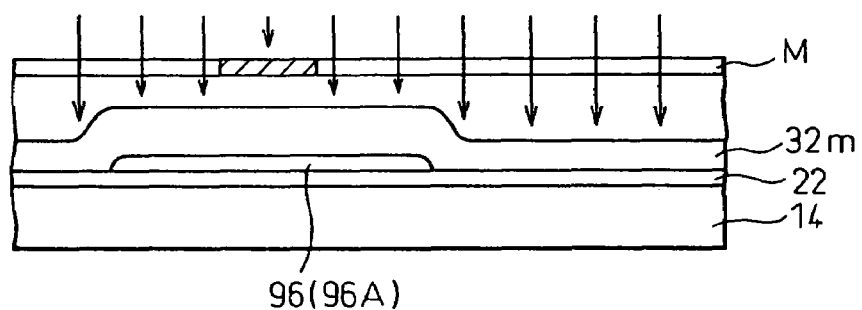
Figure 124E:
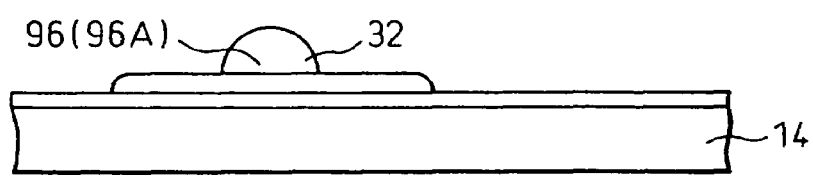

FIGS. 124A to 124E are views showing a method of fabricating the liquid crystal display apparatus of FIG. 122. As shown in FIG. 124A, an ITO 22 is formed on the glass substrate 14, thereby forming a film 96a to constitute band-shaped projections 96A of the auxiliary wall structures 96. As shown in FIG. 124B, the film 96a for projection is exposed to the ultraviolet ray UV using a mask M, and is developed to form a band-shaped projection 96A of the auxiliary wall structure 96 (FIG. 124C). As shown in FIG. 124D, a film 32m which is to constitute the linearly arranged structures 32 is formed and, using the mask M, the film 32m of the linearly arranged structures 32 are exposed to the ultraviolet ray UV and developed to form the linearly arranged structures 32 (FIG. 124E).

Figure 125A:
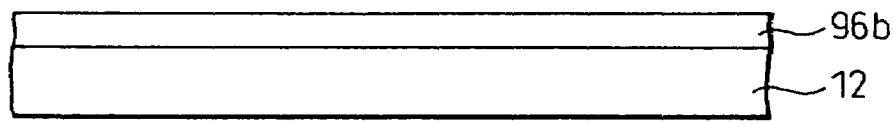
Figure 125B:
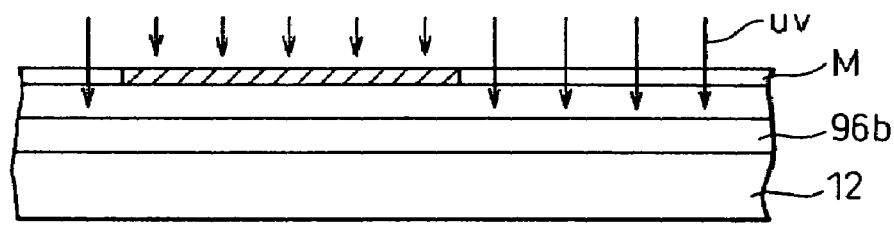
Figure 125C:
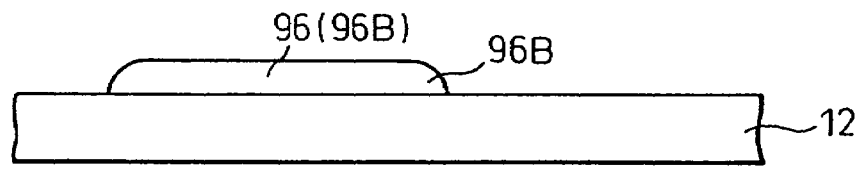
Figure 125D:
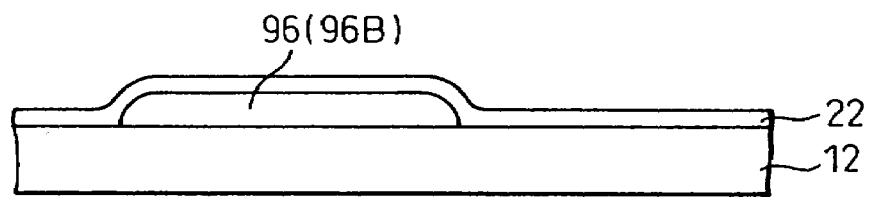
Figure 125E:
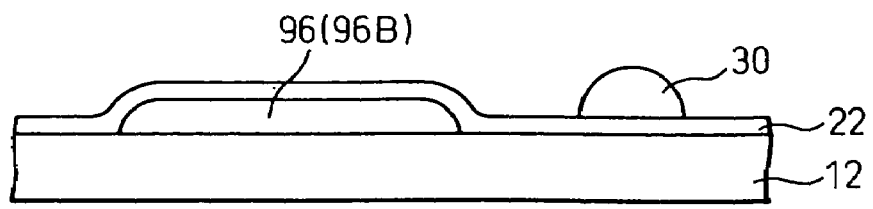

FIGS. 125A to 125E are views showing a method of fabricating the liquid crystal display apparatus of FIG. 123. As shown in FIG. 125A, the glass substrate 12 is formed with a film 96b to constitute the band-shaped projection 96B of the auxiliary wall structures. As shown in FIG. 125B, using the mask M, the film 96b for projection is exposed to the ultraviolet ray UV and developed to form the band-shaped projection 96B of the auxiliary wall structures (FIG. 125C). As shown in FIG. 125D, the film of the ITO to constitute the pixel electrodes 22 is formed by vapor deposition, and then as shown in FIG. 125E, a film to constitute the linearly arranged structures 30 are formed.

Figure 126:
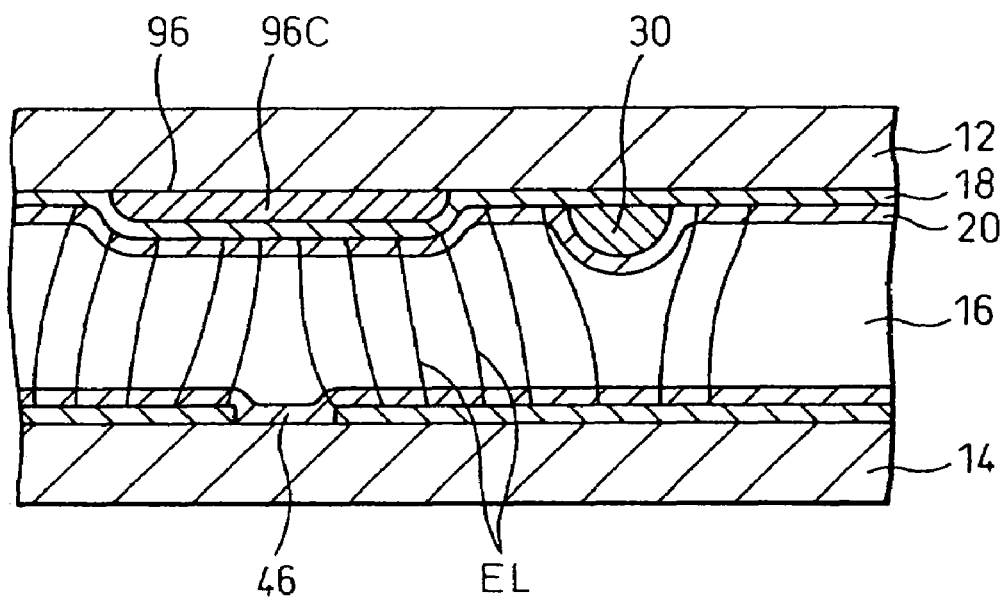

FIG. 126 shows an example in which the linearly arranged structures of the lower substrate 14 are slits 46. The auxiliary wall structures 96 includes conductive projections 96C formed on the opposite side of the linearly arranged structures 46. The linearly arranged structures 46 including the slits 46 develop electric lines of force expanding toward the same slit. The electric lines of force develop in the direction expanding toward the slit 46.

Figure 127:
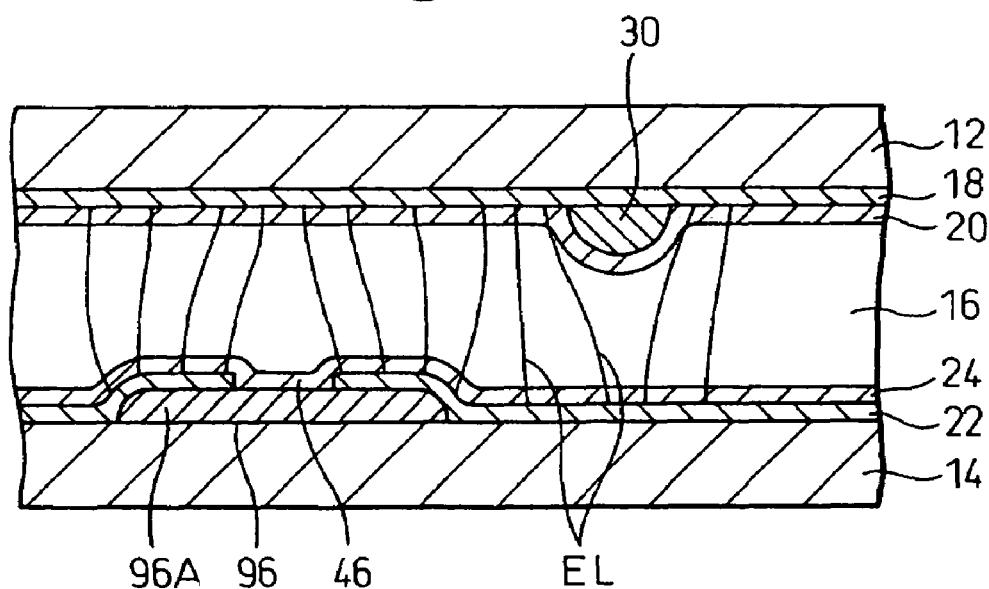

FIG. 127 shows an example in which the linear wall structure of the lower substrate 14 is the slit 46. The auxiliary wall structures 96, as in the case of FIG. 122, includes a band-shaped projection 96 formed under the linearly arranged structures 46. The linearly arranged structures 46 including the slits 46 develops electric lines of force in the direction expanded toward the slit. The electric lines of force are generated in the direction expanding toward the slit 46.

FIG. 128 shows an example in which the auxiliary wall structure 96 includes band-shaped projections 96D, 96E formed in two stages on the lower substrate 14. The band-shaped projection 96D of the lower stage is wider than the band-shaped projection 96E of the upper stage, and the linearly arranged structures 32 constituting the projections 32 are formed on the band-shaped projections 96E of the upper stage. In this case, the inclined alignment of the liquid crystal can be restricted by the two side edges of the band-shaped projections 96D, 96E formed in two stages. In this configuration, the propagation distance of the alignment inclination of the liquid crystal is one third instead of one half and therefore the response time is improved considerably.

In FIG. 129, the auxiliary wall structure 96 includes a band-shaped projection 96F which has a large thickness under the linear wall structure 32 of the lower substrate 14 and inclines outward, progressively decreasing in thickness, away from the linearly arranged structures 32. Since the band-shaped projection 96F having a wide area is inclined, the direction of inclined alignment of the liquid crystal can be restricted by the difference of the shape and the specific dielectric constant over a wide area. Further, the light leakage, which is caused by the shape of the edge, when no voltage is applied can be reduced. The inclined structure can be formed by the reflow of a photosensitive material.

FIG. 130 shows an example in which a corrugated projection 98 is formed on the lower substrate 14, and this projection 98 is caused to function as the linearly arranged structures 32 and the auxiliary wall structure 96. The period of the corrugation is changed, and the parameter changing in one direction is the period of corrugation. When the period of corrugation is long, the average force of restricting the inclined alignment of the liquid crystal weakens. Further, the average electric field distribution is inclined. Thus, the liquid crystal can be aligned by inclination. In this way, the inclined alignment of the liquid crystal can be restricted in a wide area.

FIG. 131 shows an example in which a projection 97 changed in dielectric constant is formed on the lower substrate 14, and this projection 97 is caused to function as the linearly arranged structures 32 and the auxiliary wall structure 96. The projection 97 includes a portion where the specific dielectric constant is decreased from ∈1 to ∈2 to ∈3 in steps. Since the electric field inclination occurs in the area where the specific dielectric constant changes, the inclined alignment of the liquid crystal can be restricted. The relative dielectric constant of the projection 97 may be changed continuously.

FIG. 132 shows an embodiment in which the pixel electrode 22 is configured of a conductor 99A of low resistivity and a conductor 99B of high resistivity. The conductor 99A of low resistivity is narrower than the conductor 99B of high resistivity. The conductor 99A of low resistivity is covered by the conductor 99B of high resistivity and located at the center of the conductor 99B of high resistivity. As a result, an electric field inclination is developed as the charge spreads from the conductor 99B in time due to the time constant determined by the electrostatic capacity of the electrode 18 on the opposed substrate and the conductor 99B of high resistivity. Thus, the inclined alignment of the liquid crystal can be restricted.

FIGS. 133A to 133C are views showing an embodiment in which an unevenness is formed at the end of the projection as the auxiliary wall structure 96. In FIG. 133A, the projection end is formed in a triangular wave 96H as the auxiliary wall structure 96. In FIG. 133B, the projection ends are formed as a curve 96I as the auxiliary wall structure 96. In FIG. 133C, the projection ends are formed as a rectangular wave 96J as the auxiliary wall structure 96. By forming an unevenness at the end of the projection, the orientation of the liquid crystal can be stabilized. When the liquid crystal is aligned obliquely, the alignment tends to be parallel to the projection. In the auxiliary wall structure 96, the liquid crystal is required to be aligned in the direction perpendicular to the projection. In the case where the projection ends are uneven, the forces tending to align the projections in a position parallel to the projection offset each other, with the result that the liquid crystal is oriented in the direction perpendicular to the projection.

FIG. 134A to FIG. 134C are views showing an embodiment in which the section of the projection is defined as the auxiliary wall structure 96. In FIG. 134A, the section of the projection as the auxiliary wall structure 96 is trapezoidal 96K in shape. In FIG. 134B, the section of the projection as the auxiliary wall structure 96 is arcuate 96L in shape. In FIG. 134C, the section of the projection as the auxiliary wall structure 96 is curved 96M in shape. By doing so, the area for defining the inclined orientation of the liquid crystal can be widened. Further, a steep section geometrically disturbs the liquid crystal orientation when no voltage is applied thereto. A smooth sectional shape can reduce the light leakage caused by the orientation defect of the edge.

A further embodiment can be configured from the embodiments explained with reference to FIGS. 122 to 134. For example, in the above-mentioned embodiments, the structure of restricting the inclined orientation of the liquid crystal is formed only on one substrate. Instead, the structure for restricting the inclined alignment of the liquid crystal can be formed on the two substrates. Then, a comparatively uniform cell thickness in the pixel can be secured thereby providing a uniform optical characteristic. Further, the force for restricting the inclined orientation of the liquid crystal is increased.

Also, when the liquid crystal is driven by the TFT, the process for projection fabrication can be simplified by forming the projection of a gate insulating film or the last protective film of silicon nitride or the like. Addition of a chiral material to the liquid crystal can shorten the response time of the liquid crystal for a small electric field. The twist energy of the liquid crystal can restore the liquid crystal alignment more rapidly.

As described above, the means (auxiliary wall structure) for restricting the inclined alignment of a second liquid crystal, which increases or reduces the parameter in one direction from the linearly arranged structures, is formed between the linearly arranged structures. Thus, the direction in which the liquid crystal orientation is inclined can be restricted. As a result, the propagation rate of the direction of inclination of the liquid crystal alignment increases during the transition from black to white display, and therefore the response time can be shortened, thereby greatly contributing to the display performance of the display apparatus involved.

As described above, according to the present invention, a liquid crystal display apparatus can be fabricated which is improved in brightness and higher in response speed. The direction of orientation of all the domains formed on the linear wall structure can be determined and the age-based variation of the domains can be suppressed, thereby improving the overshoot.

The invention claimed is:

1. A liquid crystal display apparatus having display portion including a plurality of pixel portions, comprising:
   a pair of substrates, one of the substrates having a common electrode and the other of said substrates having a plurality of pixel electrodes in the pixel portions, a plane parallel to a generally flat portion of either substrate defining the x-y plane of an x-y-z coordinate system;
   a liquid crystal having a negative dielectric anisotropy inserted between said pair of substrates; and
   an alignment control structure formed linearly on the other of said pair of substrates, shapes of said alignment control structure controlling an alignment of molecules of liquid crystals, said alignment having one component in the x-y plane and another component in at least one of the x-z and y-z planes, said alignment control structure controlling at least the one component in the x-y plane,
   wherein said alignment control structure includes at least one first portion having a first width and at least one second portion having a second width narrower than said first width, and said first portion and said second portion are arranged alternately in said pixel portions having said first portion and said second portion.

2. The liquid crystal display apparatus according to claim 1, further comprising another alignment control structure formed linearly on said one of said pair of substrates for controlling an alignment of molecules of liquid crystals.

3. The liquid crystal display apparatus according to claim 2, wherein said alignment control structure and said another alignment control structure are arranged in parallel with each other.

4. The liquid crystal display apparatus according to claim 1, further comprising another alignment control structure formed linearly on the other one of said pair of substrates for controlling an alignment of molecules of liquid crystals in said plane of the substrates.

5. The liquid crystal display apparatus according to claim 4, wherein said alignment control structure and said another alignment control structure are arranged in parallel with each other when seen in perpendicular to surfaces of said pair of substrates.

6. The liquid crystal display apparatus according to claim 1, wherein the liquid crystal molecules are aligned in a direction perpendicular to said pair of substrates when no voltage is applied to the liquid crystal molecules, and four domains in which the liquid crystal molecules are aligned in four different directions are formed by said alignment control structure when a voltage is applied to the liquid crystal molecules.

7. A liquid crystal display apparatus having a display portion including a plurality of pixel portions, comprising:
   a pair of substrates, one of the substrates having a common electrode and the other of said substrate having a plurality of pixel electrodes in the pixel portions, a plane parallel to a generally flat portion of either substrate defining the x-y plane of an x-y-z coordinate system;
   a liquid crystal having a negative dielectric anisotropy inserted between said pair of substrates; and
   an alignment control structure formed linearly on at least one of said pair of substrates, shapes of said alignment control structure controlling an alignment of molecules of liquid crystals, said alignment having one component in the x-y plane and another component in at least one of the x-z and y-z planes, said alignment control structure controlling at least the one component in the x-y plane,
   wherein said alignment control structure includes a plurality of linear first portions having a first width and at least one second portion between two adjacent first portions, said second portion having a second width narrower than said first width.

8. The liquid crystal display apparatus according to claim 1, further comprising another alignment control structure formed linearly on said one of said pair of substrates for controlling an alignment of molecules of liquid crystals.

9. The liquid crystal display apparatus according to claim 2, wherein said alignment control structure and said another alignment control structure are arranged in parallel with each other.

10. The liquid crystal display apparatus according to claim 7, further comprising another alignment control structure formed linearly on the other one of said pair of substrates for controlling an alignment of molecules of liquid crystals in said plane of the substrates.

11. The liquid crystal display apparatus according to claim 10, wherein said alignment control structure and said another alignment control structure are arranged in parallel with each other when seen in perpendicular to surfaces of said pair of substrates.

12. The liquid crystal display apparatus according to claim 7, wherein the liquid crystal molecules are aligned in a direction perpendicular to said pair of substrates when no voltage is applied to the liquid crystal molecules, and four domains in which the liquid crystal molecules are aligned in four different directions are formed by said alignment control structure when a voltage is applied to the liquid crystal molecules.

* * * * *